(12) United States Patent
Popovich et al.

(10) Patent No.: US 12,140,764 B2
(45) Date of Patent: Nov. 12, 2024

(54) WIDE ANGLE WAVEGUIDE DISPLAY

(71) Applicant: DigiLens Inc., Sunnyvale, CA (US)

(72) Inventors: Milan Momcilo Popovich, Leicester (GB); Alastair John Grant, San Jose, CA (US); Nima Shams, Sunnyvale, CA (US); Jonathan David Waldern, Diablo, CA (US); Sihui He, Sunnyvale, CA (US); Edward Lao, South San Francisco, CA (US); Roger Allen Conley Smith, Sunnyvale, CA (US)

(73) Assignee: DigiLens Inc., Sunnyvale, CA (US)

( * ) Notice: Subject to any disclaimer, the term of this patent is extended or adjusted under 35 U.S.C. 154(b) by 0 days.

(21) Appl. No.: 18/328,535

(22) Filed: Jun. 2, 2023

(65) Prior Publication Data

US 2024/0012247 A1    Jan. 11, 2024

Related U.S. Application Data

(63) Continuation of application No. 17/659,410, filed on Apr. 15, 2022, now abandoned, which is a
(Continued)

(51) Int. Cl.
*G02B 27/01* (2006.01)
*F21V 8/00* (2006.01)
*G02B 6/34* (2006.01)

(52) U.S. Cl.
CPC ....... *G02B 27/0172* (2013.01); *G02B 6/0016* (2013.01); *G02B 27/0103* (2013.01); *G02B 6/34* (2013.01); *G02B 2027/0125* (2013.01)

(58) Field of Classification Search
CPC .................................................. G02B 27/01
See application file for complete search history.

(56) References Cited

U.S. PATENT DOCUMENTS 1,043,938 A    11/1912   Huttenlocher
2,141,884 A    12/1938   Sonnefeld
(Continued)

FOREIGN PATENT DOCUMENTS

BR    PI0720469 A2    1/2014
CA    2889727 A1    6/2014
(Continued)

OTHER PUBLICATIONS

"Compact linear Fresnel reflector", Wikipedia, Sep. 16, 2019, https://en.wikipedia.org/wiki/Compact_linear_Fresnel_reflector, 5 pgs.
(Continued)

*Primary Examiner* — Michael Stahl
(74) *Attorney, Agent, or Firm* — KPPB LLP

(57) ABSTRACT

Disclosed herein are systems and methods for providing waveguide display devices utilizing overlapping integrated dual axis (IDA) waveguides. One embodiment includes a waveguide display device including: a first input image source providing first image light; a second input image source provide second image light; a first IDA waveguide; and a second IDA waveguide. The first IDA waveguide and the second IDA waveguide may include an overlapping region where a first two-dimensionally expanded first image light, a second two-dimensionally expanded first image light, a first two-dimensionally expanded second image light, and a second two-dimensionally expanded second image light is ejected towards an eyebox. Advantageously, resolution may be enhanced and field of view may be expanded through the use of overlapping IDA waveguides.

19 Claims, 35 Drawing Sheets
(14 of 35 Drawing Sheet(s) Filed in Color)

Related U.S. Application Data continuation-in-part of application No. 17/328,727, filed on May 24, 2021, now Pat. No. 11,543,594, which is a continuation of application No. 16/794,071, filed on Feb. 18, 2020, now abandoned.

(60) Provisional application No. 62/813,373, filed on Mar. 4, 2019, provisional application No. 62/806,665, filed on Feb. 15, 2019, provisional application No. 63/176,064, filed on Apr. 16, 2021.

(56) References Cited

U.S. PATENT DOCUMENTS

| | | |
|---|---|---|
| 3,482,498 A | 12/1969 | Becker |
| 3,620,601 A | 11/1971 | Leonard et al. |
| 3,741,716 A | 6/1973 | Johne et al. |
| 3,804,496 A | 4/1974 | Crane et al. |
| 3,843,231 A | 10/1974 | Borel et al. |
| 3,851,303 A | 11/1974 | Muller |
| 3,885,095 A | 5/1975 | Wolfson et al. |
| 3,940,204 A | 2/1976 | Withrington |
| 3,965,029 A | 6/1976 | Arora |
| 3,975,711 A | 8/1976 | McMahon |
| 4,028,725 A | 6/1977 | Lewis |
| 4,035,068 A | 7/1977 | Rawson |
| 4,038,110 A | 7/1977 | Feng |
| 4,066,334 A | 1/1978 | Fray et al. |
| 4,082,432 A | 4/1978 | Kirschner |
| 4,099,841 A | 7/1978 | Ellis |
| 4,133,152 A | 1/1979 | Penrose |
| 4,178,074 A | 12/1979 | Heller |
| 4,218,111 A | 8/1980 | Withrington et al. |
| 4,232,943 A | 11/1980 | Rogers |
| 4,248,093 A | 2/1981 | Andersson et al. |
| 4,251,137 A | 2/1981 | Knop et al. |
| 4,309,070 A | 1/1982 | Searle |
| 4,322,163 A | 3/1982 | Schiller |
| 4,386,361 A | 5/1983 | Simmonds |
| 4,389,612 A | 6/1983 | Simmonds et al. |
| 4,403,189 A | 9/1983 | Simmonds |
| 4,403,827 A | 9/1983 | Bryan et al. |
| 4,418,993 A | 12/1983 | Lipton |
| 4,472,037 A | 9/1984 | Lipton |
| 4,523,226 A | 6/1985 | Lipton et al. |
| 4,544,267 A | 10/1985 | Schiller |
| 4,562,463 A | 12/1985 | Lipton |
| 4,566,758 A | 1/1986 | Bos et al. |
| 4,583,117 A | 4/1986 | Lipton et al. |
| 4,643,515 A | 2/1987 | Upatnieks |
| 4,647,967 A | 3/1987 | Kirschner et al. |
| 4,688,900 A | 8/1987 | Doane et al. |
| 4,711,512 A | 12/1987 | Upatnieks |
| 4,714,320 A | 12/1987 | Banbury |
| 4,728,547 A | 3/1988 | Vaz et al. |
| 4,729,640 A | 3/1988 | Sakata et al. |
| 4,741,926 A | 5/1988 | White et al. |
| 4,743,083 A | 5/1988 | Schimpe |
| 4,749,256 A | 6/1988 | Bell et al. |
| 4,765,703 A | 8/1988 | Suzuki et al. |
| 4,775,218 A | 10/1988 | Wood et al. |
| 4,791,788 A | 12/1988 | Simmonds et al. |
| 4,792,850 A | 12/1988 | Liptoh et al. |
| 4,794,021 A | 12/1988 | Potter |
| 4,799,765 A | 1/1989 | Ferrer |
| 4,811,414 A | 3/1989 | Fishbine et al. |
| 4,848,093 A | 7/1989 | Simmonds et al. |
| 4,852,988 A | 8/1989 | Velez et al. |
| 4,854,688 A | 8/1989 | Hayford et al. |
| 4,860,294 A | 8/1989 | Winzer et al. |
| 4,884,876 A | 12/1989 | Lipton et al. |
| 4,890,902 A | 1/1990 | Doane et al. |
| 4,928,301 A | 5/1990 | Smoot |
| 4,933,976 A | 6/1990 | Fishbine et al. |
| 4,938,568 A | 7/1990 | Margerum et al. |
| 4,946,245 A | 8/1990 | Chamberlin et al. |
| 4,960,311 A | 10/1990 | Moss et al. |
| 4,964,701 A | 10/1990 | Dorschner et al. |
| 4,967,268 A | 10/1990 | Lipton et al. |
| 4,970,129 A | 11/1990 | Ingwall et al. |
| 4,971,719 A | 11/1990 | Vaz et al. |
| 4,994,204 A | 2/1991 | Doane et al. |
| 5,004,323 A | 4/1991 | West |
| 5,007,711 A | 4/1991 | Wood et al. |
| 5,009,483 A | 4/1991 | Rockwell et al. |
| 5,011,624 A | 4/1991 | Yamagishi et al. |
| 5,016,953 A | 5/1991 | Moss et al. |
| 5,033,814 A | 7/1991 | Brown et al. |
| 5,035,734 A | 7/1991 | Honkanen et al. |
| 5,053,834 A | 10/1991 | Simmonds |
| 5,063,441 A | 11/1991 | Lipton et al. |
| 5,076,664 A | 12/1991 | Migozzi |
| 5,079,416 A | 1/1992 | Filipovich |
| 5,096,282 A | 3/1992 | Margerum et al. |
| 5,099,343 A | 3/1992 | Margerum et al. |
| 5,106,181 A | 4/1992 | Rockwell |
| 5,109,465 A | 4/1992 | Klopotek |
| 5,110,034 A | 5/1992 | Simmonds et al. |
| 5,117,285 A | 5/1992 | Nelson et al. |
| 5,117,302 A | 5/1992 | Lipton |
| 5,119,454 A | 6/1992 | McMahon et al. |
| 5,124,821 A | 6/1992 | Antier et al. |
| 5,138,687 A | 8/1992 | Horie et al. |
| 5,139,192 A | 8/1992 | Simmonds et al. |
| 5,142,357 A | 8/1992 | Lipton et al. |
| 5,142,644 A | 8/1992 | Vansteenkiste et al. |
| 5,148,302 A | 9/1992 | Nagano et al. |
| 5,150,234 A | 9/1992 | Takahashi et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,181,133 A | 1/1993 | Lipton |
| 5,183,545 A | 2/1993 | Branca et al. |
| 5,187,597 A | 2/1993 | Kato et al. |
| 5,193,000 A | 3/1993 | Lipton et al. |
| 5,198,912 A | 3/1993 | Ingwall et al. |
| 5,198,914 A | 3/1993 | Arns |
| 5,200,861 A | 4/1993 | Moskovich et al. |
| 5,210,624 A | 5/1993 | Matsumoto et al. |
| 5,210,801 A | 5/1993 | Fournier et al. |
| 5,218,360 A | 6/1993 | Goetz et al. |
| 5,218,480 A | 6/1993 | Moskovich et al. |
| 5,224,198 A | 6/1993 | Jachimowicz et al. |
| 5,225,918 A | 7/1993 | Taniguchi et al. |
| 5,239,372 A | 8/1993 | Lipton |
| 5,240,636 A | 8/1993 | Doane et al. |
| 5,241,337 A | 8/1993 | Betensky et al. |
| 5,242,476 A | 9/1993 | Bartel et al. |
| 5,243,413 A | 9/1993 | Gitlin et al. |
| 5,251,048 A | 10/1993 | Doane et al. |
| 5,264,950 A | 11/1993 | West et al. |
| 5,268,792 A | 12/1993 | Kreitzer et al. |
| 5,284,499 A | 2/1994 | Harvey et al. |
| 5,289,315 A | 2/1994 | Makita et al. |
| 5,295,208 A | 3/1994 | Caulfield et al. |
| 5,296,967 A | 3/1994 | Moskovich et al. |
| 5,299,289 A | 3/1994 | Omae et al. |
| 5,303,085 A | 4/1994 | Rallison |
| 5,306,923 A | 4/1994 | Kazmierski et al. |
| 5,309,283 A | 5/1994 | Kreitzer et al. |
| 5,313,330 A | 5/1994 | Betensky |
| 5,315,324 A | 5/1994 | Kubelik et al. |
| 5,315,419 A | 5/1994 | Saupe et al. |
| 5,315,440 A | 5/1994 | Betensky et al. |
| 5,317,405 A | 5/1994 | Kuriki et al. |
| 5,327,269 A | 7/1994 | Tilton et al. |
| 5,329,363 A | 7/1994 | Moskovich et al. |
| 5,341,230 A | 8/1994 | Smith |
| 5,343,147 A | 8/1994 | Sager et al. |
| 5,351,151 A | 9/1994 | Levy |
| 5,359,362 A | 10/1994 | Lewis et al. |
| 5,363,220 A | 11/1994 | Kuwayama et al. |
| 5,368,770 A | 11/1994 | Saupe et al. |
| 5,369,511 A | 11/1994 | Amos |

(56) References Cited

U.S. PATENT DOCUMENTS

| | | |
|---|---|---|
| 5,371,626 A | 12/1994 | Betensky |
| 5,400,069 A | 3/1995 | Braun et al. |
| 5,408,346 A | 4/1995 | Trissel et al. |
| 5,410,370 A | 4/1995 | Janssen |
| 5,410,376 A | 4/1995 | Cornsweet et al. |
| 5,416,510 A | 5/1995 | Lipton et al. |
| 5,416,514 A | 5/1995 | Janssen et al. |
| 5,418,584 A | 5/1995 | Larson |
| 5,418,871 A | 5/1995 | Revelli et al. |
| 5,428,480 A | 6/1995 | Betensky et al. |
| 5,437,811 A | 8/1995 | Doane et al. |
| 5,438,357 A | 8/1995 | McNelley |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |
| 5,462,700 A | 10/1995 | Beeson et al. |
| 5,463,428 A | 10/1995 | Lipton et al. |
| 5,465,311 A | 11/1995 | Caulfield et al. |
| 5,471,326 A | 11/1995 | Hall et al. |
| 5,473,222 A | 12/1995 | Thoeny et al. |
| 5,476,611 A | 12/1995 | Nolan et al. |
| 5,481,321 A | 1/1996 | Lipton |
| 5,481,385 A | 1/1996 | Zimmerman et al. |
| 5,485,313 A | 1/1996 | Betensky |
| 5,493,430 A | 2/1996 | Lu et al. |
| 5,493,448 A | 2/1996 | Betensky et al. |
| 5,496,621 A | 3/1996 | Makita et al. |
| 5,499,140 A | 3/1996 | Betensky |
| 5,500,671 A | 3/1996 | Andersson et al. |
| 5,500,769 A | 3/1996 | Betensky |
| 5,510,913 A | 4/1996 | Hashimoto et al. |
| 5,515,184 A | 5/1996 | Caulfield et al. |
| 5,516,455 A | 5/1996 | Jacobine et al. |
| 5,524,272 A | 6/1996 | Podowski et al. |
| 5,528,720 A | 6/1996 | Winston et al. |
| 5,530,566 A | 6/1996 | Kumar |
| 5,532,736 A | 7/1996 | Kuriki et al. |
| 5,532,875 A | 7/1996 | Betemsky |
| 5,537,232 A | 7/1996 | Biles |
| RE35,310 E | 8/1996 | Moskovich |
| 5,543,950 A | 8/1996 | Lavrentovich et al. |
| 5,544,268 A | 8/1996 | Bischel et al. |
| 5,559,637 A | 9/1996 | Moskovich et al. |
| 5,572,248 A | 11/1996 | Allen et al. |
| 5,572,250 A | 11/1996 | Lipton et al. |
| 5,576,888 A | 11/1996 | Betensky |
| 5,579,026 A | 11/1996 | Tabata |
| 5,583,795 A | 12/1996 | Smyth |
| 5,585,035 A | 12/1996 | Nerad et al. |
| 5,593,615 A | 1/1997 | Nerad et al. |
| 5,604,611 A | 2/1997 | Saburi et al. |
| 5,606,433 A | 2/1997 | Mn et al. |
| 5,612,733 A | 3/1997 | Flohr |
| 5,612,734 A | 3/1997 | Nelson et al. |
| 5,619,254 A | 4/1997 | McNelley |
| 5,619,586 A | 4/1997 | Sibbald et al. |
| 5,621,529 A | 4/1997 | Gordon et al. |
| 5,621,552 A | 4/1997 | Coates et al. |
| 5,625,495 A | 4/1997 | Moskovich et al. |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,614 A | 9/1997 | Chien et al. |
| 5,668,907 A | 9/1997 | Veligdan |
| 5,677,797 A | 10/1997 | Betensky et al. |
| 5,680,231 A | 10/1997 | Grinberg et al. |
| 5,680,411 A | 10/1997 | Ramdane et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,694,230 A | 12/1997 | Welch |
| 5,695,682 A | 12/1997 | Doane et al. |
| 5,701,132 A | 12/1997 | Kollin et al. |
| 5,706,108 A | 1/1998 | Ando et al. |
| 5,706,136 A | 1/1998 | Okuyama et al. |
| 5,707,925 A | 1/1998 | Akada et al. |
| 5,710,645 A | 1/1998 | Phillips et al. |
| 5,724,189 A | 3/1998 | Ferrante |
| 5,724,463 A | 3/1998 | Deacon et al. |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,736,424 A | 4/1998 | Prybyla et al. |
| 5,742,262 A | 4/1998 | Tabata et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,760,931 A | 6/1998 | Saburi et al. |
| 5,760,960 A | 6/1998 | Lin et al. |
| 5,764,414 A | 6/1998 | King et al. |
| 5,771,320 A | 6/1998 | Stone |
| 5,790,288 A | 8/1998 | Jager et al. |
| 5,790,314 A | 8/1998 | Duck et al. |
| 5,798,641 A | 8/1998 | Spagna et al. |
| 5,804,609 A | 9/1998 | Ohnishi et al. |
| 5,808,804 A | 9/1998 | Moskovich |
| 5,812,608 A | 9/1998 | Valimaki et al. |
| 5,822,089 A | 10/1998 | Phillips et al. |
| 5,822,127 A | 10/1998 | Chen et al. |
| 5,825,448 A | 10/1998 | Bos et al. |
| 5,831,700 A | 11/1998 | Li et al. |
| 5,835,661 A | 11/1998 | Tai et al. |
| 5,841,507 A | 11/1998 | Barnes |
| 5,841,587 A | 11/1998 | Moskovich et al. |
| 5,847,787 A | 12/1998 | Fredley et al. |
| 5,856,842 A | 1/1999 | Tedesco |
| 5,857,043 A | 1/1999 | Cook et al. |
| 5,867,238 A | 2/1999 | Miller et al. |
| 5,867,618 A | 2/1999 | Ito et al. |
| 5,868,951 A | 2/1999 | Schuck, III et al. |
| 5,870,228 A | 2/1999 | Kreitzer et al. |
| 5,875,012 A | 2/1999 | Crawford et al. |
| 5,877,826 A | 3/1999 | Yang et al. |
| 5,886,822 A | 3/1999 | Spitzer |
| 5,892,598 A | 4/1999 | Asakawa et al. |
| 5,892,599 A | 4/1999 | Bahuguna |
| 5,898,511 A | 4/1999 | Mizutani et al. |
| 5,900,987 A | 5/1999 | Kreitzer et al. |
| 5,900,989 A | 5/1999 | Kreitzer |
| 5,903,395 A | 5/1999 | Rallison et al. |
| 5,903,396 A | 5/1999 | Rallison |
| 5,907,416 A | 5/1999 | Hegg et al. |
| 5,907,436 A | 5/1999 | Perry et al. |
| 5,911,018 A | 6/1999 | Bischel et al. |
| 5,917,459 A | 6/1999 | Son et al. |
| 5,926,147 A | 7/1999 | Sehm et al. |
| 5,929,946 A | 7/1999 | Sharp et al. |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,949,508 A | 9/1999 | Kumar et al. |
| 5,956,113 A | 9/1999 | Crawford |
| 5,962,147 A | 10/1999 | Shalhub et al. |
| 5,963,375 A | 10/1999 | Kreitzer |
| 5,966,223 A | 10/1999 | Friesem et al. |
| 5,969,874 A | 10/1999 | Moskovich |
| 5,969,876 A | 10/1999 | Kreitzer et al. |
| 5,973,727 A | 10/1999 | McGrew et al. |

(56) References Cited

U.S. PATENT DOCUMENTS

| | | |
|---|---|---|
| 5,974,162 A | 10/1999 | Metz et al. |
| 5,985,422 A | 11/1999 | Krauter |
| 5,986,746 A | 11/1999 | Metz et al. |
| 5,991,087 A | 11/1999 | Rallison |
| 5,999,089 A | 12/1999 | Carlson et al. |
| 5,999,282 A | 12/1999 | Suzuki et al. |
| 5,999,314 A | 12/1999 | Asakura et al. |
| 6,014,187 A | 1/2000 | Taketomi et al. |
| 6,023,375 A | 2/2000 | Kreitzer |
| 6,042,947 A | 3/2000 | Asakura et al. |
| 6,043,585 A | 3/2000 | Plessky et al. |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,069,728 A | 5/2000 | Huignard et al. |
| 6,075,626 A | 6/2000 | Mizutani et al. |
| 6,078,427 A | 6/2000 | Fontaine et al. |
| 6,084,998 A | 7/2000 | Straayer |
| 6,094,311 A | 7/2000 | Moskovich |
| 6,097,551 A | 8/2000 | Kreitzer |
| 6,104,448 A | 8/2000 | Doane et al. |
| 6,107,943 A | 8/2000 | Schroeder |
| 6,115,152 A | 9/2000 | Popovich et al. |
| 6,118,908 A | 9/2000 | Bischel et al. |
| 6,121,899 A | 9/2000 | Theriault |
| 6,124,954 A | 9/2000 | Popovich et al. |
| 6,127,066 A | 10/2000 | Ueda et al. |
| 6,128,058 A | 10/2000 | Walton et al. |
| 6,133,971 A | 10/2000 | Silverstein et al. |
| 6,133,975 A | 10/2000 | Li et al. |
| 6,137,630 A | 10/2000 | Tsou et al. |
| 6,141,074 A | 10/2000 | Bos et al. |
| 6,141,154 A | 10/2000 | Kreitzer et al. |
| 6,151,142 A | 11/2000 | Phillips et al. |
| 6,154,190 A | 11/2000 | Yang et al. |
| 6,156,243 A | 12/2000 | Kosuga et al. |
| 6,167,169 A | 12/2000 | Brinkman et al. |
| 6,169,594 B1 | 1/2001 | Aye et al. |
| 6,169,613 B1 | 1/2001 | Amitai et al. |
| 6,169,636 B1 | 1/2001 | Kreitzer et al. |
| 6,172,792 B1 | 1/2001 | Jepsen et al. |
| 6,176,837 B1 | 1/2001 | Foxlin |
| 6,185,015 B1 | 2/2001 | Reinhorn et al. |
| 6,185,016 B1 | 2/2001 | Popovich |
| 6,188,462 B1 | 2/2001 | Lavrentovich et al. |
| 6,191,887 B1 | 2/2001 | Michaloski et al. |
| 6,195,206 B1 | 2/2001 | Yona et al. |
| 6,195,209 B1 | 2/2001 | Kreitzer et al. |
| 6,204,835 B1 | 3/2001 | Yang et al. |
| 6,211,976 B1 | 4/2001 | Popovich et al. |
| 6,215,579 B1 | 4/2001 | Bloom et al. |
| 6,218,316 B1 | 4/2001 | Marsh |
| 6,222,297 B1 | 4/2001 | Perdue |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,266,166 B1 | 7/2001 | Katsumata et al. |
| 6,268,839 B1 | 7/2001 | Yang et al. |
| 6,269,203 B1 | 7/2001 | Davies et al. |
| 6,275,031 B1 | 8/2001 | Simmonds et al. |
| 6,278,429 B1 | 8/2001 | Ruth et al. |
| 6,285,813 B1 | 9/2001 | Schultz et al. |
| 6,297,860 B1 | 10/2001 | Moskovich et al. |
| 6,301,056 B1 | 10/2001 | Kreitzer et al. |
| 6,301,057 B1 | 10/2001 | Kreitzer et al. |
| 6,317,083 B1 | 11/2001 | Johnson et al. |
| 6,317,227 B1 | 11/2001 | Mizutani et al. |
| 6,317,228 B2 | 11/2001 | Popovich et al. |
| 6,317,528 B1 | 11/2001 | Gadkaree et al. |
| 6,320,563 B1 | 11/2001 | Yang et al. |
| 6,321,069 B1 | 11/2001 | Piirainen |
| 6,323,970 B1 | 11/2001 | Popovich |
| 6,323,989 B1 | 11/2001 | Jacobson et al. |
| 6,324,014 B1 | 11/2001 | Moskovich et al. |
| 6,327,089 B1 | 12/2001 | Hosaki et al. |
| 6,330,109 B1 | 12/2001 | Ishii et al. |
| 6,333,819 B1 | 12/2001 | Svedenkrans |
| 6,335,224 B1 | 1/2002 | Peterson et al. |
| 6,339,486 B1 | 1/2002 | Popovich |
| 6,340,540 B1 | 1/2002 | Ueda et al. |
| 6,351,273 B1 | 2/2002 | Lemelson et al. |
| 6,351,333 B2 | 2/2002 | Araki et al. |
| 6,356,172 B1 | 3/2002 | Koivisto et al. |
| 6,356,674 B1 | 3/2002 | Davis et al. |
| 6,359,730 B2 | 3/2002 | Tervonen |
| 6,359,737 B1 | 3/2002 | Stringfellow |
| 6,366,281 B1 | 4/2002 | Lipton et al. |
| 6,366,369 B2 | 4/2002 | Ichikawa et al. |
| 6,366,378 B1 | 4/2002 | Tervonen et al. |
| 6,377,238 B1 | 4/2002 | McPheters |
| 6,377,321 B1 | 4/2002 | Khan et al. |
| 6,388,797 B1 | 5/2002 | Lipton et al. |
| 6,392,812 B1 | 5/2002 | Howard |
| 6,407,724 B2 | 6/2002 | Waldern et al. |
| 6,409,687 B1 | 6/2002 | Foxlin |
| 6,411,444 B1 | 6/2002 | Moskovich et al. |
| 6,414,760 B1 | 7/2002 | Lopez et al. |
| 6,417,971 B1 | 7/2002 | Moskovich et al. |
| 6,421,109 B1 | 7/2002 | Popovich |
| 6,437,563 B1 | 8/2002 | Simmonds et al. |
| 6,445,512 B1 | 9/2002 | Moskovich et al. |
| 6,449,095 B1 | 9/2002 | Ohtaki et al. |
| 6,456,584 B1 | 9/2002 | Nagata et al. |
| 6,470,132 B1 | 10/2002 | Nousiainen et al. |
| 6,473,209 B1 | 10/2002 | Popovich |
| 6,476,974 B1 | 11/2002 | Kreitzer et al. |
| 6,483,303 B2 | 11/2002 | Simmonds et al. |
| 6,486,997 B1 | 11/2002 | Bruzzone et al. |
| 6,504,518 B1 | 1/2003 | Kuwayama et al. |
| 6,504,629 B1 | 1/2003 | Popovich et al. |
| 6,509,937 B1 | 1/2003 | Moskovich et al. |
| 6,510,263 B1 | 1/2003 | Maisenhoelder et al. |
| 6,518,747 B2 | 2/2003 | Sager et al. |
| 6,519,088 B1 | 2/2003 | Lipton |
| 6,522,794 B1 | 2/2003 | Bischel et al. |
| 6,522,795 B1 | 2/2003 | Jordan et al. |
| 6,524,771 B2 | 2/2003 | Maeda et al. |
| 6,529,336 B1 | 3/2003 | Kreitzer et al. |
| 6,534,977 B1 | 3/2003 | Duncan et al. |
| 6,538,775 B1 | 3/2003 | Bowley et al. |
| 6,545,778 B2 | 4/2003 | Ono et al. |
| 6,545,808 B1 | 4/2003 | Ehbets et al. |
| 6,550,949 B1 | 4/2003 | Bauer et al. |
| 6,552,789 B1 | 4/2003 | Modro |
| 6,557,413 B2 | 5/2003 | Nieminen et al. |
| 6,559,813 B1 | 5/2003 | DeLuca et al. |
| 6,560,019 B2 | 5/2003 | Nakai |
| 6,563,648 B2 | 5/2003 | Gleckman et al. |
| 6,563,650 B2 | 5/2003 | Moskovich et al. |
| 6,567,014 B1 | 5/2003 | Hansen et al. |
| 6,567,573 B1 | 5/2003 | Domash et al. |
| 6,577,411 B1 | 6/2003 | David et al. |
| 6,577,429 B1 | 6/2003 | Kurtz et al. |
| 6,580,529 B1 | 6/2003 | Amitai et al. |
| 6,583,838 B1 | 6/2003 | Hoke et al. |
| 6,583,873 B1 | 6/2003 | Goncharov et al. |
| 6,587,619 B1 | 7/2003 | Kinoshita |
| 6,594,090 B2 | 7/2003 | Kruschwitz et al. |
| 6,596,193 B2 | 7/2003 | Coates et al. |
| 6,597,176 B2 | 7/2003 | Simmonds et al. |
| 6,597,475 B1 | 7/2003 | Shirakura et al. |
| 6,598,987 B1 | 7/2003 | Parikka |
| 6,600,590 B2 | 7/2003 | Roddy et al. |
| 6,608,720 B1 | 8/2003 | Freeman |
| 6,611,253 B1 | 8/2003 | Cohen |
| 6,618,104 B1 | 9/2003 | Date et al. |
| 6,624,943 B2 | 9/2003 | Nakai et al. |
| 6,625,381 B2 | 9/2003 | Roddy et al. |
| 6,646,772 B1 | 11/2003 | Popovich et al. |
| 6,646,810 B2 | 11/2003 | Harter, Jr. et al. |
| 6,661,495 B1 | 12/2003 | Popovich |

(56) References Cited

U.S. PATENT DOCUMENTS

| | | |
|---|---|---|
| 6,661,578 B2 | 12/2003 | Hedrick |
| 6,667,134 B1 | 12/2003 | Sutherland et al. |
| 6,674,578 B2 | 1/2004 | Sugiyama et al. |
| 6,677,086 B1 | 1/2004 | Sutehrland et al. |
| 6,678,093 B1 | 1/2004 | Scobey et al. |
| 6,680,720 B1 | 1/2004 | Lee et al. |
| 6,686,815 B1 | 2/2004 | Mirshekarl-Syahkal et al. |
| 6,690,516 B2 | 2/2004 | Aritake et al. |
| 6,692,666 B2 | 2/2004 | Sutherland et al. |
| 6,699,407 B1 | 3/2004 | Sutehrland et al. |
| 6,706,086 B2 | 3/2004 | Emig et al. |
| 6,706,451 B1 | 3/2004 | Sutherland et al. |
| 6,714,329 B1 | 3/2004 | Sekine et al. |
| 6,721,096 B2 | 4/2004 | Bruzzone et al. |
| 6,730,442 B1 | 5/2004 | Sutherland et al. |
| 6,731,434 B1 | 5/2004 | Hua et al. |
| 6,738,105 B1 | 5/2004 | Hannah et al. |
| 6,741,189 B1 | 5/2004 | Gibbons, II et al. |
| 6,744,478 B1 | 6/2004 | Asakura et al. |
| 6,747,781 B2 | 6/2004 | Trisnadi et al. |
| 6,748,342 B1 | 6/2004 | Dickhaus |
| 6,750,941 B2 | 6/2004 | Satoh et al. |
| 6,750,995 B2 | 6/2004 | Dickson |
| 6,750,996 B2 | 6/2004 | Jagt et al. |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Natarajan et al. |
| 6,822,713 B1 | 11/2004 | Yaroshchuk et al. |
| 6,825,987 B2 | 11/2004 | Repetto et al. |
| 6,829,095 B2 | 12/2004 | Amitai |
| 6,830,789 B2 | 12/2004 | Doane et al. |
| 6,833,955 B2 | 12/2004 | Niv |
| 6,836,369 B2 | 12/2004 | Fujikawa et al. |
| 6,842,563 B2 | 1/2005 | Zhang et al. |
| 6,844,212 B1 | 1/2005 | Bond et al. |
| 6,844,980 B2 | 1/2005 | He et al. |
| 6,844,989 B1 | 1/2005 | Jo et al. |
| 6,847,274 B2 | 1/2005 | Salmela et al. |
| 6,847,488 B2 | 1/2005 | Travis |
| 6,850,210 B1 | 2/2005 | Lipton et al. |
| 6,853,491 B1 | 2/2005 | Ruhle et al. |
| 6,853,493 B2 | 2/2005 | Kreitzer et al. |
| 6,861,107 B2 | 3/2005 | Klasen-Memmer et al. |
| 6,864,861 B2 | 3/2005 | Schehrer et al. |
| 6,864,927 B1 | 3/2005 | Cathey |
| 6,864,931 B1 | 3/2005 | Kumar et al. |
| 6,867,888 B2 | 3/2005 | Sutherland et al. |
| 6,873,443 B1 | 3/2005 | Joubert et al. |
| 6,876,791 B2 | 4/2005 | Murashima et al. |
| 6,878,494 B2 | 4/2005 | Sutehrland et al. |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,919,003 B2 | 7/2005 | Ikeda et al. |
| 6,922,267 B2 | 7/2005 | Endo et al. |
| 6,926,429 B2 | 8/2005 | Barlow et al. |
| 6,927,570 B2 | 8/2005 | Simmonds et al. |
| 6,927,694 B1 | 8/2005 | Smith et al. |
| 6,940,361 B1 | 9/2005 | Jokio et al. |
| 6,943,788 B2 | 9/2005 | Tomono |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,952,435 B2 | 10/2005 | Lai et al. |
| 6,958,662 B1 | 10/2005 | Salmela et al. |
| 6,958,868 B1 | 10/2005 | Pender |
| 6,963,454 B1 | 11/2005 | Martins et al. |
| 6,972,788 B1 | 12/2005 | Robertson et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,987,908 B2 | 1/2006 | Bond et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,003,075 B2 | 2/2006 | Miyake et al. |
| 7,003,187 B2 | 2/2006 | Frick et al. |
| 7,006,732 B2 | 2/2006 | Gunn et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,018,744 B2 | 3/2006 | Otaki et al. |
| 7,019,793 B2 | 3/2006 | Moskovich et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,046,439 B2 | 5/2006 | Kaminsky et al. |
| 7,050,674 B2 | 5/2006 | Lee et al. |
| 7,053,735 B2 | 5/2006 | Salmela et al. |
| 7,053,991 B2 | 5/2006 | Sandusky |
| 7,054,045 B2 | 5/2006 | McPheters et al. |
| 7,058,434 B2 | 6/2006 | Wang et al. |
| 7,068,405 B2 | 6/2006 | Sutherland et al. |
| 7,068,898 B2 | 6/2006 | Buretea et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,095,562 B1 | 8/2006 | Peng et al. |
| 7,099,080 B2 | 8/2006 | Lipton et al. |
| 7,101,048 B2 | 9/2006 | Travis |
| 7,108,383 B1 | 9/2006 | Mitchell et al. |
| 7,110,184 B1 | 9/2006 | Yona et al. |
| 7,119,965 B1 | 10/2006 | Rolland et al. |
| 7,123,418 B2 | 10/2006 | Weber et al. |
| 7,123,421 B1 | 10/2006 | Moskovich et al. |
| 7,126,418 B2 | 10/2006 | Hunton et al. |
| 7,126,583 B1 | 10/2006 | Breed |
| 7,132,200 B1 | 11/2006 | Ueda et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,167,286 B2 | 1/2007 | Anderson et al. |
| 7,167,616 B2 | 1/2007 | Ling et al. |
| 7,175,780 B1 | 2/2007 | Sutherland et al. |
| 7,181,105 B2 | 2/2007 | Teramura et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,190,849 B2 | 3/2007 | Katase |
| 7,198,737 B2 | 4/2007 | Natarajan et al. |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,212,175 B1 | 5/2007 | Magee et al. |
| 7,218,817 B2 | 5/2007 | Magnusson et al. |
| 7,230,767 B2 | 6/2007 | Walck et al. |
| 7,230,770 B2 | 6/2007 | Kreitzer et al. |
| 7,242,527 B2 | 7/2007 | Spitzer et al. |
| 7,248,128 B2 | 7/2007 | Mattila et al. |
| 7,248,765 B2 | 7/2007 | Lee et al. |
| 7,256,915 B2 | 8/2007 | Sutherland et al. |
| 7,259,906 B1 | 8/2007 | Islam |
| 7,265,882 B2 | 9/2007 | Sutherland et al. |
| 7,265,903 B2 | 9/2007 | Sutherland et al. |
| 7,268,946 B2 | 9/2007 | Wang |
| 7,280,722 B2 | 10/2007 | Temkin et al. |

(56) References Cited

U.S. PATENT DOCUMENTS

| | | |
|---|---|---|
| 7,285,903 B2 | 10/2007 | Cull et al. |
| 7,286,272 B2 | 10/2007 | Mukawa |
| 7,289,069 B2 | 10/2007 | Ranta |
| RE39,911 E | 11/2007 | Moskovich |
| 7,299,983 B2 | 11/2007 | Piikivi |
| 7,301,601 B2 | 11/2007 | Lin et al. |
| 7,312,906 B2 | 12/2007 | Sutherland et al. |
| 7,313,291 B2 | 12/2007 | Okhotnikov et al. |
| D559,250 S | 1/2008 | Pombo |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,333,685 B2 | 2/2008 | Stone et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,349,612 B2 | 3/2008 | Nishii et al. |
| 7,356,218 B2 | 4/2008 | Kato et al. |
| 7,356,224 B2 | 4/2008 | Levner et al. |
| 7,369,911 B1 | 5/2008 | Volant et al. |
| 7,375,870 B2 | 5/2008 | Schorpp |
| 7,375,886 B2 | 5/2008 | Lipton et al. |
| 7,376,068 B1 | 5/2008 | Khoury |
| 7,376,307 B2 | 5/2008 | Singh et al. |
| 7,389,023 B2 | 6/2008 | Yeo et al. |
| 7,391,573 B2 | 6/2008 | Amitai |
| 7,394,865 B2 | 7/2008 | Borran et al. |
| 7,394,961 B2 | 7/2008 | Kornilovich et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,413,678 B1 | 8/2008 | Natarajan et al. |
| 7,413,679 B1 | 8/2008 | Sutherland et al. |
| 7,415,173 B2 | 8/2008 | Kassamakov et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,433,116 B1 | 10/2008 | Islam |
| 7,436,568 B1 | 10/2008 | Kuykendall, Jr. |
| D581,447 S | 11/2008 | Yee |
| 7,447,967 B2 | 11/2008 | Onggosanusi et al. |
| 7,453,612 B2 | 11/2008 | Mukawa |
| 7,454,103 B2 | 11/2008 | Parriaux |
| 7,457,040 B2 | 11/2008 | Amitai |
| 7,466,994 B2 | 12/2008 | Pihlaja et al. |
| 7,477,206 B2 | 1/2009 | Cowan et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,499,217 B2 | 3/2009 | Cakmakci et al. |
| 7,500,104 B2 | 3/2009 | Goland |
| 7,511,891 B2 | 3/2009 | Messerschmidt |
| 7,513,668 B1 | 4/2009 | Peng et al. |
| 7,522,344 B1 | 4/2009 | Curatu et al. |
| 7,525,448 B1 | 4/2009 | Wilson et al. |
| 7,528,385 B2 | 5/2009 | Volodin et al. |
| 7,542,210 B2 | 6/2009 | Chirieleison |
| 7,545,429 B2 | 6/2009 | Travis |
| 7,550,234 B2 | 6/2009 | Otaki et al. |
| 7,558,446 B2 | 7/2009 | Wimberger-Friedl et al. |
| 7,567,372 B2 | 7/2009 | Schorpp |
| 7,570,322 B1 | 8/2009 | Sutherland et al. |
| 7,570,405 B1 | 8/2009 | Sutherland et al. |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,583,423 B2 | 9/2009 | Sutherland et al. |
| 7,587,110 B2 | 9/2009 | Singh et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,605,719 B1 | 10/2009 | Wenger et al. |
| 7,605,774 B1 | 10/2009 | Brandt et al. |
| 7,605,882 B1 | 10/2009 | Sutherland et al. |
| 7,616,270 B2 | 11/2009 | Hirabayashi et al. |
| 7,617,022 B1 | 11/2009 | Wood et al. |
| 7,618,750 B2 | 11/2009 | Ueda et al. |
| 7,619,739 B1 | 11/2009 | Sutherland et al. |
| 7,619,825 B1 | 11/2009 | Peng et al. |
| 7,629,086 B2 | 12/2009 | Otaki et al. |
| 7,639,208 B1 | 12/2009 | Ha et al. |
| 7,639,911 B2 | 12/2009 | Lee et al. |
| 7,643,214 B2 | 1/2010 | Amitai |
| 7,643,225 B1 | 1/2010 | Tsai |
| 7,656,585 B1 | 2/2010 | Powell et al. |
| 7,660,047 B1 | 2/2010 | Travis et al. |
| 7,672,024 B2 | 3/2010 | Kuan |
| 7,672,055 B2 | 3/2010 | Amitai |
| 7,672,549 B2 | 3/2010 | Ghosh et al. |
| 7,675,021 B2 | 3/2010 | Lapstun |
| 7,675,684 B1 | 3/2010 | Weissman et al. |
| 7,691,248 B2 | 4/2010 | Ikeda et al. |
| 7,710,622 B2 | 5/2010 | Takabayashi et al. |
| 7,710,654 B2 | 5/2010 | Ashkenazi et al. |
| 7,711,228 B2 | 5/2010 | Noda et al. |
| 7,724,441 B2 | 5/2010 | Amitai |
| 7,724,442 B2 | 5/2010 | Amitai |
| 7,724,443 B2 | 5/2010 | Amitai |
| 7,733,571 B1 | 6/2010 | Li |
| 7,733,572 B1 | 6/2010 | Brown et al. |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,843,642 B2 | 11/2010 | Shaoulov et al. |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,866,869 B2 | 1/2011 | Karakawa |
| 7,872,707 B1 | 1/2011 | Sutherland et al. |
| 7,872,804 B2 | 1/2011 | Moon et al. |
| 7,884,593 B2 | 2/2011 | Simmonds et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,928,862 B1 | 4/2011 | Matthews |
| 7,936,513 B2 | 5/2011 | Wu et al. |
| 7,936,519 B2 | 5/2011 | Mukawa et al. |
| 7,944,428 B2 | 5/2011 | Travis |
| 7,944,616 B2 | 5/2011 | Mukawa |
| 7,949,214 B2 | 5/2011 | DeJong et al. |
| D640,310 S | 6/2011 | Suzuki et al. |
| 7,961,117 B1 | 6/2011 | Zimmerman et al. |
| 7,969,644 B2 | 6/2011 | Tilleman et al. |
| 7,969,657 B2 | 6/2011 | Cakmakci et al. |
| 7,970,246 B2 | 6/2011 | Travis et al. |
| 7,976,208 B2 | 7/2011 | Travis |
| 7,984,884 B1 | 7/2011 | Iliev et al. |
| 7,999,982 B2 | 8/2011 | Endo et al. |
| 8,000,020 B2 | 8/2011 | Amitai et al. |
| 8,000,491 B2 | 8/2011 | Brodkin et al. |
| 8,004,765 B2 | 8/2011 | Amitai |
| 8,014,050 B2 | 9/2011 | McGrew |

(56) References Cited

U.S. PATENT DOCUMENTS

| | | |
|---|---|---|
| 8,016,475 B2 | 9/2011 | Travis |
| 8,018,579 B1 | 9/2011 | Krah |
| 8,022,942 B2 | 9/2011 | Bathiche et al. |
| 8,023,783 B2 | 9/2011 | Mukawa et al. |
| RE42,992 E | 12/2011 | David |
| 8,073,296 B2 | 12/2011 | Mukawa et al. |
| 8,077,274 B2 | 12/2011 | Sutherland et al. |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,093,451 B2 | 1/2012 | Spangenberg et al. |
| 8,098,439 B2 | 1/2012 | Amitai et al. |
| 8,105,662 B2 | 1/2012 | Cherkaoui et al. |
| 8,107,023 B2 | 1/2012 | Simmonds et al. |
| 8,107,780 B2 | 1/2012 | Simmonds |
| 8,120,548 B1 | 2/2012 | Barber |
| 8,120,848 B2 | 2/2012 | Isano |
| 8,132,948 B2 | 3/2012 | Owen et al. |
| 8,132,976 B2 | 3/2012 | Odell et al. |
| 8,134,434 B2 | 3/2012 | Diederichs et al. |
| 8,136,690 B2 | 3/2012 | Fang et al. |
| 8,137,981 B2 | 3/2012 | Andrew et al. |
| 8,142,016 B2 | 3/2012 | Legerton et al. |
| 8,149,086 B2 | 4/2012 | Klein et al. |
| 8,152,315 B2 | 4/2012 | Travis et al. |
| 8,152,353 B2 | 4/2012 | Yang et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| D659,137 S | 5/2012 | Matsumoto |
| 8,167,173 B1 | 5/2012 | Simmonds et al. |
| 8,186,874 B2 | 5/2012 | Sinbar et al. |
| 8,188,925 B2 | 5/2012 | DeJean |
| 8,189,263 B1 | 5/2012 | Wang et al. |
| 8,189,973 B2 | 5/2012 | Travis et al. |
| D661,334 S | 6/2012 | Cho et al. |
| D661,335 S | 6/2012 | Jeon |
| 8,194,325 B2 | 6/2012 | Levola et al. |
| 8,199,803 B2 | 6/2012 | Hauske et al. |
| 8,202,405 B2 | 6/2012 | Meneghini et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,253,914 B2 | 8/2012 | Kajiya et al. |
| 8,254,031 B2 | 8/2012 | Levola |
| 8,264,498 B1 | 9/2012 | Vanderkamp et al. |
| 8,294,749 B2 | 10/2012 | Cable |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,310,327 B2 | 11/2012 | Willers et al. |
| 8,314,819 B2 | 11/2012 | Kimmel et al. |
| 8,314,993 B2 | 11/2012 | Levola et al. |
| 8,320,032 B2 | 11/2012 | Levola |
| 8,321,810 B2 | 11/2012 | Heintze |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| 8,335,414 B2 | 12/2012 | Zinoviev et al. |
| D673,996 S | 1/2013 | Kim et al. |
| 8,351,744 B2 | 1/2013 | Travis et al. |
| 8,354,640 B2 | 1/2013 | Hamre et al. |
| 8,354,806 B2 | 1/2013 | Travis et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,384,504 B2 | 2/2013 | Diederichs et al. |
| 8,384,694 B2 | 2/2013 | Powell et al. |
| 8,384,730 B1 | 2/2013 | Vanderkamp et al. |
| 8,396,339 B2 | 3/2013 | Mukawa et al. |
| 8,396,341 B2 | 3/2013 | Lee et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,432,614 B2 | 4/2013 | Amitai |
| 8,441,731 B2 | 5/2013 | Sprague |
| 8,447,365 B1 | 5/2013 | Imanuel |
| 8,466,953 B2 | 6/2013 | Levola |
| 8,472,119 B1 | 6/2013 | Kelly |
| 8,472,120 B2 | 6/2013 | Border et al. |
| 8,477,261 B2 | 7/2013 | Travis et al. |
| 8,481,130 B2 | 7/2013 | Harding et al. |
| 8,482,858 B2 | 7/2013 | Sprague |
| 8,488,246 B2 | 7/2013 | Border et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,562 B2 | 7/2013 | Kopp et al. |
| 8,493,662 B2 | 7/2013 | Noui |
| 8,494,229 B2 | 7/2013 | Jarvenpaa et al. |
| 8,508,848 B2 | 8/2013 | Saarikko |
| 8,520,309 B2 | 8/2013 | Sprague |
| D691,192 S | 10/2013 | Stanley et al. |
| 8,547,638 B2 | 10/2013 | Levola |
| 8,548,290 B2 | 10/2013 | Travers et al. |
| 8,565,560 B2 | 10/2013 | Popovich et al. |
| D694,310 S | 11/2013 | Cho et al. |
| D694,311 S | 11/2013 | Cho et al. |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| D697,130 S | 1/2014 | Lövgren |
| 8,633,786 B2 | 1/2014 | Ermolov et al. |
| 8,634,120 B2 | 1/2014 | Popovich et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,670,029 B2 | 3/2014 | McEldowney |
| 8,693,087 B2 | 4/2014 | Nowatzyk et al. |
| 8,698,705 B2 | 4/2014 | Burke |
| 8,731,350 B1 | 5/2014 | Lin et al. |
| 8,736,802 B2 | 5/2014 | Kajiya et al. |
| 8,736,963 B2 | 5/2014 | Robbins et al. |
| 8,742,952 B1 | 6/2014 | Bold |
| 8,746,008 B1 | 6/2014 | Mauritsen et al. |
| 8,749,886 B2 | 6/2014 | Gupta |
| 8,749,890 B1 | 6/2014 | Wood et al. |
| 8,767,294 B2 | 7/2014 | Chen et al. |
| 8,786,923 B2 | 7/2014 | Chuang et al. |
| 8,810,600 B2 | 8/2014 | Bohn et al. |
| 8,810,913 B2 | 8/2014 | Simmonds et al. |
| 8,810,914 B2 | 8/2014 | Amitai |
| 8,814,691 B2 | 8/2014 | Haddick et al. |
| 8,816,578 B1 | 8/2014 | Peng et al. |
| 8,817,350 B1 | 8/2014 | Robbins et al. |
| 8,824,836 B2 | 9/2014 | Sugiyama |
| 8,830,143 B1 | 9/2014 | Pitchford et al. |
| 8,830,584 B2 | 9/2014 | Saarikko et al. |
| 8,830,588 B1 | 9/2014 | Brown et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| D718,304 S | 11/2014 | Heinrich |
| D718,366 S | 11/2014 | Mehin et al. |
| 8,885,112 B2 | 11/2014 | Popovich et al. |

(56) References Cited

U.S. PATENT DOCUMENTS

| | | |
|---|---|---|
| 8,885,997 B2 | 11/2014 | Nguyen et al. |
| 8,903,207 B1 | 12/2014 | Brown et al. |
| 8,906,088 B2 | 12/2014 | Pugh et al. |
| 8,913,324 B2 | 12/2014 | Schrader |
| 8,913,865 B1 | 12/2014 | Bennett |
| 8,917,453 B2 | 12/2014 | Bohn |
| 8,917,962 B1 | 12/2014 | Nichol et al. |
| 8,929,589 B2 | 1/2015 | Publicover et al. |
| 8,933,144 B2 | 1/2015 | Enomoto et al. |
| 8,934,743 B2 | 1/2015 | Nishiwaki et al. |
| 8,937,771 B2 | 1/2015 | Robbins et al. |
| 8,937,772 B1 | 1/2015 | Burns et al. |
| 8,938,141 B2 | 1/2015 | Magnusson |
| 8,950,867 B2 | 2/2015 | Macnamara |
| 8,964,298 B2 | 2/2015 | Haddick et al. |
| 8,965,152 B2 | 2/2015 | Simmonds |
| D725,102 S | 3/2015 | Lee et al. |
| 8,985,803 B2 | 3/2015 | Bohn |
| 8,989,535 B2 | 3/2015 | Robbins |
| D726,180 S | 4/2015 | Roat et al. |
| 9,019,595 B2 | 4/2015 | Jain |
| 9,025,253 B2 | 5/2015 | Hadad et al. |
| 9,035,344 B2 | 5/2015 | Jain |
| D733,709 S | 7/2015 | Kawai |
| 9,075,184 B2 | 7/2015 | Popovich et al. |
| 9,081,178 B2 | 7/2015 | Simmonds et al. |
| 9,097,890 B2 | 8/2015 | Miller et al. |
| 9,103,978 B2 | 8/2015 | Nishiwaki et al. |
| 9,122,015 B2 | 9/2015 | Shimizu |
| 9,128,226 B2 | 9/2015 | Fattal et al. |
| 9,129,295 B2 | 9/2015 | Border et al. |
| 9,164,290 B2 | 10/2015 | Robbins et al. |
| 9,176,324 B1 | 11/2015 | Scherer et al. |
| 9,188,717 B2 | 11/2015 | Nishiwaki |
| 9,201,270 B2 | 12/2015 | Fattal et al. |
| 9,215,293 B2 | 12/2015 | Miller |
| D746,896 S | 1/2016 | Markovitz et al. |
| 9,239,507 B2 | 1/2016 | Chen et al. |
| 9,244,275 B1 | 1/2016 | Li |
| 9,244,280 B1 | 1/2016 | Tiana et al. |
| 9,244,281 B1 | 1/2016 | Zimmerman et al. |
| D749,074 S | 2/2016 | Cazalet et al. |
| 9,253,359 B2 | 2/2016 | Takahashi |
| 9,269,854 B2 | 2/2016 | Jain |
| D751,551 S | 3/2016 | Ho et al. |
| D752,129 S | 3/2016 | Lee et al. |
| 9,274,338 B2 | 3/2016 | Robbins et al. |
| 9,274,339 B1 | 3/2016 | Brown et al. |
| 9,274,349 B2 | 3/2016 | Popovich et al. |
| D754,782 S | 4/2016 | Kokinakis et al. |
| 9,310,566 B2 | 4/2016 | Valera et al. |
| 9,316,786 B2 | 4/2016 | Nishiwaki et al. |
| 9,329,325 B2 | 5/2016 | Simmonds et al. |
| 9,335,548 B1 | 5/2016 | Cakmakci et al. |
| 9,335,604 B2 | 5/2016 | Popovich et al. |
| 9,341,846 B2 | 5/2016 | Popovich et al. |
| 9,354,366 B2 | 5/2016 | Jain |
| 9,366,862 B2 | 6/2016 | Haddick et al. |
| 9,366,864 B1 | 6/2016 | Brown et al. |
| 9,372,347 B1 | 6/2016 | Levola et al. |
| 9,377,623 B2 | 6/2016 | Robbins et al. |
| 9,377,852 B1 | 6/2016 | Shapiro et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,429,692 B1 | 8/2016 | Saarikko et al. |
| 9,431,794 B2 | 8/2016 | Jain |
| 9,435,961 B2 | 9/2016 | Jiang |
| 9,456,744 B2 | 10/2016 | Popovich et al. |
| 9,459,451 B2 | 10/2016 | Saarikko et al. |
| 9,464,779 B2 | 10/2016 | Popovich et al. |
| 9,465,213 B2 | 10/2016 | Simmonds |
| 9,465,227 B2 | 10/2016 | Popovich et al. |
| 9,484,482 B2 | 11/2016 | Hsu et al. |
| 9,494,799 B2 | 11/2016 | Robbins et al. |
| 9,507,150 B1 | 11/2016 | Stratton et al. |
| 9,513,480 B2 | 12/2016 | Saarikko et al. |
| 9,516,193 B2 | 12/2016 | Aramaki |
| 9,519,089 B1 | 12/2016 | Brown et al. |
| 9,519,115 B2 | 12/2016 | Yashiki et al. |
| 9,523,852 B1 | 12/2016 | Brown et al. |
| 9,535,253 B2 | 1/2017 | Levola et al. |
| 9,541,383 B2 | 1/2017 | Abovitz et al. |
| 9,541,763 B1 | 1/2017 | Heberlein et al. |
| 9,547,174 B2 | 1/2017 | Gao et al. |
| 9,551,468 B2 | 1/2017 | Jones |
| 9,551,874 B2 | 1/2017 | Amitai |
| 9,551,880 B2 | 1/2017 | Amitai |
| 9,599,813 B1 | 3/2017 | Stratton et al. |
| 9,612,403 B2 | 4/2017 | Abovitz et al. |
| 9,632,226 B2 | 4/2017 | Waldern et al. |
| 9,635,352 B1 | 4/2017 | Henry et al. |
| 9,648,313 B1 | 5/2017 | Henry et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,671,612 B2 | 6/2017 | Kress et al. |
| 9,674,413 B1 | 6/2017 | Tiana et al. |
| 9,678,345 B1 | 6/2017 | Melzer et al. |
| 9,679,367 B1 | 6/2017 | Wald |
| 9,715,067 B1 | 7/2017 | Brown et al. |
| 9,715,110 B1 | 7/2017 | Brown et al. |
| D793,468 S | 8/2017 | Yu et al. |
| D795,865 S | 8/2017 | Porter et al. |
| D795,866 S | 8/2017 | Porter et al. |
| 9,726,540 B2 | 8/2017 | Popovich et al. |
| 9,727,772 B2 | 8/2017 | Popovich et al. |
| 9,733,475 B1 | 8/2017 | Brown et al. |
| 9,739,950 B2 | 8/2017 | Sqalli et al. |
| 9,746,688 B2 | 8/2017 | Popovich et al. |
| 9,754,507 B1 | 9/2017 | Wenger et al. |
| 9,762,895 B1 | 9/2017 | Henry et al. |
| 9,766,465 B1 | 9/2017 | Tiana et al. |
| 9,785,231 B1 | 10/2017 | Zimmerman |
| 9,791,694 B1 | 10/2017 | Haverkamp et al. |
| 9,791,696 B2 | 10/2017 | Woltman et al. |
| 9,791,703 B1 | 10/2017 | Vallius et al. |
| 9,804,316 B2 | 10/2017 | Drolet et al. |
| 9,804,389 B2 | 10/2017 | Popovich et al. |
| 9,823,423 B2 | 11/2017 | Waldern et al. |
| 9,857,605 B2 | 1/2018 | Popovich et al. |
| 9,874,931 B1 | 1/2018 | Koenck et al. |
| 9,891,436 B2 | 2/2018 | Wall et al. |
| 9,899,800 B2 | 2/2018 | Ferrotti et al. |
| 9,915,825 B2 | 3/2018 | Robbins et al. |
| 9,933,684 B2 | 4/2018 | Brown et al. |
| 9,939,577 B2 | 4/2018 | Inoue et al. |
| 9,939,628 B2 | 4/2018 | Basset et al. |
| 9,959,818 B2 | 5/2018 | Bohn |
| 9,977,247 B1 | 5/2018 | Brown et al. |
| 9,989,763 B2 | 6/2018 | Woltman et al. |
| 10,025,093 B2 | 7/2018 | Wall et al. |
| D827,641 S | 9/2018 | Morisawa |
| 10,067,347 B2 | 9/2018 | Vallius et al. |
| 10,088,675 B1 | 10/2018 | Brown et al. |
| 10,088,686 B2 | 10/2018 | Robbins et al. |
| 10,089,516 B2 | 10/2018 | Popovich et al. |
| 10,095,045 B2 | 10/2018 | Robbins et al. |
| 10,107,966 B1 | 10/2018 | Horibe et al. |
| 10,114,220 B2 | 10/2018 | Grey et al. |
| 10,126,552 B2 | 11/2018 | Brown et al. |
| 10,145,533 B2 | 12/2018 | Popovich et al. |
| 10,156,681 B2 | 12/2018 | Waldern et al. |
| 10,162,181 B2 | 12/2018 | Webster et al. |
| 10,185,154 B2 | 1/2019 | Popovich et al. |
| D840,454 S | 2/2019 | Han et al. |
| 10,197,804 B2 | 2/2019 | Stenberg et al. |
| 10,209,517 B2 | 2/2019 | Popovich et al. |
| 10,216,061 B2 | 2/2019 | Popovich et al. |
| 10,234,696 B2 | 3/2019 | Popovich et al. |
| 10,241,330 B2 | 3/2019 | Popovich et al. |
| 10,241,332 B2 | 3/2019 | Vallius |
| 10,247,943 B1 | 4/2019 | Yu et al. |
| 10,281,725 B2 | 5/2019 | Yokoyama |

(56) References Cited

U.S. PATENT DOCUMENTS

| | | |
|---|---|---|
| 10,330,777 B2 | 6/2019 | Popovich et al. |
| 10,345,519 B1 | 7/2019 | Miller et al. |
| 10,359,627 B2 | 7/2019 | Wall et al. |
| 10,359,635 B2 | 7/2019 | Grey et al. |
| 10,359,736 B2 | 7/2019 | Popovich et al. |
| D855,687 S | 8/2019 | Villalpando |
| D859,510 S | 9/2019 | Harmon et al. |
| 10,409,144 B2 | 9/2019 | Popovich et al. |
| 10,423,222 B2 | 9/2019 | Popovich et al. |
| 10,423,813 B2 | 9/2019 | Popovich et al. |
| 10,437,051 B2 | 10/2019 | Popovich et al. |
| 10,437,064 B2 | 10/2019 | Popovich et al. |
| 10,444,510 B1 | 10/2019 | Lee et al. |
| 10,459,145 B2 | 10/2019 | Popovich et al. |
| 10,459,311 B2 | 10/2019 | Popovich et al. |
| D871,494 S | 12/2019 | Yamada et al. |
| 10,509,241 B1 | 12/2019 | Robbins et al. |
| D872,170 S | 1/2020 | Evans et al. |
| D872,794 S | 1/2020 | Wilkins |
| 10,527,797 B2 | 1/2020 | Waldern et al. |
| 10,532,594 B2 | 1/2020 | Akahane et al. |
| 10,545,346 B2 | 1/2020 | Waldern et al. |
| 10,551,616 B2 | 2/2020 | Wall et al. |
| 10,560,688 B2 | 2/2020 | Robbins |
| 10,569,449 B1 | 2/2020 | Curts et al. |
| 10,578,876 B1 | 3/2020 | Lam et al. |
| 10,591,756 B2 | 3/2020 | Popovich et al. |
| 10,598,938 B1 | 3/2020 | Huang et al. |
| D880,575 S | 4/2020 | Thixton |
| 10,613,268 B1 | 4/2020 | Colburn et al. |
| 10,642,058 B2 | 5/2020 | Popovich et al. |
| 10,649,119 B2 | 5/2020 | Mohanty et al. |
| 10,670,876 B2 | 6/2020 | Popovich et al. |
| 10,678,053 B2 | 6/2020 | Waldern et al. |
| 10,690,831 B2 | 6/2020 | Calafiore |
| 10,690,851 B2 | 6/2020 | Waldern et al. |
| 10,690,915 B2 | 6/2020 | Popovich et al. |
| 10,690,916 B2 | 6/2020 | Popovich et al. |
| 10,698,214 B2 | 6/2020 | Vallius et al. |
| 10,705,281 B2 | 7/2020 | Fattal et al. |
| 10,712,571 B2 | 7/2020 | Popovich et al. |
| 10,725,312 B2 | 7/2020 | Popovich et al. |
| 10,732,351 B2 | 8/2020 | Colburn et al. |
| 10,732,569 B2 | 8/2020 | Waldern et al. |
| 10,746,989 B2 | 8/2020 | Brown et al. |
| 10,747,982 B2 | 8/2020 | Popovich et al. |
| 10,795,160 B1 | 10/2020 | Stanley et al. |
| 10,823,887 B1 | 11/2020 | Calafiore et al. |
| 10,859,768 B2 | 12/2020 | Popovich et al. |
| 10,859,837 B2 | 12/2020 | Adema et al. |
| 10,890,707 B2 | 1/2021 | Waldern et al. |
| 10,914,950 B2 | 2/2021 | Waldern et al. |
| 10,942,430 B2 | 3/2021 | Waldern et al. |
| 10,983,257 B1 | 4/2021 | Colburn et al. |
| 10,983,340 B2 | 4/2021 | Popovich et al. |
| 10,983,346 B2 | 4/2021 | Vallius et al. |
| 11,009,699 B2 | 5/2021 | Popovich et al. |
| 11,103,892 B1 | 8/2021 | Liao et al. |
| 11,106,048 B2 | 8/2021 | Popovich et al. |
| 11,107,972 B2 | 8/2021 | Diest et al. |
| 11,137,603 B2 | 10/2021 | Zhang |
| 11,169,314 B2 | 11/2021 | Popovich et al. |
| 11,175,512 B2 | 11/2021 | Waldern et al. |
| 11,194,098 B2 | 12/2021 | Waldern et al. |
| 11,194,159 B2 | 12/2021 | Popovich et al. |
| 11,194,162 B2 | 12/2021 | Waldern et al. |
| 11,204,540 B2 | 12/2021 | Popovich et al. |
| 11,231,544 B2 | 1/2022 | Lin et al. |
| 11,243,333 B1 | 2/2022 | Ouderkirk et al. |
| 11,256,155 B2 | 2/2022 | Popovich et al. |
| 11,281,013 B2 | 3/2022 | Popovich et al. |
| 11,300,795 B1 | 4/2022 | Stanley et al. |
| 11,306,193 B1 | 4/2022 | Lane et al. |
| 11,307,357 B2 | 4/2022 | Mohanty |
| 11,307,432 B2 | 4/2022 | Popovich et al. |
| 11,320,571 B2 | 5/2022 | Brown et al. |
| 11,340,386 B1 | 5/2022 | Ouderkirk et al. |
| 11,378,732 B2 | 7/2022 | Waldern et al. |
| 11,391,950 B2 | 7/2022 | Calafiore |
| 11,402,801 B2 | 8/2022 | Waldern et al. |
| 11,442,222 B2 | 9/2022 | Waldern et al. |
| 11,448,937 B2 | 9/2022 | Brown et al. |
| 11,460,621 B2 | 10/2022 | Popovich et al. |
| 11,480,788 B2 | 10/2022 | Popovich et al. |
| 11,487,131 B2 | 11/2022 | Popovich et al. |
| 11,513,350 B2 | 11/2022 | Waldern et al. |
| 11,543,594 B2 | 1/2023 | Grant et al. |
| 11,561,409 B2 | 1/2023 | Popovich et al. |
| 11,573,483 B2 | 2/2023 | Waldern et al. |
| 11,586,046 B2 | 2/2023 | Waldern et al. |
| 11,592,614 B2 | 2/2023 | Waldern et al. |
| 11,604,314 B2 | 3/2023 | Popovich et al. |
| 11,709,373 B2 | 7/2023 | Popovich et al. |
| 11,747,568 B2 | 9/2023 | Waldern et al. |
| 11,899,238 B2 | 2/2024 | Waldern et al. |
| 2001/0024177 A1 | 9/2001 | Popovich |
| 2001/0033400 A1 | 10/2001 | Sutherland et al. |
| 2001/0036012 A1 | 11/2001 | Nakai et al. |
| 2001/0043163 A1 | 11/2001 | Waldern et al. |
| 2001/0046142 A1 | 11/2001 | Van Santen et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0012064 A1 | 1/2002 | Yamaguchi |
| 2002/0018040 A1 | 2/2002 | Aye et al. |
| 2002/0021407 A1 | 2/2002 | Elliott |
| 2002/0021461 A1 | 2/2002 | Ono et al. |
| 2002/0036825 A1 | 3/2002 | Lipton et al. |
| 2002/0047837 A1 | 4/2002 | Suyama et al. |
| 2002/0071472 A1 | 6/2002 | Dickson et al. |
| 2002/0075240 A1 | 6/2002 | Lieberman et al. |
| 2002/0076154 A1 | 6/2002 | Maisenhoelder et al. |
| 2002/0093701 A1 | 7/2002 | Zhang et al. |
| 2002/0110077 A1 | 8/2002 | Drobot et al. |
| 2002/0126332 A1 | 9/2002 | Popovich |
| 2002/0127497 A1 | 9/2002 | Brown et al. |
| 2002/0131175 A1 | 9/2002 | Yagi et al. |
| 2002/0150032 A1 | 10/2002 | Nishiuchi et al. |
| 2002/0150337 A1 | 10/2002 | Fujimaki |
| 2002/0167462 A1 | 11/2002 | Lewis et al. |
| 2002/0196332 A1 | 12/2002 | Lipton et al. |
| 2003/0007070 A1 | 1/2003 | Lipton et al. |
| 2003/0025881 A1 | 2/2003 | Hwang |
| 2003/0030912 A1 | 2/2003 | Gleckman et al. |
| 2003/0038912 A1 | 2/2003 | Broer et al. |
| 2003/0039422 A1 | 2/2003 | Nisley et al. |
| 2003/0039442 A1 | 2/2003 | Bond et al. |
| 2003/0058490 A1 | 3/2003 | Brotherton-Ratcliffe et al. |
| 2003/0063042 A1 | 4/2003 | Friesem et al. |
| 2003/0063884 A1 | 4/2003 | Smith et al. |
| 2003/0067685 A1 | 4/2003 | Niv |
| 2003/0076590 A1 | 4/2003 | Kramer |
| 2003/0076950 A1 | 4/2003 | Usman et al. |
| 2003/0086670 A1 | 5/2003 | Moridaira et al. |
| 2003/0107809 A1 | 6/2003 | Chen et al. |
| 2003/0129542 A1 | 7/2003 | Shih et al. |
| 2003/0149346 A1 | 8/2003 | Arnone et al. |
| 2003/0175004 A1 | 9/2003 | Garito et al. |
| 2003/0184868 A1 | 10/2003 | Geist |
| 2003/0193709 A1 | 10/2003 | Mallya et al. |
| 2003/0197154 A1 | 10/2003 | Manabe et al. |
| 2003/0197157 A1 | 10/2003 | Sutherland et al. |
| 2003/0202247 A1 | 10/2003 | Niv et al. |
| 2003/0206329 A1 | 11/2003 | Ikeda et al. |
| 2003/0228019 A1 | 12/2003 | Eichler et al. |
| 2004/0004767 A1 | 1/2004 | Song |
| 2004/0004989 A1 | 1/2004 | Shigeoka |
| 2004/0012833 A1 | 1/2004 | Newswanger et al. |
| 2004/0047938 A1 | 3/2004 | Kosuga et al. |
| 2004/0057138 A1 | 3/2004 | Tanijiri et al. |
| 2004/0075830 A1 | 4/2004 | Miyake et al. |
| 2004/0087049 A1 | 5/2004 | Gill et al. |
| 2004/0089842 A1 | 5/2004 | Sutehrland et al. |

(56) References Cited

U.S. PATENT DOCUMENTS

| | | |
|---|---|---|
| 2004/0108971 A1 | 6/2004 | Waldern et al. |
| 2004/0109234 A1 | 6/2004 | Levola |
| 2004/0112862 A1 | 6/2004 | Willson et al. |
| 2004/0125454 A1 | 7/2004 | Kawasaki et al. |
| 2004/0130797 A1 | 7/2004 | Leigh |
| 2004/0141217 A1 | 7/2004 | Endo et al. |
| 2004/0156008 A1 | 8/2004 | Reznikov et al. |
| 2004/0174348 A1 | 9/2004 | David |
| 2004/0175627 A1 | 9/2004 | Sutherland et al. |
| 2004/0179764 A1 | 9/2004 | Melikechi et al. |
| 2004/0184156 A1 | 9/2004 | Gunn, III et al. |
| 2004/0188617 A1 | 9/2004 | Devitt et al. |
| 2004/0200368 A1 | 10/2004 | Ogino et al. |
| 2004/0208446 A1 | 10/2004 | Bond et al. |
| 2004/0208466 A1 | 10/2004 | Mossberg et al. |
| 2004/0225025 A1 | 11/2004 | Sullivan et al. |
| 2004/0263969 A1 | 12/2004 | Lipton et al. |
| 2004/0263971 A1 | 12/2004 | Lipton et al. |
| 2005/0007639 A1 | 1/2005 | Natarajan et al. |
| 2005/0018304 A1 | 1/2005 | Lipton et al. |
| 2005/0047705 A1 | 3/2005 | Domash et al. |
| 2005/0079663 A1 | 4/2005 | Masutani et al. |
| 2005/0083564 A1 | 4/2005 | Mallya et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0135747 A1 | 6/2005 | Greiner et al. |
| 2005/0136260 A1 | 6/2005 | Garcia |
| 2005/0141066 A1 | 6/2005 | Ouchi |
| 2005/0141811 A1 | 6/2005 | Yang et al. |
| 2005/0169579 A1 | 8/2005 | Temkin et al. |
| 2005/0174321 A1 | 8/2005 | Ikeda et al. |
| 2005/0180687 A1 | 8/2005 | Amitai |
| 2005/0195276 A1 | 9/2005 | Lipton et al. |
| 2005/0218377 A1 | 10/2005 | Lawandy |
| 2005/0231774 A1 | 10/2005 | Hayashi et al. |
| 2005/0232530 A1 | 10/2005 | Kekas |
| 2005/0254752 A1 | 11/2005 | Domash et al. |
| 2005/0259217 A1 | 11/2005 | Lin et al. |
| 2005/0259302 A9 | 11/2005 | Metz et al. |
| 2005/0259944 A1 | 11/2005 | Anderson et al. |
| 2005/0265585 A1 | 12/2005 | Rowe |
| 2005/0269481 A1 | 12/2005 | David et al. |
| 2005/0271258 A1 | 12/2005 | Rowe |
| 2005/0286133 A1 | 12/2005 | Lipton |
| 2006/0002274 A1 | 1/2006 | Kihara et al. |
| 2006/0012878 A1 | 1/2006 | Lipton et al. |
| 2006/0013977 A1 | 1/2006 | Duke et al. |
| 2006/0043938 A1 | 3/2006 | O'Gorman et al. |
| 2006/0055993 A1 | 3/2006 | Kobayashi et al. |
| 2006/0093012 A1 | 5/2006 | Singh et al. |
| 2006/0093793 A1 | 5/2006 | Miyakawa et al. |
| 2006/0114564 A1 | 6/2006 | Sutherland et al. |
| 2006/0119837 A1 | 6/2006 | Raguin et al. |
| 2006/0119916 A1 | 6/2006 | Sutherland et al. |
| 2006/0126179 A1 | 6/2006 | Levola |
| 2006/0132914 A1 | 6/2006 | Weiss et al. |
| 2006/0142455 A1 | 6/2006 | Agarwal et al. |
| 2006/0146422 A1 | 7/2006 | Koike |
| 2006/0159864 A1 | 7/2006 | Natarajan et al. |
| 2006/0164593 A1 | 7/2006 | Peyghambarian et al. |
| 2006/0171647 A1 | 8/2006 | Ye et al. |
| 2006/0177180 A1 | 8/2006 | Tazawa et al. |
| 2006/0181683 A1 | 8/2006 | Bhowmik et al. |
| 2006/0191293 A1 | 8/2006 | Kuczma |
| 2006/0215244 A1 | 9/2006 | Yosha et al. |
| 2006/0215976 A1 | 9/2006 | Singh et al. |
| 2006/0221063 A1 | 10/2006 | Ishihara |
| 2006/0221448 A1 | 10/2006 | Nivon et al. |
| 2006/0228073 A1 | 10/2006 | Mukawa et al. |
| 2006/0262250 A1 | 11/2006 | Hobbs |
| 2006/0268104 A1 | 11/2006 | Cowan et al. |
| 2006/0268412 A1 | 11/2006 | Downing et al. |
| 2006/0279662 A1 | 12/2006 | Kapellner et al. |
| 2006/0284974 A1 | 12/2006 | Lipton et al. |
| 2006/0285205 A1 | 12/2006 | Lipton et al. |
| 2006/0291021 A1 | 12/2006 | Mukawa |
| 2006/0291052 A1 | 12/2006 | Lipton et al. |
| 2006/0292493 A1 | 12/2006 | Shinotsuka et al. |
| 2007/0012777 A1 | 1/2007 | Tsikos et al. |
| 2007/0019152 A1 | 1/2007 | Caputo et al. |
| 2007/0019297 A1 | 1/2007 | Stewart et al. |
| 2007/0034600 A1 | 2/2007 | Willson et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0053032 A1 | 3/2007 | Popovich |
| 2007/0070476 A1 | 3/2007 | Yamada et al. |
| 2007/0070504 A1 | 3/2007 | Akutsu et al. |
| 2007/0070859 A1 | 3/2007 | Hirayama |
| 2007/0089625 A1 | 4/2007 | Grinberg et al. |
| 2007/0097502 A1 | 5/2007 | Lipton et al. |
| 2007/0109400 A1 | 5/2007 | Woodgate et al. |
| 2007/0109401 A1 | 5/2007 | Lipton et al. |
| 2007/0115553 A1 | 5/2007 | Chang-Hasnain et al. |
| 2007/0116409 A1 | 5/2007 | Bryan et al. |
| 2007/0127348 A1 | 6/2007 | Ooi et al. |
| 2007/0133089 A1 | 6/2007 | Lipton et al. |
| 2007/0133920 A1 | 6/2007 | Lee et al. |
| 2007/0133983 A1 | 6/2007 | Traff |
| 2007/0146624 A1 | 6/2007 | Duston et al. |
| 2007/0146625 A1 | 6/2007 | Ooi et al. |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0182915 A1 | 8/2007 | Osawa et al. |
| 2007/0183650 A1 | 8/2007 | Lipton et al. |
| 2007/0188602 A1 | 8/2007 | Cowan et al. |
| 2007/0188837 A1 | 8/2007 | Shimizu et al. |
| 2007/0195409 A1 | 8/2007 | Yun et al. |
| 2007/0206155 A1 | 9/2007 | Lipton |
| 2007/0211164 A1 | 9/2007 | Olsen et al. |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0001909 A1 | 1/2008 | Lim |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0063808 A1 | 3/2008 | Stumpe et al. |
| 2008/0089073 A1 | 4/2008 | Hikmet |
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |
| 2008/0136916 A1 | 6/2008 | Wolff |
| 2008/0136923 A1 | 6/2008 | Inbar et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0151379 A1 | 6/2008 | Amitai |
| 2008/0186573 A1 | 8/2008 | Lipton |
| 2008/0186574 A1 | 8/2008 | Robinson et al. |
| 2008/0186604 A1 | 8/2008 | Amitai |
| 2008/0193085 A1 | 8/2008 | Singh et al. |
| 2008/0198471 A1 | 8/2008 | Amitai |
| 2008/0225187 A1 | 9/2008 | Yamanaka |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0278812 A1 | 11/2008 | Amitai |
| 2008/0285137 A1 | 11/2008 | Simmonds et al. |
| 2008/0285140 A1 | 11/2008 | Amitai |
| 2008/0297731 A1 | 12/2008 | Powell et al. |
| 2008/0297807 A1 | 12/2008 | Feldman et al. |
| 2008/0298649 A1 | 12/2008 | Ennis et al. |
| 2008/0298740 A1 | 12/2008 | Hlousek et al. |
| 2008/0303895 A1 | 12/2008 | Akka et al. |

(56) References Cited

U.S. PATENT DOCUMENTS

| | | |
|---|---|---|
| 2008/0303896 A1 | 12/2008 | Lipton et al. |
| 2008/0304111 A1 | 12/2008 | Queenan et al. |
| 2008/0309586 A1 | 12/2008 | Vitale |
| 2008/0316303 A1 | 12/2008 | Chiu et al. |
| 2008/0316375 A1 | 12/2008 | Lipton et al. |
| 2009/0001632 A1 | 1/2009 | Stumpe et al. |
| 2009/0010135 A1 | 1/2009 | Ushiro et al. |
| 2009/0017424 A1 | 1/2009 | Yoeli et al. |
| 2009/0019222 A1 | 1/2009 | Verma et al. |
| 2009/0052017 A1 | 2/2009 | Sasaki |
| 2009/0052046 A1 | 2/2009 | Amitai |
| 2009/0052047 A1 | 2/2009 | Amitai |
| 2009/0067774 A1 | 3/2009 | Magnusson |
| 2009/0074356 A1 | 3/2009 | Sanchez et al. |
| 2009/0097122 A1 | 4/2009 | Niv |
| 2009/0097127 A1 | 4/2009 | Amitai |
| 2009/0116790 A1 | 5/2009 | Mossberg et al. |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128495 A1 | 5/2009 | Kong et al. |
| 2009/0128781 A1 | 5/2009 | Li |
| 2009/0128902 A1 | 5/2009 | Niv et al. |
| 2009/0128911 A1 | 5/2009 | Itzkovitch et al. |
| 2009/0136246 A1 | 5/2009 | Murakami |
| 2009/0141324 A1 | 6/2009 | Mukawa |
| 2009/0153437 A1 | 6/2009 | Aharoni |
| 2009/0169152 A1 | 7/2009 | Oestergard |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0242021 A1 | 10/2009 | Petkie et al. |
| 2009/0296218 A1 | 12/2009 | Ryytty |
| 2009/0303599 A1 | 12/2009 | Levola |
| 2009/0316246 A1 | 12/2009 | Asai et al. |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0060551 A1 | 3/2010 | Sugiyama et al. |
| 2010/0060990 A1 | 3/2010 | Wertheim et al. |
| 2010/0065726 A1 | 3/2010 | Zhong et al. |
| 2010/0079841 A1 | 4/2010 | Levola |
| 2010/0079865 A1 | 4/2010 | Saarikko et al. |
| 2010/0084261 A1 | 4/2010 | Lee et al. |
| 2010/0086256 A1 | 4/2010 | Ben Bakir et al. |
| 2010/0092124 A1 | 4/2010 | Magnusson et al. |
| 2010/0096562 A1 | 4/2010 | Klunder et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0135615 A1 | 6/2010 | Ho et al. |
| 2010/0136319 A1 | 6/2010 | Imai et al. |
| 2010/0141555 A1 | 6/2010 | Rorberg et al. |
| 2010/0141905 A1 | 6/2010 | Burke |
| 2010/0149073 A1 | 6/2010 | Chaum et al. |
| 2010/0165465 A1 | 7/2010 | Levola |
| 2010/0165660 A1 | 7/2010 | Weber et al. |
| 2010/0171680 A1 | 7/2010 | Lapidot et al. |
| 2010/0177388 A1 | 7/2010 | Cohen et al. |
| 2010/0202725 A1 | 8/2010 | Popovich et al. |
| 2010/0214659 A1 | 8/2010 | Levola |
| 2010/0220293 A1 | 9/2010 | Mizushima et al. |
| 2010/0225834 A1 | 9/2010 | Li |
| 2010/0225876 A1 | 9/2010 | Escuti et al. |
| 2010/0231532 A1 | 9/2010 | Nho et al. |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0232016 A1 | 9/2010 | Landa et al. |
| 2010/0245756 A1 | 9/2010 | Sugihara et al. |
| 2010/0245757 A1 | 9/2010 | Sugihara et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0253987 A1 | 10/2010 | Leopold et al. |
| 2010/0260030 A1 | 10/2010 | Yuyama et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0284180 A1 | 11/2010 | Popovich et al. |
| 2010/0296163 A1 | 11/2010 | Saarikko |
| 2010/0299814 A1 | 12/2010 | Celona et al. |
| 2010/0315719 A1 | 12/2010 | Saarikko et al. |
| 2010/0321781 A1 | 12/2010 | Levola et al. |
| 2010/0322555 A1 | 12/2010 | Vermeulen et al. |
| 2011/0001895 A1 | 1/2011 | Dahl |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0038024 A1 | 2/2011 | Wang et al. |
| 2011/0050548 A1 | 3/2011 | Blumenfeld et al. |
| 2011/0063604 A1 | 3/2011 | Hamre et al. |
| 2011/0096401 A1 | 4/2011 | Levola |
| 2011/0102711 A1 | 5/2011 | Sutherland et al. |
| 2011/0103762 A1 | 5/2011 | Lee et al. |
| 2011/0109880 A1 | 5/2011 | Nummela |
| 2011/0157707 A1 | 6/2011 | Tilleman et al. |
| 2011/0164221 A1 | 7/2011 | Tilleman et al. |
| 2011/0187293 A1 | 8/2011 | Travis et al. |
| 2011/0211239 A1 | 9/2011 | Mukawa et al. |
| 2011/0216255 A1 | 9/2011 | Miyauchi et al. |
| 2011/0221656 A1 | 9/2011 | Haddick et al. |
| 2011/0232211 A1 | 9/2011 | Farahi |
| 2011/0235179 A1 | 9/2011 | Simmonds |
| 2011/0235365 A1 | 9/2011 | McCollum et al. |
| 2011/0236803 A1 | 9/2011 | Weiser et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0027347 A1 | 2/2012 | Mathal et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0067864 A1 | 3/2012 | Kusuda et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0099203 A1 | 4/2012 | Boubis et al. |
| 2012/0105634 A1 | 5/2012 | Meidan et al. |
| 2012/0105740 A1 | 5/2012 | Jannard et al. |
| 2012/0120493 A1 | 5/2012 | Simmonds et al. |
| 2012/0127577 A1 | 5/2012 | Desserouer |
| 2012/0162549 A1 | 6/2012 | Gao et al. |
| 2012/0162764 A1 | 6/2012 | Shimizu |
| 2012/0176665 A1 | 7/2012 | Song et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0218481 A1 | 8/2012 | Popovich et al. |
| 2012/0224062 A1 | 9/2012 | Lacoste et al. |
| 2012/0235884 A1 | 9/2012 | Miller et al. |
| 2012/0235886 A1 | 9/2012 | Border et al. |

(56) References Cited

U.S. PATENT DOCUMENTS

| | | |
|---|---|---|
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0281943 A1 | 11/2012 | Popovich et al. |
| 2012/0290973 A1 | 11/2012 | Robertson et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2012/0326950 A1 | 12/2012 | Park et al. |
| 2012/0328234 A1 | 12/2012 | Lu et al. |
| 2013/0016324 A1 | 1/2013 | Travis |
| 2013/0016362 A1 | 1/2013 | Gong et al. |
| 2013/0021392 A1 | 1/2013 | Travis |
| 2013/0021586 A1 | 1/2013 | Lippey |
| 2013/0027006 A1 | 1/2013 | Holloway et al. |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0051730 A1 | 2/2013 | Travers et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0088637 A1 | 4/2013 | Duparre |
| 2013/0093893 A1 | 4/2013 | Schofield et al. |
| 2013/0101253 A1 | 4/2013 | Popovich et al. |
| 2013/0107186 A1 | 5/2013 | Ando et al. |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0138275 A1 | 5/2013 | Nauman et al. |
| 2013/0141934 A1 | 6/2013 | Hartung |
| 2013/0141937 A1 | 6/2013 | Katsuta et al. |
| 2013/0143336 A1 | 6/2013 | Jain |
| 2013/0163089 A1 | 6/2013 | Bohn |
| 2013/0163928 A1 | 6/2013 | Wang et al. |
| 2013/0170031 A1 | 7/2013 | Bohn et al. |
| 2013/0176704 A1 | 7/2013 | Lanman et al. |
| 2013/0184904 A1 | 7/2013 | Gadzinski |
| 2013/0200710 A1 | 8/2013 | Robbins |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0249895 A1 | 9/2013 | Westerinen et al. |
| 2013/0250207 A1 | 9/2013 | Bohn |
| 2013/0250380 A1 | 9/2013 | Fujikawa et al. |
| 2013/0250430 A1 | 9/2013 | Robbins et al. |
| 2013/0250431 A1 | 9/2013 | Robbins et al. |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0286053 A1 | 10/2013 | Fleck et al. |
| 2013/0300997 A1 | 11/2013 | Popovich et al. |
| 2013/0301014 A1 | 11/2013 | DeJong et al. |
| 2013/0305437 A1 | 11/2013 | Weller et al. |
| 2013/0308185 A1 | 11/2013 | Robinson et al. |
| 2013/0312811 A1 | 11/2013 | Aspnes et al. |
| 2013/0314789 A1 | 11/2013 | Saarikko et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2013/0342525 A1 | 12/2013 | Benko et al. |
| 2014/0002514 A1 | 1/2014 | Richards |
| 2014/0003762 A1 | 1/2014 | Macnamara |
| 2014/0009809 A1 | 1/2014 | Pyun et al. |
| 2014/0022616 A1 | 1/2014 | Popovich et al. |
| 2014/0024159 A1 | 1/2014 | Jain |
| 2014/0027006 A1 | 1/2014 | Foley et al. |
| 2014/0037242 A1 | 2/2014 | Popovich et al. |
| 2014/0043672 A1 | 2/2014 | Clarke et al. |
| 2014/0043689 A1 | 2/2014 | Mason |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0104685 A1 | 4/2014 | Bohn et al. |
| 2014/0118647 A1 | 5/2014 | Momonoi et al. |
| 2014/0126029 A1 | 5/2014 | Fuetterer |
| 2014/0126175 A1 | 5/2014 | Amitai et al. |
| 2014/0130132 A1 | 5/2014 | Cahill et al. |
| 2014/0138581 A1 | 5/2014 | Archetti et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0154614 A1 | 6/2014 | Xie et al. |
| 2014/0160576 A1 | 6/2014 | Robbins et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0168783 A1 | 6/2014 | Luebke et al. |
| 2014/0172296 A1 | 6/2014 | Shtukater |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0198896 A1 | 7/2014 | Hemmendorff et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason |
| 2014/0240842 A1 | 8/2014 | Nguyen et al. |
| 2014/0255662 A1 | 9/2014 | Enomoto et al. |
| 2014/0267420 A1 | 9/2014 | Schowengerdt et al. |
| 2014/0268017 A1 | 9/2014 | Sweis et al. |
| 2014/0268353 A1 | 9/2014 | Fujimura et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0009550 A1 | 1/2015 | Misago et al. |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0086907 A1 | 3/2015 | Mizuta et al. |
| 2015/0107671 A1 | 4/2015 | Bodan et al. |
| 2015/0109763 A1 | 4/2015 | Shinkai et al. |
| 2015/0125109 A1 | 5/2015 | Robbins et al. |
| 2015/0148728 A1 | 5/2015 | Sallum et al. |
| 2015/0160529 A1 | 6/2015 | Popovich et al. |
| 2015/0167868 A1 | 6/2015 | Boncha |
| 2015/0177443 A1 | 6/2015 | Faecke et al. |
| 2015/0177686 A1 | 6/2015 | Lee et al. |
| 2015/0177688 A1 | 6/2015 | Popovich et al. |
| 2015/0185475 A1 | 7/2015 | Saarikko et al. |
| 2015/0211960 A1 | 7/2015 | Shimizu |
| 2015/0219834 A1 | 8/2015 | Nichol et al. |
| 2015/0235447 A1 | 8/2015 | Abovitz et al. |
| 2015/0235448 A1 | 8/2015 | Schowengerdt et al. |
| 2015/0243068 A1 | 8/2015 | Solomon |
| 2015/0247975 A1 | 9/2015 | Abovitz et al. |
| 2015/0260994 A1 | 9/2015 | Akutsu et al. |
| 2015/0262424 A1 | 9/2015 | Tabaka et al. |
| 2015/0268399 A1 | 9/2015 | Futterer |
| 2015/0268415 A1 | 9/2015 | Schowengerdt et al. |
| 2015/0277375 A1 | 10/2015 | Large et al. |

(56) References Cited

U.S. PATENT DOCUMENTS

| | | |
|---|---|---|
| 2015/0285682 A1 | 10/2015 | Popovich et al. |
| 2015/0288129 A1 | 10/2015 | Jain |
| 2015/0289762 A1 | 10/2015 | Popovich et al. |
| 2015/0309264 A1 | 10/2015 | Abovitz et al. |
| 2015/0316768 A1 | 11/2015 | Simmonds |
| 2015/0338689 A1 | 11/2015 | Min et al. |
| 2015/0346490 A1 | 12/2015 | Tekolste et al. |
| 2015/0346495 A1 | 12/2015 | Welch et al. |
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0018673 A1 | 1/2016 | Wang |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0055822 A1 | 2/2016 | Bell |
| 2016/0060529 A1 | 3/2016 | Hegmann et al. |
| 2016/0077338 A1 | 3/2016 | Robbins et al. |
| 2016/0085008 A1 | 3/2016 | Banerjee et al. |
| 2016/0085300 A1 | 3/2016 | Robbins et al. |
| 2016/0097959 A1 | 4/2016 | Bruizeman et al. |
| 2016/0116739 A1 | 4/2016 | TeKolste et al. |
| 2016/0124223 A1 | 5/2016 | Shinbo et al. |
| 2016/0124241 A1 | 5/2016 | Popovich et al. |
| 2016/0132025 A1 | 5/2016 | Taff et al. |
| 2016/0147067 A1 | 5/2016 | Hua et al. |
| 2016/0170226 A1 | 6/2016 | Popovich et al. |
| 2016/0178901 A1 | 6/2016 | Ishikawa |
| 2016/0195664 A1 | 7/2016 | Fattal et al. |
| 2016/0195720 A1 | 7/2016 | Travis et al. |
| 2016/0209648 A1 | 7/2016 | Haddick et al. |
| 2016/0209657 A1 | 7/2016 | Popovich et al. |
| 2016/0231568 A1 | 8/2016 | Saarikko et al. |
| 2016/0231570 A1 | 8/2016 | Levola et al. |
| 2016/0238772 A1 | 8/2016 | Waldern et al. |
| 2016/0266398 A1 | 9/2016 | Poon et al. |
| 2016/0274356 A1 | 9/2016 | Mason |
| 2016/0274362 A1 | 9/2016 | Tinch et al. |
| 2016/0283773 A1 | 9/2016 | Popovich et al. |
| 2016/0291328 A1 | 10/2016 | Popovich et al. |
| 2016/0299344 A1 | 10/2016 | Dobschal et al. |
| 2016/0320536 A1 | 11/2016 | Simmonds et al. |
| 2016/0327705 A1 | 11/2016 | Simmonds et al. |
| 2016/0336033 A1 | 11/2016 | Tanaka |
| 2016/0341964 A1 | 11/2016 | Amitai |
| 2016/0363840 A1 | 12/2016 | Mizoguchi et al. |
| 2016/0370615 A1 | 12/2016 | Wu et al. |
| 2016/0377879 A1 | 12/2016 | Popovich et al. |
| 2017/0003505 A1 | 1/2017 | Vallius et al. |
| 2017/0010466 A1 | 1/2017 | Klug et al. |
| 2017/0010488 A1 | 1/2017 | Klug et al. |
| 2017/0030550 A1 | 2/2017 | Popovich et al. |
| 2017/0031160 A1 | 2/2017 | Popovich et al. |
| 2017/0031171 A1 | 2/2017 | Vallius et al. |
| 2017/0032166 A1 | 2/2017 | Raguin et al. |
| 2017/0034435 A1 | 2/2017 | Vallius |
| 2017/0038579 A1 | 2/2017 | Yeoh et al. |
| 2017/0052374 A1 | 2/2017 | Waldern et al. |
| 2017/0052376 A1 | 2/2017 | Amitai et al. |
| 2017/0059759 A1 | 3/2017 | Ayres et al. |
| 2017/0059775 A1 | 3/2017 | Coles et al. |
| 2017/0102543 A1 | 4/2017 | Vallius |
| 2017/0115487 A1 | 4/2017 | Travis et al. |
| 2017/0123208 A1 | 5/2017 | Vallius |
| 2017/0131460 A1 | 5/2017 | Lin et al. |
| 2017/0131545 A1 | 5/2017 | Wall et al. |
| 2017/0131546 A1 | 5/2017 | Woltman et al. |
| 2017/0131551 A1 | 5/2017 | Robbins et al. |
| 2017/0138789 A1 | 5/2017 | Ivanov |
| 2017/0160546 A1 | 6/2017 | Bull et al. |
| 2017/0160548 A1 | 6/2017 | Woltman et al. |
| 2017/0176747 A1 | 6/2017 | Vallius et al. |
| 2017/0180404 A1 | 6/2017 | Bersch et al. |
| 2017/0180408 A1 | 6/2017 | Yu et al. |
| 2017/0192246 A9 | 7/2017 | Popovich et al. |
| 2017/0192499 A1 | 7/2017 | Trail |
| 2017/0199333 A1 | 7/2017 | Waldern et al. |
| 2017/0212295 A1 | 7/2017 | Vasylyev |
| 2017/0219841 A1 | 8/2017 | Popovich et al. |
| 2017/0235142 A1 | 8/2017 | Wall et al. |
| 2017/0236463 A1 | 8/2017 | Chi et al. |
| 2017/0255257 A1 | 9/2017 | Tiana et al. |
| 2017/0270637 A1 | 9/2017 | Perreault et al. |
| 2017/0276940 A1 | 9/2017 | Popovich et al. |
| 2017/0299793 A1 | 10/2017 | Fattal |
| 2017/0299794 A1 | 10/2017 | Fattal |
| 2017/0299860 A1 | 10/2017 | Wall et al. |
| 2017/0299865 A1 | 10/2017 | Vallius et al. |
| 2017/0307800 A1 | 10/2017 | Fattal |
| 2017/0322426 A1 | 11/2017 | Tervo |
| 2017/0329140 A1 | 11/2017 | Yeoh et al. |
| 2017/0356801 A1 | 12/2017 | Popovich et al. |
| 2017/0357841 A1 | 12/2017 | Popovich et al. |
| 2018/0003805 A1 | 1/2018 | Popovich et al. |
| 2018/0011324 A1 | 1/2018 | Popovich et al. |
| 2018/0017801 A1 | 1/2018 | Chang et al. |
| 2018/0052277 A1 | 2/2018 | Schowengerdt et al. |
| 2018/0059305 A1 | 3/2018 | Popovich et al. |
| 2018/0067251 A1 | 3/2018 | Baldwin et al. |
| 2018/0067318 A1 | 3/2018 | St Hilaire |
| 2018/0074265 A1 | 3/2018 | Waldern et al. |
| 2018/0074340 A1 | 3/2018 | Robbins et al. |
| 2018/0074352 A1 | 3/2018 | Popovich et al. |
| 2018/0081190 A1 | 3/2018 | Lee et al. |
| 2018/0082644 A1 | 3/2018 | Bohn |
| 2018/0088325 A1 | 3/2018 | Brown et al. |
| 2018/0095283 A1 | 4/2018 | Takeda et al. |
| 2018/0107011 A1 | 4/2018 | Lu et al. |
| 2018/0112097 A1 | 4/2018 | Raghavanpillai et al. |
| 2018/0113303 A1 | 4/2018 | Popovich et al. |
| 2018/0120669 A1 | 5/2018 | Popovich et al. |
| 2018/0129060 A1 | 5/2018 | Lee et al. |
| 2018/0143438 A1 | 5/2018 | Oh |
| 2018/0143449 A1 | 5/2018 | Popovich et al. |
| 2018/0164583 A1 | 6/2018 | Wall et al. |
| 2018/0172995 A1 | 6/2018 | Lee et al. |
| 2018/0188542 A1 | 7/2018 | Waldern et al. |
| 2018/0188691 A1 | 7/2018 | Fattal |
| 2018/0203230 A1 | 7/2018 | Vallius et al. |
| 2018/0210198 A1 | 7/2018 | Brown et al. |
| 2018/0210205 A1 | 7/2018 | Grey et al. |
| 2018/0210396 A1 | 7/2018 | Popovich et al. |
| 2018/0232048 A1 | 8/2018 | Popovich et al. |
| 2018/0246354 A1 | 8/2018 | Popovich et al. |
| 2018/0252869 A1 | 9/2018 | Ayres et al. |
| 2018/0265774 A1 | 9/2018 | Huang et al. |
| 2018/0275350 A1 | 9/2018 | Oh et al. |
| 2018/0275402 A1 | 9/2018 | Popovich et al. |
| 2018/0275410 A1 | 9/2018 | Yeoh et al. |
| 2018/0284440 A1 | 10/2018 | Popovich et al. |
| 2018/0299678 A1 | 10/2018 | Singer et al. |
| 2018/0338131 A1 | 11/2018 | Robbins |
| 2018/0348524 A1 | 12/2018 | Blum et al. |
| 2018/0373115 A1 | 12/2018 | Brown et al. |
| 2019/0041634 A1 | 2/2019 | Popovich et al. |
| 2019/0042827 A1 | 2/2019 | Popovich et al. |
| 2019/0064526 A1 | 2/2019 | Connor |
| 2019/0064735 A1 | 2/2019 | Waldern et al. |
| 2019/0072723 A1 | 3/2019 | Waldern et al. |
| 2019/0072767 A1 | 3/2019 | Vallius et al. |
| 2019/0094548 A1 | 3/2019 | Nicholson et al. |
| 2019/0113751 A9 | 4/2019 | Waldern et al. |
| 2019/0113829 A1 | 4/2019 | Waldern et al. |
| 2019/0114484 A1 | 4/2019 | Keech et al. |
| 2019/0121027 A1 | 4/2019 | Popovich et al. |
| 2019/0129085 A1 | 5/2019 | Waldern et al. |
| 2019/0162962 A1 | 5/2019 | Leighton et al. |
| 2019/0162963 A1 | 5/2019 | Leighton et al. |
| 2019/0171031 A1 | 6/2019 | Popovich et al. |
| 2019/0179153 A1 | 6/2019 | Popovich et al. |
| 2019/0187474 A1* | 6/2019 | Bhargava ............ G02B 27/0944 |
| 2019/0187538 A1 | 6/2019 | Popovich et al. |

(56) References Cited

U.S. PATENT DOCUMENTS

| | | |
|---|---|---|
| 2019/0188471 A1 | 6/2019 | Osterhout et al. |
| 2019/0212195 A9 | 7/2019 | Popovich et al. |
| 2019/0212557 A1 | 7/2019 | Waldern et al. |
| 2019/0212573 A1 | 7/2019 | Popovich et al. |
| 2019/0212588 A1 | 7/2019 | Waldern et al. |
| 2019/0212589 A1 | 7/2019 | Waldern et al. |
| 2019/0212596 A1 | 7/2019 | Waldern et al. |
| 2019/0212597 A1 | 7/2019 | Waldern et al. |
| 2019/0212698 A1 | 7/2019 | Waldern et al. |
| 2019/0212699 A1 | 7/2019 | Waldern et al. |
| 2019/0219822 A1 | 7/2019 | Popovich et al. |
| 2019/0226830 A1 | 7/2019 | Edwin et al. |
| 2019/0243142 A1 | 8/2019 | Tekolste et al. |
| 2019/0243209 A1 | 8/2019 | Perreault et al. |
| 2019/0265486 A1 | 8/2019 | Hansotte et al. |
| 2019/0278224 A1 | 9/2019 | Schlottau et al. |
| 2019/0285796 A1 | 9/2019 | Waldern et al. |
| 2019/0293880 A1 | 9/2019 | Nishiwaki et al. |
| 2019/0319426 A1 | 10/2019 | Lu et al. |
| 2019/0324202 A1 | 10/2019 | Colburn et al. |
| 2019/0339558 A1 | 11/2019 | Waldern et al. |
| 2019/0361096 A1 | 11/2019 | Popovich et al. |
| 2020/0012839 A1 | 1/2020 | Popovich et al. |
| 2020/0018875 A1 | 1/2020 | Mohanty et al. |
| 2020/0026072 A1 | 1/2020 | Brown et al. |
| 2020/0026074 A1 | 1/2020 | Waldern et al. |
| 2020/0033190 A1 | 1/2020 | Popovich et al. |
| 2020/0033801 A1 | 1/2020 | Waldern et al. |
| 2020/0033802 A1 | 1/2020 | Popovich et al. |
| 2020/0041787 A1 | 2/2020 | Popovich et al. |
| 2020/0041791 A1 | 2/2020 | Shipton et al. |
| 2020/0057353 A1 | 2/2020 | Popovich et al. |
| 2020/0064637 A1 | 2/2020 | Popovich et al. |
| 2020/0081317 A1 | 3/2020 | Popovich et al. |
| 2020/0089319 A1 | 3/2020 | Popovich et al. |
| 2020/0096692 A1 | 3/2020 | Popovich et al. |
| 2020/0096772 A1 | 3/2020 | Adema et al. |
| 2020/0103661 A1 | 4/2020 | Kamakura |
| 2020/0116997 A1 | 4/2020 | Lee et al. |
| 2020/0142131 A1 | 5/2020 | Waldern et al. |
| 2020/0150469 A1 | 5/2020 | Popovich et al. |
| 2020/0158943 A1 | 5/2020 | Calafiore |
| 2020/0159023 A1 | 5/2020 | Bhargava et al. |
| 2020/0159026 A1 | 5/2020 | Waldern et al. |
| 2020/0183163 A1 | 6/2020 | Waldern et al. |
| 2020/0183200 A1 | 6/2020 | Diest et al. |
| 2020/0192088 A1 | 6/2020 | Yu et al. |
| 2020/0201042 A1 | 6/2020 | Wang et al. |
| 2020/0201051 A1 | 6/2020 | Popovich et al. |
| 2020/0209483 A1 | 7/2020 | Mohanty |
| 2020/0209630 A1* | 7/2020 | Schultz .............. G02B 27/0172 |
| 2020/0225471 A1 | 7/2020 | Waldern et al. |
| 2020/0241304 A1 | 7/2020 | Popovich et al. |
| 2020/0247016 A1 | 8/2020 | Calafiore |
| 2020/0247017 A1 | 8/2020 | Waldern et al. |
| 2020/0249484 A1 | 8/2020 | Waldern et al. |
| 2020/0249491 A1 | 8/2020 | Popovich et al. |
| 2020/0249568 A1 | 8/2020 | Rao et al. |
| 2020/0264378 A1 | 8/2020 | Grant et al. |
| 2020/0271973 A1 | 8/2020 | Waldern et al. |
| 2020/0292745 A1 | 9/2020 | Waldern et al. |
| 2020/0292840 A1 | 9/2020 | Popovich et al. |
| 2020/0319404 A1 | 10/2020 | Waldern et al. |
| 2020/0333606 A1 | 10/2020 | Popovich et al. |
| 2020/0341194 A1 | 10/2020 | Waldern et al. |
| 2020/0341272 A1 | 10/2020 | Popovich et al. |
| 2020/0348519 A1 | 11/2020 | Waldern et al. |
| 2020/0348531 A1 | 11/2020 | Popovich et al. |
| 2020/0363771 A1 | 11/2020 | Waldern et al. |
| 2020/0372236 A1 | 11/2020 | Popovich et al. |
| 2020/0386947 A1 | 12/2020 | Waldern et al. |
| 2020/0400946 A1 | 12/2020 | Waldern et al. |
| 2020/0400951 A1 | 12/2020 | Zhang |
| 2020/0409151 A1 | 12/2020 | Calafiore |
| 2021/0026297 A1 | 1/2021 | Waldern et al. |
| 2021/0033857 A1 | 2/2021 | Waldern et al. |
| 2021/0055551 A1 | 2/2021 | Chi et al. |
| 2021/0063634 A1 | 3/2021 | Waldern et al. |
| 2021/0063672 A1 | 3/2021 | Bodiya |
| 2021/0088705 A1 | 3/2021 | Drazic et al. |
| 2021/0109285 A1 | 4/2021 | Jiang et al. |
| 2021/0109353 A1 | 4/2021 | Nicholson et al. |
| 2021/0191122 A1 | 6/2021 | Yaroshchuk et al. |
| 2021/0199873 A1 | 7/2021 | Shi et al. |
| 2021/0199971 A1 | 7/2021 | Lee et al. |
| 2021/0216040 A1 | 7/2021 | Waldern et al. |
| 2021/0223585 A1 | 7/2021 | Waldern et al. |
| 2021/0231874 A1 | 7/2021 | Popovich et al. |
| 2021/0231955 A1 | 7/2021 | Waldern et al. |
| 2021/0238374 A1 | 8/2021 | Ye et al. |
| 2021/0239984 A1 | 8/2021 | Popovich et al. |
| 2021/0247560 A1 | 8/2021 | Waldern et al. |
| 2021/0247620 A1 | 8/2021 | Popovich et al. |
| 2021/0247719 A1 | 8/2021 | Waldern et al. |
| 2021/0255463 A1 | 8/2021 | Popovich et al. |
| 2021/0278739 A1 | 9/2021 | Brown et al. |
| 2021/0349328 A1 | 11/2021 | Popovich et al. |
| 2021/0364803 A1* | 11/2021 | Schowengerdt ...... G02B 6/0015 |
| 2021/0364836 A1 | 11/2021 | Waldern et al. |
| 2021/0405299 A1 | 12/2021 | Grant et al. |
| 2021/0405365 A1 | 12/2021 | Popovich et al. |
| 2021/0405514 A1 | 12/2021 | Waldern et al. |
| 2022/0019015 A1 | 1/2022 | Calafiore et al. |
| 2022/0043287 A1 | 2/2022 | Grant et al. |
| 2022/0057749 A1 | 2/2022 | Popovich et al. |
| 2022/0075196 A1 | 3/2022 | Waldern et al. |
| 2022/0075242 A1 | 3/2022 | Popovich et al. |
| 2022/0082739 A1 | 3/2022 | Franke et al. |
| 2022/0091323 A1 | 3/2022 | Yaroshchuk et al. |
| 2022/0099898 A1 | 3/2022 | Waldern et al. |
| 2022/0128754 A1 | 4/2022 | Popovich et al. |
| 2022/0155623 A1 | 5/2022 | Waldern et al. |
| 2022/0163728 A1 | 5/2022 | Waldern et al. |
| 2022/0163801 A1 | 5/2022 | Waldern et al. |
| 2022/0187692 A1 | 6/2022 | Popovich et al. |
| 2022/0204790 A1 | 6/2022 | Zhang et al. |
| 2022/0206232 A1 | 6/2022 | Zhang et al. |
| 2022/0214503 A1 | 7/2022 | Waldern et al. |
| 2022/0214551 A1 | 7/2022 | Popovich et al. |
| 2022/0244559 A1 | 8/2022 | Popovich et al. |
| 2022/0260838 A1 | 8/2022 | Popovich et al. |
| 2022/0283376 A1 | 9/2022 | Waldern et al. |
| 2022/0283377 A1 | 9/2022 | Popovich et al. |
| 2022/0283378 A1 | 9/2022 | Waldern et al. |
| 2022/0308352 A1 | 9/2022 | Stanley et al. |
| 2022/0317356 A1 | 10/2022 | Popovich et al. |
| 2023/0027493 A1 | 1/2023 | Shams et al. |
| 2023/0078253 A1 | 3/2023 | Waldern et al. |
| 2023/0081115 A1 | 3/2023 | Brown et al. |
| 2023/0114549 A1 | 4/2023 | Brown et al. |
| 2023/0221493 A1 | 7/2023 | Grant et al. |
| 2023/0290290 A1 | 9/2023 | Shams et al. |
| 2023/0359028 A1 | 11/2023 | Waldern et al. |
| 2024/0012242 A1 | 1/2024 | Waldern et al. |
| 2024/0027670 A1 | 1/2024 | Waldern et al. |
| 2024/0027689 A1 | 1/2024 | Waldern et al. |
| 2024/0142695 A1 | 5/2024 | Waldern et al. |
| 2024/0151890 A1 | 5/2024 | Popovich et al. |

FOREIGN PATENT DOCUMENTS

| | | |
|---|---|---|
| CN | 1066936 A | 12/1992 |
| CN | 1320217 A | 10/2001 |
| CN | 1357010 A | 7/2002 |
| CN | 1886680 A | 12/2006 |
| CN | 200944140 Y | 9/2007 |
| CN | 101103297 A | 1/2008 |
| CN | 101151562 A | 3/2008 |
| CN | 101263412 A | 9/2008 |
| CN | 100492099 C | 5/2009 |
| CN | 101589326 A | 11/2009 |
| CN | 101688977 A | 3/2010 |
| CN | 101726857 A | 6/2010 |
| CN | 101793555 A | 8/2010 |

(56) References Cited

FOREIGN PATENT DOCUMENTS

| | | | |
|---|---|---|---|
| CN | 101881936 A | 11/2010 |
| CN | 101910900 A | 12/2010 |
| CN | 101945612 A | 1/2011 |
| CN | 102314092 A | 1/2012 |
| CN | 102360093 A | 2/2012 |
| CN | 102393548 A | 3/2012 |
| CN | 102498425 A | 6/2012 |
| CN | 102608762 A | 7/2012 |
| CN | 102782563 A | 11/2012 |
| CN | 102928981 A | 2/2013 |
| CN | 103000188 A | 3/2013 |
| CN | 103031557 A | 4/2013 |
| CN | 103185970 A | 7/2013 |
| CN | 103562802 A | 2/2014 |
| CN | 103777282 A | 5/2014 |
| CN | 103823267 A | 5/2014 |
| CN | 103959133 A | 7/2014 |
| CN | 104035157 A | 9/2014 |
| CN | 104040308 A | 9/2014 |
| CN | 104040410 A | 9/2014 |
| CN | 104076424 A | 10/2014 |
| CN | 104136952 A | 11/2014 |
| CN | 104204901 A | 12/2014 |
| CN | 104246626 A | 12/2014 |
| CN | 303019849 | 12/2014 |
| CN | 104520751 A | 4/2015 |
| CN | 303217936 | 5/2015 |
| CN | 104956252 A | 9/2015 |
| CN | 105074537 A | 11/2015 |
| CN | 105074539 A | 11/2015 |
| CN | 105137598 A | 12/2015 |
| CN | 105190407 A | 12/2015 |
| CN | 105229514 A | 1/2016 |
| CN | 105393159 A | 3/2016 |
| CN | 105408801 A | 3/2016 |
| CN | 105408802 A | 3/2016 |
| CN | 105408803 A | 3/2016 |
| CN | 105531716 A | 4/2016 |
| CN | 105705981 A | 6/2016 |
| CN | 105940451 A | 9/2016 |
| CN | 106125308 A | 11/2016 |
| CN | 106443867 A | 2/2017 |
| CN | 106575034 A | 4/2017 |
| CN | 106716223 A | 5/2017 |
| CN | 106842397 A | 6/2017 |
| CN | 106950744 A | 7/2017 |
| CN | 107466372 A | 12/2017 |
| CN | 107533137 A | 1/2018 |
| CN | 107873086 A | 4/2018 |
| CN | 108107506 A | 6/2018 |
| CN | 108351516 A | 7/2018 |
| CN | 108474945 A | 8/2018 |
| CN | 108681067 A | 10/2018 |
| CN | 108780224 A | 11/2018 |
| CN | 208092344 U | 11/2018 |
| CN | 109073889 A | 12/2018 |
| CN | 109154717 A | 1/2019 |
| CN | 208621784 U | 3/2019 |
| CN | 103823267 B | 5/2019 |
| CN | 110383117 A | 10/2019 |
| CN | 107873086 B | 3/2020 |
| CN | 111025657 A | 4/2020 |
| CN | 111323867 A | 6/2020 |
| CN | 111386495 A | 7/2020 |
| CN | 111566571 A | 8/2020 |
| CN | 305973971 S | 8/2020 |
| CN | 111615655 A | 9/2020 |
| CN | 111684362 A | 9/2020 |
| CN | 111902768 A | 11/2020 |
| CN | 107466372 B | 1/2021 |
| CN | 109073889 B | 4/2021 |
| CN | 108780224 B | 8/2021 |
| CN | 113424095 A | 9/2021 |
| CN | 108474945 B | 10/2021 |
| CN | 113692544 A | 11/2021 |
| CN | 113728075 A | 11/2021 |
| CN | 113728258 A | 11/2021 |
| CN | 113759555 A | 12/2021 |
| CN | 111684362 B | 3/2022 |
| CN | 114207492 A | 3/2022 |
| CN | 114341686 A | 4/2022 |
| CN | 114341729 A | 4/2022 |
| CN | 109154717 B | 5/2022 |
| CN | 111566571 B | 5/2022 |
| CN | 114450608 A | 5/2022 |
| CN | 114721242 A | 7/2022 |
| CN | 111386495 B | 12/2022 |
| CN | 116149058 A | 5/2023 |
| DE | 19751190 A1 | 5/1999 |
| DE | 10221837 A1 | 12/2003 |
| DE | 102006003785 A1 | 7/2007 |
| DE | 102006036831 A1 | 2/2008 |
| DE | 102012108424 A1 | 3/2014 |
| DE | 102013209436 A1 | 11/2014 |
| EM | 001747551-0002 | 8/2012 |
| EM | 007234190-0001 | 11/2019 |
| EP | 0795775 A2 | 9/1997 |
| EP | 0822441 A2 | 2/1998 |
| EP | 1347641 A1 | 9/2003 |
| EP | 1413972 A1 | 4/2004 |
| EP | 1526709 A2 | 4/2005 |
| EP | 1748305 A1 | 1/2007 |
| EP | 1938152 A1 | 7/2008 |
| EP | 1413972 B1 | 10/2008 |
| EP | 2110701 A1 | 10/2009 |
| EP | 2196729 A1 | 6/2010 |
| EP | 2225592 A1 | 9/2010 |
| EP | 2244114 A1 | 10/2010 |
| EP | 2326983 A1 | 6/2011 |
| EP | 2381290 A1 | 10/2011 |
| EP | 1828832 B1 | 5/2013 |
| EP | 2733517 A1 | 5/2014 |
| EP | 1573369 B1 | 7/2014 |
| EP | 2748670 A1 | 7/2014 |
| EP | 2634605 B1 | 10/2015 |
| EP | 2929378 A1 | 10/2015 |
| EP | 2748670 B1 | 11/2015 |
| EP | 2995986 A1 | 3/2016 |
| EP | 1402298 B1 | 9/2016 |
| EP | 2995986 B1 | 4/2017 |
| EP | 3198192 A1 | 8/2017 |
| EP | 3245444 A1 | 11/2017 |
| EP | 3245551 A2 | 11/2017 |
| EP | 3248026 A1 | 11/2017 |
| EP | 3256888 A1 | 12/2017 |
| EP | 3359999 A1 | 8/2018 |
| EP | 2494388 B1 | 11/2018 |
| EP | 3398007 A1 | 11/2018 |
| EP | 3433658 A1 | 1/2019 |
| EP | 3433659 A1 | 1/2019 |
| EP | 2842003 B1 | 2/2019 |
| EP | 3499278 A1 | 6/2019 |
| EP | 3245551 B1 | 9/2019 |
| EP | 3548939 A2 | 10/2019 |
| EP | 3698214 A2 | 8/2020 |
| EP | 3710876 A1 | 9/2020 |
| EP | 3710887 A1 | 9/2020 |
| EP | 3710893 A1 | 9/2020 |
| EP | 3710894 A1 | 9/2020 |
| EP | 3245444 B1 | 9/2021 |
| EP | 3894938 A1 | 10/2021 |
| EP | 3924759 A1 | 12/2021 |
| EP | 3927793 A1 | 12/2021 |
| EP | 3938821 A1 | 1/2022 |
| EP | 3980825 A1 | 4/2022 |
| EP | 4004615 A1 | 6/2022 |
| EP | 4004646 A1 | 6/2022 |
| EP | 4022370 A1 | 7/2022 |
| FI | 20176157 A1 | 6/2019 |
| FI | 20176158 A1 | 6/2019 |
| FI | 20176161 A1 | 6/2019 |
| FR | 2677463 A1 | 12/1992 |
| FR | 2975506 A1 | 11/2012 |
| GB | 2115178 A | 9/1983 |

(56) References Cited

FOREIGN PATENT DOCUMENTS

| | | |
|---|---|---|
| GB | 2140935 A | 12/1984 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | S49092850 U | 8/1974 |
| JP | 57089722 A | 6/1982 |
| JP | 02186319 A | 7/1990 |
| JP | 03239384 A | 10/1991 |
| JP | H04303812 A | 10/1992 |
| JP | H04303813 A | 10/1992 |
| JP | H05066427 A | 3/1993 |
| JP | 5-224018 A | 9/1993 |
| JP | 06294952 A | 10/1994 |
| JP | 7-66383 A | 3/1995 |
| JP | 07098439 A | 4/1995 |
| JP | H07239412 A | 9/1995 |
| JP | 0990312 A | 4/1997 |
| JP | H09185313 A | 7/1997 |
| JP | 2689851 B2 | 12/1997 |
| JP | H10503279 A | 3/1998 |
| JP | 10096903 A | 4/1998 |
| JP | H10105030 A | 4/1998 |
| JP | H1164636 A | 3/1999 |
| JP | 11109320 A | 4/1999 |
| JP | 11142806 A | 5/1999 |
| JP | 2953444 B2 | 9/1999 |
| JP | 2000056259 A | 2/2000 |
| JP | 2000511306 A | 8/2000 |
| JP | 2000261706 A | 9/2000 |
| JP | 2000267042 A | 9/2000 |
| JP | 2000321962 A | 11/2000 |
| JP | 2000515996 A | 11/2000 |
| JP | 2001027739 A | 1/2001 |
| JP | 2001296503 A | 10/2001 |
| JP | 2002090858 A | 3/2002 |
| JP | 2002122906 A | 4/2002 |
| JP | 2002156617 A | 5/2002 |
| JP | 2002162598 A | 6/2002 |
| JP | 2002520648 A | 7/2002 |
| JP | 2002523802 A | 7/2002 |
| JP | 2002529790 A | 9/2002 |
| JP | 2002311379 A | 10/2002 |
| JP | 2003066428 A | 3/2003 |
| JP | 2003270419 A | 9/2003 |
| JP | 2003315540 A | 11/2003 |
| JP | 2004021071 A | 1/2004 |
| JP | 2004133074 A | 4/2004 |
| JP | 2004157245 A | 6/2004 |
| JP | 2005222963 A | 8/2005 |
| JP | 2006350129 A | 12/2006 |
| JP | 2007011057 A | 1/2007 |
| JP | 2007094175 A | 4/2007 |
| JP | 2007199699 A | 8/2007 |
| JP | 2007219106 A | 8/2007 |
| JP | 2007279313 A | 10/2007 |
| JP | 2008511702 A | 4/2008 |
| JP | 2008112187 A | 5/2008 |
| JP | 2008517323 A | 5/2008 |
| JP | 2008145619 A | 6/2008 |
| JP | 2008233226 A | 10/2008 |
| JP | 2009036955 A | 2/2009 |
| JP | 2009515225 A | 4/2009 |
| JP | 2009132221 A | 6/2009 |
| JP | 2009133999 A | 6/2009 |
| JP | 2009211091 A | 9/2009 |
| JP | 4367775 B2 | 11/2009 |
| JP | 2010044326 A | 2/2010 |
| JP | 2010256631 A | 11/2010 |
| JP | 2011505052 A | 2/2011 |
| JP | 2011075681 A | 4/2011 |
| JP | 2011158907 A | 8/2011 |
| JP | 2011164545 A | 8/2011 |
| JP | 2011523452 A | 8/2011 |
| JP | 2011187108 A | 9/2011 |
| JP | 2011232510 A | 11/2011 |
| JP | 2012137616 A | 7/2012 |
| JP | 2012163642 A | 8/2012 |
| JP | 2012533089 A | 12/2012 |
| JP | 2013061480 A | 4/2013 |
| JP | 5303928 B2 | 10/2013 |
| JP | 2013235256 A | 11/2013 |
| JP | 2014132328 A | 7/2014 |
| JP | 5588794 B2 | 8/2014 |
| JP | 5646748 B2 | 11/2014 |
| JP | 2015053163 A | 3/2015 |
| JP | 2015523586 A | 8/2015 |
| JP | 2015172713 A | 10/2015 |
| JP | 2016030503 A | 3/2016 |
| JP | 2017156389 A | 9/2017 |
| JP | 2017528739 A | 9/2017 |
| JP | 2018508037 A | 3/2018 |
| JP | 2018512562 A | 5/2018 |
| JP | 2018131608 A | 8/2018 |
| JP | 2018524621 A | 8/2018 |
| JP | 2018533069 A | 11/2018 |
| JP | 2019512745 A | 5/2019 |
| JP | 2019520595 A | 7/2019 |
| JP | 6598269 B2 | 10/2019 |
| JP | 6680793 B2 | 3/2020 |
| JP | 2020512578 A | 4/2020 |
| JP | 2020514783 A | 5/2020 |
| JP | 1664536 S | 7/2020 |
| JP | 6734933 B2 | 7/2020 |
| JP | 2020-537187 A | 12/2020 |
| JP | 2021509488 A | 3/2021 |
| JP | 2021509736 A | 4/2021 |
| JP | 2021509737 A | 4/2021 |
| JP | 2021509739 A | 4/2021 |
| JP | 6895451 B2 | 6/2021 |
| JP | 2022513896 A | 2/2022 |
| JP | 2022-520472 A | 3/2022 |
| JP | 2022523365 A | 4/2022 |
| JP | 2022525165 A | 5/2022 |
| JP | 2022091982 A | 6/2022 |
| JP | 2022535460 A | 8/2022 |
| JP | 2022543571 A | 10/2022 |
| JP | 2022546413 A | 11/2022 |
| JP | 7250799 B2 | 3/2023 |
| JP | 7399084 B2 | 12/2023 |
| JP | 7461357 B2 | 3/2024 |
| KR | 20060132474 A | 12/2006 |
| KR | 100803288 B1 | 2/2008 |
| KR | 20100092059 A | 8/2010 |
| KR | 20140140063 A | 12/2014 |
| KR | 20140142337 A | 12/2014 |
| KR | 20170031357 A | 3/2017 |
| KR | 30-1061010 S | 5/2020 |
| KR | 10-2020-0106932 A | 9/2020 |
| KR | 10-2020-0108030 A | 9/2020 |
| KR | 2020-0106170 A | 9/2020 |
| KR | 20200104402 A | 9/2020 |
| KR | 20210100174 A | 8/2021 |
| KR | 10-2021-0127237 A | 10/2021 |
| KR | 10-2021-0138609 A | 11/2021 |
| KR | 20210134763 A | 11/2021 |
| KR | 1020220036963 A | 3/2022 |
| KR | 1020220038452 A | 3/2022 |
| KR | 10-2022-0054386 A | 5/2022 |
| TW | 200535633 A | 11/2005 |
| TW | 200801583 A | 1/2008 |
| TW | 201314263 A | 4/2013 |
| TW | 201600943 A | 1/2016 |
| TW | 201604601 A | 2/2016 |
| WO | 9216880 A1 | 10/1992 |
| WO | 1997001133 A1 | 1/1997 |
| WO | 1997027519 A1 | 7/1997 |
| WO | 1998004650 A1 | 2/1998 |
| WO | 1999009440 A1 | 2/1999 |
| WO | 9931658 A1 | 6/1999 |

(56) References Cited

FOREIGN PATENT DOCUMENTS

| | | |
|---|---|---|
| WO | 1999052002 A1 | 10/1999 |
| WO | 2000016136 A1 | 3/2000 |
| WO | 2000023830 A1 | 4/2000 |
| WO | 2000023832 A1 | 4/2000 |
| WO | 2000023847 A1 | 4/2000 |
| WO | 2000028369 A2 | 5/2000 |
| WO | 2000028369 A3 | 10/2000 |
| WO | 2001050200 A2 | 7/2001 |
| WO | 2001090822 A1 | 11/2001 |
| WO | 2002082168 A1 | 10/2002 |
| WO | 2003081320 A1 | 10/2003 |
| WO | 2004023174 A2 | 3/2004 |
| WO | 2004053531 A3 | 11/2004 |
| WO | 2004102226 A2 | 11/2004 |
| WO | 2004109349 A2 | 12/2004 |
| WO | 2004109349 A3 | 1/2005 |
| WO | 2005001753 A1 | 1/2005 |
| WO | 2005006065 A8 | 1/2005 |
| WO | 2005006065 A3 | 2/2005 |
| WO | 2005047988 A1 | 5/2005 |
| WO | 2005073798 A1 | 8/2005 |
| WO | 2005093493 A1 | 10/2005 |
| WO | 2006002870 A1 | 1/2006 |
| WO | 2006064301 A1 | 6/2006 |
| WO | 2006064325 A1 | 6/2006 |
| WO | 2006064334 A1 | 6/2006 |
| WO | 2006102073 A2 | 9/2006 |
| WO | 2006132614 A1 | 12/2006 |
| WO | 2006102073 A3 | 1/2007 |
| WO | 2007015141 A2 | 2/2007 |
| WO | 2007029032 A1 | 3/2007 |
| WO | 2007085682 A1 | 8/2007 |
| WO | 2007130130 A2 | 11/2007 |
| WO | 2007141587 A1 | 12/2007 |
| WO | 2007141589 A1 | 12/2007 |
| WO | 2008011066 A2 | 1/2008 |
| WO | 2008038058 A1 | 4/2008 |
| WO | 2008011066 A9 | 5/2008 |
| WO | 2008081070 A1 | 7/2008 |
| WO | 2008100545 A2 | 8/2008 |
| WO | 2008011066 A3 | 12/2008 |
| WO | 2009013597 A2 | 1/2009 |
| WO | 2009013597 A3 | 1/2009 |
| WO | 2009077802 A1 | 6/2009 |
| WO | 2009077803 A1 | 6/2009 |
| WO | 2009101238 A1 | 8/2009 |
| WO | 2007130130 A3 | 9/2009 |
| WO | 2009155437 A1 | 12/2009 |
| WO | 2009155437 A8 | 3/2010 |
| WO | 2010023444 A1 | 3/2010 |
| WO | 2010057219 A1 | 5/2010 |
| WO | 2010067114 A1 | 6/2010 |
| WO | 2010067117 A1 | 6/2010 |
| WO | 2010078856 A1 | 7/2010 |
| WO | 2010104692 A2 | 9/2010 |
| WO | 2010122330 A1 | 10/2010 |
| WO | 2010125337 A2 | 11/2010 |
| WO | 2010125337 A3 | 11/2010 |
| WO | 2010131046 A1 | 11/2010 |
| WO | 2011012825 A1 | 2/2011 |
| WO | 2011032005 A2 | 3/2011 |
| WO | 2011042711 A2 | 4/2011 |
| WO | 2011051660 A1 | 5/2011 |
| WO | 2011055109 A2 | 5/2011 |
| WO | 2011042711 A3 | 6/2011 |
| WO | 2011073673 A1 | 6/2011 |
| WO | 2011107831 A1 | 9/2011 |
| WO | 2011110821 A1 | 9/2011 |
| WO | 2011131978 A1 | 10/2011 |
| WO | 2012052352 A1 | 4/2012 |
| WO | 2012062658 A1 | 5/2012 |
| WO | 2012136970 A1 | 10/2012 |
| WO | 2012158950 A1 | 11/2012 |
| WO | 2012172295 A1 | 12/2012 |
| WO | 2013027004 A1 | 2/2013 |
| WO | 2013027006 A1 | 2/2013 |
| WO | 2013033274 A1 | 3/2013 |
| WO | 2013034879 A1 | 3/2013 |
| WO | 2013049012 A1 | 4/2013 |
| WO | 2013054972 A1 | 4/2013 |
| WO | 2013102759 A2 | 7/2013 |
| WO | 2013163347 A1 | 10/2013 |
| WO | 2013167864 A1 | 11/2013 |
| WO | 2013190257 A1 | 12/2013 |
| WO | 2014064427 A1 | 5/2014 |
| WO | 2014080155 A1 | 5/2014 |
| WO | 2014085734 A1 | 6/2014 |
| WO | 2014090379 A1 | 6/2014 |
| WO | 2014091200 A1 | 6/2014 |
| WO | 2014093601 A1 | 6/2014 |
| WO | 2014100182 A1 | 6/2014 |
| WO | 2014113506 A1 | 7/2014 |
| WO | 2014116615 A1 | 7/2014 |
| WO | 2014130383 A1 | 8/2014 |
| WO | 2014144526 A2 | 9/2014 |
| WO | 2014156167 A1 | 10/2014 |
| WO | 2014159621 A1 | 10/2014 |
| WO | 2014164901 A1 | 10/2014 |
| WO | 2014176695 A1 | 11/2014 |
| WO | 2014179632 A1 | 11/2014 |
| WO | 2014188149 A1 | 11/2014 |
| WO | 2014209733 A1 | 12/2014 |
| WO | 2014209819 A1 | 12/2014 |
| WO | 2014209820 A1 | 12/2014 |
| WO | 2014209821 A1 | 12/2014 |
| WO | 2014210349 A1 | 12/2014 |
| WO | 2015006784 A2 | 1/2015 |
| WO | 2015015138 A1 | 2/2015 |
| WO | 2015017291 A1 | 2/2015 |
| WO | 2015069553 A1 | 5/2015 |
| WO | 2015081313 A2 | 6/2015 |
| WO | 2015117039 A1 | 8/2015 |
| WO | 2015145119 A1 | 10/2015 |
| WO | 2016010289 A1 | 1/2016 |
| WO | 2016020630 A2 | 2/2016 |
| WO | 2016020643 A1 | 2/2016 |
| WO | 2016025350 A1 | 2/2016 |
| WO | 2016020630 A3 | 3/2016 |
| WO | 2016042283 A1 | 3/2016 |
| WO | 2016044193 A1 | 3/2016 |
| WO | 2016046514 A1 | 3/2016 |
| WO | 2016048729 A1 | 3/2016 |
| WO | 2016054092 A1 | 4/2016 |
| WO | 2016069606 A1 | 5/2016 |
| WO | 2016087442 A1 | 6/2016 |
| WO | 2016103263 A1 | 6/2016 |
| WO | 2016111706 A1 | 7/2016 |
| WO | 2016111707 A1 | 7/2016 |
| WO | 2016111708 A1 | 7/2016 |
| WO | 2016111709 A1 | 7/2016 |
| WO | 2016113533 A2 | 7/2016 |
| WO | 2016113534 A1 | 7/2016 |
| WO | 2016116733 A1 | 7/2016 |
| WO | 2016118107 A1 | 7/2016 |
| WO | 2016122679 A1 | 8/2016 |
| WO | 2016130509 A1 | 8/2016 |
| WO | 2016135434 A1 | 9/2016 |
| WO | 2016113533 A3 | 10/2016 |
| WO | 2016156776 A1 | 10/2016 |
| WO | 2016162606 A1 | 10/2016 |
| WO | 2016181108 A1 | 11/2016 |
| WO | 2016046514 A8 | 4/2017 |
| WO | 2017060665 A1 | 4/2017 |
| WO | 2017094129 A1 | 6/2017 |
| WO | 2017120320 A1 | 7/2017 |
| WO | 2017134412 A1 | 8/2017 |
| WO | 2017160367 A1 | 9/2017 |
| WO | 2017162999 A1 | 9/2017 |
| WO | 2017176861 A1 | 10/2017 |
| WO | 2017178781 A1 | 10/2017 |
| WO | 2017180403 A1 | 10/2017 |
| WO | 2017180923 A1 | 10/2017 |
| WO | 2017182771 A1 | 10/2017 |
| WO | 2017203200 A1 | 11/2017 |

(56) References Cited

FOREIGN PATENT DOCUMENTS

| | | | |
|---|---|---|---|
| WO | 2017203201 A1 | 11/2017 |
| WO | 2017207987 A1 | 12/2017 |
| WO | 2018102834 A2 | 6/2018 |
| WO | 2018096359 A3 | 7/2018 |
| WO | 2018129398 A1 | 7/2018 |
| WO | 2017162999 A8 | 8/2018 |
| WO | 2018150163 A1 | 8/2018 |
| WO | 2018152337 A1 | 8/2018 |
| WO | 2018175546 A1 | 9/2018 |
| WO | 2018102834 A3 | 11/2018 |
| WO | 2018206487 A1 | 11/2018 |
| WO | 2019046649 A1 | 3/2019 |
| WO | 2019077307 A1 | 4/2019 |
| WO | 2019079350 A2 | 4/2019 |
| WO | 2019079350 A3 | 4/2019 |
| WO | 2019046649 A8 | 5/2019 |
| WO | 2019122806 A1 | 6/2019 |
| WO | 2019135784 A1 | 7/2019 |
| WO | 2019135796 A1 | 7/2019 |
| WO | 2019135837 A1 | 7/2019 |
| WO | 2019136470 A1 | 7/2019 |
| WO | 2019136471 A1 | 7/2019 |
| WO | 2019136473 A1 | 7/2019 |
| WO | 2019171038 A1 | 9/2019 |
| WO | 2019185973 A1 | 10/2019 |
| WO | 2019185975 A1 | 10/2019 |
| WO | 2019185976 A1 | 10/2019 |
| WO | 2019185977 A1 | 10/2019 |
| WO | 2019217453 A1 | 11/2019 |
| WO | 2020023779 A1 | 1/2020 |
| WO | 2020123506 A1 | 6/2020 |
| WO | 2020149956 A1 | 7/2020 |
| WO | 2020163524 A1 | 8/2020 |
| WO | 2020168348 A1 | 8/2020 |
| WO | 2020172681 A1 | 8/2020 |
| WO | 2020186113 A1 | 9/2020 |
| WO | 2020212682 A1 | 10/2020 |
| WO | 2020219092 A1 | 10/2020 |
| WO | 2020227236 A1 | 11/2020 |
| WO | 2020247930 A1 | 12/2020 |
| WO | 2021016371 A1 | 1/2021 |
| WO | 2021021926 A1 | 2/2021 |
| WO | 2021032982 A1 | 2/2021 |
| WO | 2021032983 A1 | 2/2021 |
| WO | 2021041949 A1 | 3/2021 |
| WO | 2021044121 A1 | 3/2021 |
| WO | 2021138607 A1 | 7/2021 |
| WO | 2021242898 A1 | 12/2021 |
| WO | 2021262759 A1 | 12/2021 |
| WO | 2022015878 A1 | 1/2022 |
| WO | 2022099312 A1 | 5/2022 |
| WO | 2022109615 A1 | 5/2022 |
| WO | 2022150841 A1 | 7/2022 |
| WO | 2022187870 A1 | 9/2022 |
| WO | 2022187870 A9 | 10/2022 |
| WO | 2023250390 A2 | 12/2023 |
| WO | 2024059644 A2 | 3/2024 |
| WO | 2023250390 A3 | 4/2024 |
| WO | 2024059644 A3 | 4/2024 |

OTHER PUBLICATIONS

Digi Lens: Waveguides, announced unknown, [online], [site visited Nov. 6, 2020]. Available from Internet, <URL: https://www.digilens.com/technology/waveguides/> (Year: 2020), 2 pgs.
Extended European Search Report for EP Application No. 13192383.1, dated Apr. 2, 2014, 7 pgs.
Extended European Search Report for European Application No. 13765610.4 dated Feb. 16, 2016, 6 pgs.
Extended European Search Report for European Application No. 15187491.4, search completed Jan. 15, 2016, mailed Jan. 28, 2016, 5 pgs.
Extended European Search Report for European Application No. 18867522.7, Search completed Sep. 15, 2021, Mailed Sep. 24, 2021, 9 pgs.
Extended European Search Report for European Application No. 18898154.2, Search completed Aug. 13, 2021, Mailed Aug. 23, 2021, 7 pgs.
Extended European Search Report for European Application No. 19736108.2, Search completed Sep. 15, 2021, Mailed Sep. 27, 2021, 8 pgs.
Extended European Search Report for European Application No. 19897355.4, Search completed Jul. 12, 2022, Mailed Jul. 21, 2022, 08 pgs.
Extended European Search Report for European Application No. 20755316.5, Search completed Nov. 17, 2022, Mailed Nov. 25, 2022, 09 pgs.
Extended European Search Report for European Application No. 18727645.6, Search completed Oct. 14, 2020, Mailed Oct. 23, 2020, 13 pgs.
Extended Search Report for European Application No. 18898841.4, Search completed Mar. 18, 2021, Mailed Mar. 26, 2021, 10 pgs.
International Preliminary Report on Patentability for International Application No. PCT/GB2010/000835, issued Nov. 1, 2011, mailed Nov. 10, 2011, 9 pgs.
International Preliminary Report on Patentability for International Application No. PCT/GB2010/001920, issued Apr. 11, 2012, mailed Apr. 19, 2012, 10 pgs.
International Preliminary Report on Patentability for International Application No. PCT/GB2010/001982, report issued May 1, 2012, mailed May 10, 2012, 7 pgs.
International Preliminary Report on Patentability for International Application No. PCT/GB2013/000273, issued Dec. 23, 2014, mailed Dec. 31, 2014, 8 pgs.
International Preliminary Report on Patentability for International Application No. PCT/GB2015/000203, issued Mar. 21, 2017, mailed Mar. 30, 2017, 8 pgs.
International Preliminary Report on Patentability for International Application No. PCT/GB2016/000005, Report issued Jul. 18, 2017, Mailed Jul. 27, 2017, 7 pgs.
International Preliminary Report on Patentability for International Application No. PCT/GB2016/000036, issued Aug. 29, 2017, mailed Sep. 8, 2017, 8 pgs.
International Preliminary Report on Patentability for International Application No. PCT/GB2016/000051, Report issued Sep. 19, 2017, Mailed Sep. 28, 2017, 7 pgs.
International Preliminary Report on Patentability for International Application No. PCT/GB2016/000065, issued Oct. 3, 2017, mailed Oct. 12, 2017, 8 pgs.
International Preliminary Report on Patentability for International Application No. PCT/IB2008/001909, Report issued Jan. 26, 2010, Mailed Jan. 26, 2010, 5 pgs.
International Preliminary Report on Patentability for International Application No. PCT/US2018/012227, Report issued Jul. 30, 2019, Mailed Aug. 8, 2019, 7 pgs.
International Preliminary Report on Patentability for International Application No. PCT/US2018/037410, Report issued Jul. 14, 2020, Mailed Jul. 23, 2020, 7 pgs.
International Preliminary Report on Patentability for International Application No. PCT/US2018/048636, Report issued Jul. 14, 2020, Mailed Jul. 23, 2020, 9 pgs.
International Preliminary Report on Patentability for International Application No. PCT/US2018/062835, Report issued Jul. 14, 2020, Mailed Jul. 23, 2020, 7 pgs.
International Preliminary Report on Patentability for International Application No. PCT/US2019/012758, Report issued Jul. 14, 2020, Mailed Jul. 23, 2020, 4 pgs.
International Preliminary Report on Patentability for International Application No. PCT/US2019/012759, Report issued Jul. 14, 2020, Mailed Jul. 23, 2020, 6 pgs.
International Preliminary Report on Patentability for International Application PCT /US2018/015553, Report issued Jun. 4, 2019, Mailed Jun. 13, 2019, 6 pgs.
International Preliminary Report on Patentability for International Application PCT/GB2009/051676, issued Jun. 14, 2011, mailed Jun. 23, 2011, 6 pgs.

(56) References Cited

OTHER PUBLICATIONS

International Preliminary Report on Patentability for International Application PCT/GB2011/000349, issued Sep. 18, 2012, mailed Sep. 27, 2012, 10 pgs.
International Preliminary Report on Patentability for International Application PCT/GB2012/000331, issued Oct. 8, 2013, mailed Oct. 17, 2013, 8 pgs.
International Preliminary Report on Patentability for International Application PCT/GB2012/000677, issued Feb. 25, 2014, mailed Mar. 6, 2014, 5 pgs.
International Preliminary Report on Patentability for International Application PCT/GB2013/000005, issued Jul. 8, 2014, mailed Jul. 17, 2014, 12 pgs.
International Preliminary Report on Patentability for International Application PCT/GB2013/000210, issued Nov. 11, 2014, Mailed Nov. 20, 2014, 6 pgs.
International Preliminary Report on Patentability for International Application PCT/GB2014/000197, issued Nov. 24, 2015, mailed Dec. 3, 2015, 7 pgs.
International Preliminary Report on Patentability for International Application PCT/GB2014/000295, issued Feb. 2, 2016, mailed Feb. 11, 2016, 4 pgs.
International Preliminary Report on Patentability for International Application PCT/GB2015/000225, issued Feb. 14, 2017, mailed Feb. 23, 2017, 8 pgs.
International Preliminary Report on Patentability for International Application PCT/GB2015/000228, issued Feb. 14, 2017, mailed Feb. 23, 2017, 11 pgs.
International Preliminary Report on Patentability for International Application PCT/GB2015/000274, Issued Mar. 28, 2017, mailed Apr. 6, 2017, 8 pgs.
International Preliminary Report on Patentability for International Application PCT/GB2016/000003, issued Jul. 18, 2017, mailed Jul. 27, 2017, 11 pgs.
International Preliminary Report on Patentability for International Application PCT/GB2016/000014, issued Jul. 25, 2017, mailed Aug. 3, 2017, 7 pgs.
International Preliminary Report on Patentability for International Application PCT/GB2017/000015, Report Completed Aug. 7, 2018, Mailed Aug. 16, 2018, 7 pgs.
International Preliminary Report on Patentability for International Application PCT/GB2017/000040, Report issued Sep. 25, 2018, Mailed Oct. 4, 2018, 7 pgs.
International Preliminary Report on Patentability for International Application PCT/GB2017/000055, issued Oct. 16, 2018, Mailed Oct. 25, 2018, 9 pgs.
International Preliminary Report on Patentability for International Application PCT/US2014/011736, issued Jul. 21, 2015, mailed Jul. 30, 2015, 9 pgs.
International Preliminary Report on Patentability for International Application PCT/US2016/017091, issued Aug. 15, 2017, mailed Aug. 24, 2017, 5 pgs.
International Preliminary Report on Patentability for International Application PCT/US2018/012691, issued Jul. 9, 2019, Mailed Jul. 18, 2019, 10 pgs.
International Preliminary Report on Patentability for International Application PCT/US2018/048960, Report issued on Mar. 3, 2020, Mailed on Mar. 12, 2020, 7 pgs.
International Preliminary Report on Patentability for International Application PCT/US2018/056150, Report Issued on Apr. 21, 2020, Mailed on Apr. 30, 2020, 6 pgs.
International Preliminary Report on Patentability for International Application PCT/US2019/012764, Report issued Jul. 14, 2020, Mailed Jul. 23, 2020, 5 pgs.
International Preliminary Report on Patentability for International Application PCT/US2019/031163, Report issued Nov. 10, 2020, Mailed Nov. 19, 2020, 6 pgs.
International Preliminary Report on Patentability for International Application PCT/US2019/043496 Report issued Jan. 26, 2021, Mailed Feb. 4, 2021, 5 pgs.
International Preliminary Report on Patentability for International Application PCT/US2019/047097 issued Sep. 28, 2021, Mailed on Nov. 4, 2021, 8 pgs.
International Preliminary Report on Patentability for International Application PCT/US2019/064765, Report issued Oct. 19, 2020, Mailed Oct. 28, 2020, 27 pgs.
International Preliminary Report on Patentability for International Application PCT/US2019/065478, Report issued Jun. 8, 2021, mailed on Jun. 24, 2021, 9 pgs.
International Preliminary Report on Patentability for International Application PCT/US2020/018686, Report issued Aug. 10, 2021, Mailed Aug. 26, 2021, 6 pgs.
International Preliminary Report on Patentability for International Application PCT/US2020/019549, Report issued Aug. 10, 2021, Mailed Sep. 2, 2021, 7 pgs.
International Preliminary Report on Patentability for International Application PCT/US2020/022482, issued Aug. 25, 2021, Mailed Sep. 23, 2021, 7 pgs.
International Preliminary Report on Patentability for International Application PCT/US2020/031363, issued Nov. 2, 2021, Mailed Nov. 18, 2021, 7 pgs.
International Preliminary Report on Patentability for International Application PCT/US2020/036654, Report issued Dec. 7, 2021, Mailed Dec. 16, 2021, 10 pgs.
International Preliminary Report on Patentability for International Application PCT/US2020/044060, Report issued Feb. 1, 2022, Mailed on Feb. 10, 2022, 8 pgs.
International Preliminary Report on Patentability for International Application PCT/US2020/048590, Report issued Mar. 1, 2022, Mailed on Mar. 10, 2022, 13 pgs.
International Preliminary Report on Patentability for International Application PCT/US2021/038542, Report issued Dec. 13, 2022, Mailed on Jan. 5, 2023, 8 pgs.
International Preliminary Report on Patentability for PCT Application No. PCT/US2013/038070, dated Oct. 28, 2014, 6 pgs.
International Search Report and Written Opinion for International Application No. PCT/GB2010/000835, completed Oct. 26, 2010, mailed Nov. 8, 2010, 12 pgs.
International Search Report and Written Opinion for International Application No. PCT/GB2010/001920, completed Mar. 29, 2011, mailed Apr. 6, 2011, 15 pgs.
International Search Report and Written Opinion for International Application No. PCT/GB2015/000228, Search completed May 4, 2011, Mailed Jul. 15, 2011, 15 pgs.
International Search Report and Written Opinion for International Application No. PCT/GB2016/000036, completed Jul. 4, 2016, mailed Jul. 13, 2016, 10 pgs.
International Search Report and Written Opinion for International Application No. PCT/GB2016/000065, completed Jul. 14, 2016, mailed Jul. 27, 2016, 10 pgs.
International Search Report and Written Opinion for International Application No. PCT/GB2017/000015, Search completed Apr. 25, 2017, Mailed May 8, 2017, 10 pgs.
International Search Report and Written Opinion for International Application No. PCT/GB2017/000055, Search completed Jul. 19, 2017, Mailed Jul. 26, 2017, 12 pgs.
International Search Report and Written Opinion for International Application No. PCT/IB2008/001909, Search completed Feb. 4, 2009, Mailed Feb. 17, 2009, 6 pgs.
International Search Report and Written Opinion for International Application No. PCT/US2013/038070, completed Aug. 12, 2013, mailed Aug. 14, 2013, 12 pgs.
International Search Report and Written Opinion for International Application No. PCT/US2014/011736, completed Apr. 18, 2014, mailed May 8, 2014, 10 pgs.
International Search Report and Written Opinion for International Application No. PCT/US2018/012227, Search completed Feb. 28, 2018, Mailed Mar. 14, 2018, 8 pgs.
International Search Report and Written Opinion for International Application No. PCT/US2018/012691, completed Mar. 10, 2018, mailed Mar. 28, 2018, 16 pgs.

(56) References Cited

OTHER PUBLICATIONS

International Search Report and Written Opinion for International Application No. PCT/US2018/015553, completed Aug. 6, 2018, Mailed Sep. 19, 2018, 12 pgs.
International Search Report and Written Opinion for International Application No. PCT/US2018/037410, Search completed Aug. 16, 2018, Mailed Aug. 30, 2018, 11 pgs.
International Search Report and Written Opinion for International Application No. PCT/US2018/048636, Search completed Nov. 1, 2018, Mailed Nov. 15, 2018, 16 pgs.
International Search Report and Written Opinion for International Application No. PCT/US2018/048960, Search completed Dec. 14, 2018, Mailed Jan. 8, 2019, 14 pgs.
International Search Report and Written Opinion for International Application No. PCT/US2018/056150, Search completed Dec. 4, 2018, Mailed Dec. 26, 2018, 10 pgs.
International Search Report and Written Opinion for International Application No. PCT/US2018/062835, Search completed Jan. 14, 2019, Mailed Jan. 31, 2019, 14 pgs.
International Search Report and Written Opinion for International Application No. PCT/US2019/012758, completed Mar. 12, 2019, mailed Mar. 27, 2019, 9 pgs.
International Search Report and Written Opinion for International Application No. PCT/US2019/012764, completed Mar. 1, 2019, mailed Mar. 18, 2019, 9 pgs.
International Search Report and Written Opinion for International Application No. PCT/US2019/031163, Search completed Jul. 9, 2019, Mailed Jul. 29, 2019, 11 pgs.
International Search Report and Written Opinion for International Application No. PCT/US2019/043496, Search completed Sep. 28, 2019, Mailed Nov. 14, 2019, 12 pgs.
International Search Report and Written Opinion for International Application No. PCT/US2019/064765, Search completed Feb. 3, 2020, Mailed Mar. 18, 2020, 11 pgs.
International Search Report and Written Opinion for International Application No. PCT/US2019/065478, Search completed Jan. 29, 2020, Mailed Feb. 11, 2020, 14 pgs.
International Search Report and Written Opinion for International Application No. PCT/US2020/018686, Search completed Apr. 25, 2020, Mailed May 22, 2020, 11 pgs.
International Search Report and Written Opinion for International Application No. PCT/US2020/019549, Search completed Apr. 14, 2020, Mailed May 22, 2020, 12 pgs.
International Search Report and Written Opinion for International Application No. PCT/US2020/022482, Search completed May 12, 2020, Mailed Jun. 9, 2020, 11 pgs.
International Search Report and Written Opinion for International Application No. PCT/US2020/031363, completed May 28, 2020, Mailed Jun. 10, 2020, 8 pgs.
International Search Report and Written Opinion for International Application No. PCT/US2020/036654, Search completed Aug. 21, 2020, Mailed Sep. 4, 2020, 14 pgs.
International Search Report and Written Opinion for International Application No. PCT/US2020/043107, Search completed Sep. 28, 2020, Mailed Oct. 15, 2020, 12 pgs.
International Search Report and Written Opinion for International Application No. PCT/US2020/044060, Search completed Oct. 9, 2020, Mailed Nov. 9, 2020, 12 pgs.
International Search Report and Written Opinion for International Application No. PCT/US2020/048590, Search completed Dec. 7, 2020, Mailed Jan. 11, 2021, 19 pgs.
International Search Report and Written Opinion for International Application No. PCT/US2020/067737, Search completed Mar. 3, 2021, Mailed Mar. 25, 2021, 12 pgs.
International Search Report and Written Opinion for International Application No. PCT/US2021/038542, search Completed Sep. 21, 2021, Mailed Oct. 20, 2021 16 pgs.
International Search Report and Written Opinion for International Application No. PCT/US2021/072287, Search completed Jan. 10, 2022, Mailed Feb. 17, 2022, 11 pgs.
International Search Report and Written Opinion for International Application No. PCT/US2021/072548, Search completed Jan. 25, 2022, Mailed Feb. 8, 2022, 15 pgs.
International Search Report and Written Opinion for International Application No. PCT/US2022/070095, Search completed Mar. 10, 2022, Mailed Mar. 22, 2022, 13 pgs.
International Search Report and Written Opinion for International Application PCT/GB2009/051676, completed May 10, 2010, mailed May 18, 2010, 7 pgs.
International Search Report and Written Opinion for International Application PCT/GB2016/000181, completed Dec. 21, 2016, mailed Feb. 27, 2017, 21 pgs.
International Search Report and Written Opinion for International Application PCT/US2016/017091, completed by the European Patent Office on Apr. 20, 2016, 7 pgs.
International Search Report and Written Opinion for International Application PCT/US2019/012759, completed Mar. 14, 2019, mailed Apr. 15, 2019, 12 pgs.
International Search Report and Written Opinion for International Application PCT/US2019/047097, completed Nov. 22, 2015, mailed Dec. 16, 2019, 10 pgs.
International Search Report and Written Opinion for International Application PCT/US2020/016875, Report Completed Apr. 9, 2020, Mailed Apr. 29, 2020, 11 pgs.
International Search Report for International Application PCT/GB2014/000295, completed Nov. 18, 2014, mailed Jan. 5, 2015, 4 pgs.
International Search Report for International Application PCT/GB2017/000040, mailed Jul. 18, 2017, completed Jul. 10, 2017, 3 pgs.
International Search Report for PCT/GB2010/001982, completed by the European Patent Office on Feb. 24, 2011, 4 pgs.
International Search Report for PCT/GB2011/000349, completed by the European Patent Office on Aug. 17, 2011, 4 pgs.
International Search Report for PCT/GB2012/000331, completed by the European Patent Office on Aug. 29, 2012, 4 pgs.
International Search Report for PCT/GB2012/000677, completed by the European Patent Office on Dec. 10, 2012, 4 pgs.
International Search Report for PCT/GB2013/000005, completed by the European Patent Office on Jul. 16, 2013, 3 pgs.
International Search Report for PCT/GB2013/000210, completed by the European Patent Office on Aug. 12, 2013, 3 pgs.
International Search Report for PCT/GB2013/000273, completed by the European Patent Office on Aug. 30, 2013, 4 pgs.
International Search Report for PCT/GB2014/000197, Completed by the European Patent Office on Jul. 31, 2014, 3 pgs.
International Search Report for PCT/GB2015/000203, completed by the European Patent Office on Oct. 9, 2015, 4 pgs.
International Search Report for PCT/GB2015/000225, completed by the European Patent Office on Nov. 10, 2015, mailed Dec. 2, 2016, 5 pgs.
International Search Report for PCT/GB2015/000274, completed by the European Patent Office on Jan. 7, 2016, 4 pgs.
International Search Report for PCT/GB2016/000003, Completed by the European Patent Office May 31, 2016, 6 pgs.
International Search Report for PCT/GB2016/000005, completed by the European Patent Office on May 27, 2016, 4 pgs.
International Search Report for PCT/GB2016/000014, completed by the European Patent Office on Jun. 27, 2016, 4 pgs.
International Search Report for PCT/GB2016/000051, Completed Aug. 11, 2016, 3 pgs.
Supplementary Partial European Search Report for European Application No. 18727645.6, Search completed Jul. 2, 2020, Mailed Jul. 13, 2020, 13 pgs.
Written Opinion for International Application No. PCT/GB2011/000349, completed Aug. 17, 2011, mailed Aug. 25, 2011, 9 pgs.
Written Opinion for International Application No. PCT/GB2012/000331, completed Aug. 29, 2012, mailed Sep. 6, 2012, 7 pgs.
Written Opinion for International Application No. PCT/GB2012/000677, completed Dec. 10, 2012, mailed Dec. 17, 2012, 4 pgs.
Written Opinion for International Application No. PCT/GB2013/000005, search completed Jul. 16, 2013, mailed Jul. 24, 2013, 11 pgs.

(56) References Cited

OTHER PUBLICATIONS

Written Opinion for International Application No. PCT/GB2013/000273, completed Aug. 30, 2013, mailed Sep. 9, 2013, 7 pgs.
Written Opinion for International Application No. PCT/GB2014/000197, Search completed Jul. 31, 2014, Mailed Aug. 7, 2014, 6 pgs.
Written Opinion for International Application No. PCT/GB2014/000295, search completed Nov. 18, 2014, mailed Jan. 5, 2015, 3 pgs.
Written Opinion for International Application No. PCT/GB2015/000203, completed Oct. 29, 2015, mailed Nov. 16, 2015, 7 pgs.
Written Opinion for International Application No. PCT/GB2015/000225, search completed Nov. 10, 2015, mailed Feb. 4, 2016, 7 pgs.
Written Opinion for International Application No. PCT/GB2015/000274, search completed Jan. 7, 2016, mailed Jan. 19, 2016, 7 pgs.
Written Opinion for International Application No. PCT/GB2016/000014, search completed Jun. 27, 2016, mailed Jul. 7, 2016, 6 pgs.
Written Opinion for International Application No. PCT/GB2017/000040, search completed Jul. 10, 2017, mailed Jul. 18, 2017, 6 pgs.
Written Opinion for International Application PCT/GB2013/000210, completed Aug. 12, 2013, Mailed Aug. 20, 2013, 5 pgs.
Written Opinion for International Application PCT/GB2016/000003, completed May 31, 2016, mailed Aug. 12, 2016, 10 pgs.
Written Opinion for International Application PCT/GB2016/000005, search completed May 27, 2016, mailed Jun. 6, 2016, 6 pgs.
Google search: "digilens waveguide" [site visited Sep. 14, 2020], https://www.google.com/search?q=digilens+waveguide&sxsrf=ALeKk02RFwZAZ0vrl XVH0M_2fiXFkhW1 FA: 1604777621684&source=lnms&tbm=isch&sa=X&ved=2ah U KEwjjyNXAlvHsAh U Rh HI EHTufCvsQ_AUoAnoECBwQBA&biw= 1200&bih= 1777.
Google search: "eyewear display devices" [site visited Sep. 14, 2020], https://www.google.com/search?q=eyewear+display+devices&sxsrf=ALeKk0 1 WWfnOAgsQR_bhydJaYK3e37r J Lg: 1604779001617&source=lnms&tbm=isch&sa=X&ved=2ah U KEwi99txSm_HsAhVaoH IEHawtD8QQ_AUoAnoECC8QBA&biw= 1200&bih= 1777.
Google search: "smart glasses" [site visited Sep. 14, 2020], https://www.google.com/search?q=smart+glasses&sxsrf=ALeKk01 KN 1wj23-NqP - KCnrcsUpCgxyKA: 1604779046920&source=lnms&tbm=isch&sa=X&ved=2ah U KEwipkq Pom_HsAhVKhXI EHQGFBp8Q_AUoBHoECCgQBg&biw= 1200&bih= 1777.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.
"BragGrate—Deflector: Transmitting Volume Bragg Grating for angular selection and magnification", 2015, www.OptiGrate.com, 1 pg.
"Cree XLamp XP-E LEDs", Cree, Inc., Retrieved from www.cree.com/Xlamp, CLD-DS18 Rev 17, 2013, 17 pgs.
"Desmodur N 3900", Bayer MaterialScience AG, Mar. 18, 2013, www.bayercoatings.com, 4 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261.
"FHS Lenses Series", Fraen Corporation, www.fraen.com, Jun. 16, 2003, 10 pgs.
"FLP Lens Series for LUXEONTM Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7-Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.
"Liquid Crystal Phases", Phases of Liquid Crystals, http://plc.cwru.edu/tutorial/enhanced/files/lc/phase, Retrieved on Sep. 21, 2004, 6 pgs.
"LiteHUD Head-up display", BAE Systems, 2016, 2 pgs.
"LiteHUD Head-up display infographic", BAE Systems, 2017, 2 pgs.
"Luxeon C: Power Light Source", Philips Lumileds, www.philipslumileds.com, 2012, 18 pgs.
"Luxeon Rebel ES: Leading efficacy and light output, maximum design flexibility", LUXEON Rebel ES Datasheet DS61 20130221, www.philipslumileds.com, 2013, 33 pgs.
"Mobile Display Report", Insight Media, LLC, Apr. 2012, vol. 7, No. 4, 72 pgs.
"Molecular Imprints IMPRIO 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.
"Navy awards SGB Labs a contract for HMDs for simulation and training", Press releases, DigiLens, Oct. 2012, pp. 1-2.
"Optical measurements of retinal flow", Industrial Research Limited, Feb. 2012, 18 pgs.
"Osterhout Design Group Develops Next-Generation, Fully-integrated Smart Glasses Using Qualcomm Technologies", ODG, www.osterhoutgroup.com, Sep. 18, 2014, 2 pgs.
"Plastic has replaced glass in photochromic lens", www.plastemart.com, 2003, 1 pg.
"Range Finding Using Pulse Lasers", OSRAM, Opto Semiconductors, Sep. 10, 2004, 7 pgs.
"Response time in Liquid-Crystal Variable Retarders", Meadowlark Optics, Inc., 2005, 4 pgs.
"Secondary Optics Design Considerations for SuperFlux LEDs", Lumileds, application brief AB20-5, Sep. 2002, 23 pgs.
"Solid-State Optical Mouse Sensor with Quadrature Outputs", IC Datasheet, UniquelCs, Jul. 15, 2004, 11 pgs.
"SVGA TransparentVLSITM Microdisplay Evaluation Kit", Radiant Images, Inc., Product Data Sheet, 2003, 3 pgs.
"Technical Data Sheet LPR1", Luminus Devices, Inc., Luminus Projection Chipset, Release 1, Preliminary, Revision B, Sep. 21, 2004, 9 pgs.
"The Next Generation of TV", SID Information Display, Nov./Dec. 2014, vol. 30, No. 6, 56 pgs.
"Thermal Management Considerations for SuperFlux LEDs", Lumileds, application brief AB20-4, Sep. 2002, 14 pgs.
"USAF Awards SBG Labs an SBIR Contract for Wide Field of View HUD", Press Release, SBG Labs DigiLens, Apr. 2014, 2 pgs.
"UVTOP240", Roithner LaserTechnik GmbH, v 2.0, Jun. 24, 2013, 6 pgs.
"UVTOP310", Roithner LaserTechnik GmbH, v 2.0, Jun. 24, 2013, 6 pgs.
"Velodyne's HDL-64E: A High Definition Lidar Sensor for 3-D Applications", High Definition Lidar, white paper, Oct. 2007, 7 pgs.
"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.
"X-Cubes—Revisited for LCOS", BASID, RAF Electronics Corp. Rawson Optics, Inc., Oct. 24, 2002, 16 pgs.
Aachen, "Design of plastic optics for LED applications", Optics Colloquium 2009, Mar. 19, 2009, 30 pgs.
Abbate et al., "Characterization of LC-polymer composites for opto-electronic application", Proceedings of OPTOEL '03, Leganes-Madrid, Spain, Jul. 14-16, 2003, 4 pgs.

(56) References Cited

OTHER PUBLICATIONS

Al-Kalbani et al., "Ocular Microtremor laser speckle metrology", Proc. of SPIE, 2009, vol. 7176 717606-1, 12 pgs., doi: 10.1117/12.808855.

Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.

Amitai et al., "Visor-display design based on planar holographic optics", Applied Optics, vol. 34, No. 8, Mar. 10, 1995, pp. 1352-1356.

Amundson et al., "Morphology and electro-optic properties of polymer-dispersed liquid-crystal films", Physical Review E, Feb. 1997, vol. 55. No. 2, pp. 1646-1654.

An et al., "Speckle suppression in laser display using several partially coherent beams", Optics Express, Jan. 5, 2009, vol. 17, No. 1, pp. 92-103, first published Dec. 22, 2008.

Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.

Arnold et al., "52.3: An Improved Polarizing Beamsplitter LCOS Projection Display Based on Wire-Grid Polarizers", Society for Information Display, Jun. 2001, pp. 1282-1285.

Ayras et al., "Exit pupil expander with a large field of view based on diffractive optics", Journal of the Society for Information Display, May 18, 2009, vol. 17, No. 8, pp. 659-664, DOI: 10.1889/JSID17.8.659.

Baets et al., "Resonant-Cavity Light-Emitting Diodes: a review", Proceedings of SPIE, 2003, vol. 4996, pp. 74-86.

Bayer et al., "Introduction to Helmet-Mounted Displays", 2016, pp. 47-108.

Beckel et al., "Electro-optic properties of thiol-ene polymer stabilized ferroelectric liquid crystals", Liquid Crystals, vol. 30, No. 11, Nov. 2003, pp. 1343-1350, DOI: 10.1080/02678290310001605910.

Bergkvist, "Biospeckle-based Study of the Line Profile of Light Scattered in Strawberries", Master Thesis, Lund Reports on Atomic Physics, LRAP-220, Lund 1997, pp. 1-62.

Bernards et al., "Nanoscale porosity in polymer films: fabrication and therapeutic applications", Soft Matter, Jan. 1, 2010, vol. 6, No. 8, pp. 1621-1631, doi:10.1039/B922303G.

Bhuvaneshwaran et al., "Spectral response of Bragg gratings in multimode polymer waveguides", Applied Optics, Dec. 1, 2017, vol. 56. No. 34, pp. 9573-9582, doi: 10.1364/AO.56.009573.

Bleha et al., "Binocular Holographic Waveguide Visor Display", SID Symposium Digest of Technical Papers, Holoeye Systems Inc., Jun. 2014, San Diego, CA, 4 pgs.

Bleha et al., "D-ILA Technology for High Resolution Projection Displays", Sep. 10, 2003, Proceedings, vol. 5080, 11 pgs., doi:10.1117/12.497532.

Bone, "Design Obstacles for LCOS Displays in Projection Applications "Optics architectures for LCOS are still evolving"", Aurora Systems Inc., Bay Area SID Seminar, Mar. 27, 2001, 22 pgs.

Born et al., "Optics of Crystals", Principles of Optics 5th Edition 1975, pp. 705-707.

Bourzac, "Magic Leap Needs to Engineer a Miracle", Intelligent Machines, Jun. 11, 2015, 7 pgs.

Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.

Bowley et al., "Variable-wavelength switchable Bragg gratings formed in polymer-dispersed liquid crystals", Applied Physics Letters, Jul. 2, 2001, vol. 79, No. 1, pp. 9-11, DOI: 10.1063/1.1383566.

Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738, DOI: 10.1080/00222348.2013.808926.

Brown, "Waveguide Displays", Rockwell Collins, 2015, 11 pgs.

Bruzzone et al., "Compact, high-brightness LED illumination for projection systems", Journal of the Society for Information Display, vol. 17, No. 12, Dec. 2009, pp. 1043-1049, DOI: 10.1189/JSID17.12.1043.

Buckley, "Colour holographic laser projection technology for heads-up and instrument cluster displays", Conference: Proc. SID Conference 14th Annual Symposium on Vehicle Displays, Jan. 2007, 5 pgs.

Buckley, "Pixtronix DMS technology for head-up displays", Pixtronix, Inc., Jan. 2011, 4 pgs.

Buckley et al., "Full colour holographic laser projector HUD", Light Blue Optics Ltd., Aug. 10, 2015, 5 pgs.

Buckley et al., "Rear-view virtual image displays", in Proc. SID Conference 16th Annual Symposium on Vehicle Displays, Jan. 2009, 5 pgs.

Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.

Bunning et al., "Electro-optical photonic crystals formed in H-PDLCs by thiol-ene photopolymerization", American Physical Society, Annual APS, Mar. 3-7, 2003, abstract #R1.135.

Bunning et al., "Holographic Polymer-Dispersed Liquid Crystals (H-PDLCs)1", Annual Review of Material Science, 2000, vol. 30, pp. 83-115.

Bunning et al., "Morphology of Anisotropic Polymer Dispersed Liquid Crystals and the Effect of Monomer Functionality", Journal of Polymer Science: Part B: Polymer Physics, Jul. 30, 1997, vol. 35, pp. 2825-2833.

Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662, DOI: 10.1002/adma.200900298.

Butler et al., "Diffractive Properties of Highly Birefringent Volume Gratings: Investigation", Journal of Optical Society of America, Feb. 2002, vol. 19, No. 2, pp. 183-189.

Cai et al., "Recent advances in antireflective surfaces based on nanostructure arrays", Materials Horizons, 2015, vol. 2, pp. 37-53, DOI: 10.1038/c4mh00140k.

Cameron, "Optical Waveguide Technology & Its Application In Head Mounted Displays", Proc. of SPIE, May 22, 2012, vol. 8383, pp. 83830E-1-83830E-11, doi: 10.1117/12.923660.

Cameron, "The Application of Holographic Optical Waveguide Technology to Q-Sight™ Family of Helmet Mounted Displays", Proc. of SPIE, 2009, vol. 7326, 11 pages, doi:10.1117/12.818581.

Caputo et al., "POLICRYPS Composite Materials: Features and Applications", Advances in Composite Materials—Analysis of Natural and Man-Made Materials, www.intechopen.com, Sep. 2011, pp. 93-118.

Caputo et al., "POLICRYPS Switchable Holographic Grating: A Promising Grating Electro-Optical Pixel for High Resolution Display Application", Journal of Display Technology, Mar. 2006, vol. 2, No. 1, pp. 38-51, DOI:10.1109/JDT.2005.864156.

Caputo et al., "POLICRYPS: a liquid crystal composed nano/microstructure with a wide range of optical and electro-optical applications", Journal of Optics A: Pure and Applied Optics, Jan. 15, 2009, vol. 11, No. 2, 13 pgs., doi:10.1088/1464-4258/11/2/024017.

Carclo Optics, "Guide to choosing secondary optics", Carclo Optics, Dec. 15, 2014, www.carclo-optics.com, 48 pgs.

Carothers, "Polymers and polyfunctionality", Transactions of the Faraday Society, Jan. 1, 1936, vol. 32, pp. 39-49, doi:10.1039/TF9363200039.

Chen et al., "Polarization rotators fabricated by thermally-switched liquid crystal alignments based on rubbed poly(N-vinyl carbazole) films", Optics Express, Apr. 11, 2011, vol. 19, No. 8, pp. 7553-7558, first published Apr. 5, 2011.

Cheng et al., "Design of an ultra-thin near-eye display with geometrical waveguide and freeform optics", Optics Express, Aug. 2014, 16 pgs., DOI:10.1364/OE.22.020705.

Chi et al., "Ultralow-refractive-index optical thin films through nanoscale etching of ordered mesoporous silica films", Optic Letters, May 1, 2012, vol. 37, No. 9, pp. 1406-1408, first published Apr. 19, 2012.

(56) References Cited

OTHER PUBLICATIONS

Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.
Cho et al., "Electro-optic Properties of CO2 Fixed Polymer/Nematic LC Composite Films", Journal of Applied Polymer Science, Nov. 5, 2000, vol. 81, Issue 11, pp. 2744-2753.
Cho et al., "Optimization of Holographic Polymer Dispersed Liquid Crystals for Ternary Monomers", Polymer International, Nov. 1999, vol. 48, pp. 1085-1090.
Colegrove et al., "P-59: Technology of Stacking HPDLC for Higher Reflectance", SID 00 DIGEST, May 2000, pp. 770-773.
Crawford, "Electrically Switchable Bragg Gratings", Optics & Photonics News, Apr. 2003, pp. 54-59.
Cruz-Arreola et al., "Diffraction of beams by infinite or finite amplitude-phase gratings", Investigacio' N Revista Mexicana De Fi'Sica, Feb. 2011, vol. 57, No. 1, pp. 6-16.
Dabrowski, "High Birefringence Liquid Crystals", Crystals, Sep. 3, 2013, vol. 3, No. 3, pp. 443-482, doi:10.3390/cryst3030443.
Dainty, "Some statistical properties of random speckle patterns in coherent and partially coherent illumination", Optica Acta, Mar. 12, 1970, vol. 17, No. 10, pp. 761-772.
Date, "Alignment Control in Holographic Polymer Dispersed Liquid Crystal", Journal of Photopolymer Science and Technology, Nov. 2, 2000, vol. 13, No. 2, pp. 289-294.
Date et al., "52.3: Direct-viewing Display Using Alignment-controlled PDLC and Holographic PDLC", Society for Information Display Digest, May 2000, pp. 1184-1187, DOI: 10.1889/1.1832877.
Date et al., "Full-color reflective display device using holographically fabricated polymer-dispersed liquid crystal (HPDLC)", Journal of the SID, 1999, vol. 7, No. 1, pp. 17-22.
De Bitetto, "White light viewing of surface holograms by simple dispersion compensation", Applied Physics Letters, Dec. 15, 1966, vol. 9, No. 12, pp. 417-418.
De Sarkar et al., "Effect of Monomer Functionality on the Morphology and Performance of the Holographic Transmission Gratings Recorded on Polymer Dispersed Liquid Crystals", Macromolecules, 2003, vol. 36, No. 3, pp. 630-638.
Developer World, "Create customized augmented reality solutions", printed Oct. 19, 2017, LMX-001 holographic waveguide display, Sony Developer World, 3 pgs.
Dhar et al., "Recording media that exhibit high dynamic range for digital holographic data storage", Optics Letters, Apr. 1, 1999, vol. 24, No. 7, pp. 487-489.
Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.
Doolittle, "Studies in Newtonian Flow. II. The Dependence of the Viscosity of Liquids on Free-Space", Journal of Applied Physics, 1951, vol. 22, Issue 12, pp. 1471-1475, published online Apr. 29, 2004, https://doi.org/10.1063/1.1699894.
Drake et al., "Waveguide Hologram Fingerprint Entry Device", Optical Engineering, Sep. 1996, vol. 35, No. 9, pp. 2499-2505.
Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537], DOI: 10.1080/15421400802432584.
Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212, DOI: 10.1063/1.1807027.
Ducharme, "Microlens diffusers for efficient laser speckle generation", Optics Express, Oct. 29, 2007, vol. 15, No. 22, pp. 14573-14579.
Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.
Escuti et al., "Holographic photonic crystals", Society of Photo-Optical Instrumentation Engineers, Sep. 2004, vol. 43, No. 9, pp. 1973-1987, DOI: 10.1117/1.1773773.
Fattal et al., "A multi directional backlight for a wide-angle glasses-free three-dimensional display", Nature, Mar. 21, 2012, vol. 495, pp. 348-351.
Flory, "Molecular size distribution in three-dimensional polymers. I. Gelation", J. Am. Chem. Soc., Nov. 1941, vol. 63, pp. 3083-3090.
Fontecchio et al., "Spatially Pixelated Reflective Arrays from Holographic Polymer Dispersed Liquid Crystals", SID 00 Digest, May 2000, pp. 774-776.
Forman et al., "Materials development for PhotoINhibited Super-Resolution (PINSR) lithography", Proc. of SPIE, 2012, vol. 8249, pp. 824904-1-824904-9, doi: 10.1117/12.908512.
Forman et al., "Radical diffusion limits to photoinhibited super-resolution lithography", Phys. Chem. Chem. Phys., May 31, 2013, vol. 15, pp. 14862-14867, DOI: 10.1039/c3cp51512.
Friedrich-Schiller, "Spatial Noise and Speckle", Version 1.12.2011, Dec. 2011, Abbe School of Photonics, Jena, Germany, 27 pgs.
Fries et al., "Real-time beam shaping without additional optical elements", Light Science & Applications, Jun. 20, 2018, vol. 7, No. 18, doi: 10.1038/s41377-018-0014-0.
Fuh et al., "Thermally and Electrically Switchable Gratings Based Upon the Polymer-Balls Type Polymer-Dispersed Liquid Crystal Films", Appl. Phys. Vol. 41, No. 22, Aug. 1, 2002, pp. 4585-4589.
Fujii et al., "Nanoparticle-polymer-composite volume gratings incorporating chain-transfer agents for holography and slow-neutron optics", Optics Letters, Apr. 25, 2014, vol. 39, Issue 12, 5 pgs.
Funayama et al., "Proposal of a new type thin film light-waveguide display device using", The International Conference on Electrical Engineering, 2008, No. P-044, 5 pgs.
Gabor, "Laser Speckle and its Elimination", BM Research and Development, Eliminating Speckle Noise, Sep. 1970, vol. 14, No. 5, pp. 509-514.
Gardiner et al., "Bistable liquid-crystals reduce power consumption for high-efficiency smart glazing", SPIE, 2009, 10.1117/2.1200904.1596, 2 pgs.
Gerritsen et al., "Application of Kogelnik's two-wave theory to deep, slanted, highly efficient, relief transmission gratings", Applied Optics, Mar. 1, 1991, vol. 30; No. 7, pp. 807-814.
Giancola, "Holographic Diffuser, Makes Light Work of Screen Tests", Photonics Spectra, 1996, vol. 30, No. 8, pp. 121-122.
Golub et al., "Bragg properties of efficient surface relief gratings in the resonance domain", Optics Communications, Feb. 24, 2004, vol. 235, pp. 261-267, doi: 10.1016/j.optcom.2004.02.069.
Goodman, "Introduction to Fourier Optics", Second Edition, Jan. 1996, 457 pgs.
Goodman, "Some fundamental properties of speckle", J. Opt. Soc. Am., Nov. 1976, vol. 66, No. 11, pp. 1145-1150.
Goodman, "Statistical Properties of Laser Speckle Patterns", Applied Physics, 1975, vol. 9, Chapter 2, Laser Speckle and Related Phenomena, pp. 9-75.
Goodman et al., "Speckle Reduction by a Moving Diffuser in Laser Projection Displays", The Optical Society of America, 2000, 15 pgs.
Guldin et al., "Self-Cleaning Antireflective Optical Coatings", Nano Letters, Oct. 14, 2013, vol. 13, pp. 5329-5335.
Guo et al., "Analysis of the effects of viscosity, volume and temperature in photopolymer material for holographic applications", Proc. SPIE, May 2013, vol. 8776, pp. 87760J-1-87760-J15, DOI:10.1117/12.2018330.
Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.
Han et al., "Study of Holographic Waveguide Display System", Advanced Photonics for Communications, 2014, 4 pgs.
Harbers et al., "I-15.3: LED Backlighting for LCD-HDTV", Journal of the Society for Information Display, 2002, vol. 10, No. 4, pp. 347-350.
Harbers et al., "Performance of High Power LED Illuminators in Color Sequential Projection Displays", Lumileds Lighting, 2007, 4 pgs.

(56) References Cited

OTHER PUBLICATIONS

Harbers et al., "Performance of High Power LED Illuminators in Color Sequential Projection Displays", Lumileds, Aug. 7, 2001, 11 pgs.
Harbers et al., "Performance of High-Power LED illuminators in Projection Displays", Proc. Int. Disp. Workshops, Japan. vol. 10, 2003, pp. 1585-1588.
Harding et al., "Reactive Liquid Crystal Materials for Optically Anisotropic Patterned Retarders", Merck, licrivue, 2008, ME-GR-RH-08-010, 20 pgs.
Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.
Hariharan, "Optical Holography: Principles, techniques and applications", Cambridge University Press, 1996, pp. 231-233.
Harris, "Photonic Devices", EE 216 Principals and Models of Semiconductor Devices, Autumn 2002, 20 pgs.
Harrold et al., "3D Display Systems Hardware Research at Sharp Laboratories of Europe: an update", Sharp Laboratories of Europe, Ltd., 7 pgs.
Harthong et al., "Speckle phase averaging in high-resolution color holography", J. Opt. Soc. Am. A, vol. 14, No. 2, Feb. 1997, pp. 405-409.
Hasan et al., "Tunable-focus lens for adaptive eyeglasses", Optics Express, Jan. 23, 2017, vol. 25, No. 2, 1221, 13 pgs.
Hasman et al., "Diffractive Optics: Design, Realization, and Applications", Fiber and Integrated Optics, vol. 16, 1997, pp. 1-25.
Hata et al., "Holographic nanoparticle-polymer composites based on step-growth thiol-ene photopolymerization", Optical Materials Express, vol. 1, No. 2, Jun. 1, 2011, pp. 207-222.
He et al., "Dynamics of peristrophic multiplexing in holographic polymer-dispersed liquid crystal", Liquid Crystals, Mar. 26, 2014, vol. 41, No. 5, pp. 673-684.
He et al., "Holographic 3D display based on polymer-dispersed liquid-crystal thin films", Proceedings of China Display/Asia Display 2011, pp. 158-160.
He et al., "Properties of Volume Holograms Recording in Photopolymer Films with Various Pulse Exposures Repetition Frequencies", Proceedings of SPIE vol. 5636, Bellingham, WA, 2005, pp. 842-848, doi: 10.1117/12.580978.
He et al., "Transmission Holographic Gratings Using Siloxane Containing Liquid Crystalline Compounds, Importance of Chemical Structure of Polymer Matrix Components", Polymer Journal, Jun. 9, 2006, vol. 38, No. 7, pp. 678-685.
Herman et al., "Production and Uses of Diffractionless Beams", J. Opt. Soc. Am. A., Jun. 1991, vol. 8, No. 6, pp. 932-942.
Hisano, "Alignment layer-free molecular ordering induced by masked photopolymerization with nonpolarized light", Appl. Phys. Express 9, Jun. 6, 2016, pp. 072601-1-072601-4.
Hoepfner et al., "LED Front Projection Goes Mainstream", Luminus Devices, Inc., Projection Summit, 2008, 18 pgs.
Holmes et al., "Controlling the Anisotropy of Holographic Polymer-Dispersed Liquid-Crystal Gratings", Physical Review E, Jun. 11, 2002, vol. 65, pp. 066603-1-066603-4.
Hoyle et al., "Advances in the Polymerization of Thiol-Ene Formulations", Heraeus Noblelight Fusion UV Inc., 2003 Conference, 6 pgs.
Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.
Huang et al., "Diffraction properties of substrate guided-wave holograms", Optical Engineering, Oct. 1995, vol. 34, No. 10, pp. 2891-2899.
Huang et al., "Theory and characteristics of holographic polymer dispersed liquid crystal transmission grating with scaffolding morphology", Applied Optics, Jun. 20, 2012, vol. 51, No. 18, pp. 4013-4020.
Iannacchione et al., "Deuterium NMR and morphology study of copolymer-dispersed liquid-crystal Bragg gratings", Europhysics Letters, 1996, vol. 36, No. 6, pp. 425-430.
Irie, "Photochromic diarylethenes for photonic devices", Pure and Applied Chemistry, 1996, pp. 1367-1371, vol. 68, No. 7, IUPAC.
Jang et al., "Low Driving Voltage Holographic Polymer Dispersed Liquid Crystals with Chemically Incorporated Graphene Oxide", Journal of Materials Chemistry, 2011, vol. 21, pp. 19226-19232, doi.10.1039/1jm13827h.
Jeng et al., "Aligning liquid crystal molecules", SPIE, 2012, 10.1117/2.1201203.004148, 2 pgs.
Jeong et al., "Memory Effect of Polymer Dispersed Liquid Crystal by Hybridization with Nanoclay", express Polymer Letters, vol. 4, No. 1, 2010, pp. 39-46, DOI: 10.3144/expresspolymlett.2010.7.
Jo et al., "Control of Liquid Crystal Pretilt Angle using Polymerization of Reactive Mesogen", IMID 2009 Digest, P1-25, 2009, pp. 604-606.
Juhl, "Interference Lithography for Optical Devices and Coatings", Dissertation, University of Illinois at Urbana-Champaign, 2010.
Juhl et al., "Holographically Directed Assembly of Polymer Nanocomposites", ACS Nano, Oct. 7, 2010, vol. 4, No. 10, pp. 5953-5961.
Jurbergs et al., "New recording materials for the holographic industry", Proc. of SPIE, 2009 vol. 7233, pp. 72330K-1-72330L-10, doi: 10.1117/12.809579.
Kahn et al., "Private Line Report on Large Area Display", Kahn International, Jan. 7, 2003, vol. 8, No. 10, 9 pgs.
Kakiuchida et al., "Multiple Bragg Diffractions with Different Wavelengths and Polarizations Composed of Liquid Crystal/Polymer Periodic Phases", ACS Omega, Sep. 22, 2017, pp. 6081-6090, doi: 10.1021/acsomega.7b01149.
Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.
Karp et al., "Planar micro-optic solar concentration using multiple imaging lenses into a common slab waveguide", Proc. of SPIE vol. 7407, 2009 SPIE, pp. 74070D-1-74070D-11, CCC code: 0277-786X/09, doi: 10.1117/12.826531.
Karp et al., "Planar micro-optic solar concentrator", Optics Express, Jan. 18, 2010, vol. 18, No. 2, pp. 1122-1133.
Kato et al., "Alignment-Controlled Holographic Polymer Dispersed Liquid Crystal (HPDLC) for Reflective Display Devices", SPIE, 1998, vol. 3297, pp. 52-57.
Kessler, "Optics of Near to Eye Displays (NEDs)", Oasis 2013, Tel Aviv, Feb. 19, 2013, 37 pgs.
Keuper et al., "26.1: RGB LED Illuminator for Pocket-Sized Projectors", SID 04 Digest, 2004, ISSN/0004-0966X/04/3502, pp. 943-945.
Keuper et al., "P-126: Ultra-Compact LED based Image Projector for Portable Applications", SID 03 Digest, 2003, ISSN/0003-0966X/03/3401-0713, pp. 713-715.
Kim et al., "Effect of Polymer Structure on the Morphology and Electro optic Properties of UV Curable PNLCs", Polymer, Feb. 2000, vol. 41, pp. 1325-1335.
Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.
Kim et al., "Fabrication of Reflective Holographic PDLC for Blue", Molecular Crystals and Liquid Crystals Science, 2001, vol. 368, pp. 3845-3853.
Kim et al., "Optimization of Holographic PDLC for Green", Mol. Cryst. Liq. Cryst., vol. 368, 2001, pp. 3855-3864.
Klein, "Optical Efficiency for Different Liquid Crystal Colour Displays", Digital Media Department, HPL-2000-83, Jun. 29, 2000, 18 pgs.
Kogelnik, "Coupled Wave Theory for Thick Hologram Gratings", The Bell System Technical Journal, vol. 48, No. 9, Nov. 1969, pp. 2909-2945.
Konuray et al., "State of the Art in Dual-Curing Acrylate Systems", Polymers, Feb. 12, 2018, vol. 10, No. 178, 24 pgs, doi: 10.3390/polym10020178.

(56) References Cited

OTHER PUBLICATIONS

Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.
Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.
Kwon et al., "Polymer waveguide notch filter using two stacked thermooptic long-period gratings", IEEE Photonics Technology Letters, Apr. 4, 2005, vol. 17, Issue 4, pp. 792-794, DOI: 10.1109/LPT.2005.844008.
Lauret et al., "Solving the Optics Equation for Effective LED Applications", Gaggione North America, LLFY System Design Workshop 2010, Oct. 28, 2010, 26 pgs.
Lee, "Patents Shows Widespread Augmented Reality Innovation", PatentVue, May 26, 2015, 5 pgs.
Levin et al., "A Closed Form Solution To Natural Image Matting", Illumination & Displays 3D Visualization and Imaging Systems Laboratory (3DVIS) College of Optical Sciences University of Arizona Tucson, 2014, 8 pgs.
Levola, "Diffractive optics for virtual reality displays", Journal of the SID, 2006, 14/5, pp. 467-475.
Levola et al., "Near-to-eye display with diffractive exit pupil expander having chevron design", Journal of the SID, 2008, 16/8, pp. 857-862.
Levola et al., "Replicated slanted gratings with a high refractive index material for in and outcoupling of light", Optics Express, vol. 15, Issue 5, 2007, pp. 2067-2074.
Li et al., "A low cost, label-free biosensor based on a novel double-sided grating waveguide coupler with sub-surface cavities", Sensors and Actuators B: Chemical, Jan. 2015, vol. 206, pp. 371-380, https://doi.org/10.1016/j.snb.2014.09.065.
Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.
Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.
Li et al., "Light Pipe Based Optical Train and its Applications", Proceedings vol. 5524, Novel Optical Systems Design and Optimization VII, Oct. 24, 2004, doi: 10.1117/12.559833, 10 pgs.
Li et al., "Novel Projection Engine with Dual Paraboloid Reflector and Polarization Recovery Systems", Wavien Inc., SPIE EI 5289-38, Jan. 21, 2004, 49 pgs.
Li et al., "Polymer crystallization/melting induced thermal switching in a series of holographically patterned Bragg reflectors", Soft Matter, Jul. 11, 2005, vol. 1, pp. 238-242.
Lin et al., "Ionic Liquids in Photopolymerizable Holographic Materials", in book: Hologram—Recording Materials and Applications, Nov. 9, 2011, 21 pgs.
Liu et al., "Effect of Surfactant on the Electro-Optical Properties of Holographic Polymer Dispersed Liquid Crystal Bragg Gratings", Optical Materials, 2005, vol. 27, pp. 1451-1455, available online Dec. 25, 2004, doi: 10.1016/j.optmat.2004.10.010.
Liu et al., "Holographic Polymer Dispersed Liquid Crystals" Materials, Formation and Applications, Advances in OptoElectronics, Nov. 30, 2008, vol. 2008, Article ID 684349, 52 pgs.
Liu et al., "Realization and Optimization of Holographic Waveguide Display System", Acta Optica Sinica, vol. 37, Issue 5, Issuing date—May 10, 2017, pp. 310-317.
Lorek, "Experts Say Mass Adoption of augmented and Virtual Reality is Many Years Away", Siliconhills, Sep. 9, 2017, 4 pgs.
Lougnot et al., "Polymers for holographic recording: VI. Some basic ideas for modelling the kinetics of the recording process", Pure and Applied Optics: Journal of the European Optical Society Part A, 1997, vol. 6, No. 2, pp. 225-245, https://doi.org/10.1088/0963-9659/6/2/007.
Lowenthal et al., "Speckle Removal by a Slowly Moving Diffuser Associated with a Motionless Diffuser", Journal of the Optical Society of America, Jul. 1971, vol. 61, No. 7, pp. 847-851.
Lu et al., "Polarization switch using thick holographic polymer-dispersed liquid crystal grating", Journal of Applied Physics, vol. 95, No. 3, Feb. 1, 2004, pp. 810-815.
Lu et al., "The Mechanism of electric-field-induced segregation of additives in a liquid-crystal host", Phys Rev E Stat Nonlin Soft Matter Phys., Nov. 27, 2012, 14 pgs.
Ma et al., "Holographic Reversed-Mode Polymer-Stabilized Liquid Crystal Grating", Chinese Phys. Lett., 2005, vol. 22, No. 1, pp. 103-106.
Mach et al., "Switchable Bragg diffraction from liquid crystal in colloid-templated structures", Europhysics Letters, Jun. 1, 2002, vol. 58, No. 5, pp. 679-685.
Magarinos et al., "Wide Angle Color Holographic infinity optics display", Air Force Systems Command, Brooks Air Force Base, Texas, AFHRL-TR-80-53, Mar. 1981, 100 pgs.
Marino et al., "Dynamical Behaviour of Policryps Gratings", Electronic-Liquid Crystal Communications, Feb. 5, 2004, 10 pgs.
Massenot et al., "Multiplexed holographic transmission gratings recorded in holographic polymer-dispersed liquid crystals: static and dynamic studies", Applied Optics, 2005, vol. 44, Issue 25, pp. 5273-5280.
Matay et al., "Planarization of Microelectronic Structures by Using Polyimides", Journal of Electrical Engineering, 2002, vol. 53, No. 3-4, pp. 86-90.
Mathews, "The LED FAQ Pages", Jan. 31, 2002, 23 pgs.
Matic, "Blazed phase liquid crystal beam steering", Proc. of the SPIE, 1994, vol. 2120, pp. 194-205.
Matsushima et al., "Thiol-Isocyanate-Acrylate Ternary Networks by Selective Thiol-Click Chemistry", Journal of Polymer Science: Part A: Polymer Chemistry, Apr. 16, 2010, vol. 48, 3255-3264, doi: 10.1002/pola.24102.
McLeod, "Axicons and Their Uses", Journal of the Optical Society of America, Feb. 1960, vol. 50, No. 2, pp. 166-169.
McManamon et al., "A Review of Phased Array Steering for Narrow-Band Electrooptical Systems", Proceedings of the IEEE, Jun. 2009, vol. 97, No. 6, pp. 1078-1096.
McManamon et al., "Optical Phased Array Technology", Proceedings of the IEEE, Feb. 1996, vol. 84, Issue 2, pp. 268-298.
Miller, "Coupled Wave Theory and Waveguide Applications", The Bell System Technical Journal, Short Hills, NJ, Feb. 2, 1954, 166 pgs.
Missinne et al., "Flexible thin polymer waveguide Bragg grating sensor foils for strain sensing", Proc. SPIE, 10101, Organic Photonic Materials and Devices, Feb. 16, 2017, https://doi.org/10.1117/12.2250823.
Moffitt, "Head-Mounted Display Image Configurations", retrieved from the internet on Dec. 19, 2014, dated May 2008, 25 pgs.
Moharam et al., "Diffraction characteristics of photoresist surface-relief gratings", Applied Optics, Sep. 15, 1984, vol. 23, pp. 3214-3220.
Mulik, "Adhesion Enhancement of Polymeric Films on Glass Surfaces by a Silane Derivative of Azobisisobutyronitrile (AIBN).", Polymer Preprints, American Chemical Society (ACS), Jan. 2008, 3 pgs.
Nair et al., "Enhanced Two-Stage Reactive Polymer Network Forming Systems", Polymer (Guildf). May 25, 2012, vol. 53, No. 12, pp. 2429-2434, doi:10.1016/j.polymer.2012.04.007.
Nair et al., "Two-Stage Reactive Polymer Network Forming Systems", Advanced Functional Materials, 2012, pp. 1-9, DOI: 10.1002/adfm.201102742.
Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.
Natarajan et al., "Electro Optical Switching Characteristics of Volume Holograms in Polymer Dispersed Liquid Crystals", Journal of Nonlinear Optical Physics and Materials, 1997, vol. 5, No. 1, pp. 666-668.

(56) References Cited

OTHER PUBLICATIONS

Natarajan et al., "Electro-Optical Switching Characteristics of Volume Holograms in Polymer Dispersed Liquid Crystals", Journal of Nonlinear Optical Physics and Materials, Jan. 1996, vol. 5, No. 1, pp. 89-98.
Natarajan et al., "Holographic polymer dispersed liquid crystal reflection gratings formed by visible light initiated thiol-ene photopolymerization", Polymer, vol. 47, May 8, 2006, pp. 4411-4420.
Naydenova et al., "Low-scattering Volume Holographic Material", DIT PhD Project, http://www.dit.ie/ieo/, Oct. 2017, 2 pgs.
Neipp et al., "Non-local polymerization driven diffusion based model: general dependence of the polymerization rate to the exposure intensity", Optics Express, Aug. 11, 2003, vol. 11, No. 16, pp. 1876-1886.
Nielsen et al., "Grating Couplers for Fiber-to-Fiber Characterizations of Stand-Alone Dielectric Loaded Surface Plasmon Waveguide Components", Journal of Lightwave Technology, Oct. 1, 2012, vol. 30, No. 19, pp. 3118-3125, DOI: 10.1109/JLT.2012.2212418.
Nishikawa et al., "Mechanically and Light Induced Anchoring of Liquid Crystal on Polyimide Film", Mol. Cryst. Liq. Cryst., Aug. 1999, vol. 329, 8 pgs.
Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.
Nordin et al., "Diffraction Properties of Stratified Volume Holographic Optical Elements", Journal of the Optical Society of America A. Dec. 1992, vol. 9, No. 12, pp. 2206-2217.
Ogiwara et al., "Temperature Dependence of Anisotropic Diffraction in Holographic Polymer-Dispersed Liquid Crystal Memory", Applied Optics, Sep. 10, 2013, vol. 52, No. 26, pp. 6529-6536.
Ogiwara et al., "Thermo-Driven Light Controller by Using Thermal Modulation of Diffraction Wavelength in Holographic Polymer Dispersed Liquid Crystal Grating", Proc. SPIE, Feb. 19, 2014, 9004, Article 90040Q, 8 pgs., doi: 10.1117/12.2039104.
Oh et al., "Achromatic Diffraction from Polarization Gratings with High Efficiency", Optic Letters, vol. 33, No. 20, Oct. 15, 2008, pp. 2287-2289.
Olson et al., "Templating Nanoporous Polymers with Ordered Block Copolymers", Chemistry of Materials, Web publication Nov. 27, 2007, vol. 20, pp. 869-890.
Ondax, Inc., "Volume Holographic Gratings (VHG)", 2005, 7 pgs.
Orcutt, "Coming Soon: Smart Glasses That Look Like Regular Spectacles", Intelligent Machines, Jan. 9, 2014, 4 pgs.
Osredkar, "A study of the limits of spin-on-glass planarization process", Informacije MIDEM, 2001, vol. 31, 2, ISSN0352-9045, pp. 102-105.
Osredkar et al., "Planarization methods in IC fabrication technologies", Informacije MIDEM, 2002, vol. 32, 3, ISSN0352-9045, 5 pgs.
Ou et al., "A Simple LCOS Optical System (Late News)", Industrial Technology Research Institute/OES Lab. Q100/Q200, SID 2002, Boston, USA, 2 pgs.
Paolini et al., "High-Power LED Illuminators in Projection Displays", Lumileds, Aug. 7, 2001, 19 pgs.
Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.
Park et al., "Fabrication of Reflective Holographic Gratings with Polyurethane Acrylates (PUA)", Current Applied Physics, Jun. 2002, vol. 2, pp. 249-252.
Peng et al., "Facile Image Patterning via Sequential Thiol-Michael/Thiol-Yne Click Reactions", Chemistry of Materials, Nov. 20, 2014, vol. 26, pp. 6819-6826, doi: 10.1021/cm5034436.
Peng et al., "High Performance Graded Rainbow Holograms via Two-Stage Sequential Orthogonal Thiol-Click Chemistry", Macromolecules, Mar. 28, 2014, vol. 47, pp. 2306-2315, doi: 10.1021/ma500167x.
Peng et al., "Low Voltage Driven and Highly Diffractive Holographic Polymer Dispersed Liquid Crystals with Spherical Morphology", RSC Advances, 2017, vol. 7, pp. 51847-51857, doi: 10.1039/c7ra08949.
Pierantoni et al., "Efficient modeling of 3-D photonic crystals for integrated optical devices", IEEE Photonics Technology Letters, Feb. 2006, vol. 18, No. 2, pp. 319-321, DOI: 10.1109/LPT.2005.861991.
Plawsky et al., "Engineered nanoporous and nanostructured films", MaterialsToday, Jun. 2009, vol. 12, No. 6, pp. 36-45.
Pogue et al., "Electrically Switchable Bragg Gratings from Liquid Crystal/Polymer Composites", Applied Spectroscopy, 2000, vol. 54, Issue 1, pp. 12A-28A.
Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.
Presnyakov et al., "Electrically tunable polymer stabilized liquid-crystal lens", Journal of Applied Physics, Apr. 29, 2005, vol. 97, p. 103101-1 - 103101-6.
Prokop et al., "Air-Suspended SU-8 Polymer Waveguide Grating Couplers", Journal of Lightwave Technology, Sep. 1, 2016, vol. 34, No. 17, pp. 3966-3971, DOI: 10.1109/JLT.2016.2593025.
Qi et al., "P-111: Reflective Display Based on Total Internal Reflection and Grating-Grating Coupling", Society for Information Display Digest, May 2003, pp. 648-651, DOI: 10.1889/1.1832359.
Ramón, "Formation of 3D micro- and nanostructures using liquid crystals as a template", Technische Universiteit Eindhoven, Apr. 17, 2008, Thesis, 117 pgs., DOI:http://dx.doi.org/10.6100/IR634422.
Ramsey, "Holographic Patterning of Polymer Dispersed Liquid Crystal Materials for Diffractive Optical Elements", Thesis, The University of Texas at Arlington, Dec. 2006, 166 pgs.
Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.
Reid, "Thin film silica nanocomposites for anti-reflection coatings", Oxford Advance Surfaces, www.oxfordsurfaces.com, Oct. 18, 2012, 23 pgs.
Riechert, "Speckle Reduction in Projection Systems", Dissertation, University Karlsruhe, 2009, 178 pgs.
Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.
Roussel et al., "Photopolymerization Kinetics and Phase Behavior of Acrylate Based Polymers Dispersed Liquid Crystals", Liquid Crystals, 1998, vol. 24, Issue 4, pp. 555-561.
Sabel et al., "Simultaneous formation of holographic surface relief gratings and volume phase gratings in photosensitive polymer", Materials Research Letters, May 30, 2019, vol. 7, No. 10, pp. 405-411, doi: 10.1080/21663831.2019.1621956.
Sagan et al., "Electrically Switchable Bragg Grating Technology for Projection Displays", Proc. SPIE. vol. 4294, Jan. 24, 2001, pp. 75-83.
Sakhno et al., "Deep surface relief grating in azobenzene-containing materials using a low-intensity 532 nm laser", Optical Materials: X, Jan. 23, 2019, 100006, pp. 3-7, doi: 10.1016/j.omx.2019.100006.
Saleh et al., "Fourier Optics: 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.
Saraswat, "Deposition & Planarization", EE 311 Notes, Aug. 29, 2017, 28 pgs.
Schreiber et al., "Laser display with single-mirror MEMS scanner", Journal of the SID 17/7, 2009, pp. 591-595.
Seiberle et al., "Photo-aligned anisotropic optical thin films", Journal of the SID 12/1, 2004, 6 pgs.

(56) References Cited

OTHER PUBLICATIONS

Serebriakov et al., "Correction of the phase retardation caused by intrinsic birefringence in deep UV lithography", Proc. of SPIE, May 21, 2010, vol. 5754, pp. 1780-1791.
Shechter et al., "Compact beam expander with linear gratings", Applied Optics, vol. 41, No. 7, Mar. 1, 2002, pp. 1236-1240.
Shi et al., "Design considerations for high efficiency liquid crystal decentered microlens arrays for steering light", Applied Optics, vol. 49, No. 3, Jan. 20, 2010, pp. 409-421.
Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.
Simonite, "How Magic Leap's Augmented Reality Works", Intelligent Machines, Oct. 23, 2014, 7 pgs.
Smith et al., "RM-PLUS—Overview", Licrivue, Nov. 5, 2013, 16 pgs.
Sony Global, "Sony Releases the Transparent Lens Eyewear 'SmartEyeglass Developer Edition'", printed Oct. 19, 2017, Sony Global—News Releases, 5 pgs.
Steranka et al., "High-Power LEDs—Technology Status and Market Applications", Lumileds, Jul. 2002, 23 pgs.
Stumpe et al., "Active and Passive LC Based Polarization Elements", Mol. Cryst. Liq. Cryst., 2014, vol. 594: pp. 140-149.
Stumpe et al., "New type of polymer-LC electrically switchable diffractive devices—POLIPHEM", May 19, 2015, p. 97.
Subbarayappa et al., "Bistable Nematic Liquid Crystal Device", Jul. 30, 2009, 14 pgs.
Sun et al., "Effects of multiwalled carbon nanotube on holographic polymer dispersed liquid crystal", Polymers Advanced Technologies, Feb. 19, 2010, DOI: 10.1002/pat.1708, 8 pgs.
Sun et al., "Low-birefringence lens design for polarization sensitive optical systems", Proceedings of SPIE, 2006, vol. 6289, pp. 6289DH-1-6289DH-10, doi: 10.1117/12.679416.
Sun et al., "Transflective Multiplexing of Holographic Polymer Dispersed Liquid Crystal Using Si Additives", eXPRESS Polymer Letters, 2011, vol. 5, No. 1, pp. 73-81.
Sutherland et al., "Bragg Gratings in an Acrylate Polymer Consisting of Periodic Polymer-Dispersed Liquid-Crystal Planes", Chem. Mater., 1993, vol. 5, pp. 1533-1538.
Sutherland et al., "Electrically switchable vol. gratings in polymer-dispersed liquid crystals", Applied Physics Letters, Feb. 28, 1994, vol. 64, No. 9, pp. 1074-1076.
Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.
Sutherland et al., "Phenomenological model of anisotropic volume hologram formation in liquid-crystal-photopolymer mixtures", Journal of Applied Physics, Jun. 30, 2004, vol. 96, No. 2, pp. 951-965, https://doi.org/10.1063/1.1762713.
Sutherland et al., "The physics of photopolymer liquid crystal composite holographic gratings", presented at SPIE: Diffractive and Holographic Optics Technology San Jose, CA, 1996, SPIE, vol. 2689, pp. 158-169.
Sweatt, "Achromatic triplet using holographic optical elements", Applied Optics, May 1977, vol. 16, No. 5, pp. 1390-1391.
Tahata et al., "Effects of Polymer Matrix on Electro-Optic Properties of Liquid Crystal Mixed With Polymer", Proc SPIE, Mar. 11, 1996, vol. 2651, pp. 101-106, doi: 10.1117/12.235342.
Talukdar, "Technology Forecast: Augmented reality", Changing the economics of Smartglasses, Issue 2, 2016, 5 pgs.
Tao et al., "TiO2 nanocomposites with high refractive index and transparency", J. Mater. Chem., Oct. 4, 2011, vol. 21, pp. 18623-18629.

Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.
Tiziani, "Physical Properties of Speckles", Speckle Metrology, Chapter 2, Academic Press, Inc., 1978, pp. 5-9.
Tominaga et al., "Fabrication of holographic polymer dispersed liquid crystals doped with gold nanoparticles", 2010 Japanese Liquid Crystal Society Annual Meeting, 2 pgs.
Tomita, "Holographic assembly of nanoparticles in photopolymers for photonic applications", The International Society for Optical Engineering, SPIE Newsroom, 2006, 3 pgs., doi: 10.1117/2.1200612.0475.
Tondiglia et al., "Holographic Formation of Electro-Optical Polymer-Liquid Crystal Photonic Crystals", Advanced Materials, 2002, Published Online Nov. 8, 2001, vol. 14, No. 3, pp. 187-191.
Trisnadi, "Hadamard Speckle Contrast Reduction", Optics Letters, Jan. 1, 2004, vol. 29, No. 1, pp. 11-13.
Trisnadi, "Speckle contrast reduction in laser projection displays", Proc. SPIE 4657, 2002, 7 pgs.
Tzeng et al., "Axially symmetric polarization converters based on photo-aligned liquid crystal films", Optics Express, Mar. 17, 2008, vol. 16, No. 6, pp. 3768-3775.
Upatnieks et al., "Color Holograms for white light reconstruction", Applied Physics Letters, Jun. 1, 1996, vol. 8, No. 11, pp. 286-287.
Urey, "Diffractive exit pupil expander for display applications", Applied Optics, Nov. 10, 2001, vol. 40, Issue 32, pp. 5840-5851.
Ushenko, "The Vector Structure of Laser Biospeckle Fields and Polarization Diagnostics of Collagen Skin Structures", Laser Physics, 2000, vol. 10, No. 5, pp. 1143-1149.
Valoriani, "Mixed Reality: Dalle demo a un prodotto", Disruptive Technologies Conference, Sep. 23, 2016, 67 pgs.
Van Gerwen et al., "Nanoscaled interdigitated electrode arrays for biochemical sensors", Sensors and Actuators, Mar. 3, 1998, vol. B 49, pp. 73-80.
Vecchi, "Studi Esr Di Sistemi Complessi Basati Su Cristalli Liquidi", Thesis, University of Bologna, Department of Physical and Inorganic Chemistry, 2004-2006, 110 pgs.
Veltri et al., "Model for the photoinduced formation of diffraction gratings in liquid-crystalline composite materials", Applied Physics Letters, May 3, 2004, vol. 84, No. 18, pp. 3492-3494.
Vita, "Switchable Bragg Gratings", Thesis, Universita degli Studi di Napoli Federico II, Nov. 2005, 103 pgs.
Vuzix, "M3000 Smart Glasses, Advanced Waveguide Optics", brochure, Jan. 1, 2017, 2 pgs.
Waldern et al., "Waveguide Optics for All Day Wearable Displays", Jun. 20, 2017, 35 pgs.
Wang et al., "Liquid-crystal blazed-grating beam deflector", Applied Optics, Dec. 10, 2000, vol. 39, No. 35, pp. 6545-6555.
Wang et al., "Optical Design of Waveguide Holographic Binocular Display for Machine Vision", Applied Mechanics and Materials, Sep. 27, 2013, vols. 427-429, pp. 763-769.
Wang et al., "Speckle reduction in laser projection systems by diffractive optical elements", Applied Optics, Apr. 1, 1998, vol. 37, No. 10, pp. 1770-1775.
Weber et al., "Giant Birefringent Optics in Multilayer Polymer Mirrors", Science, Mar. 31, 2000, vol. 287, pp. 2451-2456.
Webster, "Webster's Third New International Dictionary 433", (1986), 3 pgs.
Wei An, "Industrial Applications of Speckle Techniques", Doctoral Thesis, Royal Institute of Technology, Department of Production Engineering, Chair of Industrial Metrology & Optics, Stockholm, Sweden 2002, 76 pgs.
Welde et al., "Investigation of methods for speckle contrast reduction", Master of Science in Electronics, Jul. 2010, Norwegian University of Science and Technology, Department of Electronics and Telecommunications, 127 pgs.
White, "Influence of thiol-ene polymer evolution on the formation and performance of holographic polymer dispersed liquid crystals", The 232nd ACS National Meeting, San Francisco, CA, Sep. 10-14, 2006, 1 pg.

(56) References Cited

OTHER PUBLICATIONS

Wicht et al., "Nanoporous Films with Low Refractive Index for Large-Surface Broad-Band Anti-Reflection Coatings", Macromol. Mater. Eng., 2010, 295, DOI: 10.1002/mame.201000045, 9 pgs.
Wilderbeek et al., "Photoinitiated Bulk Polymerization of Liquid Crystalline Thiolene Monomers", Macromolecules, 2002, vol. 35, pp. 8962-8969.
Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, pp. 12874-12883.
Wisely, "Head up and head mounted display performance improvements through advanced techniques in the manipulation of light", Proc. of SPIE, 2009, 10 pages, vol. 7327.
Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.
Yang et al., "Robust and Accurate Surface Measurement Using Structured Light", IEEE, Apr. 30, 2008, vol. 57, Issue 6, pp. 1275-1280, DOI:10.1109/TIM.2007.915103.
Yaqoob et al., "High-speed two-dimensional laser scanner based on Bragg grating stored in photothermorefractive glass", Applied Optics, Sep. 10, 2003, vol. 42, No. 26, pp. 5251-5262.
Yaroshchuk et al., "Stabilization of liquid crystal photoaligning layers by reactive mesogens", Applied Physics Letters, Jul. 14, 2009, vol. 95, pp. 021902-1-021902-3.
Ye, "Three-dimensional Gradient Index Optics Fabricated in Diffusive Photopolymers", Thesis, Department of Electrical, Computer and Energy Engineering, University of Colorado, 2012, 224 pgs.
Yemtsova et al., "Determination of liquid crystal orientation in holographic polymer dispersed liquid crystals by linear and non-linear optics", Journal of Applied Physics, Oct. 13, 2008, vol. 104, pp. 073115-1-073115-4.
Yeralan et al., "Switchable Bragg grating devices for telecommunications applications", Opt. Eng., Aug. 2012, vol. 41, No. 8, pp. 1774-1779.
Yokomori, "Dielectric surface-relief gratings with high diffraction efficiency", Applied Optics, Jul. 15, 1984, vol. 23; No. 14, pp. 2303-2310.
Yoshida et al., "Nanoparticle-Dispersed Liquid Crystals Fabricated by Sputter Doping", Adv. Mater., 2010, vol. 22, pp. 622-626.
Youcef et al., "Phase Behavior Of Poly(N-Butyl Acrylate) And Poly(2-Ethylhexyl Acrylate) in Nematic Liquid Crystal E7", Macromol. Symp. 2011, vol. 303, pp. 10-16, doi: 10.1002/masy.201150502.
Zeller et al., "Laminated Air Structured and Fluid Infiltrated Polymer Waveguides", in IEEE Photonics Technology Letters, Nov. 2, 2011, vol. 23, Issue: 21, pp. 1564-1566, first published Aug. 12, 2011, DOI: 10.1109/LPT.2011.2164396.
Zhang et al., "Dynamic Holographic Gratings Recorded by Photopolymerization of Liquid Crystalline Monomers", J. Am. Chem. Soc., 1994, vol. 116, pp. 7055-7063.
Zhang et al., "Switchable Liquid Crystalline Photopolymer Media for Holography", J. Am. Chem. Soc., 1992, vol. 114, pp. 1506-1507.
Zhao et al., "Designing Nanostructures by Glancing Angle Deposition", Proc. of SPIE, Oct. 27, 2003, vol. 5219, pp. 59-73.
Zhao et al., "Diffusion Model of Hologram Formation in Dry Photopolymer Materials", Journal of Modern Optics, 1994. Vol. 41, No. 10, pp. 1929-1939, https://doi.org/10.1080/09500349414551831.
Zhao et al., "Extension of a diffusion model for holographic photopolymers", Journal of Modern Optics, 1995, vol. 42, No. 12, pp. 2571-2573, https://doi.org/10.1080/713824349.
Zheng et al., "Holographic Polymer-Dispersed Liquid Crystal Grating with Low Scattering Losses", Liquid Crystals, Mar. 2012, vol. 39, Issue 3, pp. 387-391,http://dx.doi.org/10.1080/02678292.2012.656716.
Ziebacz, "Dynamics of nano and micro objects in complex liquids", Ph.D. dissertation, Institute of Physical Chemistry of the Polish Academy of Sciences, Warsaw 2011, 133 pgs.
Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526, doi:10.1016/j.sna.2006.12.006.
Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.
Extended European Search Report for European Application No. 18897932.2, Search completed Dec. 22, 2021, Mailed Jan. 12, 2022, 8 pgs.
Extended European Search Report for European Application No. 20760111.3, Search completed Sep. 19, 2022, Mailed Sep. 29, 2022, 12 pgs.
Extended European Search Report for European Application No. 20818304.6, Search completed Mar. 23, 2023, Mailed Mar. 31, 2023, 8 pgs.
Extended European Search Report for European Application No. 20856729.7, Search completed Jul. 18, 2023, Mailed Jul. 28, 2023, 11 pgs.
International Preliminary Report on Patentability for International Application PCT/US2020/043107, Report issued Jan. 25, 2022, Mailed on Feb. 3, 2022, 7 pgs.
International Preliminary Report on Patentability for International Application PCT/US2020/067737, Report issued Jul. 5, 2022, Mailed Jul. 14, 2022, 6 pgs.
International Preliminary Report on Patentability for International Application PCT/US2021/072548, Report issued May 16, 2023, Mailed on Jun. 1, 2023, 05 pgs.
International Preliminary Report on Patentability for International Application PCT/US2022/070095, Report issued Jul. 4, 2023, Mailed on Jul. 20, 2023, 08 pgs.
International Search Report and Written Opinion for International Application No. PCT/US2023/068830, Search completed Dec. 21, 2023, Mailed Jan. 31, 2024, 15 pgs.
International Search Report and Written Opinion for International Application No. PCT/US2023/074088, Search completed Jan. 17, 2024, Mailed Mar. 1, 2024, 9 pgs.
International Search Report and Written Opinion for International Application No. PCT/US2022/071007, Search completed May 2, 2022, Mailed May 23, 2022, 13 pgs.
Written Opinion for International Application No. PCT/GB2010/001982, search completed Feb. 24, 2011, mailed Mar. 8, 2011, 6 pgs.
Written Opinion for International Application No. PCT/GB2016/000051, Search completed Aug. 11, 2016, Mailed Aug. 22, 2016, 6 Pgs.
Ahmadi et al., "Influence of an Al2O3 surface coating on the response of polymeric waveguide sensors", Optics Express, vol. 25, No. 21, Oct. 16, 2017, pp. 25102-25112, doi: 10.1364/oe.25.025102.
D'Alessandro et al., "Electro-optic properties of switchable gratings made of polymer and nematic liquid-crystal slices", Optics Letters, vol. 29, No. 12, Jun. 15, 2004, pp. 1405-1407, doi: 10.1364/OL.29.001405.
Emoto et al., "Formation of Positive and Negative Anisotropic Holographic Gratings Depending on Recording Energy in Photoreactive Liquid Crystalline Copolymer Films", Applied Physics B: Lasers and Optics, vol. 107, No. 3, Mar. 31, 2012, pp. 741-748, XP035071884, ISSN: 1432-0649, doi: 10.1007/S00340- 012-4977-X.
Gaylord et al., "Thin and thick gratings: terminology clarification", Applied Optics, vol. 20, No. 19, Oct. 1, 1981, pp. 3271-3273, doi: 10.1364/AO.20.003271.
Kawatsuki et al., "Surface Relief Formation with Molecular Orientation in Photoreactive Liquid Crystalline Polymer Film", Journal of Photopolymer Science and Technology, vol. 19, No. 2, Aug. 15, 2006, pp. 151-156, XP093064657, ISSN: 0914-9244, doi: 10.2494/photopolymer.19.151.

\* cited by examiner

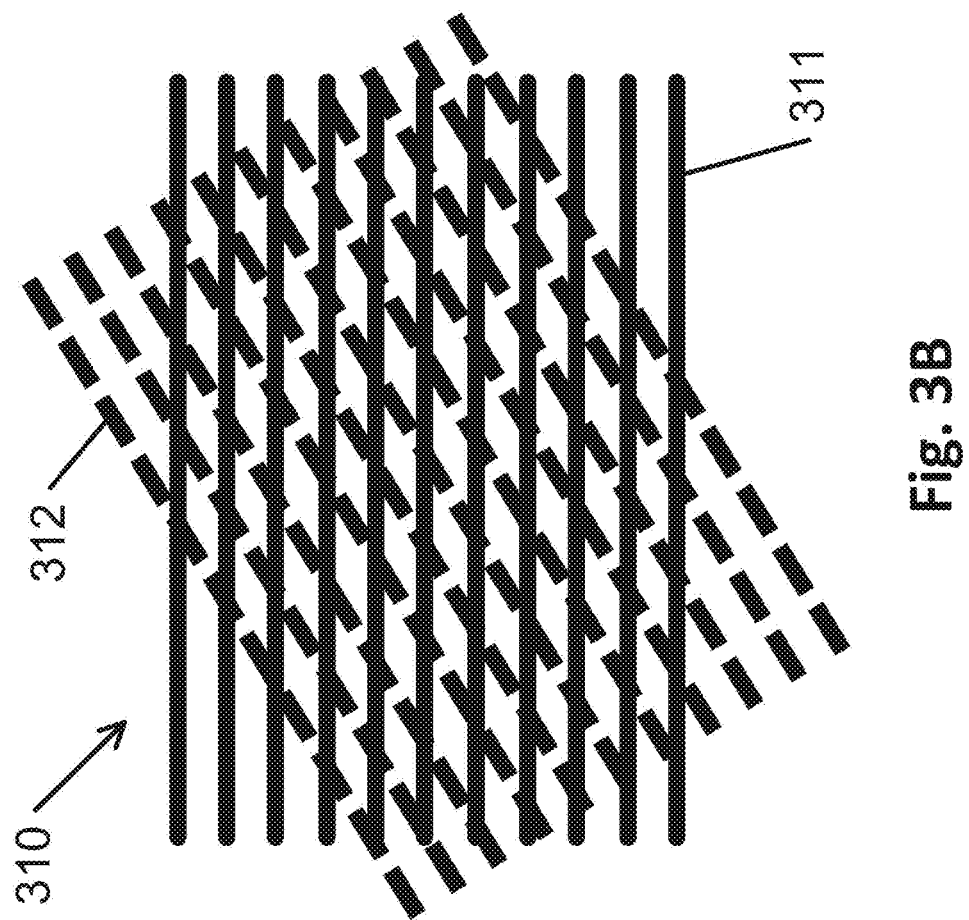

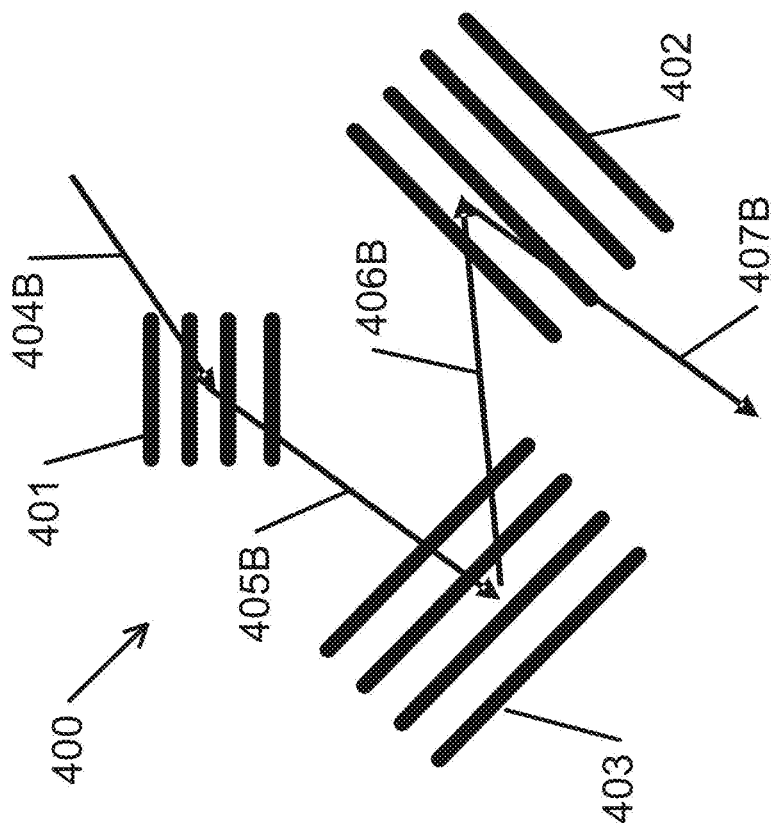

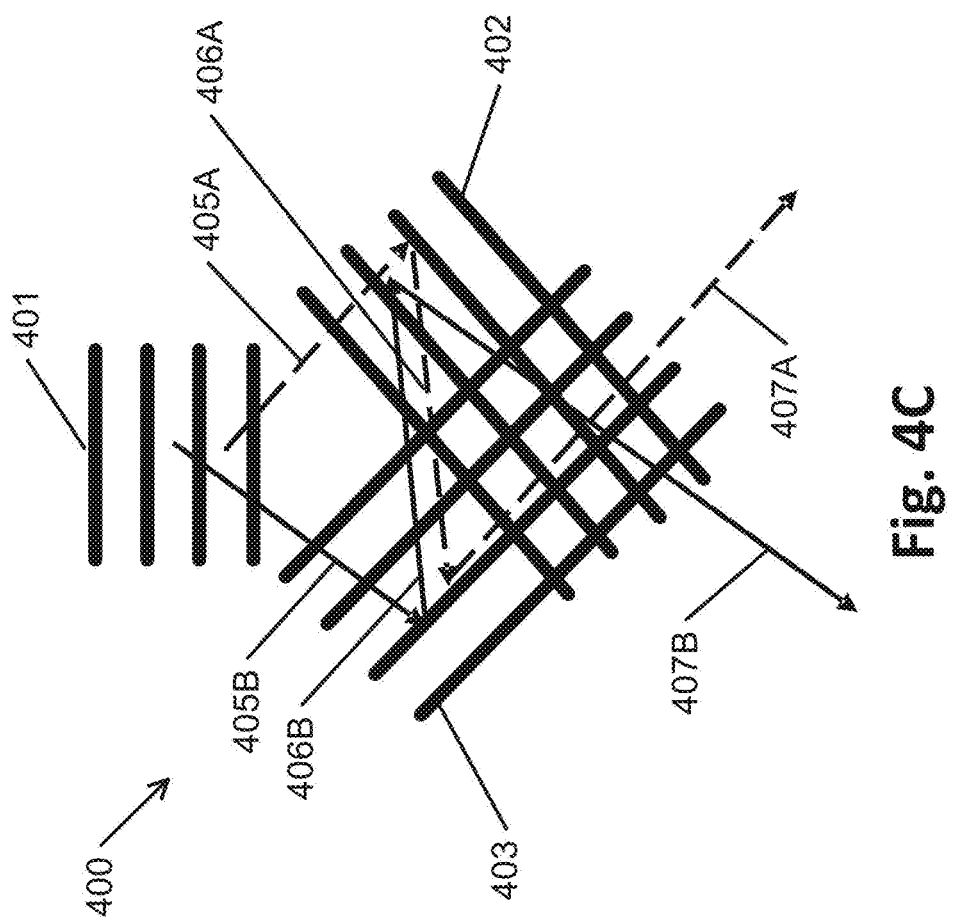

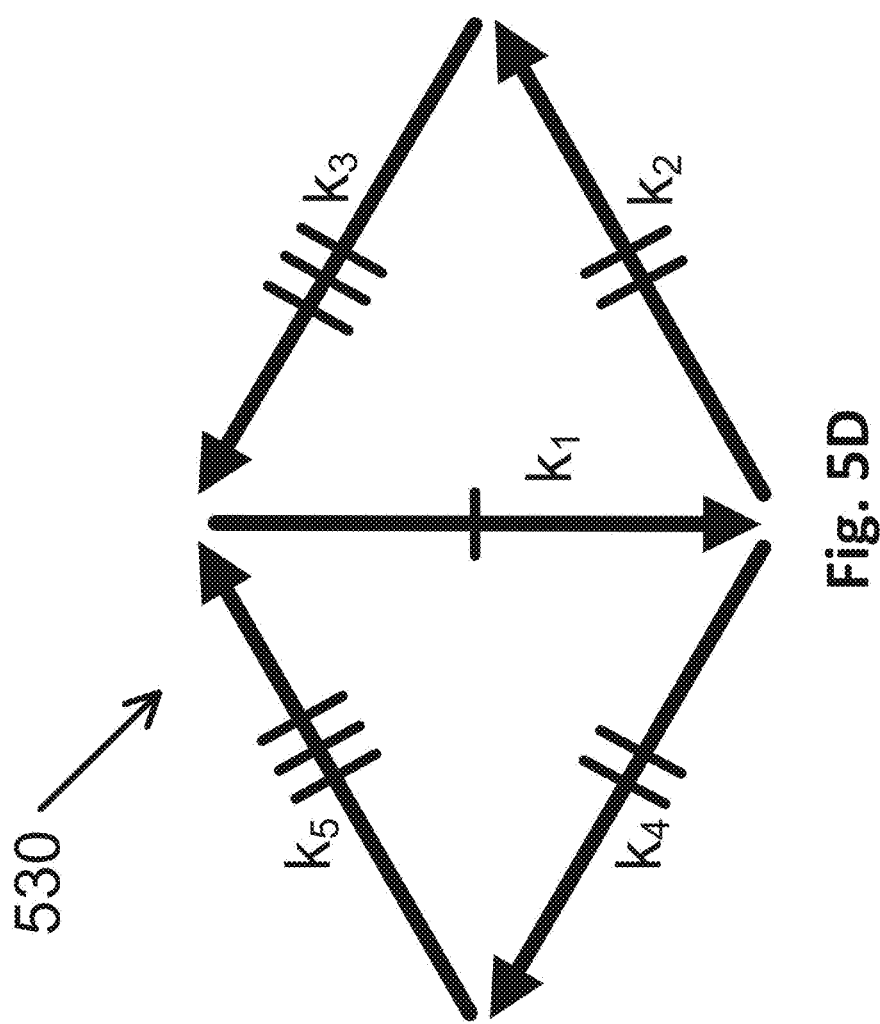

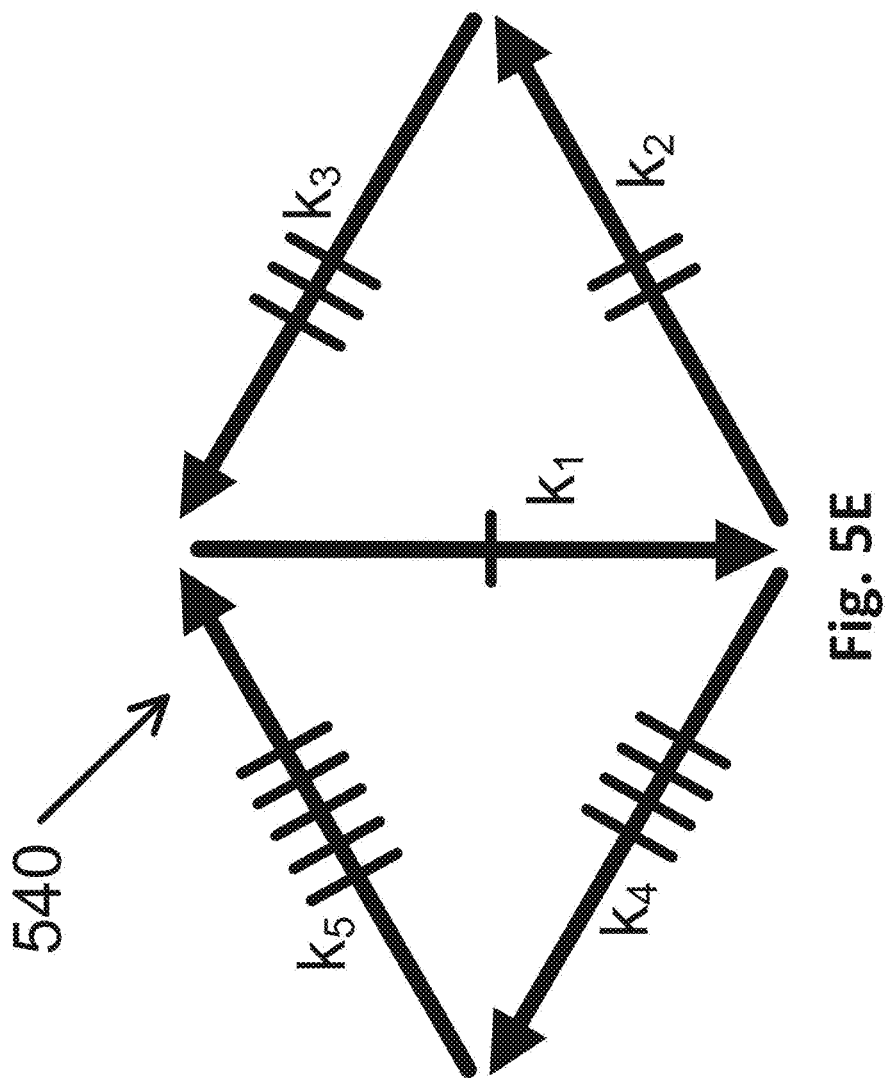

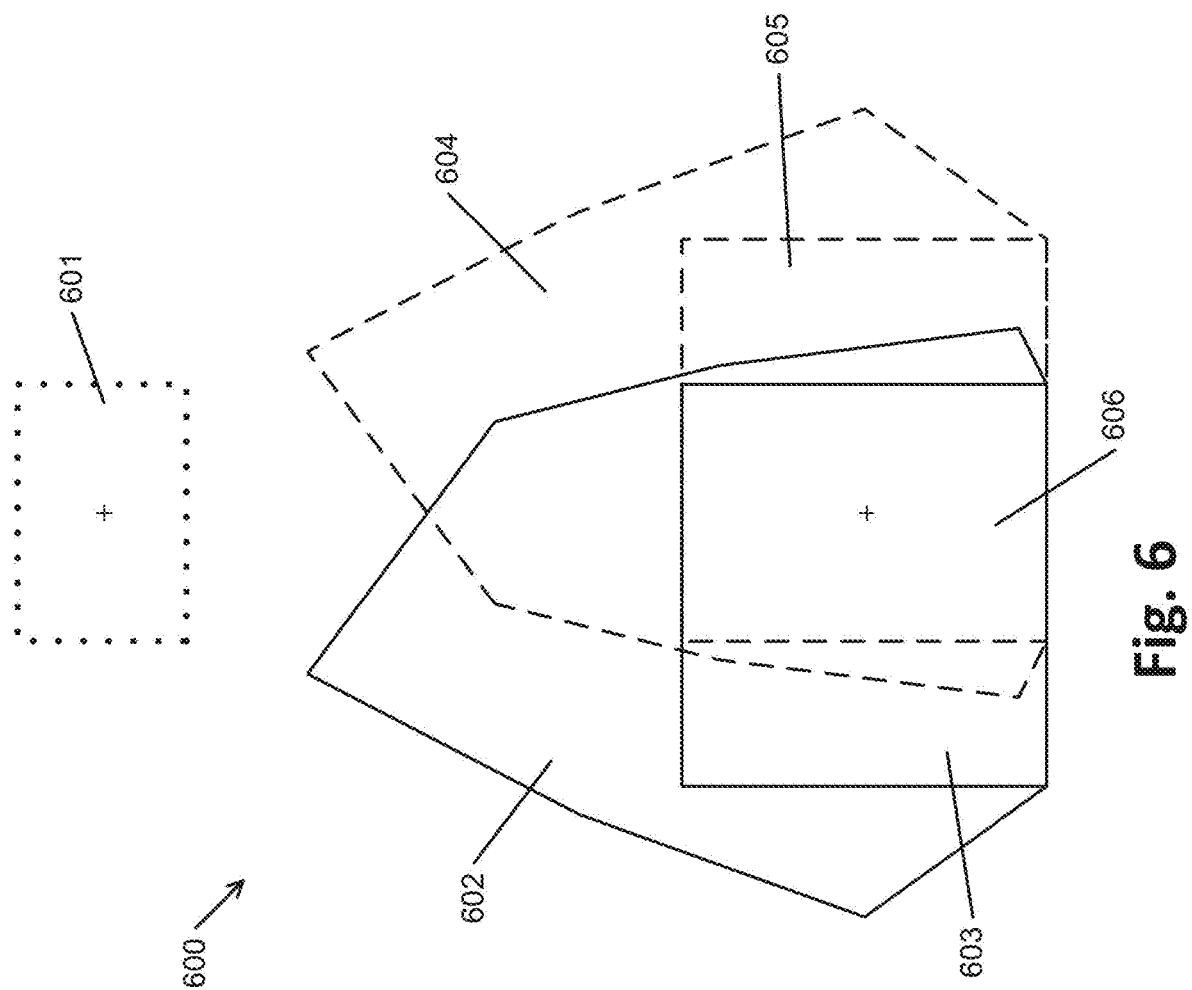

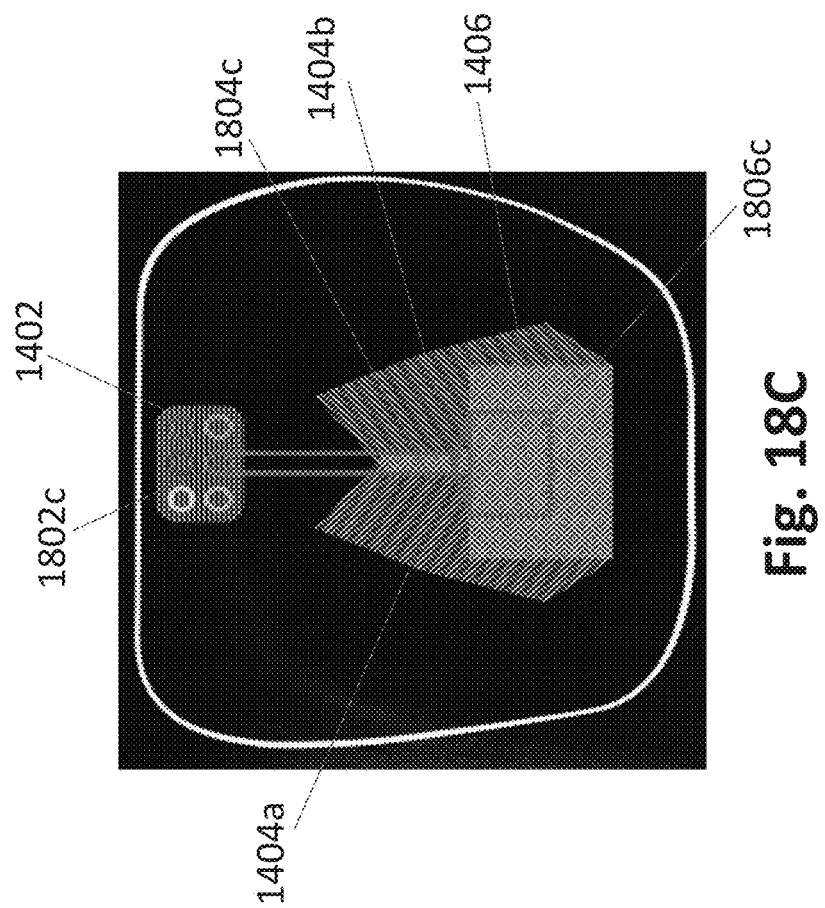

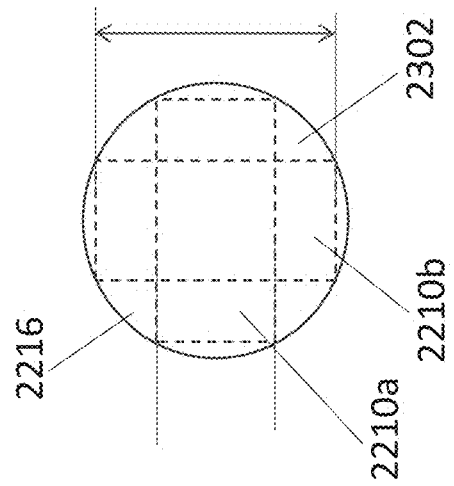
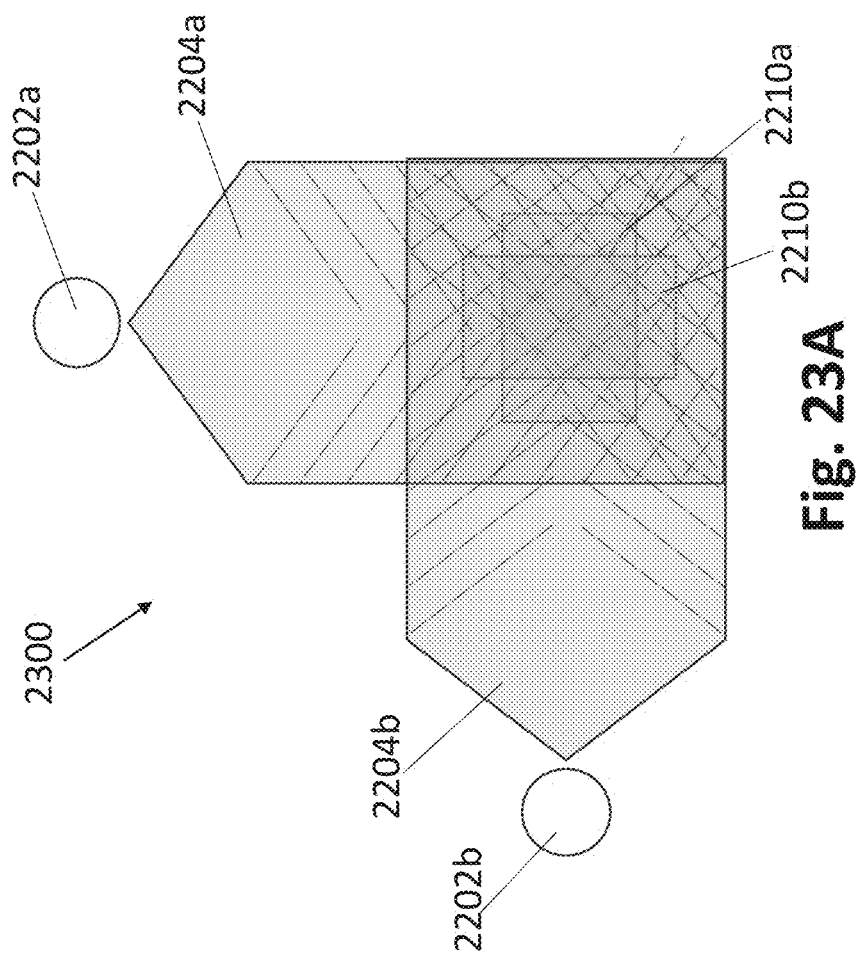

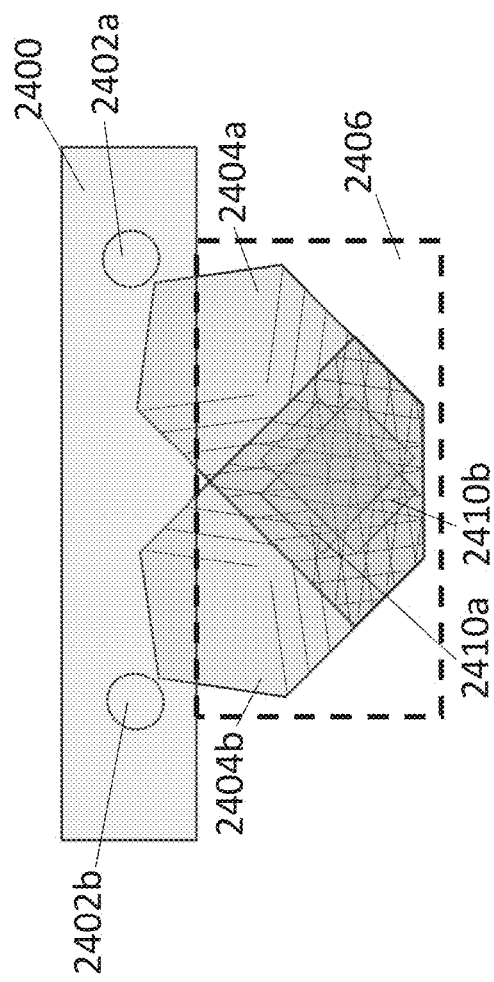
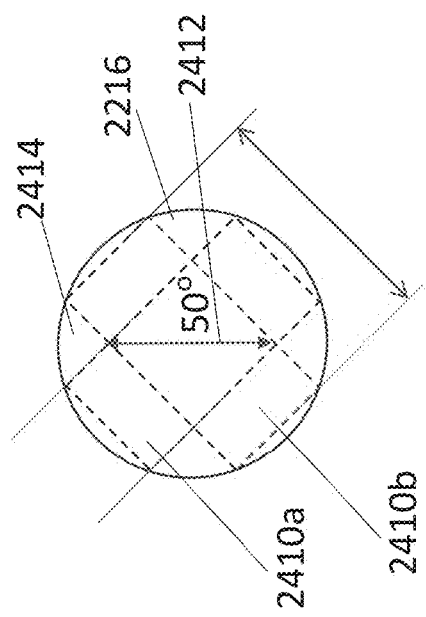
Fig. 24A
Fig. 24B

WIDE ANGLE WAVEGUIDE DISPLAY

CROSS-REFERENCED APPLICATIONS

This application is a continuation of U.S. patent application Ser. No. 17/659,410 entitled "Wide Angle Waveguide Display," filed Apr. 15, 2022, which, claims priority U.S. Provisional Patent Application No. 63/176,064 entitled "Wide Angle Waveguide Display," filed Apr. 16, 2021, and claims priority as a continuation-in-part of U.S. patent application Ser. No. 17/328,727 entitled "Methods and Apparatuses for Providing a Holographic Waveguide Display Using Integrated Gratings," filed on May 24, 2021, which is a continuation of U.S. application Ser. No. 16/794,071 entitled "Methods and Apparatuses for Providing a Holographic Waveguide Display Using Integrated Gratings," filed Feb. 18, 2020, which claims the benefit of and priority under 35 U.S.C. § 119(e) to U.S. Provisional Patent Application No. 62/806,665 entitled "Methods and Apparatuses for Providing a Color Holographic Waveguide Display Using Overlapping Bragg Gratings," filed Feb. 15, 2019 and U.S. Provisional Patent Application No. 62/813,373 entitled "Improvements to Methods and Apparatuses for Providing a Color Holographic Waveguide Display Using Overlapping Bragg Gratings," filed Mar. 4, 2019, the disclosures of which are incorporated herein by reference in their entirety.

FIELD OF THE DISCLOSURE

The present invention generally relates to waveguide devices and, more specifically, to holographic waveguide displays.

BACKGROUND

Waveguides can be referred to as structures with the capability of confining and guiding waves (i.e., restricting the spatial region in which waves can propagate). One subclass includes optical waveguides, which are structures that can guide electromagnetic waves, typically those in the visible spectrum. Waveguide structures can be designed to control the propagation path of waves using a number of different mechanisms. For example, planar waveguides can be designed to utilize diffraction gratings to diffract and couple incident light into the waveguide structure such that the incoupled light can proceed to travel within the planar structure via total internal reflection (TIR).

Fabrication of waveguides can include the use of material systems that allow for the recording of holographic optical elements within or on the surface of the waveguides. One class of such material includes polymer dispersed liquid crystal (PDLC) mixtures, which are mixtures containing photopolymerizable monomers and liquid crystals. A further subclass of such mixtures includes holographic polymer dispersed liquid crystal (HPDLC) mixtures. Holographic optical elements, such as volume phase gratings, can be recorded in such a liquid mixture by illuminating the material with two mutually coherent laser beams. During the recording process, the monomers polymerize, and the mixture undergoes a photopolymerization-induced phase separation, creating regions densely populated by liquid crystal (LC) micro-droplets, interspersed with regions of clear polymer. The alternating liquid crystal-rich and liquid crystal-depleted regions form the fringe planes of the grating.

Waveguide optics, such as those described above, can be considered for a range of display and sensor applications. In many applications, waveguides containing one or more grating layers encoding multiple optical functions can be realized using various waveguide architectures and material systems, enabling new innovations in near-eye displays for Augmented Reality (AR) and Virtual Reality (VR), compact Heads Up Displays (HUDs) for aviation and road transport, and sensors for biometric and laser radar (LIDAR) applications. As many of these applications are directed at consumer products, there is a growing requirement for efficient low cost means for manufacturing holographic waveguides in large volumes.

SUMMARY OF THE DISCLOSURE

Various embodiments are directed to a waveguide display device including: a first input image source providing first image light; a second input image source provide second image light; a first IDA waveguide including: an input coupler for incoupling the first image light into a TIR path in the first IDA waveguide via a first pupil; a first grating with a first K-vector; and a second grating with a second K-vector different than the first K-vector and sharing a multiplexed region with the first grating, where the first grating and the second grating together provide two-dimensional beam expansion to the first image light, and where the second grating in the multiplexed region extracts the two-dimensionally expanded first image light towards an eyebox; and a second IDA waveguide including: an input coupler for incoupling the second image light into a TIR path in the second IDA waveguide via a second pupil; a first grating with a first K-vector; and a second grating with a second K-vector different than the first K-vector and sharing a multiplexed region with the first grating, where the first grating and the second grating together provide two-dimensional beam expansion to the second image light, and where the second grating in the multiplexed region extracts the two-dimensionally expanded second image light towards the eyebox.

In various other embodiments, a first portion of the incoupled first image light is passed to the first grating of the first IDA waveguide which provides beam expansion to the incoupled first image light in a first direction and passes the first direction beam expanded light onto the multiplexed region, where the portion of the second grating of the first IDA waveguide in the multiplexed region is configured to provide beam expansion in a second direction different from the first direction to produce a first two-dimensionally expanded first image light, where a second portion of the incoupled first image light is passed to the second grating of the first IDA waveguide which provides beam expansion to the incoupled first image light in a third direction to produce a third direction expanded second image light, where the portion of the first grating of the first IDA waveguide in the multiplexed region is configured to provide beam expansion in a fourth direction different from the third direction to produce a second two-dimensionally expanded first image light, and where the multiplexed region of the first IDA waveguide is configured to extract the first two-dimensionally expanded first image light and the second two-dimensionally expanded first image light from the first IDA waveguide towards an eyebox.

In still various other embodiments, a first portion of the incoupled second image light is passed to the first grating of the second IDA waveguide which provides beam expansion to the incoupled second image light in a first direction and passes the first direction beam expanded light onto the multiplexed region, where the portion of the second grating of the second IDA waveguide in the multiplexed region is configured to provide beam expansion in a second direction different from the first direction to produce a first two-dimensionally expanded second image light, where a second portion of the incoupled second image light is passed to the second grating of the second IDA waveguide which provides beam expansion to the incoupled second image light in a third direction to produce a third direction expanded second image light, where the portion of the first grating of the second IDA waveguide in the multiplexed region is configured to provide beam expansion in a fourth direction different from the third direction to produce a second two-dimensionally expanded second image light, where the multiplexed region of the incoupled second image light is configured to extract the first two-dimensionally expanded second image light and the second two-dimensionally expanded second image light from the second IDA waveguide towards the eyebox, where the first IDA waveguide and the second IDA waveguide comprise an overlapping region where the first two-dimensionally expanded first image light, the second two-dimensionally expanded first image light, the first two-dimensionally expanded second image light, and the second two-dimensionally expanded second image light is ejected towards the eyebox.

In still various other embodiments, the first two-dimensionally expanded first image light and the second two-dimensionally expanded first image light create a first field of view, where the first two-dimensionally expanded second image light and the second two-dimensionally expanded second image light create a second field of view, and where the first field of view and second field of view include an overlapping region which combines the resolution of the first field of view and the second field of view.

In still various other embodiments, the first field of view includes first non-overlapping regions on opposite sides of the overlapping region and wherein the second field of view includes second non-overlapping regions on opposite sides of the overlapping region.

In still various other embodiments, the first pupil and the second pupil are spatially separated.

In still various other embodiments, the first pupil and the second pupil are positioned in different areas of a head band.

In still various other embodiments, the first IDA waveguide and the second IDA waveguide are partially disposed on the headband and partially disposed on an eyepiece.

In still various other embodiments, the first IDA waveguide and the second IDA waveguide have orthogonal principal axis.

In still various other embodiments, the first grating and second grating of the first IDA waveguide have at least one of different aspect ratios, different grating clock angles, or different grating pitches.

In still various other embodiments, the first grating and the second grating of the second IDA waveguide have at least one of different aspect ratios, different grating clock angles, or different grating pitches.

In still various other embodiments, the first IDA waveguide and the second IDA waveguide are integrated onto a first eyepiece.

In still various other embodiments, the waveguide display device, further includes: a third input image source providing third image light; a fourth input image source provide fourth image light; a third IDA waveguide including: an input coupler for incoupling the third image light into a TIR path in the first IDA waveguide via a third pupil; a first grating with a first K-vector; and a second grating with a second K-vector different than the first K-vector and sharing a multiplexed region with the first grating, where a first portion of the incoupled third image light is passed to the first grating which provides beam expansion to the incoupled third image light in a first direction and passes the first direction beam expanded light onto the multiplexed region, where the portion of the second grating in the multiplexed region is configured to provide beam expansion in a second direction different from the first direction to produce a first two-dimensionally expanded third image light, where a second portion of the incoupled third image light is passed to the second grating which provides beam expansion to the incoupled third image light in a third direction to produce a second two-dimensionally expanded third image light, and where the multiplexed region is configured to extract the first two-dimensionally expanded third image light and the second two-dimensionally expanded third image light from the third IDA waveguide towards an eyebox; and a fourth IDA waveguide including: an input coupler for incoupling the fourth image light into a TIR path in the fourth IDA waveguide via a fourth pupil; a first grating with a first K-vector; and a second grating with a second K-vector different than the first K-vector and sharing a multiplexed region with the first grating, where a first portion of the incoupled fourth image light is passed to the first grating which provides beam expansion to the incoupled fourth image light in a first direction and passes the first direction beam expanded light onto the multiplexed region, where the portion of the second grating in the multiplexed region is configured to provide beam expansion in a second direction different from the first direction to produce a first two-dimensionally expanded fourth image light, where a second portion of the incoupled fourth image light is passed to the second grating which provides beam expansion to the incoupled fourth image light in a third direction to produce a second two-dimensionally expanded fourth image light, and where the multiplexed region is configured to extract the first two-dimensionally expanded fourth image light and the second two-dimensionally expanded fourth image light from the fourth IDA waveguide towards the eyebox, where the third IDA waveguide and the fourth IDA waveguide comprise an overlapping region where the first two-dimensionally expanded third image light, the second two-dimensionally expanded third image light, the first two-dimensionally expanded fourth image light, and the second two-dimensionally expanded fourth image light is ejected towards the eyebox.

In still various other embodiments, the third IDA waveguide and the fourth IDA waveguide are integrated onto a second eyepiece.

In still various other embodiments, the first eyepiece and the second eyepiece are positioned below the headband.

In still various other embodiments, the first eyepiece is configured to eject light into a user's first eye and the second eyepiece is configured to eject light into a user's second eye.

In still various other embodiments, the first two-dimensionally expanded first image light and the second two-dimensionally expanded first image light create a first field of view, and wherein the first two-dimensionally expanded second image light and the second two-dimensionally expanded second image light create a second field of view, and wherein the first field of view and the second field of view include a first overlapping region which combines the resolution of the first field of view and the second field of view, and where the first two-dimensionally expanded third image light and the second two-dimensionally expanded third image light create a third field of view, and wherein the first two-dimensionally expanded fourth image light and the second two-dimensionally expanded fourth image light create a fourth field of view, and wherein the third field of view and the fourth field of view include a second overlapping region which combines the resolution of the third field of view and the fourth field of view.

In still various other embodiments, the center of the user's first eye and the center of the user's second eye are separated by an interpupillary distance, and wherein the center of the first overlapping region and the center of the second overlapping region are separated by the interpupillary distance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

FIGS. 3A-3C conceptually illustrate integrated gratings in accordance with various embodiments of the invention.

FIGS. 4A-4C schematically illustrate ray propagation through a grating structure having an input grating and two integrated gratings in accordance with an embodiment of the invention.

FIGS. 5A-5E conceptually illustrate various grating vector configurations in accordance with various embodiments of the invention.

FIG. 6 conceptually illustrates a schematic plan view of a grating architecture having an input grating and integrated gratings in accordance with an embodiment of the invention.

FIG. 23A schematically illustrates an IDA grating device including two overlapping air-spaced waveguides in accordance with an embodiment of the invention.

FIG. 23B illustrates the eyebox of FIG. 23A in relation to a circular region.

FIG. 24A illustrates an IDA grating device including two overlapping spaced waveguides in accordance with an embodiment of the invention.

FIG. 24B illustrates the eyebox of FIG. 24A in relation to a circular region.

DETAILED DESCRIPTION

Figure 1:
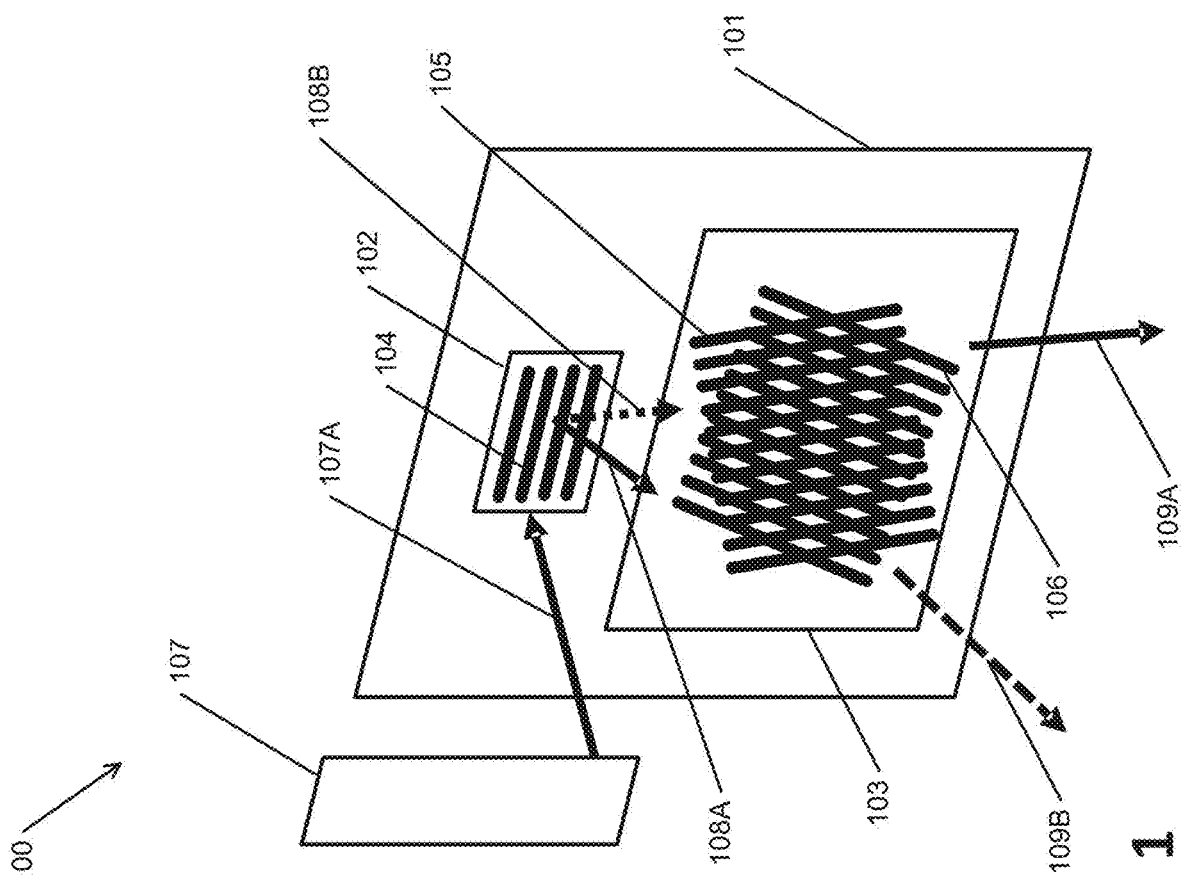
FIG. 1 conceptually illustrates a waveguide display in accordance with an embodiment of the invention.

For the purposes of describing embodiments, some well-known features of optical technology known to those skilled in the art of optical design and visual displays have been omitted or simplified in order to not obscure the basic principles of the invention. Unless otherwise stated, the term "on-axis" in relation to a ray or a beam direction refers to propagation parallel to an axis normal to the surfaces of the optical components described in relation to the invention. In the following description the terms light, ray, beam, and direction may be used interchangeably and in association with each other to indicate the direction of propagation of electromagnetic radiation along rectilinear trajectories. The term light and illumination may be used in relation to the visible and infrared bands of the electromagnetic spectrum. Parts of the following description will be presented using terminology commonly employed by those skilled in the art of optical design. As used herein, the term grating may encompass a grating comprised of a set of gratings in some embodiments. For illustrative purposes, it is to be understood that the drawings are not drawn to scale unless stated otherwise.

Waveguide displays in accordance with various embodiments of the invention can be implemented using many different techniques. Waveguide technology can enable low cost, efficient, and versatile diffractive optical solutions for many different applications. One commonly used waveguide architecture includes an input grating for coupling light from an image source into a TIR path in the waveguide, a fold grating for providing beam expansion in a first direction, and an output grating for providing a second beam expansion in a direction orthogonal to the first direction and extracting the pupil-expanded beam from the waveguide for viewing from an exit pupil or eyebox. While effective at two-dimensional beam expansion and extraction, this arrangement typically demands a large grating area. When used with birefringent gratings, this architecture can also suffer from haze that arises from millions of grating interactions in the fold. A further issue is image nonuniformity due to longer light paths incurring more beam interactions with the substrates of the waveguide. As such, many embodiments of the invention are directed towards wide angle, low cost, efficient, and compact waveguide displays.

In many embodiments, the waveguide display includes at least one input grating and at least two integrated gratings, each capable of performing the functions of traditional fold and output gratings. In further embodiments, a single multiplexed input grating is implemented to provide input light with two bifurcated paths. In other embodiments, two input gratings are implemented to provide bifurcated optical paths. In addition to the different configurations of the input grating(s), the integrated gratings can also be configured in various ways. In some embodiments, the integrated gratings contain crossed grating vectors and can be configured to provide beam expansion in two directions and beam extraction for light coming from the input grating(s). In several embodiments, the integrated gratings are configured as overlapping gratings with crossed grating vectors. The integrated nature of the grating architecture can allow for a compact waveguide display that is suitable for various applications, including but not limited to AR, VR, HUD, and LIDAR applications. As can readily be appreciated, the specific architecture and implementation of the waveguide display can depend on the specific requirements of a given application. For example, in some embodiments, the waveguide display is implemented with integrated gratings to provide a binocular field-of-view of at least 50° diagonal. In further embodiments, the waveguide display is implemented with integrated gratings to provide a binocular field-of-view of at least ~100° diagonal. Waveguide displays, grating architecture, HPDLC materials, and manufacturing processes in accordance with various embodiments of the invention are discussed below in further detail.

Optical Waveguide and Grating Structures

Optical structures recorded in waveguides can include many different types of optical elements, such as but not limited to diffraction gratings. Gratings can be implemented to perform various optical functions, including but not limited to coupling light, directing light, and preventing the transmission of light. In many embodiments, the gratings are surface relief gratings that reside on the outer surface of the waveguide. In other embodiments, the grating implemented is a Bragg grating (also referred to as a volume grating), which are structures having a periodic refractive index modulation. Bragg gratings can be fabricated using a variety of different methods. One process includes interferential exposure of holographic photopolymer materials to form periodic structures. Bragg gratings can have high efficiency with little light being diffracted into higher orders. The relative amount of light in the diffracted and zero order can be varied by controlling the refractive index modulation of the grating, a property that can be used to make lossy waveguide gratings for extracting light over a large pupil.

One class of Bragg gratings used in holographic waveguide devices is the Switchable Bragg Grating (SBG). SBGs can be fabricated by first placing a thin film of a mixture of photopolymerizable monomers and liquid crystal material between substrates. The substrates can be made of various types of materials, such glass and plastics. In many cases, the substrates are in a parallel configuration. In other embodiments, the substrates form a wedge shape. One or both substrates can support electrodes, typically transparent tin oxide films, for applying an electric field across the film. The grating structure in an SBG can be recorded in the liquid material (often referred to as the syrup) through photopolymerization-induced phase separation using interferential exposure with a spatially periodic intensity modulation. Factors such as but not limited to control of the irradiation intensity, component volume fractions of the materials in the mixture, and exposure temperature can determine the resulting grating morphology and performance. As can readily be appreciated, a wide variety of materials and mixtures can be used depending on the specific requirements of a given application. In many embodiments, HPDLC material is used. During the recording process, the monomers polymerize, and the mixture undergoes a phase separation. The LC molecules aggregate to form discrete or coalesced droplets that are periodically distributed in polymer networks on the scale of optical wavelengths. The alternating liquid crystal-rich and liquid crystal-depleted regions form the fringe planes of the grating, which can produce Bragg diffraction with a strong optical polarization resulting from the orientation ordering of the LC molecules in the droplets.

The resulting volume phase grating can exhibit very high diffraction efficiency, which can be controlled by the magnitude of the electric field applied across the film. When an electric field is applied to the grating via transparent electrodes, the natural orientation of the LC droplets can change, causing the refractive index modulation of the fringes to lower and the hologram diffraction efficiency to drop to very low levels. Typically, the electrodes are configured such that the applied electric field will be perpendicular to the substrates. In a number of embodiments, the electrodes are fabricated from indium tin oxide (ITO). In the OFF state with no electric field applied, the extraordinary axis of the liquid crystals generally aligns normal to the fringes. The grating thus exhibits high refractive index modulation and high diffraction efficiency for P-polarized light. When an electric field is applied to the HPDLC, the grating switches to the ON state wherein the extraordinary axes of the liquid crystal molecules align parallel to the applied field and hence perpendicular to the substrate. In the ON state, the grating exhibits lower refractive index modulation and lower diffraction efficiency for both S- and P-polarized light. Thus, the grating region no longer diffracts light. Each grating region can be divided into a multiplicity of grating elements such as for example a pixel matrix according to the function of the HPDLC device. Typically, the electrode on one substrate surface is uniform and continuous, while electrodes on the opposing substrate surface are patterned in accordance to the multiplicity of selectively switchable grating elements.

Typically, the SBG elements are switched clear in 30 μs with a longer relaxation time to switch ON. The diffraction efficiency of the device can be adjusted, by means of the applied voltage, over a continuous range. In many cases, the device exhibits near 100% efficiency with no voltage applied and essentially zero efficiency with a sufficiently high voltage applied. In certain types of HPDLC devices, magnetic fields can be used to control the LC orientation. In some HPDLC applications, phase separation of the LC material from the polymer can be accomplished to such a degree that no discernible droplet structure results. An SBG can also be used as a passive grating. In this mode, its chief benefit is a uniquely high refractive index modulation. SBGs can be used to provide transmission or reflection gratings for free space applications. SBGs can be implemented as waveguide devices in which the HPDLC forms either the waveguide core or an evanescently coupled layer in proximity to the waveguide. The substrates used to form the HPDLC cell provide a total internal reflection (TIR) light guiding structure. Light can be coupled out of the SBG when the switchable grating diffracts the light at an angle beyond the TIR condition.

In some embodiments, LC can be extracted or evacuated from the SBG to provide a surface relief grating (SRG) that has properties very similar to a Bragg grating due to the depth of the SRG structure (which is much greater than that practically achievable using surface etching and other conventional processes commonly used to fabricate SRGs). The LC can be extracted using a variety of different methods, including but not limited to flushing with isopropyl alcohol and solvents. In many embodiments, one of the transparent substrates of the SBG is removed, and the LC is extracted. In further embodiments, the removed substrate is replaced. The SRG can be at least partially backfilled with a material of higher or lower refractive index. Such gratings offer scope for tailoring the efficiency, angular/spectral response, polarization, and other properties to suit various waveguide applications.

Waveguides in accordance with various embodiments of the invention can include various grating configurations designed for specific purposes and functions. In many embodiments, the waveguide is designed to implement a grating configuration capable of preserving eyebox size while reducing lens size by effectively expanding the exit pupil of a collimating optical system. The exit pupil can be defined as a virtual aperture where only the light rays which pass though this virtual aperture can enter the eyes of a user. In some embodiments, the waveguide includes an input grating optically coupled to a light source, a fold grating for providing a first direction beam expansion, and an output grating for providing beam expansion in a second direction, which is typically orthogonal to the first direction, and beam extraction towards the eyebox. As can readily be appreciated, the grating configuration implemented waveguide architectures can depend on the specific requirements of a given application. In some embodiments, the grating configuration includes multiple fold gratings. In several embodiments, the grating configuration includes an input grating and a second grating for performing beam expansion and beam extraction simultaneously. The second grating can include gratings of different prescriptions, for propagating different portions of the field-of-view, arranged in separate overlapping grating layers or multiplexed in a single grating layer. Furthermore, various types of gratings and waveguide architectures can also be utilized.

In several embodiments, the gratings within each layer are designed to have different spectral and/or angular responses. For example, in many embodiments, different gratings across different grating layers are overlapped, or multiplexed, to provide an increase in spectral bandwidth. In some embodiments, a full color waveguide is implemented using three grating layers, each designed to operate in a different spectral band (red, green, and blue). In other embodiments, a full color waveguide is implemented using two grating layers, a red-green grating layer and a green-blue grating layer. As can readily be appreciated, such techniques can be implemented similarly for increasing angular bandwidth operation of the waveguide. In addition to the multiplexing of gratings across different grating layers, multiple gratings can be multiplexed within a single grating layer—i.e., multiple gratings can be superimposed within the same volume. In several embodiments, the waveguide includes at least one grating layer having two or more grating prescriptions multiplexed in the same volume. In further embodiments, the waveguide includes two grating layers, each layer having two grating prescriptions multiplexed in the same volume. Multiplexing two or more grating prescriptions within the same volume can be achieved using various fabrication techniques. In a number of embodiments, a multiplexed master grating is utilized with an exposure configuration to form a multiplexed grating. In many embodiments, a multiplexed grating is fabricated by sequentially exposing an optical recording material layer with two or more configurations of exposure light, where each configuration is designed to form a grating prescription. In some embodiments, a multiplexed grating is fabricated by exposing an optical recording material layer by alternating between or among two or more configurations of exposure light, where each configuration is designed to form a grating prescription. As can readily be appreciated, various techniques, including those well known in the art, can be used as appropriate to fabricate multiplexed gratings.

In many embodiments, the waveguide can incorporate at least one of: angle multiplexed gratings, color multiplexed gratings, fold gratings, dual interaction gratings, rolled K-vector gratings, crossed fold gratings, tessellated gratings, chirped gratings, gratings with spatially varying refractive index modulation, gratings having spatially varying grating thickness, gratings having spatially varying average refractive index, gratings with spatially varying refractive index modulation tensors, and gratings having spatially varying average refractive index tensors. In some embodiments, the waveguide can incorporate at least one of: a half wave plate, a quarter wave plate, an anti-reflection coating, a beam splitting layer, an alignment layer, a photochromic back layer for glare reduction, and louvre films for glare reduction. In several embodiments, the waveguide can support gratings providing separate optical paths for different polarizations. In various embodiments, the waveguide can support gratings providing separate optical paths for different spectral bandwidths. In a number of embodiments, the gratings can be HPDLC gratings, switching gratings recorded in HPDLC (such switchable Bragg Gratings), Bragg gratings recorded in holographic photopolymer, or surface relief gratings. In many embodiments, the waveguide operates in a monochrome band. In some embodiments, the waveguide operates in the green band. In several embodiments, waveguide layers operating in different spectral bands such as red, green, and blue (RGB) can be stacked to provide a three-layer waveguiding structure. In further embodiments, the layers are stacked with air gaps between the waveguide layers. In various embodiments, the waveguide layers operate in broader bands such as blue-green and green-red to provide two-waveguide layer solutions. In other embodiments, the gratings are color multiplexed to reduce the number of grating layers. Various types of gratings can be implemented. In some embodiments, at least one grating in each layer is a switchable grating.

Waveguides incorporating optical structures such as those discussed above can be implemented in a variety of different applications, including but not limited to waveguide displays. In various embodiments, the waveguide display is implemented with an eyebox of greater than 10 mm with an eye relief greater than 25 mm. In some embodiments, the waveguide display includes a waveguide with a thickness between 2.0-5.0 mm. In many embodiments, the waveguide display can provide an image field-of-view of at least 50° diagonal. In further embodiments, the waveguide display can provide an image field-of-view of at least 70° diagonal. The waveguide display can employ many different types of picture generation units (PGUs). In several embodiments, the PGU can be a reflective or transmissive spatial light modulator such as a liquid crystal on Silicon (LCoS) panel or a micro electromechanical system (MEMS) panel. In a number of embodiments, the PGU can be an emissive device such as an organic light emitting diode (OLED) panel. In some embodiments, an OLED display can have a luminance greater than 4000 nits and a resolution of 4 k×4 k pixels. In several embodiments, the waveguide can have an optical efficiency greater than 10% such that a greater than 400 nit image luminance can be provided using an OLED display of luminance 4000 nits. Waveguides implementing P-diffracting gratings (e.g., gratings with high efficiency for P-polarized light) typically have a waveguide efficiency of 5%-6.2%. Since P-diffracting or S-diffracting gratings can waste half of the light from an unpolarized source such as an OLED panel, many embodiments are directed towards waveguides capable of providing both S-diffracting and P-diffracting gratings to allow for an increase in the efficiency of the waveguide by up to a factor of two. In some embodiments, the S-diffracting and P-diffracting gratings are implemented in separate overlapping grating layers. Alternatively, a single grating can, under certain conditions, provide high efficiency for both p-polarized and s-polarized light. In several embodiments, the waveguide includes Bragg-like gratings produced by extracting LC from HPDLC gratings, such as those described above, to enable high S and P diffraction efficiency over certain wavelength and angle ranges for suitably chosen values of grating thickness (typically, in the range 2-5 µm).

Optical Recording Material Systems

HPDLC mixtures generally include LC, monomers, photoinitiator dyes, and coinitiators. The mixture (often referred to as syrup) frequently also includes a surfactant. For the purposes of describing the invention, a surfactant is defined as any chemical agent that lowers the surface tension of the total liquid mixture. The use of surfactants in PDLC mixtures is known and dates back to the earliest investigations of PDLCs. For example, a paper by R. L Sutherland et al., SPIE Vol. 2689, 158-169, 1996, the disclosure of which is incorporated herein by reference, describes a PDLC mixture including a monomer, photoinitiator, coinitiator, chain extender, and LCs to which a surfactant can be added. Surfactants are also mentioned in a paper by Natarajan et al, Journal of Nonlinear Optical Physics and Materials, Vol. 5 No. I 89-98, 1996, the disclosure of which is incorporated herein by reference. Furthermore, U.S. Pat. No. 7,018,563 by Sutherland; et al., discusses polymer-dispersed liquid crystal material for forming a polymer-dispersed liquid crystal optical element having: at least one acrylic acid monomer; at least one type of liquid crystal material; a photoinitiator dye; a coinitiator; and a surfactant. The disclosure of U.S. Pat. No. 7,018,563 is hereby incorporated by reference in its entirety.

The patent and scientific literature contains many examples of material systems and processes that can be used to fabricate SBGs, including investigations into formulating such material systems for achieving high diffraction efficiency, fast response time, low drive voltage, and so forth. U.S. Pat. No. 5,942,157 by Sutherland, and U.S. Pat. No. 5,751,452 by Tanaka et al. both describe monomer and liquid crystal material combinations suitable for fabricating SBG devices. Examples of recipes can also be found in papers dating back to the early 1990s. Many of these materials use acrylate monomers, including:

R. L. Sutherland et al., Chem. Mater. 5, 1533 (1993), the disclosure of which is incorporated herein by reference, describes the use of acrylate polymers and surfactants. Specifically, the recipe comprises a crosslinking multifunctional acrylate monomer; a chain extender N-vinyl pyrrolidinone, LC E7, photoinitiator rose Bengal, and coinitiator N-phenyl glycine. Surfactant octanoic acid was added in certain variants.

Fontecchio et al., SID 00 Digest 774-776, 2000, the disclosure of which is incorporated herein by reference, describes a UV curable HPDLC for reflective display applications including a multi-functional acrylate monomer, LC, a photoinitiator, a coinitiators, and a chain terminator.

Y. H. Cho, et al., Polymer International, 48, 1085-1090, 1999, the disclosure of which is incorporated herein by reference, discloses HPDLC recipes including acrylates.

Karasawa et al., Japanese Journal of Applied Physics, Vol. 36, 6388-6392, 1997, the disclosure of which is incorporated herein by reference, describes acrylates of various functional orders.

T. J. Bunning et al., Polymer Science: Part B: Polymer Physics, Vol. 35, 2825-2833, 1997, the disclosure of which is incorporated herein by reference, also describes multifunctional acrylate monomers.

G. S. Iannacchione et al., Europhysics Letters Vol. 36 (6). 425-430, 1996, the disclosure of which is incorporated herein by reference, describes a PDLC mixture including a penta-acrylate monomer, LC, chain extender, coinitiators, and photoinitiator.

Acrylates offer the benefits of fast kinetics, good mixing with other materials, and compatibility with film forming processes. Since acrylates are cross-linked, they tend to be mechanically robust and flexible. For example, urethane acrylates of functionality 2 (di) and 3 (tri) have been used extensively for HPDLC technology. Higher functionality materials such as penta and hex functional stems have also been used.

Modulation of Material Composition

High luminance and excellent color fidelity are important factors in AR waveguide displays. In each case, high uniformity across the FOV can be desired. However, the fundamental optics of waveguides can lead to non-uniformities due to gaps or overlaps of beams bouncing down the waveguide. Further non-uniformities may arise from imperfections in the gratings and non-planarity of the waveguide substrates. In SBGs, there can exist a further issue of polarization rotation by birefringent gratings. In applicable cases, the biggest challenge is usually the fold grating where there are millions of light paths resulting from multiple intersections of the beam with the grating fringes. Careful management of grating properties, particularly the refractive index modulation, can be utilized to overcome non-uniformity.

Out of the multitude of possible beam interactions (diffraction or zero order transmission), only a subset contributes to the signal presented at the eye box. By reverse tracing from the eyebox, fold regions contributing to a given field point can be pinpointed. The precise correction to the modulation that is needed to send more into the dark regions of the output illumination can then be calculated. Having brought the output illumination uniformity for one color back on target, the procedure can be repeated for other colors. Once the index modulation pattern has been established, the design can be exported to the deposition mechanism, with each target index modulation translating to a unique deposition setting for each spatial resolution cell on the substrate to be coated/deposited. The resolution of the deposition mechanism can depend on the technical limitations of the system utilized. In many embodiments, the spatial pattern can be implemented to 30 micrometers resolution with full repeatability.

Compared with waveguides utilizing surface relief gratings (SRGs), SBG waveguides implementing manufacturing techniques in accordance with various embodiments of the invention can allow for the grating design parameters that impact efficiency and uniformity, such as but not limited to refractive index modulation and grating thickness, to be adjusted dynamically during the deposition process without the need for a different master. With SRGs where modulation is controlled by etch depth, such schemes would not be practical as each variation of the grating would entail repeating the complex and expensive tooling process. Additionally, achieving the required etch depth precision and resist imaging complexity can be very difficult.

Deposition processes in accordance with various embodiments of the invention can provide for the adjustment of grating design parameters by controlling the type of material that is to be deposited. Various embodiments of the invention can be configured to deposit different materials, or different material compositions, in different areas on the substrate. For example, deposition processes can be configured to deposit HPDLC material onto an area of a substrate that is meant to be a grating region and to deposit monomer onto an area of the substrate that is meant to be a non-grating region. In several embodiments, the deposition process is configured to deposit a layer of optical recording material that varies spatially in component composition, allowing for the modulation of various aspects of the deposited material. The deposition of material with different compositions can be implemented in several different ways. In many embodiments, more than one deposition head can be utilized to deposit different materials and mixtures. Each deposition head can be coupled to a different material/mixture reservoir. Such implementations can be used for a variety of applications. For example, different materials can be deposited for grating and non-grating areas of a waveguide cell. In some embodiments, HPDLC material is deposited onto the grating regions while only monomer is deposited onto the non-grating regions. In several embodiments, the deposition mechanism can be configured to deposit mixtures with different component compositions.

In some embodiments, spraying nozzles can be implemented to deposit multiple types of materials onto a single substrate. In waveguide applications, the spraying nozzles can be used to deposit different materials for grating and non-grating areas of the waveguide. In many embodiments, the spraying mechanism is configured for printing gratings in which at least one the material composition, birefringence, and/or thickness can be controlled using a deposition apparatus having at least two selectable spray heads. In some embodiments, the manufacturing system provides an apparatus for depositing grating recording material optimized for the control of laser banding. In several embodiments, the manufacturing system provides an apparatus for depositing grating recording material optimized for the control of polarization non-uniformity. In several embodiments, the manufacturing system provides an apparatus for depositing grating recording material optimized for the control of polarization non-uniformity in association with an alignment control layer. In a number of embodiments, the deposition workcell can be configured for the deposition of additional layers such as beam splitting coatings and environmental protection layers. Inkjet print heads can also be implemented to print different materials in different regions of the substrate.

As discussed above, deposition processes can be configured to deposit optical recording material that varies spatially in component composition. Modulation of material composition can be implemented in many different ways. In a number of embodiments, an inkjet print head can be configured to modulate material composition by utilizing the various inkjet nozzles within the print head. By altering the composition on a "dot-by-dot" basis, the layer of optical recording material can be deposited such that it has a varying composition across the planar surface of the layer. Such a system can be implemented using a variety of apparatuses including but not limited to inkjet print heads. Similar to how color systems use a palette of only a few colors to produce a spectrum of millions of discrete color values, such as the CMYK system in printers or the additive RGB system in display applications, inkjet print heads in accordance with various embodiments of the invention can be configured to print optical recording materials with varying compositions using only a few reservoirs of different materials. Different types of inkjet print heads can have different precision levels and can print with different resolutions. In many embodiments, a 300 DPI ("dots per inch") inkjet print head is utilized. Depending on the precision level, discretization of varying compositions of a given number of materials can be determined across a given area. For example, given two types of materials to be printed and an inkjet print head with a precision level of 300 DPI, there are 90,001 possible discrete values of composition ratios of the two types of materials across a square inch for a given volume of printed material if each dot location can contain either one of the two types of materials. In some embodiments, each dot location can contain either one of the two types of materials or both materials. In several embodiments, more than one inkjet print head is configured to print a layer of optical recording material with a spatially varying composition. Although the printing of dots in a two-material application is essentially a binary system, averaging the printed dots across an area can allow for discretization of a sliding scale of ratios of the two materials to be printed. For example, the amount of discrete levels of possible concentrations/ratios across a unit square is given by how many dot locations can be printed within the unit square. As such, there can be a range of different concentration combinations, ranging from 100% of the first material to 100% of the second material. As can readily be appreciated, the concepts are applicable to real units and can be determined by the precision level of the inkjet print head. Although specific examples of modulating the material composition of the printed layer are discussed, the concept of modulating material composition using inkjet print heads can be expanded to use more than two different material reservoirs and can vary in precision levels, which largely depends on the types of print heads used.

Varying the composition of the material printed can be advantageous for several reasons. For example, in many embodiments, varying the composition of the material during deposition can allow for the formation of a waveguide with gratings that have spatially varying diffraction efficiencies across different areas of the gratings. In embodiments utilizing HPDLC mixtures, this can be achieved by modulating the relative concentration of liquid crystals in the HPDLC mixture during the printing process, which creates compositions that can produce gratings with varying diffraction efficiencies when the material is exposed. In several embodiments, a first HPDLC mixture with a certain concentration of liquid crystals and a second HPDLC mixture that is liquid crystal-free are used as the printing palette in an inkjet print head for modulating the diffraction efficiencies of gratings that can be formed in the printed material. In such embodiments, discretization can be determined based on the precision of the inkjet print head. A discrete level can be given by the concentration/ratio of the materials printed across a certain area. In this example, the discrete levels range from no liquid crystal to the maximum concentration of liquid crystals in the first PDLC mixture.

The ability to vary the diffraction efficiency across a waveguide can be used for various purposes. A waveguide is typically designed to guide light internally by reflecting the light many times between the two planar surfaces of the waveguide. These multiple reflections can allow for the light path to interact with a grating multiple times. In many embodiments, a layer of material can be printed with varying composition of materials such that the gratings formed have spatially varying diffraction efficiencies to compensate for the loss of light during interactions with the gratings to allow for a uniform output intensity. For example, in some waveguide applications, an output grating is configured to provide exit pupil expansion in one direction while also coupling light out of the waveguide. The output grating can be designed such that when light within the waveguide interact with the grating, only a percentage of the light is refracted out of the waveguide. The remaining portion continues in the same light path, which remains within TIR and continues to be reflected within the waveguide. Upon a second interaction with the same output grating again, another portion of light is refracted out of the waveguide. During each refraction, the amount of light still traveling within the waveguide decreases by the amount refracted out of the waveguide. As such, the portions refracted at each interaction gradually decreases in terms of total intensity. By varying the diffraction efficiency of the grating such that it increases with propagation distance, the decrease in output intensity along each interaction can be compensated, allowing for a uniform output intensity.

Varying the diffraction efficiency can also be used to compensate for other attenuation of light within a waveguide. All objects have a degree of reflection and absorption. Light trapped in TIR within a waveguide are continually reflected between the two surfaces of the waveguide. Depending on the material that makes up the surfaces, portions of light can be absorbed by the material during each interaction. In many cases, this attenuation is small, but can be substantial across a large area where many reflections occur. In many embodiments, a waveguide cell can be printed with varying compositions such that the gratings formed from the optical recording material layer have varying diffraction efficiencies to compensate for the absorption of light from the substrates. Depending on the substrates, certain wavelengths can be more prone to absorption by the substrates. In a multi-layered waveguide design, each layer can be designed to couple in a certain range of wavelengths of light. Accordingly, the light coupled by these individual layers can be absorbed in different amounts by the substrates of the layers. For example, in a number of embodiments, the waveguide is made of a three-layered stack to implement a full color display, where each layer is designed for one of red, green, and blue. In such embodiments, gratings within each of the waveguide layers can be formed to have varying diffraction efficiencies to perform color balance optimization by compensating for color imbalance due to loss of transmission of certain wavelengths of light.

In addition to varying the liquid crystal concentration within the material in order to vary the diffraction efficiency, another technique includes varying the thickness of the waveguide cell. This can be accomplished through the use of spacers. In many embodiments, spacers are dispersed throughout the optical recording material for structural support during the construction of the waveguide cell. In some embodiments, different sizes of spacers are dispersed throughout the optical recording material. The spacers can be dispersed in ascending order of sizes across one direction of the layer of optical recording material. When the waveguide cell is constructed through lamination, the substrates sandwich the optical recording material and, with structural support from the varying sizes of spacers, create a wedge-shaped layer of optical recording material. spacers of varying sizes can be dispersed similar to the modulation process described above. Additionally, modulating spacer sizes can be combined with modulation of material compositions. In several embodiments, reservoirs of HPDLC materials each suspended with spacers of different sizes are used to print a layer of HPDLC material with spacers of varying sizes strategically dispersed to form a wedge-shaped waveguide cell. In a number of embodiments, spacer size modulation is combined with material composition modulation by providing a number of reservoirs equal to the product of the number of different sizes of spacers and the number of different materials used. For example, in one embodiment, the inkjet print head is configured to print varying concentrations of liquid crystal with two different spacer sizes. In such an embodiment, four reservoirs can be prepared: a liquid crystal-free mixture suspension with spacers of a first size, a liquid crystal-free mixture-suspension with spacers of a second size, a liquid crystal-rich mixture-suspension with spacers of a first size, and a liquid crystal-rich mixture-suspension with spacers of a second size. Further discussion regarding material modulation can be found in U.S. application Ser. No. 16/203,071 filed Nov. 18, 2018 entitled "SYSTEMS AND METHODS FOR MANUFACTURING WAVEGUIDE CELLS." The disclosure of U.S. application Ser. No. 16/203,491 is hereby incorporated by reference in its entirety for all purposes.

Multi-Layered Waveguide Fabrication

Waveguide manufacturing in accordance with various embodiments of the invention can be implemented for the fabrication of multi-layered waveguides. Multi-layered waveguides refer to a class of waveguides that utilizes two or more layers having gratings or other optical structures. Although the discussions below may pertain to gratings, any type of holographic optical structure can be implemented and substituted as appropriate. Multi-layered waveguides can be implemented for various purposes, including but not limited to improving spectral and/or angular bandwidths. Traditionally, multi-layered waveguides are formed by stacking and aligning waveguides having a single grating layer. In such cases, each grating layer is typically bounded by a pair of transparent substrates. To maintain the desired total internal reflection characteristics, the waveguides are usually stacked using spacers to form air gaps between the individual waveguides.

In contrast to traditional stacked waveguides, many embodiments of the invention are directed to the manufacturing of multi-layered waveguides having alternating substrate layers and grating layers. Such waveguides can be fabricated with an iterative process capable of sequentially forming grating layers for a single waveguide. In several embodiments, the multi-layered waveguide is fabricated with two grating layers. In a number of embodiments, the multi-layered waveguide is fabricated with three grating layers. Any number of grating layers can be formed, limited by the tools utilized and/or waveguide design. Compared to traditional multi-layered waveguides, this allows for a reduction in thickness, materials, and costs as fewer substrates are needed. Furthermore, the manufacturing process for such waveguides allow for a higher yield in production due to simplified alignment and substrate matching requirements.

Manufacturing processes for multi-layered waveguides having alternating transparent substrate layers and grating layers in accordance with various embodiments of the invention can be implemented using a variety of techniques. In many embodiments, the manufacturing process includes depositing a first layer of optical recording material onto a first transparent substrate. Optical recording material can include various materials and mixtures, including but not limited to HPDLC mixtures and any of the material formulations discussed in the sections above. Similarly, any of a variety of deposition techniques, such as but not limited to spraying, spin coating, inkjet printing, and any of the techniques described in the sections above, can be utilized. Transparent substrates of various shapes, thicknesses, and materials can be utilized. Transparent substrates can include but are not limited to glass substrates and plastic substrates. Depending on the application, the transparent substrates can be coated with different types of films for various purposes. Once the deposition process is completed, a second transparent substrate can then be placed onto the deposited first layer of optical recording material. In some embodiments, the process includes a lamination step to form the three-layer composite into a desired height/thickness. An exposure process can be implemented to form a set of gratings within the first layer of optical recording material. Exposure processes, such as but not limited to single-beam interferential exposure and any of the other exposure processes described in the sections above, can be utilized. In essence, a single-layered waveguide is now formed. The process can then repeat to add on additional layers to the waveguide. In several embodiments, a second layer of optical recording material is deposited onto the second transparent substrate. A third transparent substrate can be placed onto the second layer of optical recording material. Similar to the previous steps, the composite can be laminated to a desired height/thickness. A second exposure process can then be performed to form a set of gratings within the second layer of optical recording material. The result is a waveguide having two grating layers. As can readily be appreciated, the process can continue iteratively to add additional layers. The additional optical recording layers can be added onto either side of the current laminate. For instance, a third layer of optical recording material can be deposited onto the outer surface of either the first transparent substrate or the third transparent substrate.

In many embodiments, the manufacturing process includes one or more post processing steps. Post processing steps such as but not limited to planarization, cleaning, application of protective coats, thermal annealing, alignment of LC directors to achieve a desired birefringence state, extraction of LC from recorded SBGs and refilling with another material, etc. can be carried out at any stage of the manufacturing process. Some processes such as but not limited to waveguide dicing (where multiple elements are being produced), edge finishing, AR coating deposition, final protective coating application, etc. are typically carried out at the end of the manufacturing process.

In many embodiments, spacers, such as but not limited to beads and other particles, are dispersed throughout the optical recording material to help control and maintain the thickness of the layer of optical recording material. The spacers can also help prevent the two substrates from collapsing onto one another. In some embodiments, the waveguide cell is constructed with an optical recording layer sandwiched between two planar substrates. Depending on the type of optical recording material used, thickness control can be difficult to achieve due to the viscosity of some optical recording materials and the lack of a bounding perimeter for the optical recording layer. In a number of embodiments, the spacers are relatively incompressible solids, which can allow for the construction of waveguide cells with consistent thicknesses. The spacers can take any suitable geometry, including but not limited to rods and spheres. The size of a spacer can determine a localized minimum thickness for the area around the individual spacer. As such, the dimensions of the spacers can be selected to help attain the desired optical recording layer thickness. The spacers can take any suitable size. In many cases, the sizes of the spacers range from 1 to 30 µm. The spacers can be made of any of a variety of materials, including but not limited to plastics (e.g. divinylbenzene), silica, and conductive materials. In several embodiments, the material of the spacers is selected such that its refractive index does not substantially affect the propagation of light within the waveguide cell.

In many embodiments, the first layer of optical recording material is incorporated between the first and second transparent substrates using vacuum filling methods. In a number of embodiments, the layer of optical recording materials is separated in different sections, which can be filled or deposited as appropriate depending on the specific requirements of a given application. In some embodiments, the manufacturing system is configured to expose the optical recording material from below. In such embodiments, the iterative multi-layered fabrication process can include turning over the current device such that the exposure light is incident on a newly deposited optical recording layer before it is incident on any formed grating layers.

In many embodiments, the exposing process can include temporarily "erasing" or making transparent the previously formed grating layer such that they will not interfere with the recording process of the newly deposited optical recording layer. Temporarily "erased" gratings or other optical structures can behave similar to transparent materials, allowing light to pass through without affecting the ray paths. Methods for recording gratings into layers of optical recording material using such techniques can include fabricating a stack of optical structures in which a first optical recording material layer deposited on a substrate is exposed to form a first set of gratings, which can be temporarily erased so that a second set of gratings can be recorded into a second optical recording material layer using optical recording beams traversing the first optical recording material layer. Although the recording methods are discussed primarily with regards to waveguides with two grating layers, the basic principle can be applied to waveguides with more than two grating layers.

Multi-layered waveguide fabrication processes incorporating steps of temporarily erasing a grating structure can be implemented in various ways. Typically, the first layer is formed using conventional methods. The recording material utilized can include material systems capable of supporting optical structures that can be erased in response to a stimulus. In embodiments in which the optical structure is a holographic grating, the exposure process can utilize a crossed-beam holographic recording apparatus. In a number of embodiments, the optical recording process uses beams provided by a master grating, which may be a Bragg hologram recorded in a photopolymer or an amplitude grating. In some embodiments, the exposure process utilizes a single recording beam in conjunction with a master grating to form an interferential exposure beam. In addition to the processes described, other industrial processes and apparatuses currently used in the field to fabricate holograms can be used.

Once a first set of gratings is recorded, additional material layers can be added similar to the processes described above.

During the exposure process of any material layer after the first material layer, an external stimulus can be applied to any previously formed gratings to render them effectively transparent. The effectively transparent grating layers can allow for light to pass through to expose the new material layer. External stimulus/stimuli can include optical, thermal, chemical, mechanical, electrical, and/or magnetic stimuli. In many embodiments, the external stimulus is applied at a strength below a predefined threshold to produce optical noise below a predefined level. The specific predefined threshold can depend on the type of material used to form the gratings. In some embodiments, a sacrificial alignment layer applied to the first material layer can be used to temporarily erase the first set of gratings. In some embodiments, the strength of the external stimulus applied to the first set of gratings is controlled to reduced optical noise in the optical device during normal operation. In several embodiments, the optical recording material further includes an additive for facilitating the process of erasing the gratings, which can include any of the methods described above. In a number of embodiments, a stimulus is applied for the restoration of an erased layer.

The clearing and restoration of a recorded layer described in the process above can be achieved using many different methods. In many embodiments, the first layer is cleared by applying a stimulus continuously during the recording of the second layer. In other embodiments, the stimulus is initially applied, and the grating in the cleared layer can naturally revert to its recorded state over a timescale that allows for the recording of the second grating. In other embodiments, the layer stays cleared after application of an external stimulus and reverts in response to another external stimulus. In several embodiments, the restoration of the first optical structure to its recorded state can be carried out using an alignment layer or an external stimulus. An external stimulus used for such restoration can be any of a variety of different stimuli, including but not limited to the stimulus/stimuli used to clear the optical structure. Depending on the composition material of the optical structure and layer to be cleared, the clearing process can vary. Further discussion regarding the multi-layered waveguide fabrication utilizing external stimuli can be found in U.S. application Ser. No. 16/522,491 filed Jul. 25, 2019 entitled "Systems and Methods for Fabricating a Multilayer Optical Structure." The disclosure of U.S. application Ser. No. 16/522,491 is hereby incorporated by reference in its entirety for all purposes.

Waveguides Incorporating Integrated Dual Axis (IDA) Waveguides

Waveguides in accordance with various embodiments of the invention can include different grating configurations. In many embodiments, the waveguide includes at least one input coupler and at least two integrated gratings. In some embodiments, at least two integrated gratings can be implemented to work in combination to provide beam expansion and beam extraction for light coupled into the waveguide by the input coupler. Multiple integrated gratings can be implemented by overlapping integrated gratings across different grating layers or by multiplexing the integrated gratings. In a number of embodiments, the integrated gratings are partially overlapped or multiplexed. Multiplexed gratings can include the superimposition of at least two gratings having different grating prescriptions within the same volume. Gratings having different grating prescriptions can have different grating vectors and/or grating slant with respect to the waveguide's surface. The magnitude of the grating vector of a grating can be defined as the inverse of the grating period while its direction can be defined as the direction orthogonal to the fringes of the grating.

In several embodiments, an integrated can be implemented to perform both beam expansion and beam extraction. An integrated grating can be implemented with one or more grating prescriptions. In a number of embodiments, the integrated grating is implemented with at least two grating prescriptions. In further embodiments, the integrated grating is implemented with at least three grating prescriptions. In many embodiments, two grating prescriptions within the integrated grating have similar clock angles. In some embodiments, the two grating prescriptions have different slant angles. An integrated grating in accordance with various embodiments of the invention can be implemented using a variety of types of gratings, such as but not limited to SRGs, SBGs, holographic gratings, and other types of gratings including those described in the sections above. In a number of embodiments, the integrated grating includes two surface relief gratings. In other embodiments, the integrated grating includes two holographic gratings.

The integrated grating can include at least two grating prescriptions that are at least partially overlapped or multiplexed. In further embodiments, the integrate grating includes at least two grating prescriptions that are fully overlapped or multiplexed. In a number of embodiments, the integrated grating includes multiplexed or overlapping gratings that have different sizes and/or shapes—i.e., one grating may be larger than the other, resulting in only partial multiplexing of the larger grating. As can readily be appreciated, various multiplexed and overlapping configurations may be implemented as appropriate depending on the specific requirements of a given application. Although the discussions below may describe configurations as implementing multiplexed or overlapping gratings, such gratings can be substituted for one another as appropriate depending on the application. In several embodiments, the integrated gratings are implemented by a combination of both multiplexed and overlapping gratings. For example, two or more sets of multiplexed gratings can be overlapped across two or more grating layers.

Integrated gratings in accordance with various embodiments of the invention can be utilized for various purposes including but not limited to implementing full color waveguides and addressing some key problems in conventional waveguide architectures. Other advantages include reduced material and waveguide refractive index requirements and reduced waveguide dimensions resulting from the overlapping and/or multiplexing nature of the integrated gratings. Such configurations can allow for large field-of-view waveguides, which would ordinarily incur unacceptable increases in waveguide form factor and refractive index requirements. In many embodiments, a waveguide is implemented with at least one substrate having a low refractive index. In some embodiments, the waveguide is implemented with a substrate having a refractive index of lower than 1.8. In further embodiments, the waveguide is implemented with a substrate having a refractive index of not more than ~1.5.

Integrated gratings that can provide beam expansion and beam extraction—i.e., the functions of conventional fold and output gratings—can result in a much smaller grating area, enabling a small form factor and lower fabrication cost. By integrating the functions of beam expansion and extraction, instead of performing them serially as in traditional waveguides, beam expansion and extraction can be accomplished with ~50% of the grating interactions normally required, cutting down haze in the same proportion in the case of birefringent gratings. A further advantage is that, as a result of the greatly shortened light paths, the number of beam bounces at glass/air interface(s) is reduced, rendering the output image less sensitive to substrate nonuniformities. This can enable higher quality images and the potential to use less expensive, lower specification substrates.

In many embodiments, the grating vectors of the input coupler and integrated gratings are arranged to provide a substantially zero resultant vector. The grating vectors of the input coupler and integrated gratings can be arranged to form a triangular configuration. In several embodiments, the grating vectors can be arranged in an equilateral triangular configuration. In some embodiments, the grating vectors can be arranged in an isosceles triangular configuration where at least two grating vectors have equal magnitudes. In further embodiments, the grating vectors are arranged in an isosceles right triangular configuration. In a number of embodiments, the grating vectors are arranged in a scalene triangular configuration. Another waveguide architecture includes integrated diffractive elements with grating vectors aligned in the same direction for providing horizontal expansion for one set of angles and extraction for a separate set of angles. In several embodiments, one or more of the integrated gratings are asymmetrical in their general shape. In some embodiments, one or more of the integrated gratings has at least one axis of symmetry in their general shape. In a number of embodiments, the gratings are designed to sandwich an electro-active material, enabling switching between clear and diffracting states for certain types of gratings such as but not limited to HPDLC gratings. The gratings can be a surface relief or a holographic type.

In many embodiments, a waveguide supporting at least one input coupler and first and second integrated gratings is implemented. The grating structures can be implemented in single- or multi-layered waveguide designs. In single-layered designs, the integrated gratings can be multiplexed. In embodiments where each integrated grating contains at least two multiplexed gratings, the multiplexed integrated gratings can contain at least four multiplexed gratings. As described above, any individual multiplexed grating can be partially or completely multiplexed with the other gratings. In some embodiments, a multi-layered waveguide is implemented with overlapping integrated gratings. In further embodiments, the integrated gratings are partially overlapped. Each of the integrated gratings can be a separate grating or multiplexed gratings.

In many embodiments, the waveguide architecture is designed to couple the input light into two bifurcated paths using an input coupler. Such configurations can be implemented in various ways. In some embodiments, a multiplexed input grating is implemented to couple input light into two bifurcated paths. In other embodiments, two input gratings are implemented to separately couple input light into two bifurcated paths. The two input gratings can be implemented in the same layer or separately in two layers. In a number of embodiments, two overlapping or partially overlapping input gratings are implemented to couple input light into two bifurcated paths. In many embodiments, the input coupler includes a prism. In further embodiments, the input coupler includes a prism and any of the input grating configuration described above.

In addition to various input coupler architectures, the first and second integrated gratings can be implemented in a variety of configurations. Integrated gratings in accordance with various embodiments of the invention can be incorporated into waveguides to perform the dual function of two-dimensional beam expansion and beam extraction. In several embodiments, the first and second integrated gratings are crossed gratings. As described above, some waveguide architectures include designs in which input light is coupled into two bifurcated paths. In such designs, the two bifurcated paths are each directed towards a different integrated grating. As can readily be appreciated, such configurations can be designed to bifurcate the input light based on various light characteristics, including but not limited to angular and spectral bandwidths. In some embodiments, light can be bifurcated based on polarization states—e.g., input unpolarized light can be bifurcated into S and P polarization paths. In many embodiments, each of the integrated gratings performs either beam expansion in a first direction or beam expansion in a second direction different from the first direction according to the field-of-view portion being propagated through the waveguide. The first and second directions can be orthogonal to one another. In other embodiments, the first and second directions are not orthogonal to one another. Each integrated grating can provide expansion of the light in a first dimension while directing the light towards the other integrated grating, which provides expansion of the light in a second dimension and extraction. For example, many grating architectures in accordance with various embodiments of the invention include an input configuration for bifurcating input light into first and second portions of light. A first integrated grating can be configured to provide beam expansion in a first direction for the first and second portions of light and to provide beam extraction for the second portion of light. Conversely, the second integrated grating can be configured to provide beam expansion in a second direction for the first and second portions of light and to provide beam extraction for the first portion of light.

In a number of embodiments, the first integrated grating includes multiplexed first and second grating prescriptions, and the second integrated grating includes multiplexed third and fourth grating prescriptions. In such embodiments, the first grating prescription can be configured to provide beam expansion in a first direction for the first portion of light and to redirect the expanded light towards the fourth grating prescription. The second grating prescription can be configured to provide beam expansion in the first direction for the second portion of light and to extract the light out of the waveguide. The third grating prescription can be configured to provide beam expansion in a second direction for the second portion of light and to redirect the expanded light towards the second grating prescription. The fourth grating prescription can be configured to provide beam expansion in the second direction for the first portion of light and to extract the light out of the waveguide. As can readily be appreciated, the integrated gratings can be implemented with overlapping grating prescriptions instead of multiplexed grating prescriptions. In many embodiments, the first and second grating prescriptions have the same clock angle but different grating slants. In some embodiments, the third and fourth grating prescriptions have the same clock angle, which is different from the clock angles of the first and second grating prescriptions. In a number of embodiments, the first, second, third, and fourth grating prescriptions all have different clock angles. In several embodiments, the first, second, third, and fourth grating prescriptions all have different grating periods. In a number of embodiments, the first and third grating prescriptions have the same grating period, and the second and fourth grating prescriptions have the same grating period.

FIG. 1 conceptually illustrates a waveguide display including an Integrated Dual Axis (IDA) waveguide in accordance with an embodiment of the invention. As shown, the apparatus 100 includes a waveguide 101 supporting an input grating 102 and a grating structure 103. Each grating can be characterized by a grating vector defining the orientation of the grating fringes in the plane of the waveguide. A grating can also be characterized by a K-vector in 3D space, which in the case of a Bragg grating is defined as the vector normal to the grating fringes. The waveguide reflecting surfaces are parallel to the XY plane of the Cartesian reference frame inset into the drawing. In some embodiments, the X and Y axes can correspond to global horizontal and vertical axes in the reference frame of a user of the display.

In the illustrative embodiment of FIG. 1, the input grating 102 includes a Bragg grating 104. In other embodiments, the input grating 102 is a surface relief grating. The input grating 102 can be implemented to bifurcate input light into two different portions. In further embodiments, the input grating 102 includes two multiplexed gratings having different grating prescriptions. In other embodiments, the input grating 102 includes two overlaid surface relief gratings. The grating structure 103 includes two effective gratings 105,106 that have different grating vectors. The gratings 105,106 can be integrated gratings implemented as surface relief gratings or volume gratings. In many embodiments, the gratings 105,106 are multiplexed in a single layer. In several embodiments, the waveguide 101 provides two effective gratings at all points across the grating structure 103 by overlaying more than two separated gratings in the grating structure. For ease of clarity, the gratings 105,106 that form the grating structure 103 will be referred to as first and second integrated gratings since their role in the grating structure includes providing beam expansion by changing the direction of the guided beam in the plane of the waveguide and beam extraction. In various embodiments, the integrated gratings 105,106 perform two-dimensional beam expansion and extraction of light from the waveguide 101. The field-of-view coupled into the waveguide can be partitioned into first and second portions, which can be bifurcated as such by the input grating 102. In many embodiments, the first and second portions correspond to positive and negative angles, vertically or horizontally. In some embodiments, the first and second portions may overlap in angle space. In a number of embodiments, the first portion of the field-of-view is expanded in a first direction by the first integrated grating and, in a parallel operation, expanded in a second direction and extracted by the second integrated grating. When a ray interacts with a grating fringe, some of the light that meets the Bragg condition is diffracted while non-diffracted light proceeds along its TIR path up to the next fringe, continuing the expansion and extraction process. Considering next the second portion of the field-of-view, the role of the gratings is reversed such that the second portion of the field is expanded in the second direction by the second integrated grating and expanded in the first direction and extracted by the first integrated grating.

In many embodiments, the integrated gratings 105,106 in the grating structure 103 can be asymmetrically disposed. In some embodiments, the integrated gratings 105,106 have grating vectors of different magnitudes. In several embodiments, the input grating 102 can have a grating vector offset from the Y-axis. In a number of embodiments, it is desirable that the vector combination of the grating vectors of the input grating 102 and the integrated gratings 105,106 in the grating structures 103 gives a resultant vector of substantially zero magnitude. As described above, the grating vectors can be arranged in an equilateral, isosceles, or scalene triangular configuration. Depending on the application, certain configurations may be more desirable.

In many embodiments, at least one grating parameter selected from the group of grating vector direction, K-vector direction, grating refractive index modulation, and grating spatial frequency can vary spatially across at least one grating implemented in the waveguide for the purposes of optimizing angular bandwidth, waveguide efficiency, and output uniformity to increase the angular response and/or efficiency. In some embodiments, at least one of the gratings implemented in the waveguide can employ rolled K-vectors—i.e., spatially varying K-vectors. In several embodiments, the spatial frequencies of the grating(s) are matched to overcome color dispersion.

The apparatus 100 of FIG. 1 further includes an input image generator. In the illustrative embodiment, the input image generator includes a laser scanning projector 107 that provides a scanned beam 107A over a field-of-view that is coupled into total internal reflection paths (TIR paths) (108A,108B, for example) in the waveguide by the input grating 102 and is directed towards the integrated gratings 105,106 to be expanded and extracted (as shown by rays 109A,109B, for example). In some embodiments, the laser projector 107 is configured to inject a scanned beam into the waveguide. In several embodiments, the laser projector 107 can have a scan pattern modified to compensate for optical distortions in the waveguide. In a number of embodiments, the laser scanning pattern and/or grating prescriptions in the input grating 102 and grating structure 103 can be modified to overcome illumination banding. In various embodiments, the laser scanning projector 107 can be replaced by an input image generator based on a microdisplay illuminated by a laser or an LED. In many embodiments, the input image can be provided by an emissive display. A laser projector can offer the advantages of improved color gamut, higher brightness, wider field-of-view, high resolution, and a very compact form factor. In some embodiments, the apparatus 100 can further include a despeckler. In further embodiments, the despeckler can be implemented as a waveguide device.

Although FIG. 1 shows a specific waveguide application implementing integrated gratings, such structures and grating architectures can be utilized for various applications. In a number of embodiments, a waveguide having integrated gratings can be implemented in a single grating layer for a full color application. In many embodiments, more than one grating layer implementing integrated gratings are implemented. Such configurations can be implemented to provide wider angular or spectral bandwidth operation. In some embodiments, a multi-layered waveguide is implemented to provide a full color application. In several embodiments, a multi-layered waveguide is implemented to provide a wider field-of-view. In many embodiments, a full color waveguide having at least a ~50° diagonal field-of-view is implemented using integrated gratings. In some embodiments, a full color waveguide having at least a ~100° diagonal field-of-view is implemented using integrated gratings.

Figure 2:
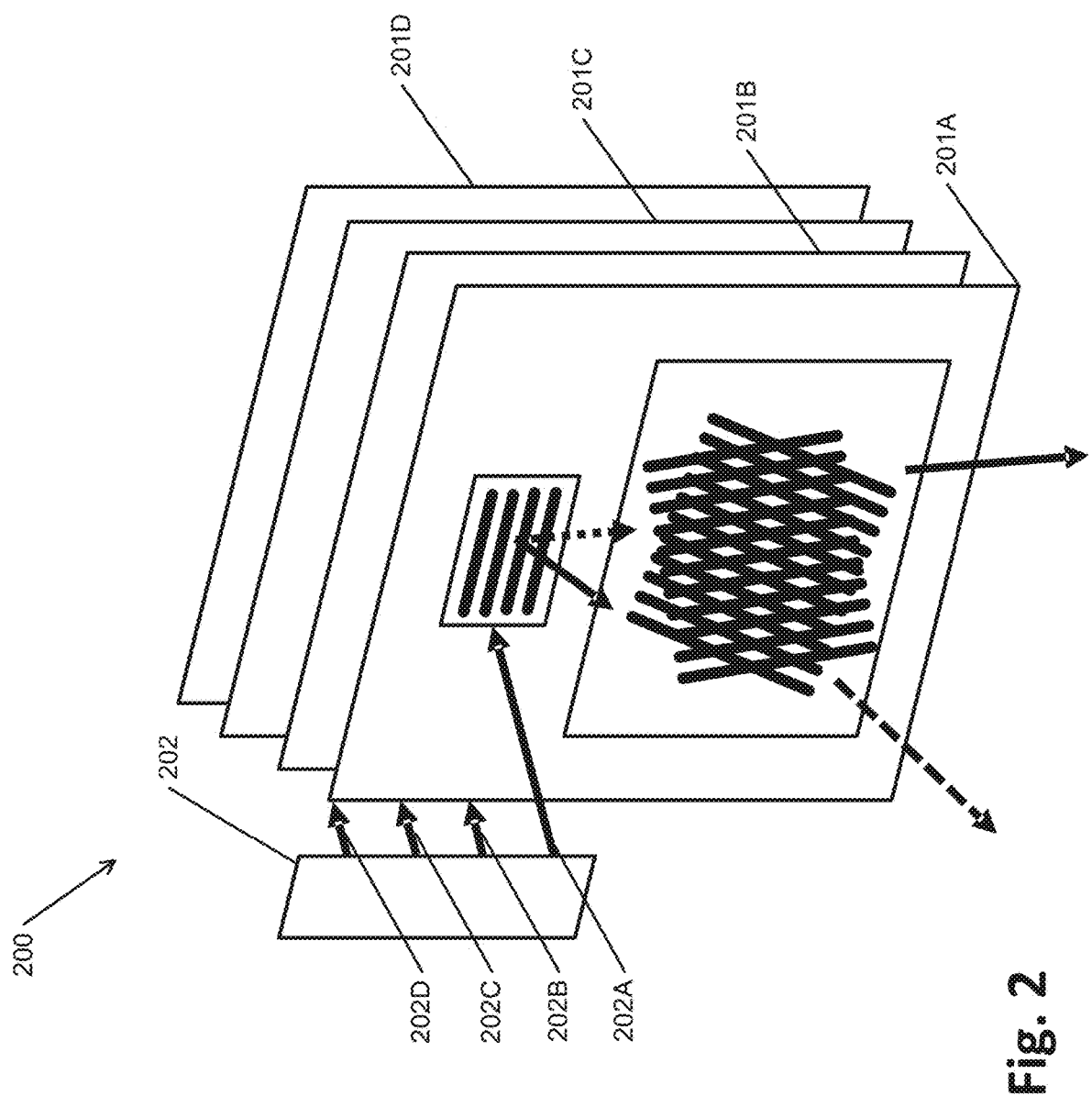
FIG. 2 conceptually illustrates a color waveguide display having two blue-green diffracting waveguides and two green-red diffracting waveguides in accordance with an embodiment of the invention.

FIG. 2 conceptually illustrates a color waveguide display having two blue-green diffracting waveguides and two green-red diffracting waveguides in accordance with an embodiment of the invention. FIG. 2 schematically illustrates an apparatus 200 with an architecture similar to that of FIG. 1 but includes the use of four stacked waveguides 201A-201D, including two blue-green diffracting waveguides and two green-red diffracting waveguides. As shown, the apparatus 200 includes a laser scanning projector 202 that provides scanning beams 202A-202D. In the illustrative embodiment, the waveguides providing each color band can be configured to propagate different field-of-view portions. For example, in some embodiments, each of the waveguides operating in a given color band provides a field-of-view of 35° h×35° v (50° diagonal), yielding 70° h×35° v (78° diagonal) field-of-view for each color band when the two fields of view are combined. In many embodiments, the scanning beams can be generated using red, green, and blue laser emitters with each light of two laser wavelengths selected from red, green, and blue being injected into each waveguide according to the color band intended to be propagated by the waveguide. The laser beam intensities can be modulated for the purpose of color balancing. The stacked waveguides can be arranged in any order. In several embodiments, consideration of factors such as but not limited to color crosstalk can influence the stack order. In a number of embodiments, the integrated gratings of one waveguide are partially or completely overlapped with the integrated gratings of another waveguide. As described above, the integrated gratings can be implemented in various configurations. In some embodiments, the integrated gratings are implemented across more than one grating layer. In several embodiments, each of the integrated gratings includes two multiplexed grating prescriptions.

In many embodiments, the optical geometrical requirements for combining waveguide paths for more than one field-of-view or color band can dictate an asymmetric arrangement of the gratings used in the input grating(s) and the integrated gratings. In other words, the grating vectors of the input grating and the integrated gratings are not equilaterally disposed or symmetrically disposed about the Y axis.

Although FIGS. 1 and 2 show specific configurations of waveguide architectures, various structures can be implemented as appropriate depending on the specific requirements of a given application. In some embodiments, a six-layered waveguide is implemented for full color applications. The six-layered waveguide can be implemented with three pairs of layers configured for color bands of red, green, and blue, respectively. In such embodiments, waveguides within each pair can be configured for different field-of-view portions.

Figure 3A:
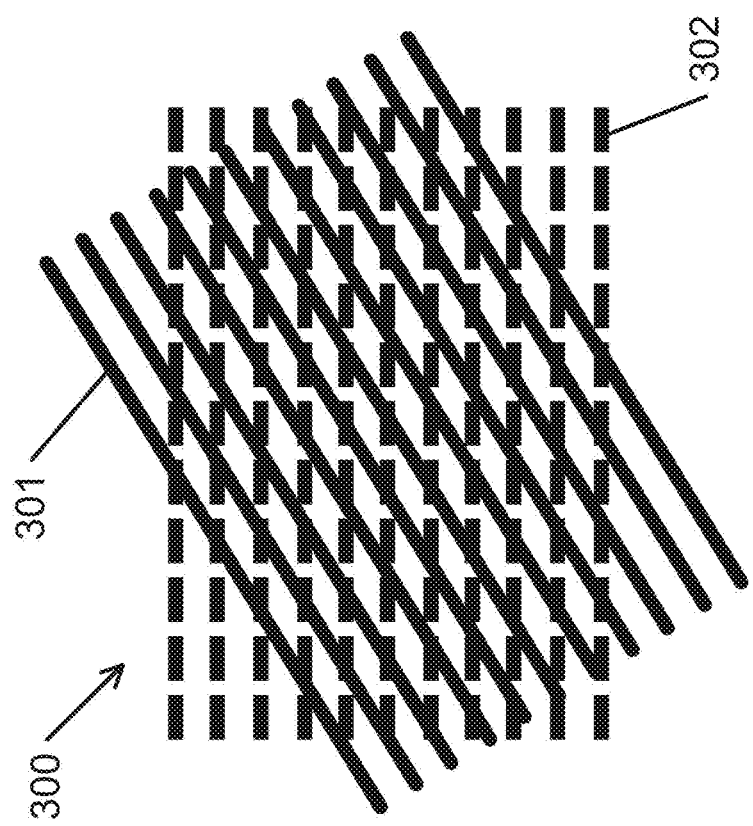
Figure 3C:
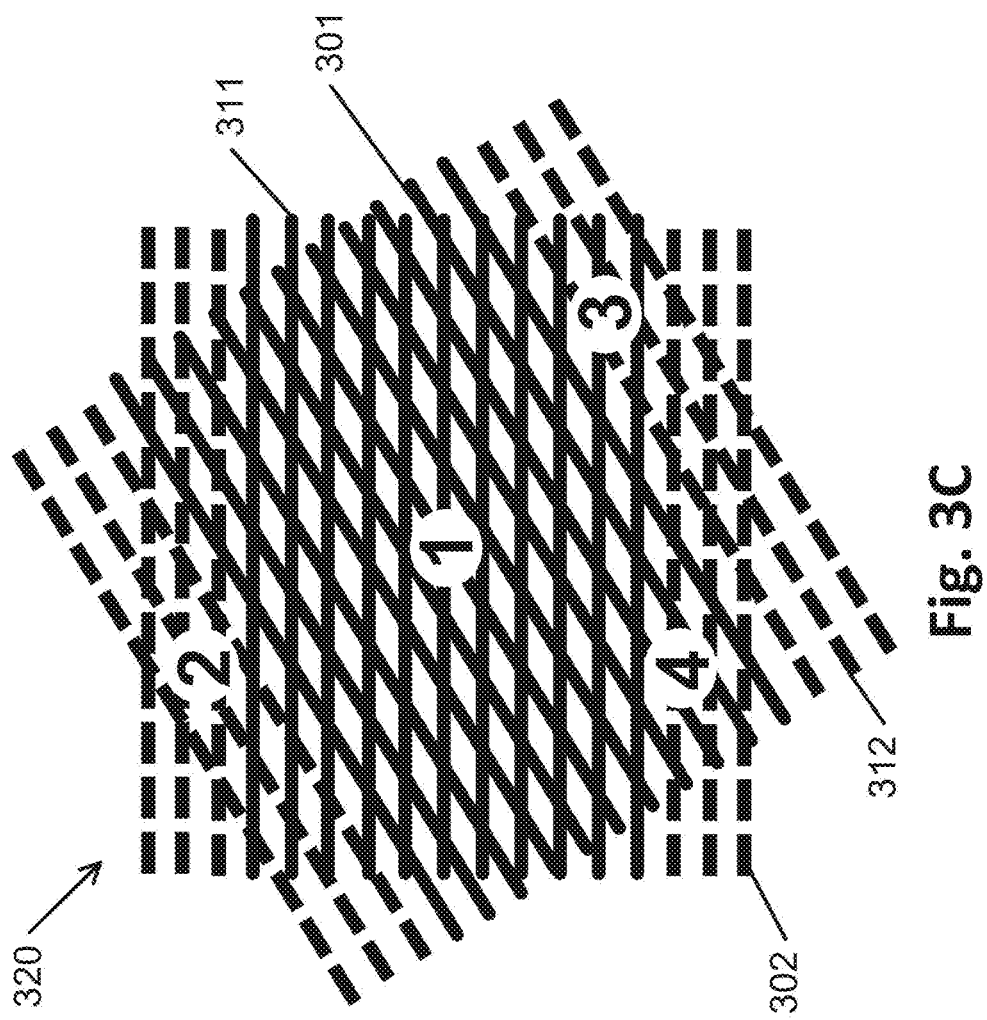

In some embodiments, to perform beam expansion and extraction, the waveguide is designed such that each point of interaction of a ray with a grating structure occurs in a region of overlapping effective gratings. In a non-fully overlapped grating configuration, the grating structures will have regions in which the first and second effective gratings only partially overlap such that some rays interact with only one of the effective gratings. In many embodiments, the grating structures are formed from two multiplexed gratings. The first of the multiplexed grating 300, which is shown in FIG. 3A, multiplexes a first effective grating 301 with one 302 having a different effective grating vector (or clock angle). The second multiplexed grating 310, which is shown in FIG. 3B, multiplexes a second effective grating 311 with one 312 having a different effective grating vector. FIGS. 3A-3B are intended to illustrate the relative orientations of the multiplexed gratings and do not represent the shapes of the gratings as implemented. In some embodiments, the gratings 301,302 and 311,312 may differ in shape from each other. In the embodiments of FIGS. 3A-3B, the grating vector (clock angle) of the second multiplexed grating is identical to the first grating vector of the first multiplexed grating. Likewise, the grating vector of the first multiplexed grating is identical to the second grating vector of the second multiplexed grating. Turning now to FIG. 3C, it should be apparent that when the gratings are overlapped 320, there are two gratings of different clock angles at any point in the grating structures (e.g., in the regions of partial overlap—labeled by numerals 2-4 in FIG. 3C) of the effective gratings. In the regions of full overlap (labelled by numeral 1 in FIG. 3C) of the effective gratings, there will be four gratings overlapping any point in the grating structures. However, in such regions, each pair of gratings having the same clock angle results in only two overlapping effective gratings. It should be appreciated from the above description that, in many embodiments, the two pairs of multiplexed gratings could be implemented as one multiplexed grating formed from the four gratings 301,302 and 311, 312.

Figure 4A:
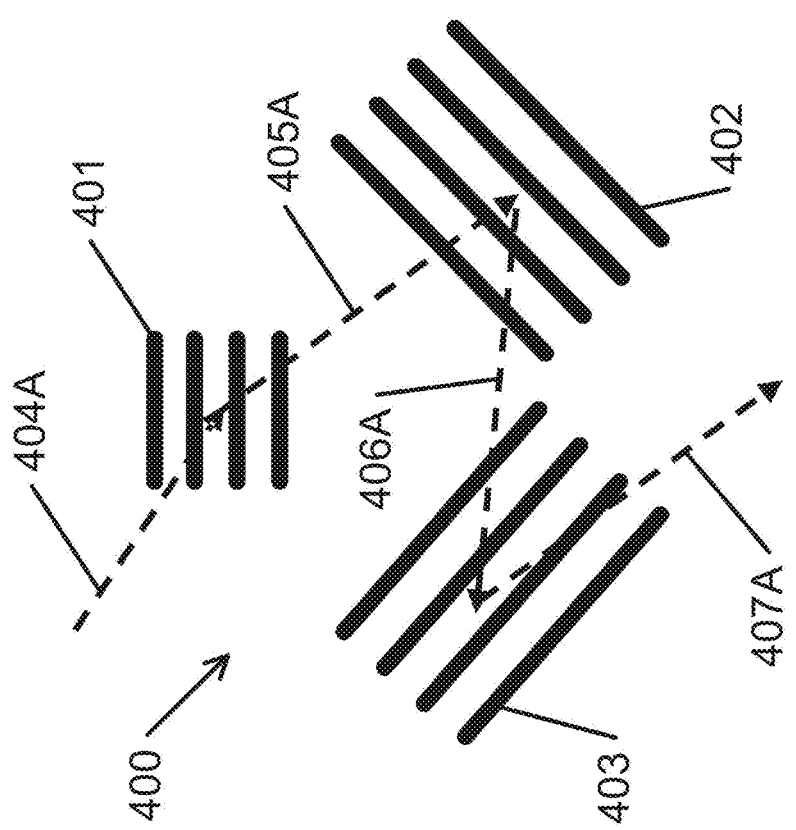

FIGS. 4A-4C schematically illustrate ray propagation through a grating structure 400 having an input grating 401 and two integrated gratings 402,403 in accordance with an embodiment of the invention. The ray propagation is illustrated using unfolded ray paths to clarify the interaction between the rays and gratings. As shown in the schematic diagram of FIG. 4A, light from a first portion of the FOV shows a ray 404A coupled into a TIR path in the waveguide by the input grating 401, a TIR ray 405A leading to the first integrated grating 402, a TIR ray 406A diffracted by the first integrated grating 403 (which also provides beam expansion in a first direction), and a ray 407A diffracted out of the waveguide by the second integrated grating 403 (which also provides beam expansion in a second direction). Turning now to the propagation of the second portion of the FOV, which is shown in FIG. 4B, the ray path includes a ray 404B coupled into a TIR path in the waveguide by the input grating 401, a TIR ray 405B leading to the second integrated grating 403, a TIR ray 406B diffracted by the second integrated grating 403 (which also provides beam expansion in the second direction), and a TIR ray 407B diffracted out of the waveguide by the first integrated grating 402 (which also provides beam expansion in the first direction). FIG. 4C shows the combined paths of FIGS. 4A-4B with the integrated gratings overlaid. FIG. 4C also shows the partial overlapping nature of the integrated gratings along the paths of the rays. As can readily be appreciated, such configurations can be modified as appropriate depending on the specific requirements of a given application. Gratings of various shapes can be utilized. An integrated grating can include two multiplexed gratings, one providing the function of a traditional fold grating and another for extracting the light similar to a traditional output grating. Each of the two multiplexed gratings within a single integrated grating can be configured to act on different portions of light bifurcated by the input configuration. In a number of embodiments, the two multiplexed gratings within a single integrated grating can have different shapes—i.e., certain areas of one or both of the gratings are not multiplexed. In some embodiments, more than two gratings are multiplexed for a single integrated grating. In many embodiments, the integrated gratings are multiplexed in a single grating layer. In several embodiments, the integrated gratings are fully multiplexed or overlapped. In other embodiments, only portions of the integrated gratings are multiplexed overlapped.

Figure 5A:
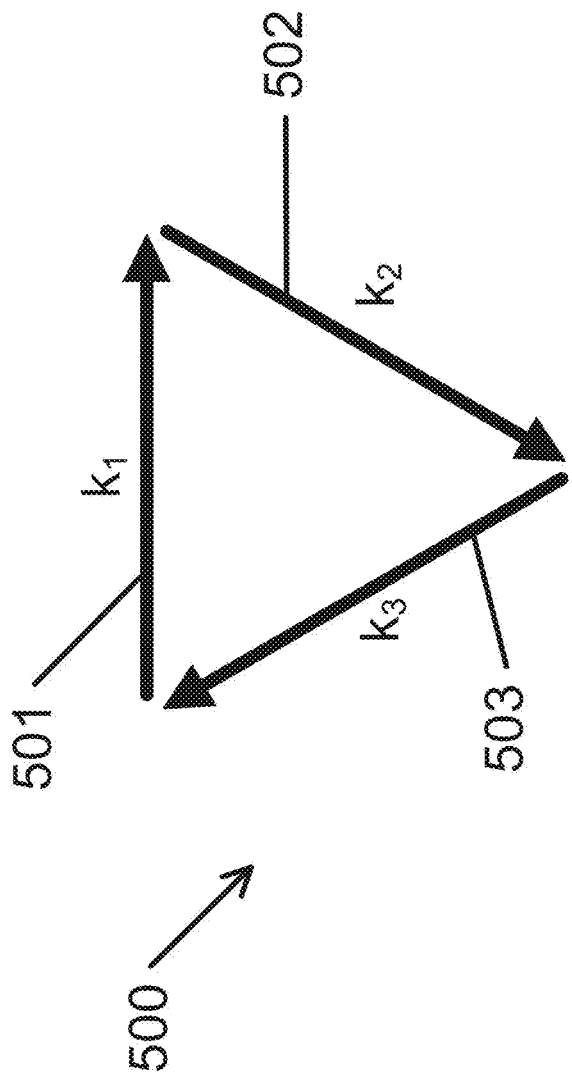
Figure 5B:
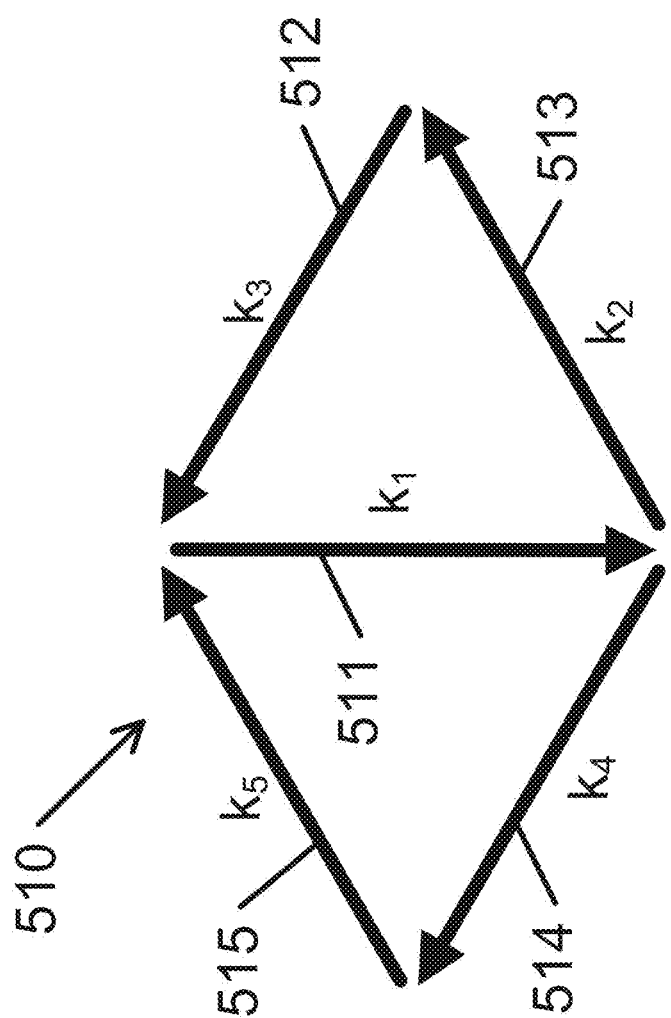

As described above, grating architectures including those implementing integrated gratings can be described and visualized using grating vectors. In many embodiments, three grating vectors, which can represent traditional input, fold, and output functions, can be implemented with a substantially zero resultant vector. FIG. 5A conceptually illustrates a grating vector configuration with a substantially zero resultant vector in accordance with an embodiment of the invention. As shown, the configuration 500 includes three grating vectors 501-503 represented as $k_1$, $k_2$, and $k_3$, respectively. With three grating vectors, configurations having a substantially zero resultant vector can provide various triangular configurations, such as but not limited to equilateral triangles, isosceles triangles, and scalene triangles. In the case of architectures utilizing integrated gratings, more than one triangular configuration can be visualized. FIG. 5B conceptually illustrates one such embodiment. As shown, the configuration 510 illustrates two triangular configurations. One triangular configuration is formed by grating vectors $k_1$, $k_2$, and $k_3$ (511-513), and a second configuration is formed by grating vectors $k_1$, $k_4$, and $k_5$ (511, 514, and 515). In the illustrative embodiment, grating vector $k_1$ represents the function of the input coupler, grating vectors $k_2$ and $k_5$ represent the functions of a first integrated grating, and grating vectors $k_4$ and $k_3$ represent the functions of a second integrated grating.

Figure 5C:
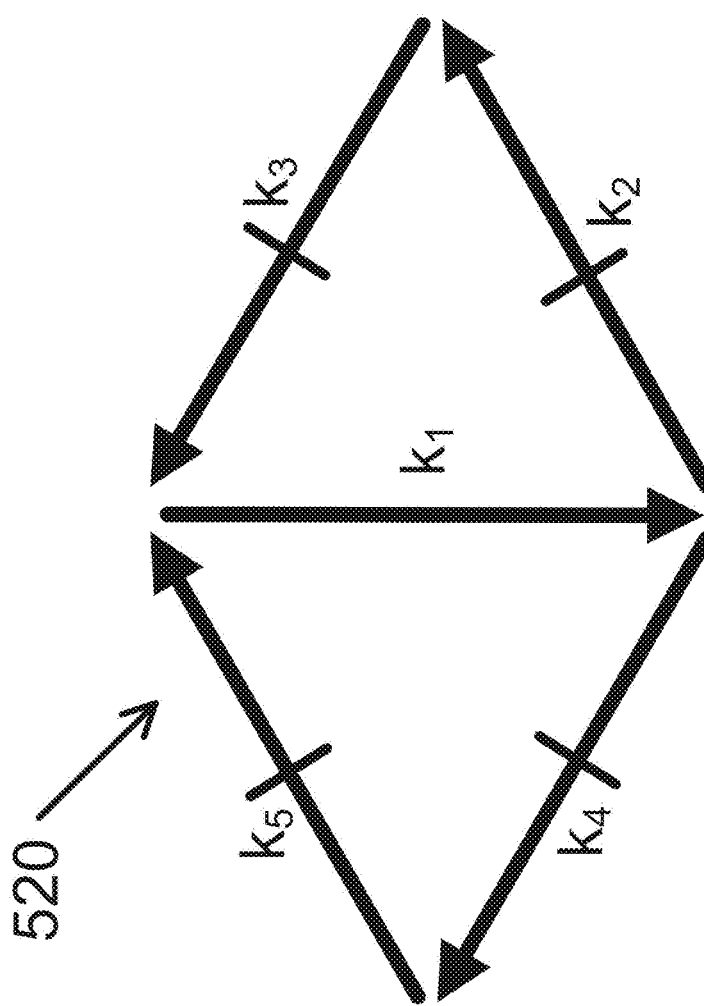

In many embodiments, the grating vector configuration implemented can include various triangular configurations. Typically, the magnitudes of the grating vectors can dictate the resulting triangular configuration. In some embodiments, an equilateral triangular configuration is implemented where all grating vectors are of similar, or substantially similar, magnitude. In cases where integrated gratings are implemented, the configuration can include two triangular configurations. In a number of embodiments, the grating vector configuration includes at least one isosceles triangle where at least two of the grating vectors have similar, or substantially similar, magnitudes. FIG. 5C conceptually illustrates a grating vector configuration with two isosceles triangles in accordance with an embodiment of the invention. As shown, the configuration 520 forms two isosceles triangles due to grating vectors $k_2$-$k_5$ having similar magnitudes. In several embodiments, the grating configuration includes at least one scalene triangle. FIG. 5D conceptually illustrates a grating vector configuration with two scalene triangles in accordance an embodiment of the invention. As shown, the configuration 530 forms two scalene triangles. In the illustrative embodiment, the two scalene triangles are mirrored—i.e., grating vectors $k_2$ and $k_4$ are equal in magnitude, and grating vectors $k_3$ and $k_5$ are equal in magnitude. FIG. 5E conceptually illustrates a grating vector configuration with two different scalene triangles in accordance with an embodiment of the invention. As shown, the configuration 540 includes two different scalene triangles with grating vectors $k_2$-$k_5$ having different magnitudes.

Although FIGS. 5A-5E illustrate specific grating vector configurations, various other configurations can be implemented as appropriate depending on the specific requirements of a given application. For example, in some embodiments, the input coupler is implemented to have two different grating vectors. Such configurations utilize an input grating having two different grating prescriptions, which can implemented using overlapping or multiplexed grating prescriptions. In the embodiments illustrated in FIGS. 5B-5E, the configurations shown can be due to the implementation of integrated gratings. In many embodiments, grating vectors $k_2$ and $k_5$ represent the functions of a first integrated grating, and grating vectors $k_4$ and $k_3$ represent the functions of a second integrated grating. In several embodiments, each grating vector $k_i$ represent a different grating prescription. For example, many grating architectures in accordance with various embodiments of the invention can implement integrated gratings that each contain two different grating prescriptions. In such cases, grating vectors $k_2$ and $k_5$ can respectively represent the two different grating prescriptions of a first integrated grating, and grating vectors $k_4$ and $k_3$ can respectively represent the two different grating prescriptions of a second integrated grating.

FIG. 6 conceptually illustrates a schematic plan view of a grating architecture 600 having an input grating and integrated gratings in accordance with an embodiment of the invention. As shown, the grating architecture 600 includes an input coupler 601. The input coupler 601 can be a Bragg grating or a surface relief grating. In many embodiments, the input coupler 601 includes at least two gratings. In such embodiments, individual input gratings can be configured to couple in different portions of input light, which can be based on angular or spectral characteristics. In some embodiments, the input couple 601 includes two overlapped gratings. In other embodiments, the input coupler 601 includes two multiplexed gratings. The grating architecture 600 further includes first (bold lines) and second (dashed lines) integrated gratings. In the illustrative embodiment, the first integrated grating includes a first grating 602 having a first grating prescription and a second grating 603 having a second grating prescription. As shown, the second grating 603 is smaller than the first grating 602 and can be entirely multiplexed within the volume of the first grating 602. In some embodiments, the first and second gratings 602,603 are overlapped across different grating layers. In several embodiments, the first and second gratings 602,603 are adjacent or nearly adjacent one another and are neither overlapped nor multiplexed. In a number of embodiments, the first and second gratings 602,603 have the same clock angles but different grating prescriptions.

In many embodiments, the configuration of the first integrated grating is applied similarly to the second integrated grating but flipped about an axis. For example, the illustrative embodiment in FIG. 6 shows the second integrated grating having third 604 and fourth 605 gratings with shapes corresponding to the first and second gratings 602, 603, respectively. The third grating 604 has a third grating prescription, and the fourth grating 605 has a fourth grating prescription. Similar to the first integrated grating, the third and fourth gratings 604,605 can have the same clock angles but different grating prescriptions. In a number of embodiments, the first and second gratings 602,603 are clocked at an angle different from the third and fourth gratings 604,605. Again, the overlapping and multiplexing nature of the third and fourth gratings 604,605 can be implemented in a similar manner as the first and second gratings 602,603.

In the illustrative embodiment of FIG. 6, the first and third integrated gratings are partially overlapped with one another such that the second and fourth gratings 603,605 are also partially overlapped. In the illustrative embodiment, the second and fourth gratings 603,605 are multiplexed within the first and third gratings 602,604, and, as such, the waveguide architecture includes an area 606 where four grating prescriptions are active. In embodiments where the first and second integrated gratings are implemented in a single layer, area 606 would contain four multiplexed gratings. In other embodiments, the first and second integrated gratings are implemented across different grating layers.

During operation, input light incident on the input grating 601 can be bifurcated into two portions of light traveling in TIR paths within the waveguide. One portion can be directed towards the first grating 602 while the other portion can be directed towards the third grating 604. The first grating 602 can be configured to provide beam expansion in a first direction for incident light and to redirect the incident light towards the fourth grating 605. The fourth grating 605 can be configured to provide beam expansion in a second direction for incident light and to extract the light out of the waveguide. On the other hand, the third grating 604 can be configured to provide beam expansion in the second direction for incident light and to redirect the incident light towards the second grating 603. The second grating 603 can be configured to provide beam expansion in the first direction for incident light and to extract the light out of the waveguide.

Figure 7:
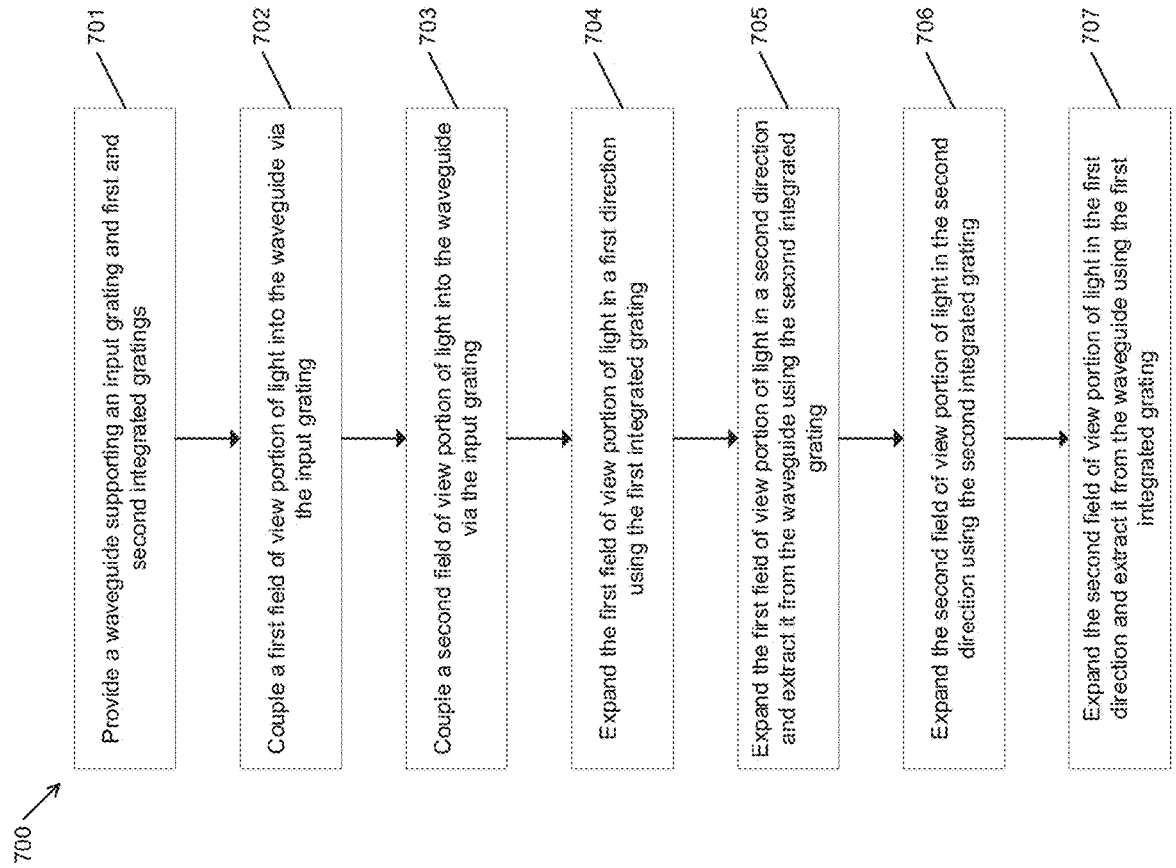
FIG. 7 shows a flow diagram conceptually illustrating a method of displaying an image in accordance with an embodiment of the invention.

FIG. 7 shows a flow diagram conceptually illustrating a method of displaying an image in accordance with an embodiment of the invention. Referring to the flow diagram, the method 700 includes providing (701) a waveguide supporting an input grating, a first integrated grating, and a second integrated grating. In many embodiments, the first integrated grating partially overlaps the second integrated grating. In some embodiments, the integrated gratings are fully overlapped. The first and second integrated gratings can include multiplexed pairs of different K-vector gratings. A first field-of-view portion can be coupled (702) into the waveguide via the input grating and directed towards the first integrated grating. A second field-of-view portion can be coupled (703) into the waveguide via the input grating and directed towards the second integrated grating. The first field-of-view portion light can be expanded (704) in a first direction using the first integrated grating. The first field-of-view portion light can be expanded in a second direction and extracted (705) from the waveguide using the second integrated grating. The second field-of-view portion light can be expanded in the second direction (706) using the second integrated grating to create two-dimensionally expanded light. The second field-of-view portion light can be expanded in the first direction and extracted (707) from the waveguide using the first integrated grating. In some embodiments, the portions of the first integrated grating and the second integrated grating sharing a multiplexed region together extract the two-dimensionally expanded light towards the eyebox.

Figure 8:
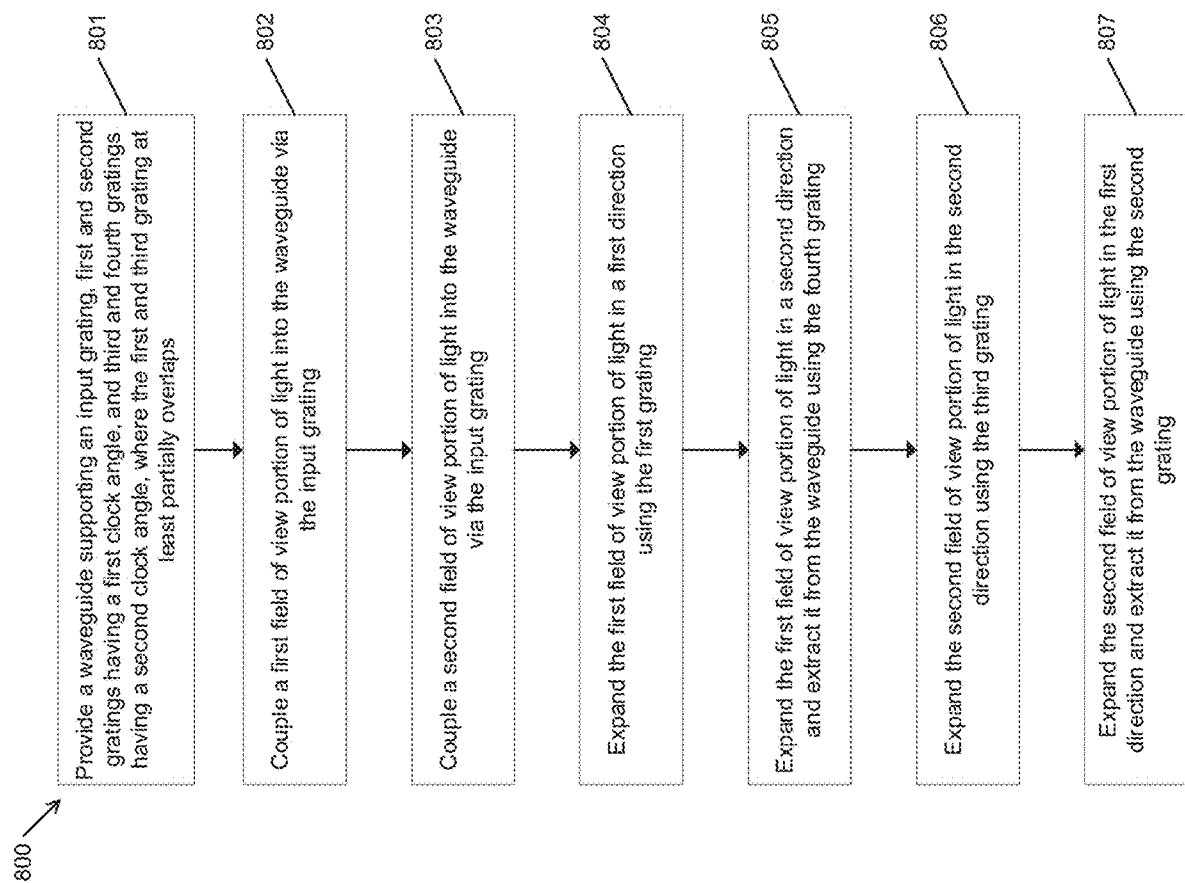
FIG. 8 shows a flow diagram conceptually illustrating a method of displaying an image utilizing integrated gratings containing multiple gratings in accordance with an embodiment of the invention.

As described in the sections above, integrated gratings can be implemented in a variety of different ways. In many embodiments, an integrated grating is implemented with two gratings that have the same clock angle but different grating prescriptions. In further embodiments, the two gratings are multiplexed. FIG. 8 shows a flow diagram conceptually illustrating a method of displaying an image utilizing integrated gratings containing multiple gratings in accordance with an embodiment of the invention. Referring to the flow diagram, the method 800 includes providing (801) a waveguide supporting an input grating, first and second gratings having a first clock angle, and third and fourth gratings having a second clock angle, where the first and third grating at least partially overlaps. In many embodiments, the first integrated grating partially overlaps the second integrated grating. In some embodiments, the integrated gratings are fully overlapped. The first and second integrated gratings can include multiplexed pairs of different K-vector gratings. A first field-of-view portion can be coupled (802) into the waveguide via the input grating and directed towards the first grating. A second field-of-view portion can be coupled (803) into the waveguide via the input grating and directed towards the third grating. The first field-of-view portion light can be expanded (804) in a first direction using the first grating and redirected towards the fourth grating. The first field-of-view portion light can be expanded in a second direction and extracted (805) from the waveguide using the fourth grating. The second field-of-view portion light can be expanded in the second direction (806) using the third grating and redirected towards the second grating. The second field-of-view portion light can be expanded in the first direction and extracted (807) from the waveguide using the second grating.

Although FIGS. 6-8 illustrate specific waveguide configurations and methods of displaying an image, many different methods can be implemented in accordance with various embodiments of the invention. For example, in some embodiments, more than one input grating is utilized. In other embodiments, the input configuration includes a prism. Such methods and implemented waveguides can also be configured to improve performance and/or provide various different functions. In many embodiments, the waveguide apparatus includes at least one grating with spatially-varying pitch. In some embodiments, each grating has a fixed K vector. In a number of embodiments, at least one of the gratings is a rolled k-vector grating according to the embodiments and teachings disclosed in the cited references. Rolling the K-vectors can allow the angular bandwidth of the grating to be expanded without the need to decrease the grating thickness or to utilize multiple grating layers. In some embodiments a rolled K-vector grating includes a waveguide portion containing discrete grating elements having differently aligned K-vectors. In some embodiments, a rolled K-vector grating comprises a waveguide portion containing a single grating element within which the K-vectors undergo a smooth monotonic variation in direction. In some of the embodiments describe rolled K-vector gratings are used to input light into the waveguide. In some embodiments, waveguides having two integrated gratings can be implemented as single-layered or multi-layered waveguides. In several embodiments, a multi-layered waveguide is implemented with more than two integrated gratings. As can readily be appreciated, the specific architecture and configuration implemented can depend on a number of different factors. In some embodiments, the position of the input grating relative to the integrated gratings can be dictated by various factors, including but not limited to projector relief and the input pupil diameter and vergence. In many applications, it is desirable for the distance between the input grating and the integrated gratings to be minimized to provide a waveguide having a small form factor. The field ray angle paths required to fill the eyebox typically dominate the waveguide height. In many cases, the height of waveguide grows non-linearly with projector relief. In some embodiments, the pupil diameter does not have a significant impact on the footprint of the waveguide. A converging or diverging pupil can be used to reduce the local angle response at any location on the input grating.

Figure 9:
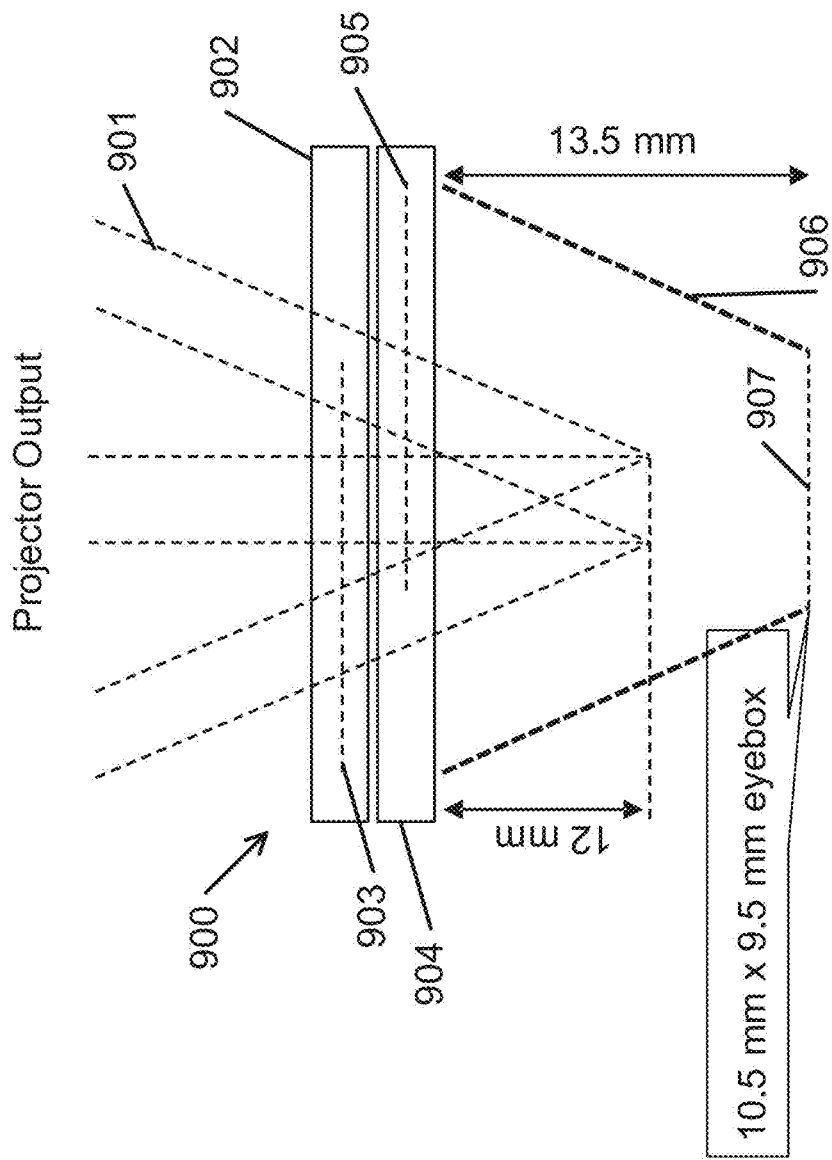
FIG. 9 conceptually illustrates a profile view of two overlapping waveguide portions implementing integrated gratings in accordance with an embodiment of the invention.

In some embodiments, the waveguide configuration implemented can depend on the configuration of the input image generator/projector. FIG. 9 conceptually illustrates a profile view 900 of two overlapping waveguide portions implementing integrated gratings in accordance with an embodiment of the invention. In the illustrative embodiment, the two-layered waveguide is designed for a high field-of-view application implemented with a converging projector pupil input beam, indicated by rays 901. As shown, the apparatus includes a first waveguide 902 containing a first grating layer 903 having a first set of two integrated gratings and a second waveguide 904 containing a second grating layer 905 having a second set of two integrated gratings that partially overlaps the first set of two integrated gratings. The grating layers 903,905 having integrated gratings can operate according to the principles discussed in the sections above. The output beam from the waveguides is generally indicated by rays 906 intersecting the eyebox 907. In the illustrated embodiment, the eyebox has dimensions 10.5 mm.×9.5 mm, an eye relief of 13.5 mm, and a laser projector to waveguide separation of 12 mm. As can readily be appreciated, such dimensions and specifications can be specifically tailored depending on the requirements of a given application.

Figure 10:
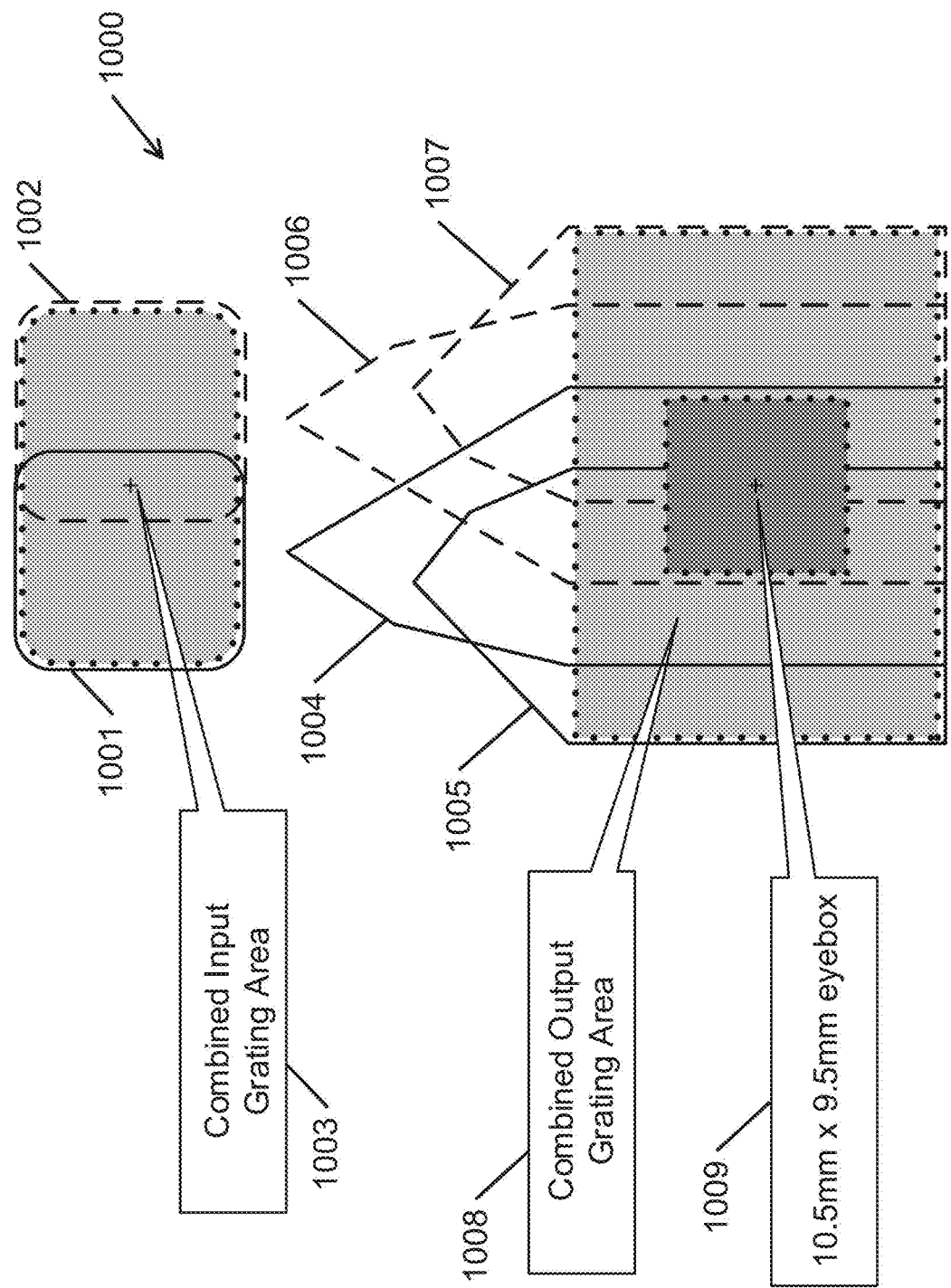
FIG. 10 conceptually illustrates a schematic plan view of a grating architecture having two sets of integrated gratings in accordance with an embodiment of the invention.
Figure 11:
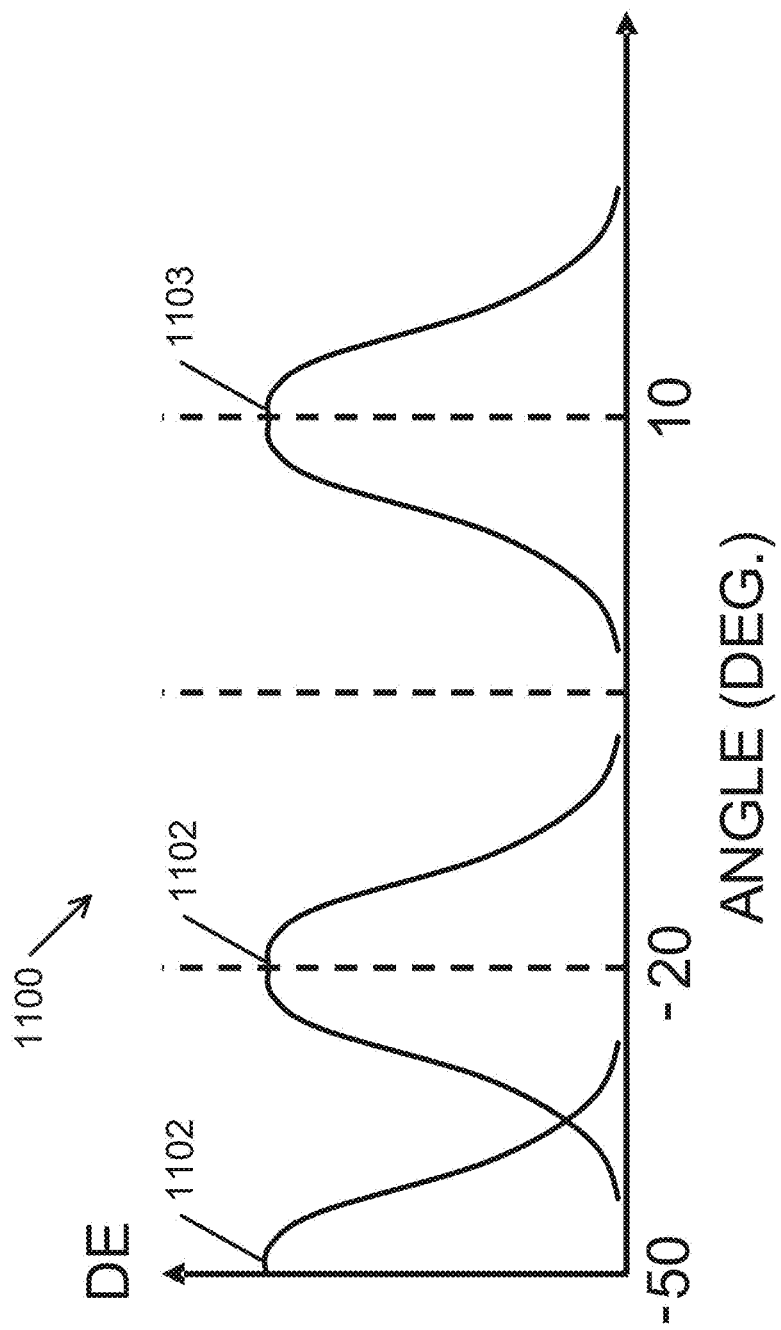
FIG. 11 conceptually illustrates a plot of diffraction efficiency versus angle for a waveguide for diffractions occurring at different field-of-view angles in accordance with an embodiment of the invention.
Figure 12:
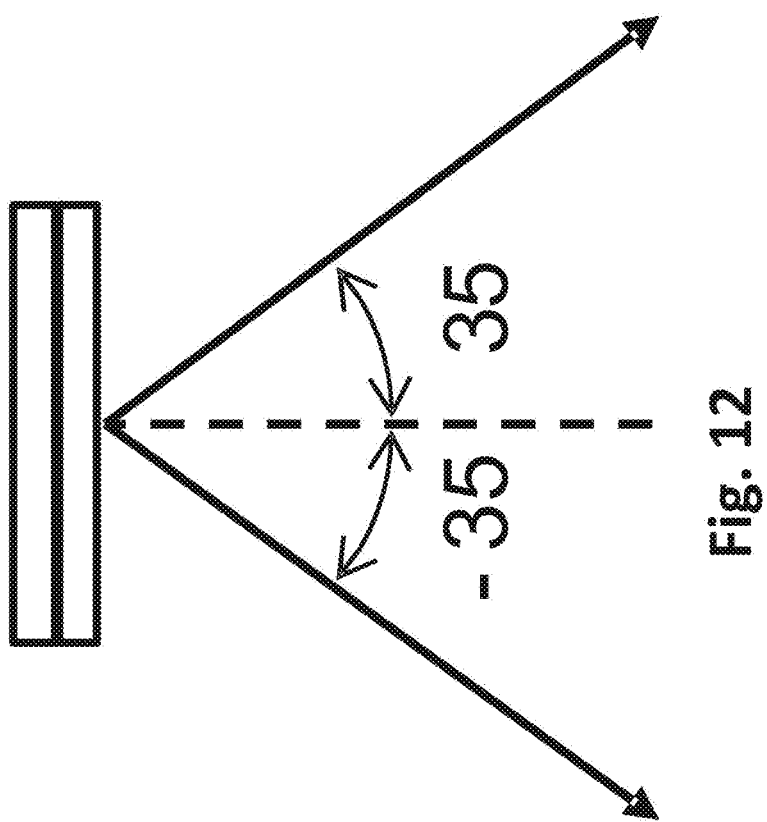
FIG. 12 shows the viewing geometry provided by a waveguide in accordance with an embodiment of the invention.

FIG. 10 conceptually illustrates a schematic plan view 1000 of a grating architecture having two sets of integrated gratings in accordance with an embodiment of the invention. As shown, the grating configuration includes first and second input gratings 1001,1002, forming the combined input grating area 1003 indicated by the shaded area. In some embodiments, each of the input gratings includes a set of multiplexed or overlapping gratings. The grating configuration further includes a first set of grating structures having first and second integrated gratings 1004,1005 and a second set of grating structures having third and fourth integrated gratings 1006,1007. In the illustrative embodiment, each set of integrated gratings is shaped and disposed asymmetrically. Such configurations can be implemented as appropriate depending on several factors. In the embodiment of FIG. 10, the asymmetrical grating architecture can be implemented for operation with a converging projector pupil configuration, such as the one shown in FIG. 9. Furthermore, different grating characteristics can be implemented and tuned for different applications. FIG. 11 conceptually illustrates a plot 1100 of diffraction efficiency versus angle for a waveguide for diffractions occurring at different field-of-view angles in accordance with an embodiment of the invention. As shown, the waveguide is tuned to have three different peak diffraction efficiencies, with two different peaks 1101,1102 for the "fold" interaction and one 1103 for the "output." In some embodiments, light undergoes a dual interaction within the grating. Such gratings can be designed to have high diffraction efficiencies for two different incident angles. Turning back to FIG. 10, the first and second set of grating structures can be implemented as partially overlapping structures, forming a combined output grating area 1008 as indicated by the shaded area. The eyebox 1009 is overlaid on the drawing and is indicated by the dark shaded area. In the illustrative embodiment, the waveguide apparatus is configured to provide a FOV of 120 degrees diagonal. As shown in FIGS. 9-10, in some embodiments, displays providing a FOV of 120 degrees diagonal can be configured with a projector to waveguide distance of 12 mm and an eye relief of 13.5 mm, which is compatible with many glasses inserts. In some embodiments, the display provides an eyebox of 10.5 mm.×9.5 mm, which can provide easy wearability. FIG. 12 shows the viewing geometry of such a waveguide. As can readily be appreciated, the grating configuration illustrated by FIG. 10 can be implemented in a variety of waveguide architectures. In some embodiments, both input gratings and both sets of grating structures are implemented in a single grating layer, with the overlapping portions multiplexed. In several embodiments, the first input grating and the first set of grating structures are implemented in a first grating layer while the second input grating and the second set of grating structures are implemented in a second grating layer. In a number of embodiments, the first, second, third, and fourth integrated gratings are implemented across four grating layers.

Figure 13:
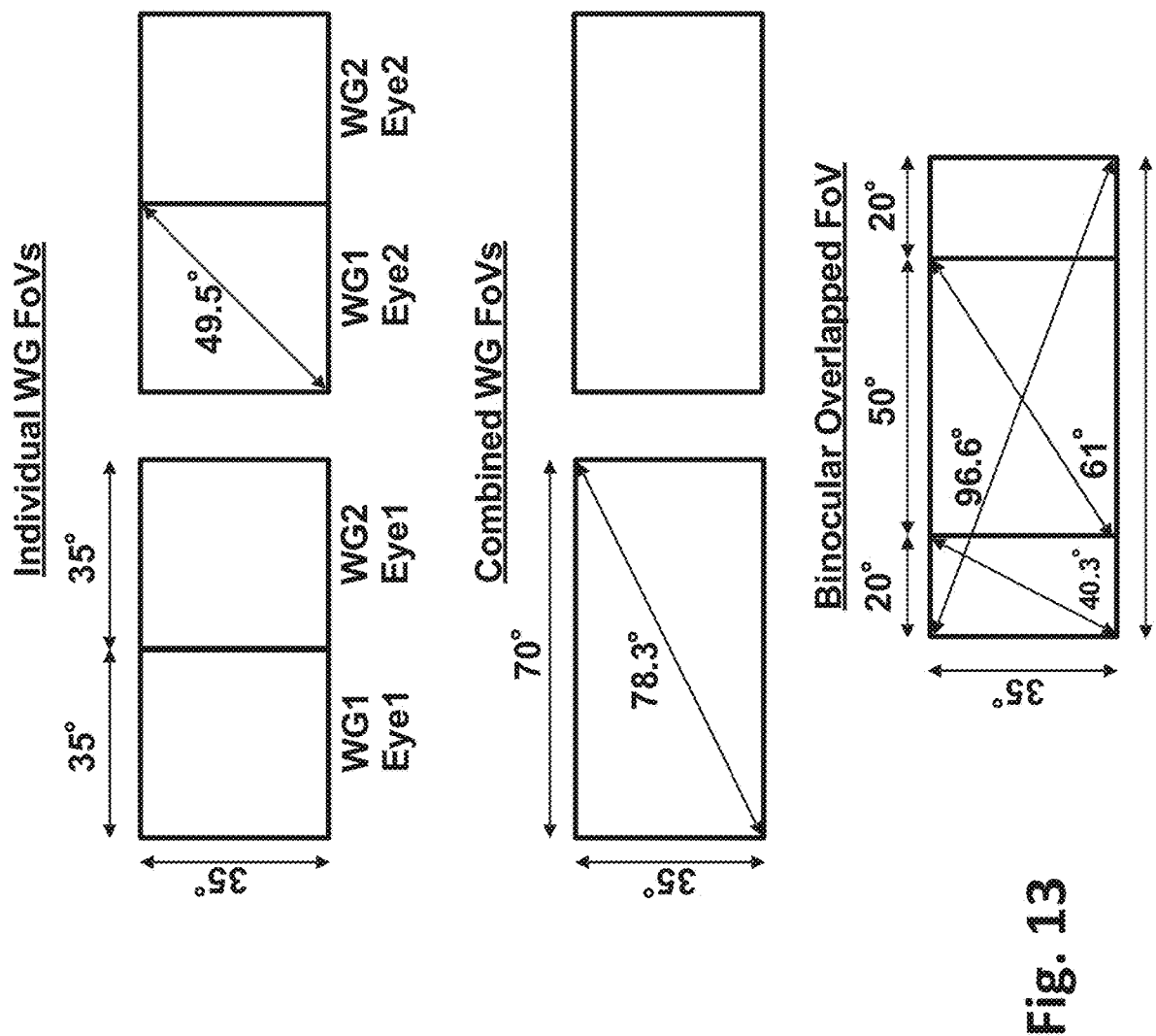
FIG. 13 conceptually illustrates the field-of-view geometry for a binocular display with binocular overlap between the left and right eye images provided by a waveguide in accordance with an embodiment of the invention.

FIG. 13 conceptually illustrates the field-of-view geometry for a binocular display with binocular overlap between the left and right eye images provided by a waveguide in accordance with an embodiment of the invention. Binocular displays utilizing various grating architectures, such as the one described in FIGS. 9-10. can be implemented. In the illustrated embodiment, the waveguide is a color waveguide that includes a stack of four waveguides: two blue-green layers and two green-red layers. Each of the waveguides can provide a field-of-view of 35° h×35° v (~50° diagonal) for a single-color band, yielding 70° h×35° v (~78° diagonal) field-of-view for each color band. Each waveguide set for the left and right eyes can be overlapped by 50° horizontally to achieve ~100° diagonal binocular field-of-view. As can readily be appreciated, various binocular configurations can be implemented as appropriated depending on the specific requirements of a given application. In many embodiments, the waveguide is raked at an angle of at least 5°, which can facilitate the implementation of some binocular overlapped field-of-view applications. In further embodiments, the waveguide is raked at an angle of at least 10°. In some embodiments, the field-of-views for both the left and right eyes are completely overlapped.

Other Waveguide Embodiments

In some embodiments, a prism may be used as an alternative to the input grating. In many embodiments, this can require that an external grating is provided for grating vector closure purposes. In several embodiments, the external grating may be disposed on the surface of the prism. In some embodiments, the external grating may form part of a laser despeckler disposed in the optical train between the laser projector and the input prims. The use of a prism to couple light into a waveguide has the advantage of avoiding the significant light loss and restricted angular bandwidth resulting from the use of a rolled K-vector grating. A practical rolled K-vector input grating typically cannot match the much large angular bandwidth of the fold grating, which can be around 40 degrees or more.

Although the drawings may indicate a high degree of symmetry in the grating geometry and layout of the gratings in the different wavelength channels, the grating prescriptions and footprints can be asymmetric. The shapes of the input, fold, or output gratings can depend on the waveguide application and could be of any polygonal geometry subject to factors such as the required beam expansion, output beam geometry, beam uniformity, and ergonomic factors.

In some embodiments, directed at displays using unpolarized light sources, the input gratings can combine gratings orientated such that each grating diffracts a particular polarization of the incident unpolarized light into a waveguide path. Such embodiments may incorporate some of the embodiments and teachings disclosed in the PCT application PCT/GB2017/000040 "METHOD AND APPARATUS FOR PROVIDING A POLARIZATION SELECTIVE HOLOGRAPHIC WAVGUIDE DEVICE" by Waldern et al., the disclosure of which is incorporated herein in by reference in its entirety. The output gratings can be configured in a similar fashion so that the light from the waveguide paths is combined and coupled out of the waveguide as unpolarized light. For example, in some embodiments, the input grating and output grating each combine crossed gratings with peak diffraction efficiency for orthogonal polarizations states. In a number of embodiments, the polarization states are S-polarized and P-polarized. In several embodiments, the polarization states are opposing senses of circular polarization. The advantage of gratings recorded in liquid crystal polymer systems, such as SBGs, in this regard is that owing to their inherent birefringence, they exhibit strong polarization selectivity. However, other grating technologies that can be configured to provide unique polarization states can also be used.

In some embodiments using gratings recorded in liquid crystal polymer material systems, at least one polarization control layer overlapping at least one of the fold gratings, input gratings, or output gratings may be provided for the purposes of compensating for polarization rotation in any the gratings, particularly the fold gratings, which can result in polarization rotation. In many embodiments, all of the gratings are overlaid by polarization control layers. In a number of embodiments, polarization control layers are applied to the fold gratings only or to any other subset of the gratings. The polarization control layer may include an optical retarder film. In some embodiments based on HPDLC materials, the birefringence of the gratings may be used to control the polarization properties of the waveguide device. The use of the birefringence tensor of the HPDLC grating, K-vectors, and grating footprints as design variables opens up the design space for optimizing the angular capability and optical efficiency of the waveguide device. In some embodiments, a quarter wave plate can be disposed on a glass-air interface of the wave guide rotates polarization of a light ray to maintain efficient coupling with the gratings. In further embodiments, the quarter wave plate is a coating that is applied to substrate waveguide. In some waveguide display embodiments, applying a quarter wave coating to a substrate of the waveguide may help light rays retain alignment with the intended viewing axis by compensating for skew waves in the waveguide. In some embodiments, the quarter wave plate may be provided as a multi-layer coating.

As used in relation to any of the embodiments described herein, the term grating may encompass a grating that includes a set of gratings. For example, in some embodiments, the input grating and output grating each include two or more gratings multiplexed into a single layer. It is well established in the literature of holography that more than one holographic prescription can be recorded into a single holographic layer. Methods for recording such multiplexed holograms are well known to those skilled in the art. In some embodiments, the input grating and output grating may each include two overlapping gratings layers that are in contact or vertically separated by one or more thin optical substrate. In several embodiments, the grating layers are sandwiched between glass or plastic substrates. In a number of embodiments, two or more such gratings layers may form a stack within which total internal reflection occurs at the outer substrate and air interfaces. In some embodiments, the waveguide may include just one grating layer. In many embodiments, electrodes may be applied to faces of the substrates to switch gratings between diffracting and clear states. The stack may further include additional layers such as beam splitting coatings and environmental protection layers.

In some embodiments, the fold grating angular bandwidth can be enhanced by designing the grating prescription to facilitate dual interaction of the guided light with the grating. Exemplary embodiments of dual interaction fold gratings are disclosed in U.S. patent application Ser. No. 14/620,969 entitled "WAVEGUIDE GRATING DEVICE."

Advantageously, to improve color uniformity, gratings for use in the invention can be designed using reverse ray tracing from the eyebox to the input grating via the output grating and fold grating. This process allows the required physical extent of the gratings, in particular the fold grating, to be identified. Unnecessary grating real-state which contribute to haze can be eliminated. Ray paths can be optimized for red, green, and blue, each of which follow slightly different paths because of dispersion effects between the input and output gratings via the fold grating.

In many embodiments, the gratings are holographic gratings, such as a switchable or non-switchable Bragg Gratings. In some embodiments, gratings embodied as SBGs can be Bragg gratings recorded in a holographic polymer dispersed liquid crystal (e.g., a matrix of liquid crystal droplets), although SBGs may also be recorded in other materials. In several embodiments, the SBGs are recorded in a uniform modulation material, such as POLICRYPS or POLIPHEM having a matrix of solid liquid crystals dispersed in a liquid polymer. The SBGs can be switching or non-switching in nature. In some embodiments, at least one of the input, fold, and output gratings may be electrically switchable. In many embodiments, it is desirable that all three grating types are passive, that is, non-switching. In its non-switching form, an SBG has the advantage over conventional holographic photopolymer materials of being capable of providing high refractive index modulation due to its liquid crystal component. Exemplary uniform modulation liquid crystal-polymer material systems are disclosed in United State Patent Application Publication No.: US2007/0019152 by Caputo et al and PCT Application No.: PCT/EP2005/006950 by Stumpe et al., both of which are incorporated herein by reference in their entireties. Uniform modulation gratings are characterized by high refractive index modulation (and hence high diffraction efficiency) and low scatter. In some embodiments, the input coupler, the fold grating, and the output grating are recorded in a reverse mode HPDLC material. Reverse mode HPDLC differs from conventional HPDLC in that the grating is passive when no electric field is applied and becomes diffractive in the presence of an electric field. The reverse mode HPDLC may be based on any of the recipes and processes disclosed in PCT Application No.: PCT/GB2012/000680, entitled "IMPROVEMENTS TO HOLOGRAPHIC POLYMER DISPERSED LIQUID CRYSTAL MATERIALS AND DEVICES." The gratings may be recorded in any of the above material systems but used in a passive (non-switching) mode. The advantage of recording a passive grating in a liquid crystal polymer material is that the final hologram benefits from the high index modulation afforded by the liquid crystal. Higher index modulation translates to high diffraction efficiency and wide angular bandwidth. The fabrication process is identical to that used for switched but with the electrode coating stage being omitted. LC polymer material systems are highly desirable in view of their high index modulation. In some embodiments, the gratings are recorded in HPDLC but are not switched.

In many embodiments, two spatially separated input couplers may be used to provide two separate waveguide input pupils. In some embodiments, the input coupler is a grating. In several embodiments, the input coupler is a prism. In embodiments using an input coupler prism based on prisms only, the conditions for grating reciprocity can be addressed using the pitch and clock angles of the fold and output gratings.

In many embodiments, the source of data modulated light used with the above waveguide embodiments includes an Input Image Node ("IIN") incorporating a microdisplay. The input grating can be configured to receive collimated light from the IIN and to cause the light to travel within the waveguide via total internal reflection between the first surface and the second surface to the fold grating. Typically, the IIN integrates, in addition to the microdisplay panel, a light source and optical components needed to illuminate the display panel, separate the reflected light, and collimate it into the required FOV. Each image pixel on the microdisplay can be converted into a unique angular direction within the first waveguide. The instant disclosure does not assume any particular microdisplay technology. In some embodiments, the microdisplay panel can be a liquid crystal device or a MEMS device. In several embodiments, the microdisplay may be based on Organic Light Emitting Diode (OLED) technology. Such emissive devices would not require a separate light source and would therefore offer the benefits of a smaller form factor. In some embodiments, the IIN may be based on a scanned modulated laser. The IIN projects the image displayed on the microdisplay panel such that each display pixel is converted into a unique angular direction within the substrate waveguide according to some embodiments. The collimation optics contained in the IIN may include lens and mirrors, which may be diffractive lenses and mirrors. In some embodiments, the IIN may be based on the embodiments and teachings disclosed in U.S. patent application Ser. No. 13/869,866 entitled "HOLOGRAPHIC WIDE-ANGLE DISPLAY," and U.S. patent application Ser. No. 13/844,456 entitled "TRANSPARENT WAVEGUIDE DISPLAY." In several embodiments, the IIN contains beam-splitter for directing light onto the microdisplay and transmitting the reflected light towards the waveguide. In many embodiments, the beamsplitter is a grating recorded in HPDLC and uses the intrinsic polarization selectivity of such gratings to separate the light illuminating the display and the image modulated light reflected off the display. In some embodiments, the beam splitter is a polarizing beam splitter cube. In a number of embodiments, the IIN incorporates a despeckler. The despeckler can be a holographic waveguide device based on the embodiments and teachings of U.S. Pat. No. 8,565,560 entitled "LASER ILLUMINATION DEVICE." The light source can be a laser or LED and can include one or more lenses for modifying the illumination beam angular characteristics. The image source can be a micro-display or laser-based display. LED can provide better uniformity than laser. If laser illumination is used, there is a risk of illumination banding occurring at the waveguide output. In some embodiments, laser illumination banding in waveguides can be overcome using the techniques and teachings disclosed in U.S. Provisional Patent Application No. 62/071,277 entitled "METHOD AND APPARATUS FOR GENERATING INPUT IMAGES FOR HOLOGRAPHIC WAVEGUIDE DISPLAYS." In some embodiments, the light from the light source is polarized. In one or more embodiments, the image source is a liquid crystal display (LCD) micro display or liquid crystal on silicon (LCoS) micro display.

The principles and teachings of the invention in combination with other waveguide inventions by the inventors as disclosed in the reference documents incorporated by reference herein may be applied in many different display and sensor devices. In some embodiments directed at displays, a waveguide display according to the principles of the invention can be combined with an eye tracker. In some embodiments, the eye tracker is a waveguide device overlaying the display waveguide and is based on the embodiments and teachings of PCT/GB2014/000197 entitled "HOLOGRAPHIC WAVEGUIDE EYE TRACKER," PCT/GB2015/000274 entitled "HOLOGRAPHIC WAVEGUIDE OPTICAL TRACKER," and PCT Application No.:GB2013/000210 entitled "APPARATUS FOR EYE TRACKING."

In some embodiments of the invention directed at displays, a waveguide display according to the principles of the invention further includes a dynamic focusing element. The dynamic focusing element may be based on the embodiments and teachings of U.S. Provisional Patent Application No. 62/176,572 entitled "ELECTRICALLY FOCUS TUNABLE LENS." In some embodiments, a waveguide display according to the principles of the invention can further include a dynamic focusing element and an eye tracker, which can provide a light field display based on the embodiments and teachings disclosed in U.S. Provisional Patent Application No. 62/125,089 entitled "HOLOGRAPHIC WAVEGUIDE LIGHT FIELD DISPLAYS."

In some embodiments of the invention directed at displays, a waveguide according to the principles of the invention may be based on some of the embodiments of U.S. patent application Ser. No. 13/869,866 entitled "HOLOGRAPHIC WIDEANGLE DISPLAY," and U.S. patent application Ser. No. 13/844,456 entitled "TRANSPARENT WAVEGUIDE DISPLAY." In some embodiments, a waveguide apparatus according to the principles of the invention may be integrated within a window, for example a windscreen-integrated HUD for road vehicle applications. In some embodiments, a window-integrated display may be based on the embodiments and teachings disclosed in United States Provisional Patent Application No.: PCT Application No.: PCT/GB2016/000005 entitled "ENVIRONMENTALLY ISOLATED WAVEGUIDE DISPLAY." In some embodiments, a waveguide apparatus may include gradient index (GRIN) wave-guiding components for relaying image content between the IIN and the waveguide. Exemplary embodiments are disclosed in PCT Application No.: PCT/GB2016/000005 entitled "ENVIRONMENTALLY ISOLATED WAVEGUIDE DISPLAY." In some embodiments, the waveguide apparatus may incorporate a light pipe for providing beam expansion in one direction based on the embodiments disclosed in U.S. Provisional Patent Application No. 62/177,494 entitled "WAVEGUIDE DEVICE INCORPORATING A LIGHT PIPE."

In many embodiments, a waveguide according to the principles of the invention provides an image at infinity. In some embodiments, the image may be at some intermediate distance. In some embodiments, the image may be at a distance compatible with the relaxed viewing range of the human eye. In many embodiments, this may cover viewing ranges from about 2 meters up to about 10 meters.

The construction and arrangement of the systems and methods as shown in the various exemplary embodiments are illustrative only. Although only a few embodiments have been described in detail in this disclosure, many modifications are possible (for example, variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. The present invention can incorporate the embodiments and teachings disclosed in U.S. Provisional Patent Application No. 62/778,239 "METHODS AND APPARATUSES FOR PROVIDING A SINGLE GRATING LAYER COLOR HOLOGRAPHIC WAVEGUIDE DISPLAY", and the following US filings: U.S. Ser. No. 14/620,969 "WAVEGUIDE GRATING DEVICE"; U.S. Ser. No. 15/468,536 "WAVEGUIDE GRATING DEVICE"; U.S. Ser. No. 15/807,149 "WAVEGUIDE GRATING DEVICE"; and U.S. Ser. No. 16/178,104 "WAVEGUIDE GRATING DEVICE", by Popovich et al., which are incorporated herein in by reference in their entireties. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Embodiments Including Stacked IDA Waveguides

This application discloses various embodiments related to one or more Integrated Dual Axis (IDA) waveguides. Various examples of IDA waveguides are disclosed above and in U.S. Pat. No. 2020/0264378, filed Feb. 18, 2020 and entitled "Methods and Apparatuses for Providing a Holographic Waveguide Display Using Integrated Gratings" which is hereby incorporated by reference in its entirety for all purposes. Also, various aspects related to IDA waveguides are discussed in U.S. Pat. No. 9,632,226, entitled "Methods and Apparatuses for Providing a Color Holographic Waveguide Display using integrated gratings" and filed on Feb. 12, 2015, which is hereby incorporated by reference in its entirety for all purposes. As described, an IDA waveguide may include two-fold overlapping gratings with opposing k-vectors to provide simultaneous vertical expansion, horizontal expansion, and beam extraction. The fold gratings can be multiplexed or formed in overlapping layers. Such architectures offer various benefits such as reducing grating real estate in waveguides, and easing of the grating average refractive index requirement for a given field of view (FoV).

However, there may be a limitation on the maximum vertical FoV achievable using an IDA architecture, which may be set by the current grating recording materials. The average grating material index achieved using a monomer and liquid crystal holographic recording mixture may have a refractive index of 1.74, limiting the vertical FoV to around 40 degrees. A larger vertical FoV may be desirable in displays applications (e.g. augmented reality, virtual reality, or mixed reality displays) to accommodate up and down motions of worn displays in active use. It may be beneficial in a waveguide display employing an IDA architecture to have a large vertical FoV.

Figure 14:
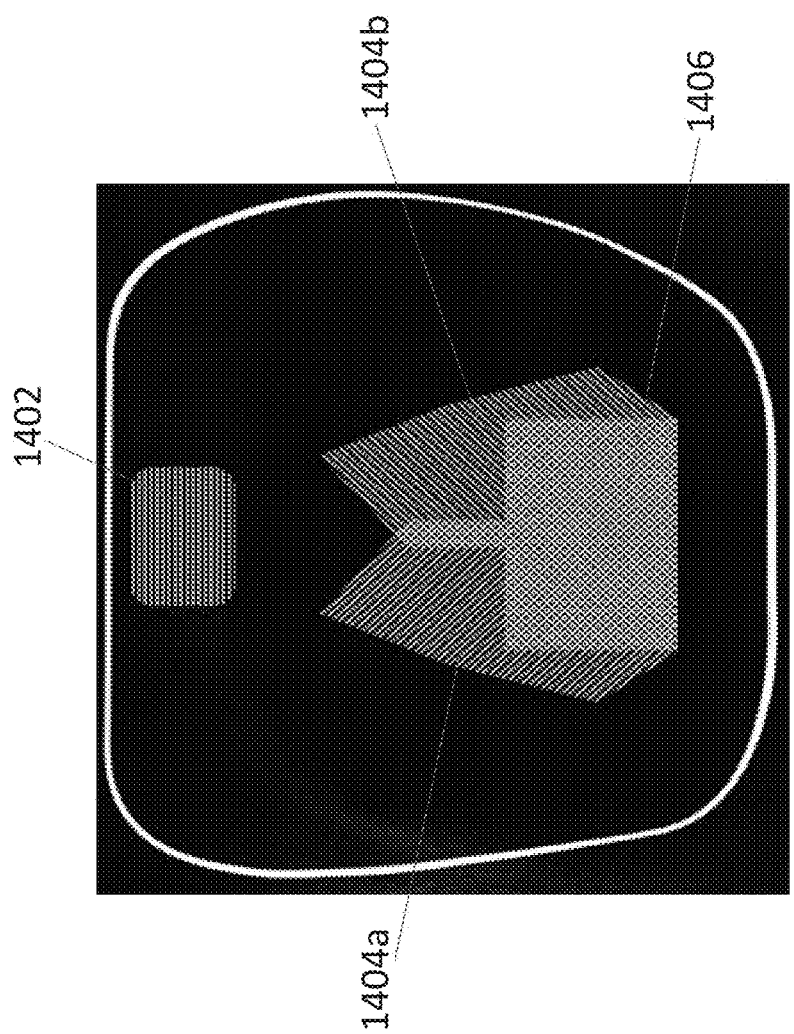
FIGS. 14-19 schematically illustrate the operation of an example IDA waveguide.
Figure 15A:
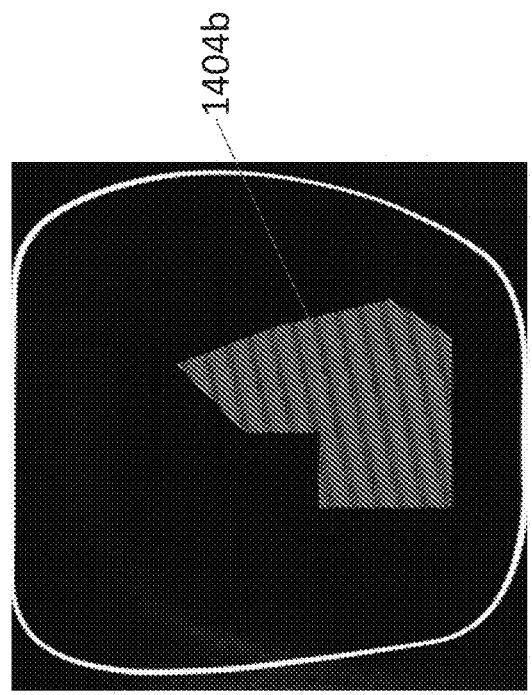
Figure 15B:
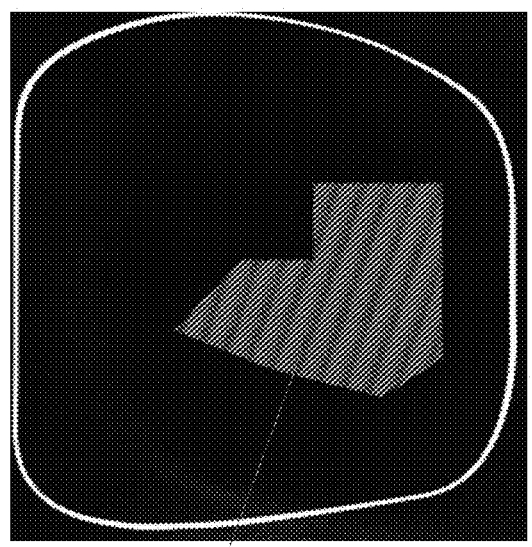
Figure 16:
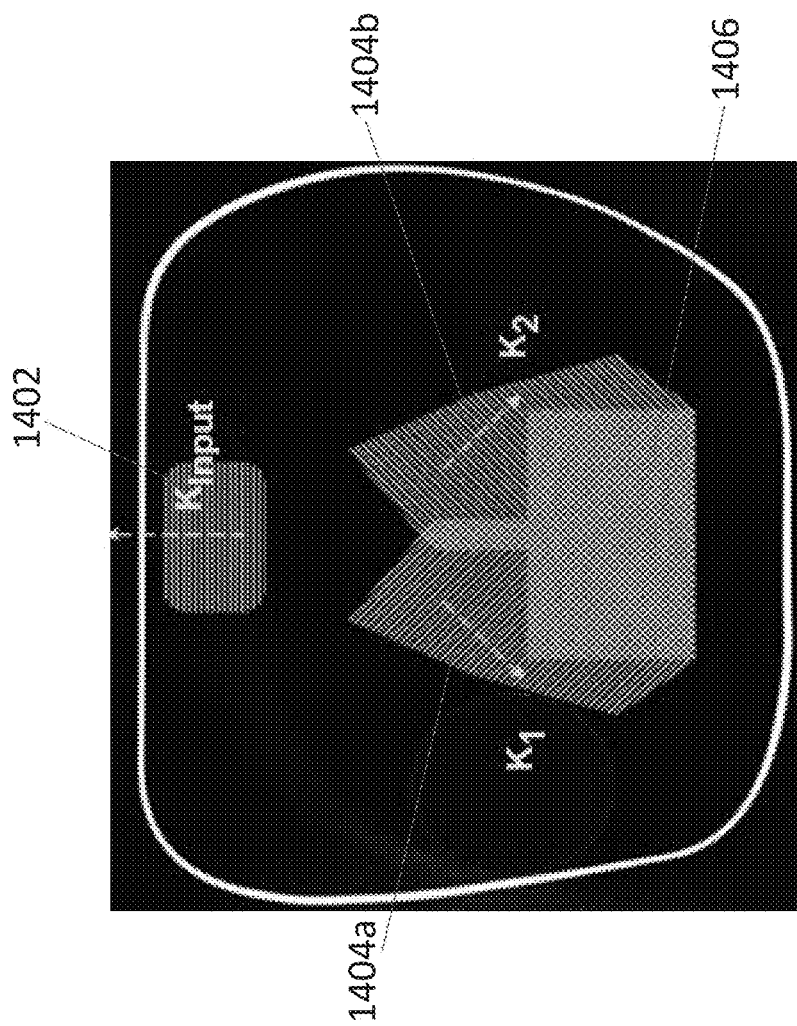

Turning to the drawings, FIGS. 14-19 schematically illustrate the operation of an example IDA waveguide. FIG. 14 schematically illustrates an IDA waveguide in accordance with an embodiment of the invention. The IDA waveguide includes an input grating 1402, a first fold grating 1404a, and a second fold grating 1404b. The first fold grating 1404a and the second fold grating 1404b meet at an overlap portion 1406. FIG. 15A schematically illustrates the first fold grating 1404a and FIG. 15B schematically illustrates the second fold grating 1404b. FIG. 16 schematically illustrates the K-vector orientation of the IDA waveguide of FIG. 14. As illustrated, the first fold grating 1404a has a K-vector of $K_1$ and the second fold grating 1404b has a k-vector of $K_2$. $K_1$ and $K_2$ may be of different orientations. In some embodiments, $K_1$ and $K_2$ may be of opposite orientations. The input grating 1402 has a K-vector of $K_{input}$. In some embodiments, $K_1$, $K_2$, and $K_{input}$ may be all different orientations. In some embodiments, $K_{input}$ may be a vertical orientation while $K_1$ and $K_2$ may be off vertical orientations.

Figure 17:
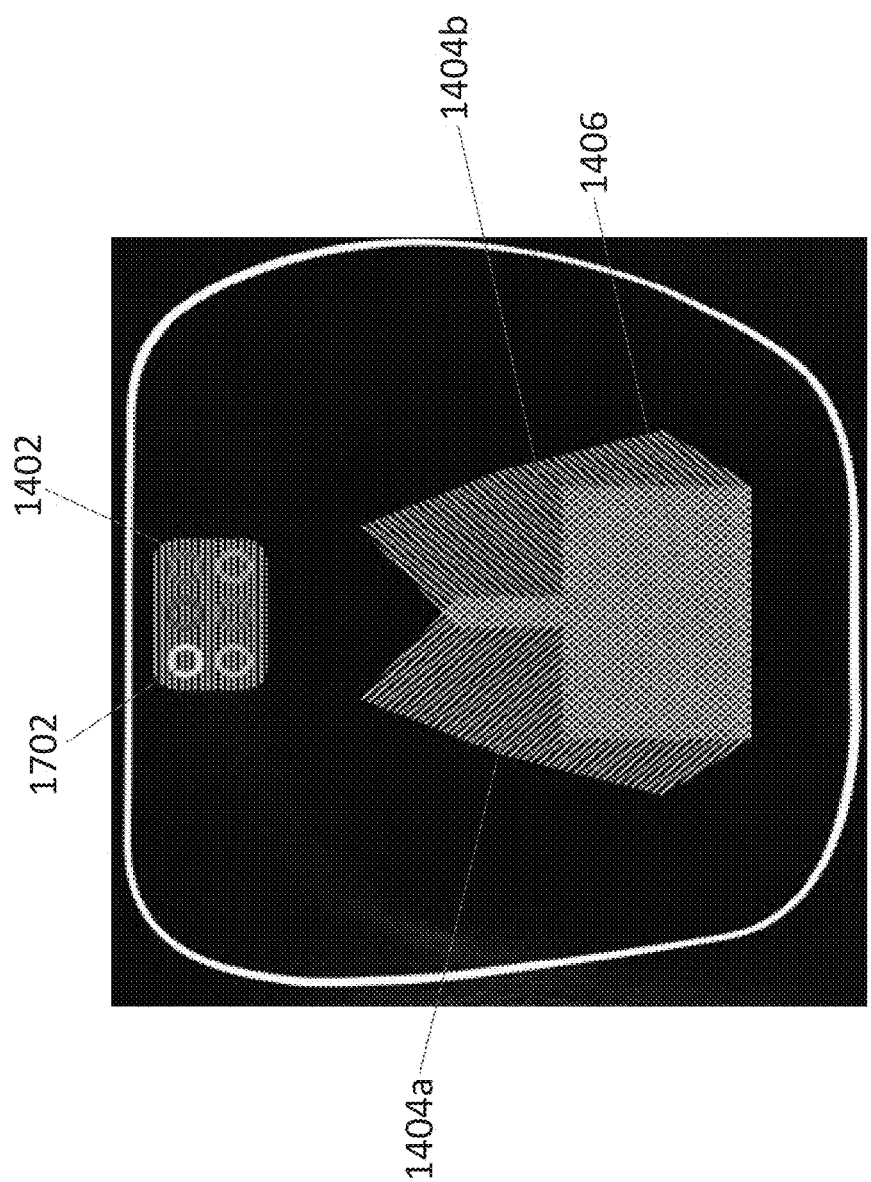
Figure 18A:
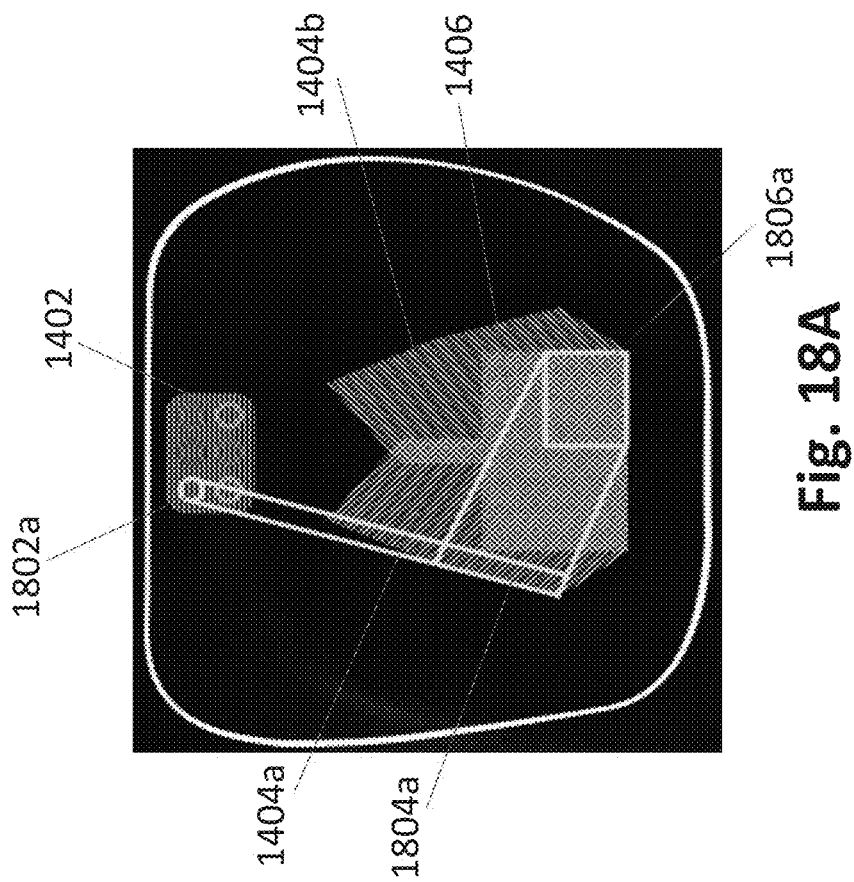
Figure 18B:
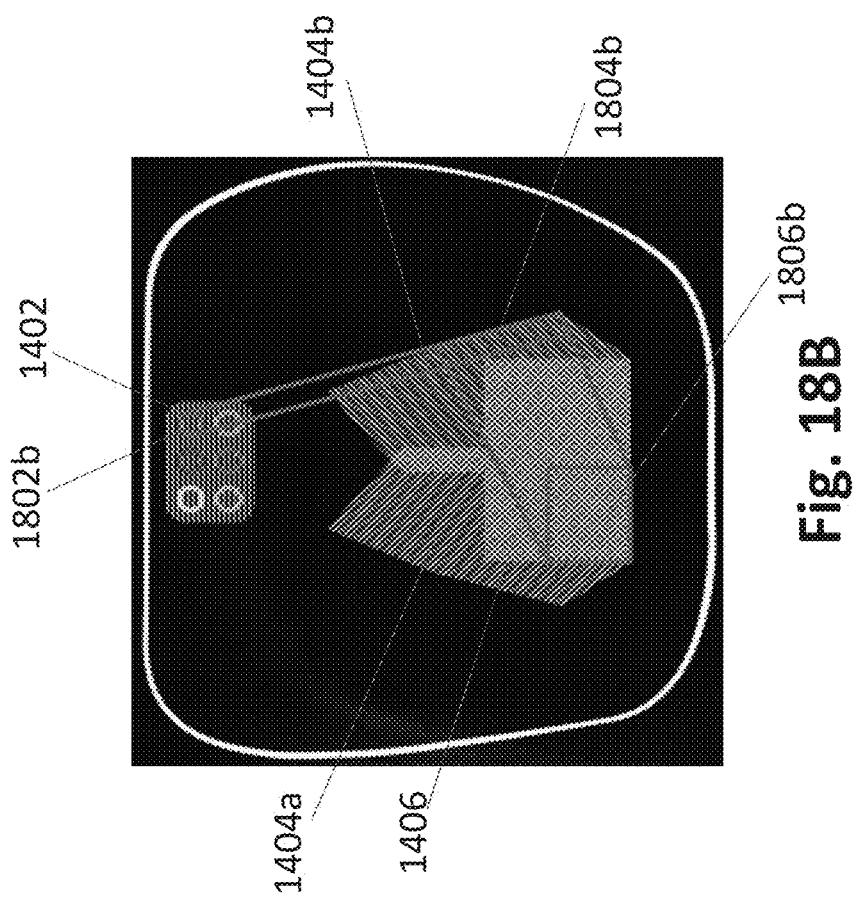
Figure 19:
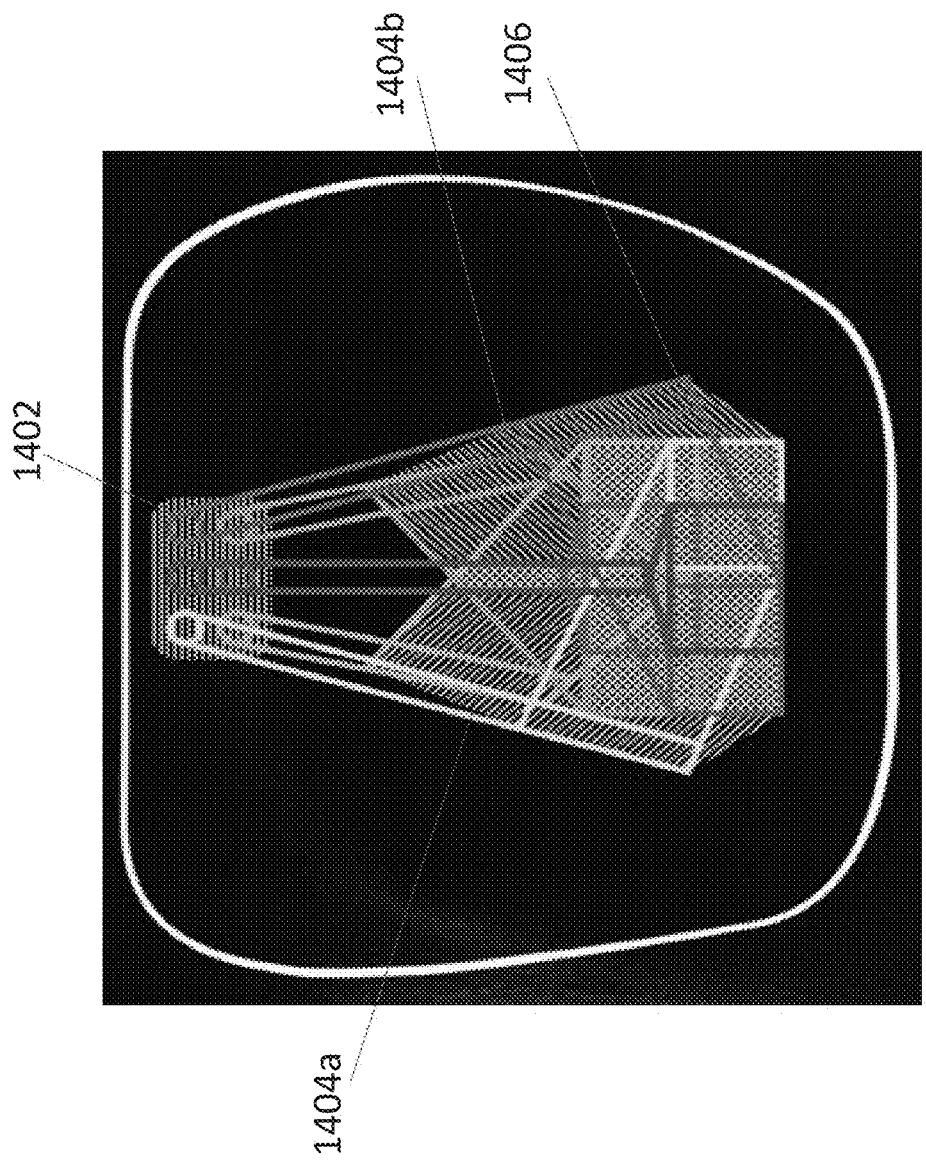

FIG. 17 illustrates the IDA grating of FIGS. 14 and 16 showing a set of input pupils 1702 of the input grating 1402. FIG. 18A illustrates the IDA waveguide of FIGS. 14 and 16 with the left input pupil 1802a. Light from a light source may be configured to be input by the left input pupil 1802a into the first fold grating 1404a. The first fold grating 1404a may provide a first direction beam expansion 1804a to the input light. The overlap region 1406 of the first fold grating 1404a and the second fold grating 1404b may provide a second direction beam expansion and output 1806a. In some embodiments, the first direction beam expansion 1804a may be in a direction orthogonal to the second direction beam expansion. The output may eject light out of the IDA waveguide. FIG. 18B illustrates the IDA grating of FIGS. 14 and 16 with the right input pupil 1802b. Light from a light source may be configured to be input by the right input pupil 1802b into the second fold grating 1404b. The second fold grating 1404b may provide a first direction beam expansion 1804b to the input light. The overlap region 1406 of the first fold grating 1404a and the second fold grating 1404b may provide a second direction beam expansion and output 1806b. In some embodiments, the first direction beam expansion 1804b may be in a direction orthogonal to the second direction beam expansion. The output may eject light out of the IDA waveguide. FIG. 18C illustrates the IDA Grating of FIGS. 14 and 16 with the center input pupil 1802c. Light from a light source may be configured to be input by the center input pupil 1802c into the first fold grating 1404a or the second fold grating 1404b. The first fold grating 1404a or second fold grating 1404b may provide a first direction beam expansion 1804c to the input light. The overlap region 1406 of the first fold grating 1404a and the second fold grating 1404b may provide a second direction beam expansion and output 1806c. In some embodiments, the first direction beam expansion 1804b may be in a direction orthogonal to the second direction beam expansion. FIG. 19 illustrates the IDA grating of FIGS. 14 and 16 with various input pupils of the input grating 1402 and the light output from the input pupils. As illustrated, the light output may cover a wide field of view (FoV) which may include most of the overlap region 1406.

Figure 20B:
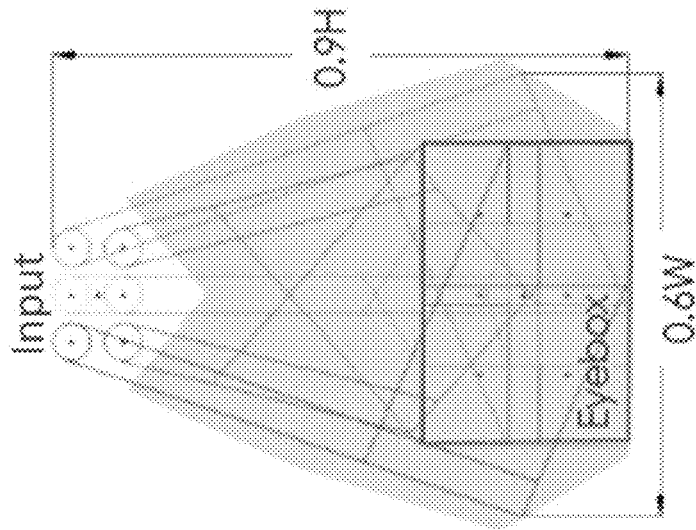
FIGS. 20A and 20B illustrate a comparison between a waveguide display without overlapping gratings and a waveguide display including IDA gratings.
Figure 20A:
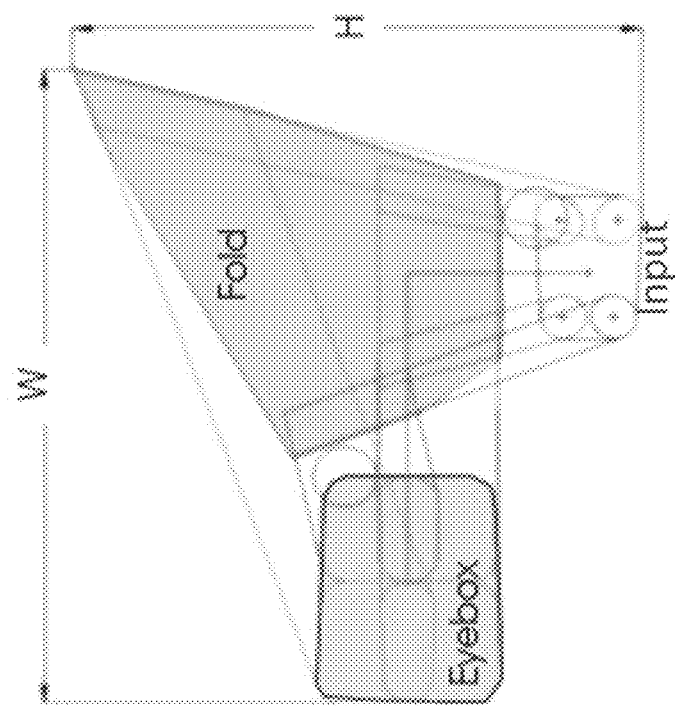

FIGS. 20A and 20B illustrate a comparison between a waveguide display without overlapping gratings and a waveguide display including IDA gratings. FIG. 20A illustrates the footprint of a waveguide display without overlapping gratings. As illustrated, the waveguide display may include a width W and a height H. FIG. 20B illustrates the footprint of a waveguide display including IDA gratings. As illustrated the waveguide display may include a width 0.6 W and a height 0.9H. Thus, the waveguide display including IDA gratings may have a more compact footprint than the waveguide display without overlapping gratings.

Figure 21:
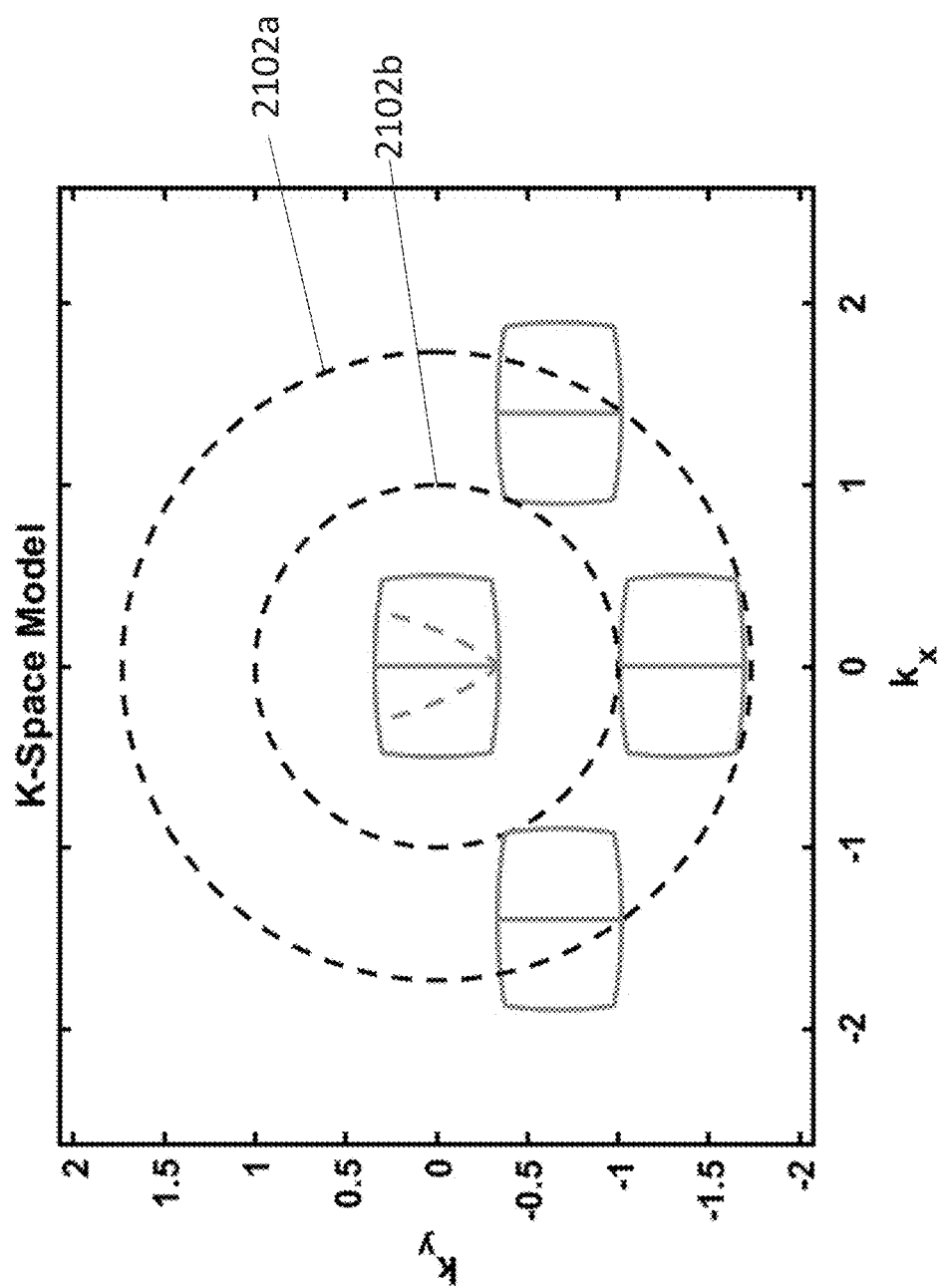
FIG. 21 illustrates a k-space representation of an example IDA grating.

The angular carrying capacity of a diffractive waveguide can be represented using k-space (or reciprocal lattice) formalism. FIG. 21 illustrates a k-space representation of an example IDA grating. The IDA grating may be configured to provide a horizontal FoV of 60 degrees and a vertical FoV of 40 degrees with a grating material of refractive index 1.74. The waveguide angular carrying capacity (or angular bandwidth) may represented by the space between the two concentric rings 2102a, 2102b. The outer ring 2102a indicates the maximum waveguided beam angle and the inner ring 2102b representing the total internal reflection (TIR) limit. The boxes illustrate the FoV of the display split into two equal portions (left and right).

Figure 22B:
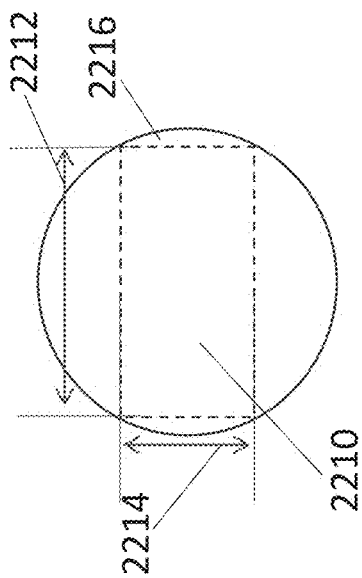
FIG. 22B illustrates the FoV of FIG. 22A in relation to a circular region.
Figure 22A:
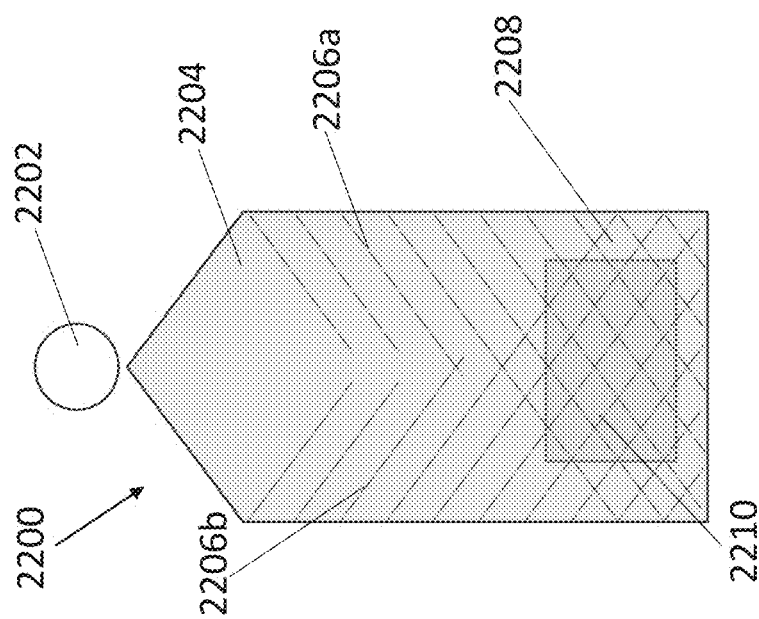
FIG. 22A schematically illustrates an IDA grating device in accordance with an embodiment of the invention.

FIG. 22A schematically illustrates an IDA grating device in accordance with an embodiment of the invention. The IDA grating device 2200 may include an IDA grating which may include an average grating material index of 1.74 providing a horizontal FoV of 50 degrees and a vertical FoV of 40 degrees. An input pupil 2202 may input an optical light into an IDA waveguide 2204. The IDA waveguide 2204 may include a crossed grating structure. The crossed grating structure may include a first grating fringes 2206a and a second grating fringes 2206b. The grating fringes 2206a, 2206b and k-vectors (e.g. vectors normal to the grating fringes 2206a, 2206b) may be symmetrically disposed about a vertical axis (in the plane of the drawing). The grating fringes 2206a, 2206b may overlap in a grating overlap region 2208 which may be overlaid by an eyebox and include a specific FoV 2210. In some embodiments, a projector can be optically coupled to the input pupil 2202 using a grating or a prism. The projector may include a light source, microdisplay, and/or projection lens. The light source may be a laser light source or a LED light source. A laser light source may offer some benefits over LED such as lower etendue which may enable higher efficiency and brightness, near-perfect collimation, compact form factor, and excellent color gamut. In many embodiments, the grating material refractive index of the IDA waveguide 2204 can be reduced by using a light source with a moderate degree of spectral dispersion such as a narrow band LED.

FIG. 22B illustrates the FoV of FIG. 22A in relation to a circular region 2216. As illustrated, the FoV 2210 may substantially overlap the eyebox. The FoV 2210 may include a portion of a circular region 2216. The FoV 2210 may include a vertical FoV 2214 and a horizontal FoV 2212. In some embodiments, the horizontal FoV 2212 may be 60° and the vertical FoV 2214 may be 40°. In some embodiments, the horizontal FoV 2212 may be 60° and the vertical FoV 2214 may be 35°.

In some embodiments, the IDA grating of the IDA grating device 2200 may include a rolled k-vector grating. The FoV coverage can be optimized by using rolled k-vector gratings. In some embodiments, the IDA grating may be optimized using spatial variation of at least one of average refractive index, grating modulation, birefringence, grating thickness, grating k-vector, grating pitch, or other grating parameters using the inkjet coating and exposure processes and reverse ray tracing methods. FoV coverage can be optimized using spatial variation of at least one of the above mentioned features. Uniformity of the light extracted from the waveguide may be optimized using spatial variation of at least one of the above grating parameters. Examples of processes of optimizing the spatial variation of gratings are described in U.S. Pat. App. Pub. No. 2019/0212588, entitled "Systems and Methods for Manufacturing Waveguide Cells" and filed on Nov. 28, 2018, which is hereby incorporated by reference in its entirety for all purposes.

FIG. 23A schematically illustrates an IDA grating device including two overlapping air-spaced waveguides in accordance with an embodiment of the invention. The IDA grating device 2300 may include a first IDA waveguide 2204a and a second IDA waveguide 2204b. The first IDA waveguide 2204a may receive light from a first input pupil 2202a and the second IDA waveguide 2204b may receive light from a second input pupil 2202b. The first IDA waveguide 2204a and the second IDA waveguide 2204b may be identical to the IDA waveguide 2204 described in connection with FIG. 22A. The first IDA waveguide 2204a and the second IDA waveguide 2204b may be aligned orthogonally to each other at angles of 0° and 90° relative to the vertical axis. Other orientations of the first IDA waveguide 2204a and the second IDA waveguide 2204b have been contemplated. Each waveguide may use a separate projector to input light into the first input pupil 2202a and the second input pupil 2202b. The first IDA waveguide 2204a and the second IDA waveguide 2204b may be spaced apart by air. The first IDA waveguide 2204a may inject light into an eyebox with a first FoV 2210a and the second IDA waveguide 2204b may inject light into the eyebox with a second FoV 2210b. In some embodiments, the first IDA waveguide 2204a and the second IDA waveguide 2204b may be spaced apart by a substance other than air such as a transparent epoxy.

FIG. 23B illustrates the eyebox of FIG. 23A in relation to a circular region 2216. As illustrated, the first FoV 2210a and the second FoV 2210b may overlap the eyebox. The first FoV 2210a and the second FoV 2210b may overlap a portion of the circular region 2216. The circular region 2216 represents the overlapping FoVs 2210a, 2210b having the same dimensions with one of the IDA waveguides being rotated through 90 degrees. The corners of the FoVs 2210a, 2210b lie on the circular region 2216 of diametric equal to the rectangle diagonal. Each of the first FoV 2210a and the second FoV 2210b may include a vertical FoV and a horizontal FoV. In some embodiments, the horizontal FoV may be 60° and the vertical FoV may be 40°. In some embodiments, the horizontal FoV may be 60° and the vertical FoV may be 35°. The first FoV 2210a and the second FoV 2210b may not be sharply defined. the first FoV 2210a and the second FoV 2210b may include FoV regions outside the crossed rectangular FOV overlap areas in FIG. 23B. For example, the region 2302 of the FoV located below the first FoV 2210a may include a portion of the FoV region. Sharp FoV cut-offs may occur with laser illumination. It has been discovered that an LED light source is less likely to cause sharp FoV cut-offs. In some embodiments, an LED light source may be used which may fill in the FoV gaps in the eyebox 216. For example, in many green display embodiments, a phosphor green LED with approximately a 100 nm full width half maximum (FWHM) spectral width can be used to fill in the FoV gaps in the eyebox 216. In some embodiments, FoV coverage can be improved by sharing FoV regions between different overlapping waveguides. It may be advantageous to avoid color imbalances arising in the shared FoV regions. Stacked red, green, and blue waveguide layers may be used. It has been discovered that FoV region sharing by stacked monochromatic layers can be used to improve FoV coverage.

In some embodiments, the first FoV 210a and the second FoV 210b may be square or rectangular. In many embodiments, the first FoV 210a and the second FoV 210b may not be square or rectangular. In some embodiments, the overlapping gratings can have asymmetrically disposed k-vectors. For example, FIG. 23A if the waveguide and grating structures are identical then an axis of symmetry exists along the diagonal of the square formed by the waveguide overlap region where the first IDA waveguide 2204a and the second IDA waveguide 2204b overlap. The grating k-vectors may be symmetrically disposed around this axis. In other embodiments, the waveguide may have different dimensions and the first IDA waveguide 2204a and the second IDA waveguide 2204b may be non-orthogonal. Hence the overlap region diagonal may not necessarily provide an axis of symmetry. In such cases, the k-vectors of the two waveguides may be asymmetric.

FIG. 24A illustrates an IDA grating device including two overlapping spaced waveguides in accordance with an embodiment of the invention. The IDA grating device includes a headband 2400 which includes a first input pupil 2402a and a second input pupil 2402b. The IDA grating device 2300 may include a first IDA waveguide 2404a and a second IDA waveguide 2404b at least partially positioned in an eyepiece 2406. The first IDA waveguide 2404a may receive light from a first input pupil 2402a and the second IDA waveguide 2404b may receive light from a second input pupil 2402b. The first IDA waveguide 2404a and the second IDA waveguide 2404b share many of the features of the first IDA waveguide 2204a and the second IDA waveguide 2204b described in connection with FIG. 23A which will not be repeated in detail. The first IDA waveguide 2404a and the second IDA waveguide 2404b may be spaced apart by air. The first IDA waveguide 2404a may inject light into an eyebox with a first FoV 2410a and the second IDA waveguide 2404b may inject light into the eyebox with a second FoV 2410b. In some embodiments, the first IDA waveguide 2404a and the second IDA waveguide 2404b may be spaced apart by a substance other than air such as a transparent epoxy.

In some embodiments, the first IDA waveguide 2404a and the second IDA waveguide 2404b may be shaped to fit in a certain augmented reality lens. Each of the first IDA waveguide 2404a and the second IDA waveguide 2404b may be aligned symmetrically relative to the vertical axis providing a maximum vertical FoV 412 of 50°. As illustrated, the first IDA waveguide 2404a and the second IDA waveguide 2404b may be clocked such that one or more projectors that feed light into of the first IDA waveguide 2404a and the second IDA waveguide 2404b are located in the headband 2400. The clocked first IDA waveguide 2404a and the clocked second IDA waveguide 2404b causes the first FoV 2410a and the second FoV 2410b to be clocked.

FIG. 24B illustrates the eyebox of FIG. 24A in relation to a circular region 2216. As illustrated, the first FoV 2410a and the second FoV 2410b may include a portion of the circular region 2216. Each of the first FoV 2410a and the second FoV 2410b may include a vertical FoV and a horizontal FoV. In some embodiments, the horizontal FoV may be and the vertical FoV may be 40°. In some embodiments, the horizontal FoV may be and the vertical FoV may be 35°. As described previously in connection with FIG. 23B, the FoV cut-offs may not be sharply defined. The first FoV 2410a and the second FoV 2410b may not be sharply defined. the first FoV 2410a and the second FoV 2410b may include FoV regions outside the crossed rectangular FOV overlap areas in FIG. 24B. For example, the region 2414 of the eyebox located above the first FoV 2410a may include a portion of the FoV region. Sharp FoV cut-offs may occur with laser illumination. It has been discovered that an LED light source is less likely to cause sharp FoV cut-offs. In some embodiments, an LED light source may be used which may fill in the FoV gaps in the circular region 2216. For example, in many green display embodiments, a phosphor green LED with approximately a 100 nm full width half maximum (FWHM) spectral width can be used to fill in the FoV gaps in the circular region 2216. In some embodiments, FoV coverage can be improved by sharing FoV regions between different overlapping waveguides. It may be advantageous to avoid color imbalances arising in the shared FoV regions. Stacked red, green, and blue waveguide layers may be used. It has been discovered that FoV region sharing by stacked monochromatic layers can be used to improve FoV coverage.

In some embodiments, the first FoV 2410a and the second FoV 2410b may be square or rectangular. In many embodiments, the first FoV 2410a and the second FoV 2410b may not be square or rectangular. In some embodiments, the overlapping gratings can have asymmetrically disposed k-vectors. It should be apparent from consideration of the figures that, in some embodiments, the FoV coverage, including maximum vertical and horizontal FoV and the FoV aspect ratio, may be controlled using various combination of k-vectors and clock angles of the gratings within each waveguide and the clock angles of the overlapping waveguides. In some embodiments the same a range of useful FoV specifications, including maximum and horizontal FoV and FoV aspect ratios may be obtained from a single waveguide using variations of the above grating and waveguide parameters.

Figure 25:
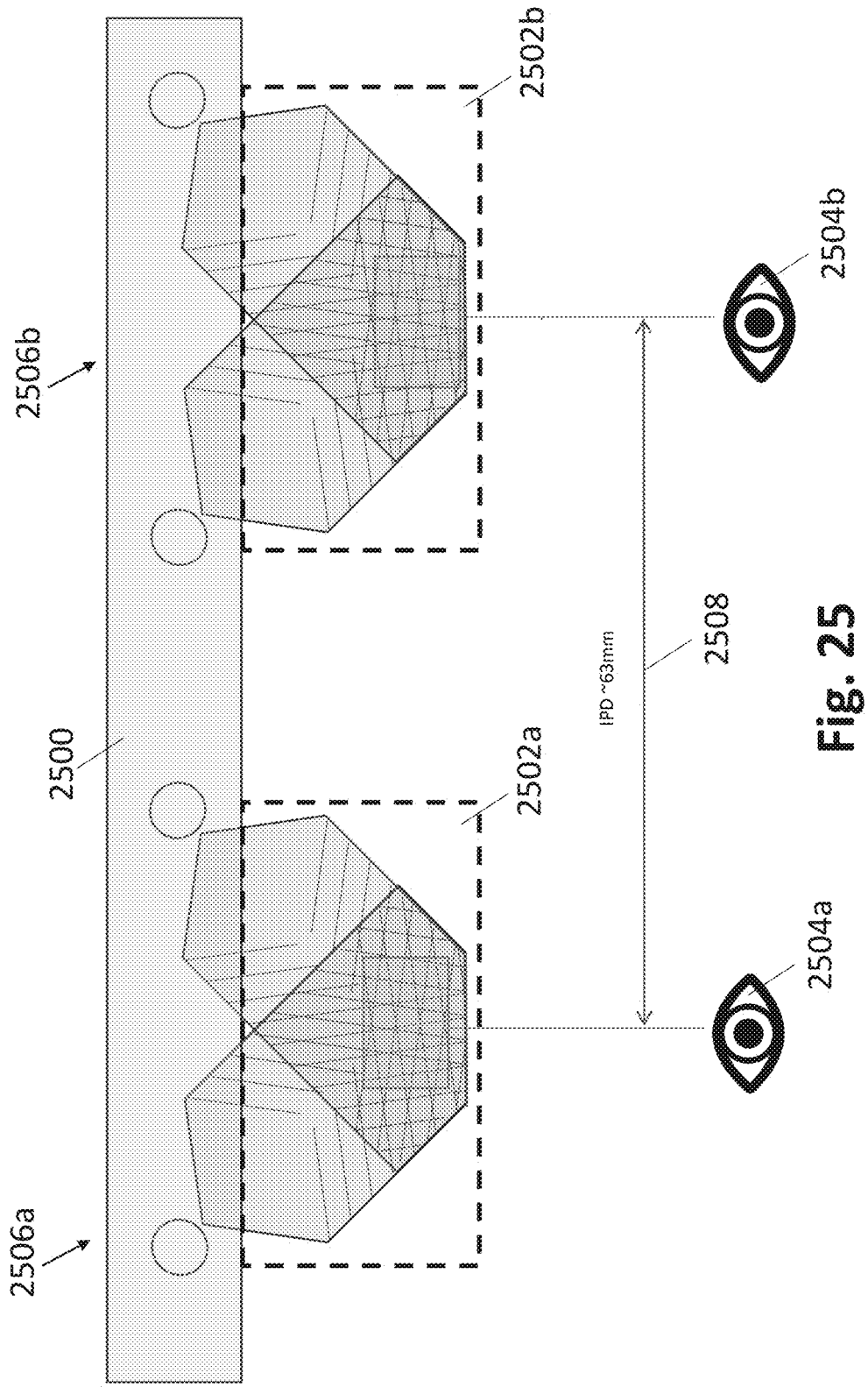
FIG. 25 schematically illustrates a binocular display supported by a headband including overlapping spaced waveguides in accordance with an embodiment of the invention.

FIG. 25 schematically illustrates a binocular display supported by a headband including overlapping spaced waveguides in accordance with an embodiment of the invention. The binocular display includes a first eyepiece 2502a and a second eyepiece 2502b. The first eyepiece 2502a includes a first waveguide configuration 2506a and the second eyepiece 2502b includes a first waveguide configuration 2506a. The first waveguide configuration 2506a and the second waveguide configuration 2506b are identical to the configuration described in connection with FIG. 24A. A headband 2500 may be configured to incorporate multiple input pupils each with their corresponding projector. All of the projectors can be accommodated within the headband 2500. Many other arrangements for providing a binocular display based on the disclosed IDA waveguides have also been contemplated. The first waveguide configuration 2506a outputs light into a first eye 2504a and the second waveguide configuration 2506b outputs light into a second eye 2504b. The first eye 2504a and the second eye 2504b may have an interpupillary distance (IPD) of approximately 63 mm.

There may be many advantages of the IDA architectures described above. For example, one advantage of the IDA architecture discussed above is that the projectors can have lower resolutions in the overlap region. In many embodiments, the resolution in the overlap region can be enhanced by a factor of two. Doubling of resolution in the overlap regions may allow a specified optical resolution to be achieved using a projector of half the resolution in a configuration using a single projector and waveguide set up (e.g. FIG. 22A). In some embodiments, the projectors can be aligned with a half pixel offset. The maximum resolution available from the two projectors can be provided in the center field region. In some embodiments, the resolution may further be increased through the use of switching gratings configured to apply time-sequenced sub-pixel angular offset to the waveguided light. Examples of configurations which use switching gratings to achieve increased resolution are described in U.S. Pat. No. 10,942,430, entitled "Systems and Methods for Multiplying the Image Resolution of a Pixelated Display" and filed Oct. 16, 2018, which is hereby incorporated by reference in its entirety. This reference discloses apparatus and methods for multiplying the effective resolution of a waveguide grating display using switching gratings configured to apply time-sequenced sub-pixel angular offset to the waveguided image light. While applying switching gratings may increase resolution, the increased resolution is achieved through displaying different offset images at different times which may decrease the available displayed frame rate. Advantageously, the IDA architecture may apply the corresponding pixel offset simultaneously allowing higher frame rates to be achieved.

In some embodiments, the waveguide-based display may include one or more cameras. In many embodiments, the projectors can be boresight-aligned with the cameras integrated in the display. In some embodiments, the cameras may be aligned to the same sub-pixel accuracy as the projectors (e.g. half pixel accuracy) and synchronized with the projectors. In such embodiments, the display pixel offset direction may complement the camera pixel offset direction.

Combining the illumination from two projectors within the grating overlap region may result in a doubling of image brightness. However, it may be advantageous to avoid a corresponding relative dimming of non-overlapped regions (e.g. the regions of the first IDA waveguide 2204a and the second IDA waveguide 2204b that do not overlap in FIG. 23A). In general, having too many layers can impact image contrast. In many embodiments, multiplexing can be used to reduce the number of layers. In some embodiments, the waveguide-based display may include four multiplexed prescription fold/output arrangements (e.g. FIG. 23A). However, dimming may still be a potential risk in single layer multiplexed grating waveguide architectures (e.g. FIG. 22A). Optimization of the overlap geometry of the overlapping fold gratings may mitigate the risk of a dim single layer multiplexed grating waveguide architecture.

In some embodiments, the waveguide-based display may be monochromatic. In many embodiments, the apparatus discussed above can be extended to displays including two or more colors (e.g. three color displays including red, green, and blue) by providing additional monochromatic waveguide layers. In many embodiments, a two-waveguide solution can be used to display red, green, and blue. The two-waveguide solution may include one waveguide layer display red and one waveguide layer for propagating both blue and green wavelength bands.

The embodiments described here can also be applied to other waveguide devices using IDA architectures such as, for example, automotive heads up displays and waveguide sensors, such as eye tracker and LIDAR.

In many embodiments, the waveguides disclosed herein can incorporate at least one of a reflective coating, a reflection grating, an alignment layer, a polarization rotation layer, a low index clad layer, a variable refractive index layer, or a gradient index (GRIN) structure. In some embodiments, an IDA waveguide can be formed on curved substrates.

In some embodiments, IDA gratings can be recorded in material having wavelength sensitivity selected from a group containing at least two different wavelength sensitivities. In some embodiments, IDA gratings can be recorded in material having holographic exposure time including at least two different holographic exposure times.

In some embodiments, IDA gratings can support ray path lengths within the IDA grating differing by a distance shorter than the coherence length of the light source.

In many embodiments, the input coupler into the waveguide can comprise a plurality of gratings. In further embodiments, the input coupler into the waveguide can incorporate polarization selection. In further embodiments, the input coupler into the waveguide can incorporate polarization rotation.

In some embodiments, the IDA gratings can be configured as two or more grating regions or arrays of grating elements each region or element having unique spectral and/or angular prescriptions. Such configurations may be used to provide single layer color imaging system where different colors may be output using a single grating. Examples of a single layer color imaging system are disclosed in U.S. patent application Ser. No. 17/647,408, entitled "Grating Structures for Color Waveguides" and filed Jan. 7, 2022 which is hereby incorporated by reference in its entirety for all purposes.

In many embodiments, the IDA grating can be formed in monomer and liquid crystal material systems. In many embodiments, the gratings can be formed as an Evacuated Periodic Structure (EPS) such as an Evacuated Bragg Gratings (EBGs), as disclosed in United States Pat. App. Pub. No. US 2021/0063634 entitled "Evacuating Bragg Gratings and Methods of Manufacturing" and filed Aug. 28, 2020 which is hereby incorporated by reference in its entirety for all purposes. Also, EPSs are described in U.S. patent application Ser. No. 17/653,818, entitled "Evacuated Periotic Structures and Methods of Manufacturing" and filed on Mar. 7, 2022, which is incorporated herein by reference in its entirety for all purposes. In many embodiments, as described in the above incorporated references, EPSs can be at least partially backfilled with a material of higher or lower average refractive index than the average refractive index of the evacuated grating. In many embodiments, the IDA gratings can employ one or more optical layers between the grating and the substrate (e.g. one or more bias layers) for controlling coupling between waveguide substrates and gratings, as disclosed in the above incorporated references. In many embodiments, the gratings can be formed as Surface Relief Gratings (SRGs) fabricated using plasma etching and nanoimprint lithographic techniques.

Although only a few embodiments have been described in detail in this disclosure, many other embodiments have been contemplated. For example, variations in sizes, dimensions, structures, shapes and proportions of the various elements, values of parameters (e.g. FoV, clock angle, inter pupillary distance, grating average refractive index, etc.), use of materials, orientations, etc. Other substitutions, modifications, changes, arrangements, and omissions may be made in the design or embodiments without departing from the scope of the present disclosure.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A waveguide display device comprising:

a first input image source providing first image light;

a second input image source providing second image light;

a first IDA waveguide comprising:

an input coupler for incoupling the first image light into a TIR path in the first IDA waveguide via a first pupil;

a first grating with a first K-vector; and a second grating with a second K-vector different than the first K-vector and sharing a multiplexed region with the first grating, wherein the first grating and the second grating together provide two-dimensional beam expansion to the first image light, and wherein the portions of the first grating and the second grating sharing the multiplexed region together extract the two-dimensionally expanded first image light towards an eyebox; and a second IDA waveguide comprising:
  an input coupler for incoupling the second image light into a TIR path in the second IDA waveguide via a second pupil;
  a first grating with a first K-vector; and
  a second grating with a second K-vector different than the first K-vector and sharing a multiplexed region with the first grating,
  wherein the first grating and the second grating together provide two-dimensional beam expansion to the second image light, and
  wherein the portions of the first grating and the second grating sharing the multiplexed region together extract the two-dimensionally expanded second image light towards the eyebox.

2. The waveguide display device of claim 1, wherein a first portion of the incoupled first image light is passed to the first grating of the first IDA waveguide which provides beam expansion to the incoupled first image light in a first direction and passes the first direction beam expanded light onto the multiplexed region,
  wherein the portion of the second grating of the first IDA waveguide in the multiplexed region is configured to provide beam expansion in a second direction different from the first direction to produce a first two-dimensionally expanded first image light,
  wherein a second portion of the incoupled first image light is passed to the second grating of the first IDA waveguide which provides beam expansion to the incoupled first image light in a third direction to produce a third direction expanded first image light,
  wherein the portion of the first grating of the first IDA waveguide in the multiplexed region is configured to provide beam expansion in a fourth direction different from the third direction to produce a second two-dimensionally expanded first image light, and
  wherein the multiplexed region of the first IDA waveguide is configured to extract the first two-dimensionally expanded first image light and the second two-dimensionally expanded first image light from the first IDA waveguide towards the eyebox.

3. The waveguide display device of claim 2, wherein a first portion of the incoupled second image light is passed to the first grating of the second IDA waveguide which provides beam expansion to the incoupled second image light in a first direction and passes the first direction beam expanded light onto the multiplexed region,
  wherein the portion of the second grating of the second IDA waveguide in the multiplexed region is configured to provide beam expansion in a second direction different from the first direction to produce a first two-dimensionally expanded second image light,
  wherein a second portion of the incoupled second image light is passed to the second grating of the second IDA waveguide which provides beam expansion to the incoupled second image light in a third direction to produce a third direction expanded second image light,
  wherein the portion of the first grating of the second IDA waveguide in the multiplexed region is configured to provide beam expansion in a fourth direction different from the third direction to produce a second two-dimensionally expanded second image light,
  wherein the multiplexed region of the second IDA waveguide is configured to extract the first two-dimensionally expanded second image light and the second two-dimensionally expanded second image light from the second IDA waveguide towards the eyebox, and
  wherein the first IDA waveguide and the second IDA waveguide comprise an overlapping region where the first two-dimensionally expanded first image light, the second two-dimensionally expanded first image light, the first two-dimensionally expanded second image light, and the second two-dimensionally expanded second image light is ejected towards the eyebox.

4. The waveguide display device of claim 3, wherein the first two-dimensionally expanded first image light and the second two-dimensionally expanded first image light create a first field of view, and wherein the first two-dimensionally expanded second image light and the second two-dimensionally expanded second image light create a second field of view, and wherein the first field of view and second field of view include an overlapping region which combines the resolution of the first field of view and the second field of view.

5. The waveguide display device of claim 4, wherein the first field of view includes first non-overlapping regions on opposite sides of the overlapping region and wherein the second field of view includes second non-overlapping regions on opposite sides of the overlapping region.

6. The waveguide display device of claim 2, wherein the first portion corresponds to a first field of view portion and the second portion corresponds to a second field of view portion, and wherein the first field of view portion and second field of view portion each make up half of the total viewable field of view.

7. The waveguide display device of claim 1, wherein the first pupil and the second pupil are spatially separated.

8. The waveguide display device of claim 7, wherein the first pupil and the second pupil are positioned in different areas of a head band.

9. The waveguide display device of claim 8, wherein the first IDA waveguide and the second IDA waveguide are partially disposed on the head band and partially disposed on an eyepiece.

10. The waveguide display device of claim 1, wherein the first IDA waveguide and the second IDA waveguide have orthogonal principal axis.

11. The waveguide display device of claim 1, wherein the first grating and second grating of the first IDA waveguide have at least one of different aspect ratios, different grating clock angles, or different grating pitches.

12. The waveguide display device of claim 1, wherein the first grating and the second grating of the second IDA waveguide have at least one of different aspect ratios, different grating clock angles, or different grating pitches.

13. The waveguide display device of claim 1, wherein the first IDA waveguide and the second IDA waveguide are integrated onto a first eyepiece.

14. The waveguide display device of claim 13, further comprising:
  a third input image source providing third image light;
  a fourth input image source providing fourth image light;
  a third IDA waveguide comprising:
    an input coupler for incoupling the third image light into a TIR path in the first IDA waveguide via a third pupil;
    a first grating with a first K-vector; and
    a second grating with a second K-vector different than the first K-vector and sharing a multiplexed region with the first grating,
    wherein a first portion of the incoupled third image light is passed to the first grating which provides beam expansion to the incoupled third image light in a first direction and passes the first direction beam expanded light onto the multiplexed region, wherein the portion of the second grating in the multiplexed region is configured to provide beam expansion in a second direction different from the first direction to produce a first two-dimensionally expanded third image light, wherein a second portion of the incoupled third image light is passed to the second grating which provides beam expansion to the incoupled third image light in a third direction to produce a second two-dimensionally expanded third image light, and wherein the multiplexed region is configured to extract the first two-dimensionally expanded third image light and the second two-dimensionally expanded third image light from the third IDA waveguide towards an eyebox; and a fourth IDA waveguide comprising:

an input coupler for incoupling the fourth image light into a TIR path in the fourth IDA waveguide via a fourth pupil;

a first grating with a first K-vector; and a second grating with a second K-vector different than the first K-vector and sharing a multiplexed region with the first grating, wherein a first portion of the incoupled fourth image light is passed to the first grating which provides beam expansion to the incoupled fourth image light in a first direction and passes the first direction beam expanded light onto the multiplexed region, wherein the portion of the second grating in the multiplexed region is configured to provide beam expansion in a second direction different from the first direction to produce a first two-dimensionally expanded fourth image light, wherein a second portion of the incoupled fourth image light is passed to the second grating which provides beam expansion to the incoupled fourth image light in a third direction to produce a second two-dimensionally expanded fourth image light, wherein the multiplexed region is configured to extract the first two-dimensionally expanded fourth image light and the second two-dimensionally expanded fourth image light from the fourth IDA waveguide towards the eyebox, and wherein the third IDA waveguide and the fourth IDA waveguide comprise an overlapping region where the first two-dimensionally expanded third image light, the second two-dimensionally expanded third image light, the first two-dimensionally expanded fourth image light, and the second two-dimensionally expanded fourth image light is ejected towards the eyebox.

15. The waveguide display device of claim 14, wherein the third IDA waveguide and the fourth IDA waveguide are integrated onto a second eyepiece.

16. The waveguide display device of claim 15, wherein the first eyepiece and the second eyepiece are positioned below a head band.

17. The waveguide display device of claim 16, wherein the first eyepiece is configured to eject light into a user's first eye and the second eyepiece is configured to eject light into a user's second eye.

18. The waveguide display device of claim 17, wherein the first two-dimensionally expanded first image light and the second two-dimensionally expanded first image light create a first field of view, and wherein the first two-dimensionally expanded second image light and the second two-dimensionally expanded second image light create a second field of view, and wherein the first field of view and the second field of view include a first overlapping region which combines the resolution of the first field of view and the second field of view, and wherein the first two-dimensionally expanded third image light and the second two-dimensionally expanded third image light create a third field of view, and wherein the first two-dimensionally expanded fourth image light and the second two-dimensionally expanded fourth image light create a fourth field of view, and wherein the third field of view and the fourth field of view include a second overlapping region which combines the resolution of the third field of view and the fourth field of view.

19. The waveguide display device of claim 18, wherein the center of the user's first eye and the center of the user's second eye are separated by an interpupillary distance, and wherein the center of the first overlapping region and the center of the second overlapping region are separated by the interpupillary distance.

* * * * *